(12) United States Patent
Ophardt et al.

(10) Patent No.: US 11,976,953 B2
(45) Date of Patent: May 7, 2024

(54) TOUCH-FREE DOSAGE ADJUSTMENT

(71) Applicant: OP-Hygiene IP GmbH, Niederbipp (CH)

(72) Inventors: Heiner Ophardt, Arisdorf (CH); Andrew Jones, St. Anns (CA); John Garry, St. Catharines (CA)

(73) Assignee: OP-HYGIENE IP GMBH, Niederbipp (CH)

( * ) Notice: Subject to any disclaimer, the term of this patent is extended or adjusted under 35 U.S.C. 154(b) by 144 days.

(21) Appl. No.: 17/371,583

(22) Filed: Jul. 9, 2021

(65) Prior Publication Data

US 2021/0333139 A1 Oct. 28, 2021

Related U.S. Application Data

(63) Continuation of application No. 16/818,380, filed on Mar. 13, 2020, now Pat. No. 11,092,472.

(30) Foreign Application Priority Data

Mar. 15, 2019 (CA) ...................................... 3036883
Mar. 6, 2020 (CA) ...................................... 3074778

(51) Int. Cl.
| | |
|---|---|
| *A47K 5/12* | (2006.01) |
| *F04B 13/00* | (2006.01) |
| *F04B 17/00* | (2006.01) |
| *G01F 11/02* | (2006.01) |

(52) U.S. Cl.
CPC .............. *G01F 11/023* (2013.01); *A47K 5/12* (2013.01); *F04B 13/00* (2013.01); *F04B 17/00* (2013.01)

(58) Field of Classification Search
CPC ...... A47K 5/1207; A47K 5/1217; A47K 5/12; A47K 5/16; B05B 11/1007; B05B 11/1008; B05B 11/1052; B05B 11/1087; G01F 11/00; G01F 11/023
USPC .............................. 222/181.3, 303, 333, 325
See application file for complete search history.

(56) References Cited

U.S. PATENT DOCUMENTS

| | | | | |
|---|---|---|---|---|
| 6,036,056 A | * | 3/2000 | Lee ...................... | A47K 5/1209 222/105 |
| 8,573,443 B2 | * | 11/2013 | Natterer ................ | B05B 12/122 222/173 |
| 8,851,331 B2 | * | 10/2014 | Pelkey ................. | A47K 5/1202 222/289 |
| 9,265,384 B2 | * | 2/2016 | Wegelin ............... | A47K 5/1201 |

(Continued)

*Primary Examiner* — Charles P. Cheyney
(74) *Attorney, Agent, or Firm* — Thorpe North & Western, LLP

(57) ABSTRACT

A fluid dispenser having a pump mechanism that dispenses a dose of fluid when a movable pump member of the pump mechanism is moved between an extended position and a retracted position. A pump engagement body engages with the movable pump member for effecting movement of the movable pump member. A first cam surface and a second cam surface are connected to the pump engagement body, at least one of the first cam surface and the second cam surface comprising an adjustable cam surface whose location relative to the pump engagement body is selectively adjustable. A camming body engages with the first cam surface and the second cam surface to effect movement of the pump engagement body, and a dose adjustment mechanism allows the location of the adjustable cam surface relative to the pump engagement body to be selected.

18 Claims, 84 Drawing Sheets

(56) References Cited

U.S. PATENT DOCUMENTS

| | | | |
|---|---|---|---|
| 10,893,780 B2* | 1/2021 | Ophardt | G01F 11/023 |
| 10,948,326 B2* | 3/2021 | Moore | A47K 5/1207 |
| 2009/0266842 A1* | 10/2009 | Snodgrass | A47K 5/1217 |
| | | | 222/326 |
| 2011/0101032 A1* | 5/2011 | Hsu | B05B 11/1052 |
| | | | 222/309 |
| 2011/0127290 A1* | 6/2011 | Law | A47K 5/12 |
| | | | 222/190 |
| 2012/0080452 A1* | 4/2012 | Boshuizen | A47K 5/1207 |
| | | | 222/1 |

* cited by examiner

TOUCH-FREE DOSAGE ADJUSTMENT

SCOPE OF THE INVENTION

This invention relates to fluid dispensers that dispense an adjustable dosage of fluid, including in particular touch-free hand cleaning fluid dispensers.

BACKGROUND OF THE INVENTION

Hand cleaning fluid dispensers that dispense an adjustable dosage of fluid are known. In some known dispensers, the amount of fluid that is dispensed is adjusted by changing the interface between a pump and a pump actuator, for example by introducing a lost link between the pump and the pump actuator. Typically, these mechanisms work by changing the height of a piston engagement feature of the pump actuator that is responsible for moving a piston of the pump towards a piston chamber of the pump during a retraction stroke. By changing the height of the piston engagement feature, the location of the piston relative to the piston chamber at the end of the retraction stroke can be adjusted, thereby controlling the amount of fluid that is dispensed.

The applicant has appreciated a number of disadvantages of the known prior art dispensers. For example, adjusting the interface between the pump and the pump actuator often requires the dispenser to be at least partially disassembled, which can be time consuming and labor intensive. Furthermore, lock-out mechanisms for preventing the use of unauthorized pumps often operate at the interface between the pump and the pump actuator. Adjusting the fluid dosage by changing the interface between the pump and the pump actuator may prevent these lock-out mechanisms from functioning properly. In addition, dosage adjustment mechanisms that change the position of the piston at the end of the retraction stroke relative to the piston chamber may suffer from priming and dosage consistency issues, as the fluid contained within the piston chamber may not be fully evacuated with each activation.

SUMMARY OF THE INVENTION

To at least partially overcome some of the disadvantages of previously known devices and methods, the present inventors have provided a fluid dispenser with a pump engagement body that engages with a movable pump member for effecting movement of the movable pump member between an extended position and a retracted position, and an adjustable cam surface whose location relative to the pump engagement body is selectively adjustable. The adjustable cam surface engages with a camming body of a driver for effecting movement of the pump engagement body.

The inventors have appreciated that adjusting the location of the adjustable cam surface relative to the pump engagement body allows the dosage of fluid to be adjusted, without requiring the interface between the movable pump member and the pump engagement body to be changed.

In preferred embodiments, the dispenser includes a driver engagement mechanism having a first cam surface and a second cam surface that are connected to the pump engagement body, at least one of the first cam surface and the second cam surface comprising the adjustable cam surface. The camming body of the driver is preferably positioned between the first cam surface and the second cam surface in a Scottish yoke-type arrangement, with the camming body traveling in a circular path to thereby effect movement of the pump engagement body in an extension direction and in a retraction direction through engagement with the first cam surface and the second cam surface. By increasing the distance between the first and second cam surfaces, thereby introducing a lost link between the camming body and the first and second cam surfaces, the distance that the pump engagement body travels in the extension direction and in the retraction direction with each rotation of the camming body can be decreased, producing a corresponding decrease in the volume of fluid that is dispensed.

The inventors have appreciated that the distance between the first and second cam surfaces can be adjusted in a variety of different ways. For example, in some embodiments of the invention the dispenser has a dose adjustment mechanism that includes a sliding body that is laterally slideable relative to the pump engagement body, and a cam adjustment body that carries the adjustable cam surface and is slideable relative to the pump engagement body in the extension direction and in the retraction direction. The sliding body preferably has a ramped adjustment surface and the cam adjustment body has an engagement surface that engages with the ramped adjustment surface. With this arrangement, the location of the adjustable cam surface can be selected by laterally sliding the sliding body relative to the cam adjustment body, to thereby move the cam adjustment body in the retraction direction or in the extension direction through the engagement of the engagement surface with the ramped adjustment surface.

In other embodiments of the invention, the dose adjustment mechanism includes a rotation body that is rotatable about a rotation axis relative to the pump engagement body, the rotation body having an outer adjustment surface with segments whose distance from the rotation axis differs. The engagement surface of the cam adjustment body engages with the outer adjustment surface, such that the location of the adjustable cam surface can be selected by rotating the rotation body about the rotation axis to move the cam adjustment body in the retraction direction or in the extension direction through the engagement of the engagement surface with the outer adjustment surface.

The dose adjustment mechanism is preferably accessible from outside the dispenser, so that the dose can be adjusted without requiring the dispenser to be disassembled. Furthermore, since the dose adjustment mechanism does not change the interface between the movable pump member and the pump engagement body, any lock-out mechanisms that may be present at the interface between the movable pump member and the pump engagement body are not affected by the dose adjustment mechanism.

In preferred embodiments, the adjustable cam surface is the cam surface that the camming body engages with to drive the pump engagement body in the extension direction, and the cam surface that the camming body engages with to drive the pump engagement body in the retraction direction has a fixed location relative to the pump engagement body. This ensures that the movable pump member, which may for example be in the form of a piston, always returns to the same position relative to a reciprocal pump member, such as a piston chamber, at the end of the retraction stroke. Preferably, the piston always returns to a fully retracted state in which substantially all of the fluid contained within the piston chamber is evacuated, thereby avoiding any priming or dosage consistency issues that might arise if the piston chamber was not fully evacuated with each stroke.

In some embodiments of the invention, the adjustable cam surface is located between a first fixed cam surface and a second fixed cam surface, and is laterally slidable relative to the pump engagement body. With this arrangement, the surfaces that the camming body engages with as it travels in its circular path can preferably be selected by selecting the lateral location of the adjustable cam surface. For example, when the adjustable cam surface is at a first lateral location, the camming body may engage with the first fixed cam surface and the adjustable cam surface to effect movement of the pump engagement body, and when the adjustable cam surface is at a second lateral location, the camming body may largely bypass the adjustable cam surface as it travels in its circular path, and instead engage with the first fixed cam surface and the second fixed cam surface to effect movement of the pump engagement body. The lateral location of the adjustable cam surface can thus be selected to control the size of the lost link between the camming body and the driver engagement mechanism, and thereby control the volume of fluid that is dispensed.

Accordingly, in a first aspect the present invention resides in a fluid dispenser comprising: a pump mechanism that dispenses a dose of fluid when a movable pump member of the pump mechanism is moved between an extended position and a retracted position; a pump engagement body that engages with the movable pump member for effecting movement of the movable pump member between the extended position and the retracted position; a driver engagement mechanism having a first cam surface and a second cam surface that are connected to the pump engagement body, at least one of the first cam surface and the second cam surface comprising an adjustable cam surface whose location relative to the pump engagement body is selectively adjustable; a driver having a camming body that moves between an extension position and a retraction position when the driver is activated, the camming body engaging with the first cam surface and the second cam surface to effect movement of the pump engagement body; and a dose adjustment mechanism for selecting the location of the adjustable cam surface relative to the pump engagement body.

In a second aspect, the invention resides in a fluid dispenser, which optionally incorporates one of more features of the first aspect, wherein the location of the adjustable cam surface relative to the pump engagement body is selectable from at least a first location and a second location; and wherein a distance between the first cam surface and the second cam surface is greater when the adjustable cam surface is at the second location than when the adjustable cam surface is at the first location.

In a third aspect, the invention resides in a fluid dispenser, which optionally incorporates one or more features of the first aspect and/or the second aspect, wherein, when the driver is activated, the camming body moves away from the extension position and towards the retraction position in a retraction motion, and moves away from the retraction position and towards the extension position in an extension motion; wherein the camming body engages with the first cam surface at least during an engagement portion of the retraction motion; wherein the camming body engages with the second cam surface at least during an engagement portion of the extension motion; and wherein, when the adjustable cam surface is at the second location, the camming body is disengaged from both the first cam surface and the second cam surface during a disengagement portion of the retraction motion and during a disengagement portion of the extension motion.

In a fourth aspect, the invention resides in a fluid dispenser, which optionally incorporates one or more features of any one or more of the first to third aspects, wherein the camming body travels a lost link distance in a retraction direction during the disengagement portion of the retraction motion, and travels the lost link distance in an extension direction during the disengagement portion of the extension motion; wherein the lost link distance increases as the distance between the first cam surface and the second cam surface increases; wherein the camming body travels an engagement distance in the retraction direction during the engagement portion of the retraction motion, and travels the engagement distance in the extension direction during the engagement portion of the extension motion; wherein the engagement distance decreases as the distance between the first cam surface and the second cam surface increases; wherein the camming body, through engagement with the first cam surface, moves the pump engagement body the engagement distance in the retraction direction during the retraction motion, which moves the movable pump member to the retracted position; wherein the camming body, through engagement with the second cam surface, moves the pump engagement body the engagement distance in the extension direction during the extension motion, which moves the movable pump member to the extended position; wherein a stroke distance between the retracted position and the extended position decreases as the engagement distance decreases; and wherein a volume of the dose of fluid that is dispensed from the pump mechanism decreases as the stroke distance decreases.

In a fifth aspect, the invention resides in a fluid dispenser, which optionally incorporates one or more features of any one or more of the first to fourth aspects, wherein the driver comprises a drive wheel that rotates about a drive axis when the driver is activated; wherein the camming body is carried on the drive wheel and is spaced from the drive axis, so that the camming body moves in a circular path around the drive axis as the drive wheel rotates; and wherein the pump engagement body and the movable pump member are movable in the retraction direction and in the extension direction relative to the drive axis.

In a sixth aspect, the invention resides in a fluid dispenser, which optionally incorporates one or more features of any one or more of the first to fifth aspects, wherein with each activation of the driver, the camming body travels an equal distance in the retraction direction and in the extension direction relative to the drive axis.

In a seventh aspect, the invention resides in a fluid dispenser, which optionally incorporates one or more features of any one or more of the first to sixth aspects, wherein the drive wheel completes one rotation with each activation of the driver.

In an eighth aspect, the invention resides in a fluid dispenser, which optionally incorporates one or more features of any one or more of the first to seventh aspects, wherein the dose adjustment mechanism comprises: a sliding body that is laterally slideable relative to the pump engagement body, the sliding body having a ramped adjustment surface with a first location selection segment, a ramped intermediate segment, and a second location selection segment, the first location selection segment being spaced in the retraction direction or in the extension direction relative to the second location selection segment, and the ramped intermediate segment connecting the first location selection segment to the second location selection segment; and a cam adjustment body that is slideable relative to the pump engagement body in the retraction direction and in the extension direction, the cam adjustment body having an engagement surface that engages with the ramped adjustment surface; wherein the cam adjustment body carries the adjustable cam surface; wherein the location of the adjustable cam surface is selected by laterally sliding the sliding body relative to the cam adjustment body to move the cam adjustment body in the retraction direction or in the extension direction through the engagement of the engagement surface with the ramped adjustment surface; wherein, when the engagement surface is engaged with the first location selection segment of the ramped adjustment surface, the adjustable cam surface is located at the first location relative to the pump engagement body; and wherein, when the engagement surface is engaged with the second location selection segment of the ramped adjustment surface, the adjustable cam surface is located at the second location relative to the pump engagement body.

In a ninth aspect, the invention resides in a fluid dispenser, which optionally incorporates one or more features of any one or more of the first to eighth aspects, wherein the dose adjustment mechanism further comprises: a first holding member that carries the sliding body, allows the sliding body to slide laterally relative to the pump engagement body, and prevents the sliding body from moving in the retraction direction or in the extension direction relative to the pump engagement body; and a second holding member that carries the cam adjustment body, allows the cam adjustment body to slide relative to the pump engagement body in the retraction direction and in the extension direction, and prevents the cam adjustment body from sliding laterally relative to the pump engagement body.

In a tenth aspect, the invention resides in a fluid dispenser, which optionally incorporates one or more features of any one or more of the first to ninth aspects, wherein the dose adjustment mechanism comprises: a rotation body that is rotatable about a rotation axis relative to the pump engagement body, the rotation body having an outer adjustment surface with a first location selection segment, which is spaced a first distance from the rotation axis, and a second location selection segment, which is spaced a second distance from the rotation axis, the first distance being different than the second distance; and a cam adjustment body that is slideable relative to the pump engagement body in the retraction direction and in the extension direction, the cam adjustment body having an engagement surface that engages with the outer adjustment surface; wherein the cam adjustment body carries the adjustable cam surface; wherein the location of the adjustable cam surface is selected by rotating the rotation body about the rotation axis relative to the cam adjustment body to move the cam adjustment body in the retraction direction or in the extension direction through the engagement of the engagement surface with the outer adjustment surface; wherein, when the engagement surface is engaged with the first location selection segment of the outer adjustment surface, the adjustable cam surface is located at the first location relative to the pump engagement body; and wherein, when the engagement surface is engaged with the second location selection segment of the outer adjustment surface, the adjustable cam surface is located at the second location relative to the pump engagement body.

In an eleventh aspect, the invention resides in a fluid dispenser, which optionally incorporates one or more features of any one or more of the first to tenth aspects, wherein the dose adjustment mechanism further comprises: a first holding member that carries the rotation body, allows the rotation body to rotate about the rotation axis relative to the pump engagement body, and prevents the rotation axis from moving in the retraction direction or in the extension direction relative to the pump engagement body; and a second holding member that carries the cam adjustment body, allows the cam adjustment body to slide relative to the pump engagement body in the retraction direction and in the extension direction, and prevents the cam adjustment body from rotating about the rotation axis relative to the pump engagement body.

In a twelfth aspect, the invention resides in a fluid dispenser, which optionally incorporates one or more features of any one or more of the first to eleventh aspects, wherein the rotation body has a rotation effecting surface that is spaced from the rotation axis; the dose adjustment mechanism further comprising a sliding body that is laterally slideable relative to the rotation axis, the sliding body having a contact surface that engages with the rotation effecting surface for effecting rotation of the rotation body; wherein the location of the adjustable cam surface is selected by laterally sliding the sliding body relative to the rotation axis to thereby rotate the rotation body through the engagement of the contact surface with the rotation effecting surface.

In a thirteenth aspect, the invention resides in a fluid dispenser, which optionally incorporates one or more features of any one or more of the first to twelfth aspects, wherein the fluid dispenser further comprises a carrying member that carries the sliding body, allows the sliding body to slide laterally relative to the rotation axis, and prevents the sliding body from moving in the retraction direction or in the extension direction relative to the drive axis.

In a fourteenth aspect, the invention resides in a fluid dispenser, which optionally incorporates one or more features of any one or more of the first to thirteenth aspects, wherein the dose adjustment mechanism comprises: a selection body that is moveable relative to the pump engagement body between a first position and a second position, the selection body having a first location selection surface and a second location selection surface; and a cam adjustment body that is moveable relative to the pump engagement body and carries the adjustable cam surface, the cam adjustment body having an engagement surface that engages with the selection body; wherein, when the selection body is at the first position, the engagement surface of the cam adjustment body engages with the first location selection surface of the selection body, which locates the adjustable cam surface at the first location relative to the pump engagement body; and wherein, when the selection body is at the second position, the engagement surface of the cam adjustment body engages with the second location selection surface of the selection body, which locates the adjustable cam surface at the second location relative to the pump engagement body.

In a fifteenth aspect, the invention resides in a fluid dispenser, which optionally incorporates one or more features of any one or more of the first to fourteenth aspects, wherein the pump mechanism further comprises a reciprocal pump member, the movable pump member being movable relative to the reciprocal pump member between the retracted position and the extended position; wherein, when the movable pump member is at the retracted position, a movable pump surface of the movable pump member is a retracted distance from a reciprocal pump surface of the reciprocal pump member; wherein, when the movable pump member is at the extended position, the movable pump surface of the movable pump member is an extended distance from the reciprocal pump surface of the reciprocal pump member; wherein the extended distance is greater than the retracted distance; wherein, when the camming body is at the retraction position, the engagement of the camming body with the first cam surface positions the movable pump member at the retracted position; and wherein, when the camming body is at the extension position, the engagement of the camming body with the second cam surface positions the movable pump member at the extended position.

In a sixteenth aspect, the invention resides in a fluid dispenser, which optionally incorporates one or more features of any one or more of the first to fifteenth aspects, wherein the second cam surface comprises the adjustable cam surface; and the extended distance between the movable pump surface and the reciprocal pump surface is greater when the adjustable cam surface is at the first location than when the adjustable cam surface is at the second location.

In a seventeenth aspect, the invention resides in a fluid dispenser, which optionally incorporates one or more features of any one or more of the first to sixteenth aspects, wherein the first cam surface has a fixed location relative to the pump engagement body, so that the retracted distance between the movable pump surface and the reciprocal pump surface remains constant regardless of whether the adjustable cam surface is at the first location or the second location.

In an eighteenth aspect, the invention resides in a fluid dispenser, which optionally incorporates one or more features of any one or more of the first to seventeenth aspects, wherein the first cam surface and the second cam surface are substantially parallel.

In a nineteenth aspect, the invention resides in a fluid dispenser, which optionally incorporates one or more features of any one or more of the first to eighteenth aspects, wherein the dose adjustment mechanism comprises a locking mechanism that prevents the camming body from moving the adjustable cam surface relative to the pump engagement body.

In a twentieth aspect, the invention resides in a fluid dispenser, which optionally incorporates one or more features of any one or more of the first to nineteenth aspects, wherein the movable pump member has a catch member, and the pump engagement body has a catch mechanism that engages with the catch member to effect movement of the movable pump member between the extended position and the retracted position; wherein the driver engagement mechanism is spaced from the catch mechanism; and wherein the catch member is spaced from the camming body.

In a twenty first aspect, the invention resides in a fluid dispenser, which optionally incorporates one or more features of any one or more of the first to twentieth aspects, wherein the first cam surface comprises a surface of the pump engagement body.

In a twenty second aspect, the present invention resides in a fluid dispenser comprising: a pump mechanism that dispenses a dose of fluid when a movable pump member of the pump mechanism is moved between an extended position and a retracted position; a pump engagement body that engages with the movable pump member for effecting movement of the movable pump member between the extended position and the retracted position; a driver engagement mechanism having one or more retraction surfaces and one or more extension surfaces that are connected to the pump engagement body, at least one of the one or more retraction surfaces and the one or more extension surfaces comprising an adjustable cam surface whose location relative to the pump engagement body is selectively adjustable; a driver having a camming body that moves between an extension position and a retraction position when the driver is activated, the camming body engaging with at least one of the one or more retraction surfaces and at least one of the one or more extension surfaces to effect movement of the pump engagement body; and a dose adjustment mechanism for selecting the location of the adjustable cam surface relative to the pump engagement body.

In a twenty third aspect, the invention resides in the fluid dispenser in accordance with the twenty second aspect, which optionally incorporates one or more features of any one or more of the first to twenty first aspects.

In a twenty fourth aspect, the invention resides in a fluid dispenser, which optionally incorporates one or more features of any one or more of the first to twenty third aspects, wherein the driver engagement mechanism has a first cam surface and a second cam surface that are connected to the pump engagement body; wherein the location of the adjustable cam surface is selectable from at least a first location and a second location; wherein, when the adjustable cam surface is at the first location and the driver is activated, the camming body engages with at least the first cam surface and the second cam surface to effect movement of the pump engagement body; and wherein, when the adjustable cam surface is at the second location and the driver is activated, the camming body engages with at least the first cam surface and the adjustable cam surface to effect movement of the pump engagement body, without engaging with the second cam surface.

In a twenty fifth aspect, the invention resides in a fluid dispenser, which optionally incorporates one or more features of any one or more of the first to twenty fourth aspects, wherein the camming body is positioned between the first cam surface and the second cam surface; wherein, when the adjustable cam surface is at the second location, the adjustable cam surface is positioned between the first cam surface and the second cam surface; and wherein, when the adjustable cam surface is at the second location, a distance between the first cam surface and the second cam surface is greater than a distance between the first cam surface and the adjustable cam surface.

In a twenty sixth aspect, the invention resides in a fluid dispenser, which optionally incorporates one or more features of any one or more of the first to twenty fifth aspects, wherein, when the driver is activated, the camming body moves away from the extension position and towards the retraction position in a retraction motion, and moves away from the retraction position and towards the extension position in an extension motion; wherein the camming body engages with the at least one of the one or more retraction surfaces at least during an engagement portion of the retraction motion; wherein the camming body engages with the at least one of the one or more extension surfaces at least during an engagement portion of the extension motion; wherein the one or more retraction surfaces comprise the first cam surface; wherein the one or more extension surfaces comprise the adjustable cam surface and the second cam surface; wherein, when the adjustable cam surface is at the first location, the camming body engages with the first cam surface during at least part of the engagement portion of the retraction motion; wherein, when the adjustable cam surface is at the first location, the camming body engages with the second cam surface during at least part of the engagement portion of the extension motion; wherein, when the adjustable cam surface is at the second location, the camming body engages with the first cam surface during at least part of the engagement portion of the retraction motion; wherein, when the adjustable cam surface is at the second location, the camming body engages with the adjustable cam surface during at least part of the engagement portion of the extension motion; and wherein, when the adjustable cam surface is at the first location, the camming body is disengaged from the one or more retraction surfaces and the one or more extension surfaces during a disengagement portion of the retraction motion and during a disengagement portion of the extension motion.

In a twenty seventh aspect, the invention resides in a fluid dispenser, which optionally incorporates one or more features of any one or more of the first to twenty sixth aspects, wherein the camming body travels a lost link distance in a retraction direction during the disengagement portion of the retraction motion, and travels the lost link distance in an extension direction during the disengagement portion of the extension motion; wherein the lost link distance is greater when the adjustable cam surface is at the first location than when the adjustable cam surface is at the second location; wherein the camming body travels an engagement distance in the retraction direction during the engagement portion of the retraction motion, and travels the engagement distance in the extension direction during the engagement portion of the extension motion; wherein the engagement distance is greater when the adjustable cam surface is at the second location than when the adjustable cam surface is at the first location; wherein the camming body, through engagement with the at least one of the one or more retraction surfaces, moves the pump engagement body the engagement distance in the retraction direction during the retraction motion, which moves the movable pump member to the retracted position; wherein the camming body, through engagement with the at least one of the one or more extension surfaces, moves the pump engagement body the engagement distance in the extension direction during the extension motion, which moves the movable pump member to the extended position; wherein a stroke distance between the retracted position and the extended position decreases as the engagement distance decreases; and wherein a volume of the dose of fluid that is dispensed from the pump mechanism decreases as the stroke distance decreases.

In a twenty eighth aspect, the invention resides in a fluid dispenser, which optionally incorporates one or more features of any one or more of the first to twenty seventh aspects, wherein the driver comprises a drive wheel that rotates about a drive axis when the driver as activated; wherein the camming body is carried on the drive wheel and is spaced from the drive axis, so that the camming body moves in a circular path around the drive axis as the drive wheel rotates; and wherein the pump engagement body and the movable pump member are movable in the retraction direction and in the extension direction relative to the drive axis.

In a twenty ninth aspect, the invention resides in a fluid dispenser, which optionally incorporates one or more features of any one or more of the first to twenty eighth aspects, wherein, with each activation of the driver, the camming body travels an equal distance in the retraction direction and in the extension direction relative to the drive axis.

In a thirtieth aspect, the invention resides in a fluid dispenser, which optionally incorporates one or more features of any one or more of the first to twenty ninth aspects, wherein the drive wheel completes one rotation with each activation of the driver.

In a thirty first aspect, the invention resides in a fluid dispenser, which optionally incorporates one or more features of any one or more of the first to thirtieth aspects, wherein, when the driver is activated, the camming body travels in a first lateral direction and an opposite second lateral direction in addition to travelling in the retraction direction and the extension direction, the first lateral direction and the second lateral direction being perpendicular to the retraction direction and perpendicular to the extension direction.

In a thirty second aspect, the invention resides in a fluid dispenser, which optionally incorporates one or more features of any one or more of the first to thirty first aspects, wherein, when the adjustable cam surface is at the first location and the driver is activated: the camming body travels past the adjustable cam surface in the extension direction during the extension motion, and travels past the adjustable cam surface in the retraction direction during the retraction motion; the camming body is located in the first lateral direction relative to the adjustable cam surface when the camming body passes the adjustable cam surface in the extension direction during the extension motion; and the camming body is located in the second lateral direction relative to the adjustable cam surface when the camming body passes the adjustable cam surface in the retraction direction during the retraction motion.

In a thirty third aspect, the invention resides in a fluid dispenser, which optionally incorporates one or more features of any one or more of the first to thirty second aspects, wherein the dose adjustment mechanism comprises a sliding body that carries the adjustable cam surface; and wherein the sliding body is laterally slideable relative to the pump engagement body for selecting the location of the adjustable cam surface relative to the pump engagement body.

In a thirty fourth aspect, the invention resides in a fluid dispenser, which optionally incorporates one or more features of any one or more of the first to thirty third aspects, wherein the pump engagement body comprises a holding member that carries the sliding body, allows the sliding body to slide laterally relative to the pump engagement body, and prevents the sliding body from moving in the retraction direction or in the extension direction relative to the pump engagement body.

In a thirty fifth aspect, the invention resides in a fluid dispenser, which optionally incorporates one or more features of any one or more of the first to thirty fourth aspects, wherein the pump mechanism further comprises a reciprocal pump member, the movable pump member being movable relative to the reciprocal pump member between the retracted position and the extended position; wherein, when the movable pump member is at the retracted position, a movable pump surface of the movable pump member is a retracted distance from a reciprocal pump surface of the reciprocal pump member; wherein, when the movable pump member is at the extended position, the movable pump surface of the movable pump member is an extended distance from the reciprocal pump surface of the reciprocal pump member; wherein the extended distance is greater than the retracted distance; wherein the engagement of the camming body with the at least one of the one or more retraction surfaces during the retraction motion moves the movable pump member to the retracted position; and wherein the engagement of the camming body with the at least one of the one or more extension surfaces during the extension motion moves the movable pump member to the extended position.

In a thirty sixth aspect, the invention resides in a fluid dispenser, which optionally incorporates one or more features of any one or more of the first to thirty fifth aspects, wherein the extended distance between the movable pump surface and the reciprocal pump surface is greater when the adjustable cam surface is at the second location than when the adjustable cam surface is at the first location.

In a thirty seventh aspect, the invention resides in a fluid dispenser, which optionally incorporates one or more features of any one or more of the first to thirty sixth aspects, wherein the camming body engages with the first cam surface when the camming body is at the retraction position, regardless of whether the adjustable cam surface is at the first location or the second location; and wherein the first cam surface has a fixed location relative to the pump engagement body, so that the retracted distance between the movable pump surface and the reciprocal pump surface remains constant regardless of whether the adjustable cam surface is at the first location or the second location.

In a thirty eighth aspect, the invention resides in a fluid dispenser, which optionally incorporates one or more features of any one or more of the first to thirty seventh aspects, wherein the adjustable cam surface is a first adjustable cam surface; wherein the location of the first adjustable cam surface is selectable from at least the first location, the second location, and a third location; wherein the sliding body carries a second adjustable cam surface that is spaced from the first adjustable cam surface; and wherein, when the first adjustable cam surface is at the third location and the driver is activated, the camming body engages with at least the first cam surface and the second adjustable cam surface to effect movement of the pump engagement body.

In a thirty ninth aspect, the invention resides in a fluid dispenser, which optionally incorporates one or more features of any one or more of the first to thirty eighth aspects, wherein, when the first adjustable cam surface is at the third location, the second adjustable cam surface is positioned between the first cam surface and the second cam surface; wherein the one or more extension surfaces further comprise the second adjustable cam surface; wherein, when the first adjustable cam surface is at the third location, the camming body engages with the first cam surface during at least part of the engagement portion of the retraction motion; wherein, when the first adjustable cam surface is at the third location, the camming body engages with the second adjustable cam surface during at least part of the engagement portion of the extension motion; and wherein the lost link distance is greater when the first adjustable cam surface is at the second location than when the first adjustable cam surface is at the third location.

In a fortieth aspect, the invention resides in a fluid dispenser, which optionally incorporates one or more features of any one or more of the first to thirty ninth aspects, wherein the first cam surface, the second cam surface, the first adjustable cam surface, and the second adjustable cam surface are substantially parallel.

In a forty first aspect, the invention resides in a fluid dispenser, which optionally incorporates one or more features of any one or more of the first to fortieth aspects, wherein the dose adjustment mechanism comprises a locking mechanism that prevents the camming body from moving the adjustable cam surface relative to the pump engagement body.

In a forty second aspect, the invention resides in a fluid dispenser, which optionally incorporates one or more features of any one or more of the first to forty first aspects, wherein the movable pump member has a catch member, and the pump engagement body has a catch mechanism that engages with the catch member to effect movement of the movable pump member between the extended position and the retracted position; wherein the driver engagement mechanism is spaced from the catch mechanism; and wherein the catch member is spaced from the camming body.

In a forty third aspect, the invention resides in a fluid dispenser, which optionally incorporates one or more features of any one or more of the first to forty second aspects, wherein the dose adjustment mechanism comprises a sliding body that carries the adjustable cam surface; and wherein the sliding body is laterally slideable relative to the pump engagement body for selecting the location of the adjustable cam surface relative to the pump engagement body.

In a forty fourth aspect, the invention resides in a fluid dispenser, which optionally incorporates one or more features of any one or more of the first to forty third aspects, wherein the first cam surface, the second cam surface, and the adjustable cam surface are substantially parallel.

In a forty fifth aspect, the invention resides in a fluid dispenser, which optionally incorporates one or more features of any one or more of the first to forty fourth aspects, wherein the first cam surface and the second cam surface each comprise a respective surface of the pump engagement body.

In a forty sixth aspect, the invention resides in a fluid dispenser, which optionally incorporates one or more features of any one or more of the first to forty fifth aspects, wherein the one or more retraction surfaces comprise a first cam surface; wherein the first cam surface has a fixed location relative to the pump engagement body; and wherein the camming body engages with the first cam surface when the camming body is at the retraction position.

In a forty seventh aspect, the invention resides in a fluid dispenser, which optionally incorporates one or more features of any one or more of the first to forty sixth aspects, wherein the first cam surface has a fixed location relative to the pump engagement body; and wherein the camming body engages with the first cam surface when the camming body is at the retraction position, regardless of whether the adjustable cam surface is at the first location or the second location.

In a forty eighth aspect, the invention resides in a fluid dispenser, which optionally incorporates one or more features of any one or more of the first to forty seventh aspects, wherein, when the driver is activated, the camming body moves in a retraction direction towards the retraction position during a retraction motion, and moves in an extension direction towards the extension position during an extension motion; wherein, when the driver is activated, the camming body also travels in a first lateral direction and an opposite second lateral direction, the first lateral direction and the second lateral direction being perpendicular to the retraction direction and perpendicular to the extension direction; wherein, when the adjustable cam surface is at a first location and the driver is activated: the camming body travels past the adjustable cam surface in the extension direction during the extension motion, and travels past the adjustable cam surface in the retraction direction during the retraction motion; the camming body is located in the first lateral direction relative to the adjustable cam surface when the camming body passes the adjustable cam surface in the extension direction during the extension motion; and the camming body is located in the second lateral direction relative to the adjustable cam surface when the camming body passes the adjustable cam surface in the retraction direction during the retraction motion.

In a forty ninth aspect, the invention resides in a fluid dispenser, which optionally incorporates one or more features of any one or more of the first to forty eighth aspects, wherein the fluid is a hand cleaning fluid.

In a fiftieth aspect, the invention resides in a fluid dispenser, which optionally incorporates one or more features of any one or more of the first to forty ninth aspects, wherein fluid dispenser comprises: a pump mechanism that dispenses a dose of fluid when a movable pump member of the pump mechanism is moved between an extended position and a retracted position; a pump engagement body that engages with the movable pump member for effecting movement of the movable pump member between the extended position and the retracted position; a driver engagement mechanism having a first cam surface and a second cam surface that are connected to the pump engagement body, at least one of the first cam surface and the second cam surface comprising an adjustable cam surface whose location relative to the pump engagement body is selectively adjustable; a driver having a camming body that moves between an extension position and a retraction position when the driver is activated, the camming body engaging with the first cam surface and the second cam surface to effect movement of the pump engagement body; and a dose adjustment mechanism for selecting the location of the adjustable cam surface relative to the pump engagement body.

In a fifty first aspect, the invention resides in a fluid dispenser, which optionally incorporates one or more features of any one or more of the first to fiftieth aspects, wherein the camming body is positioned between the first cam surface and the second cam surface; wherein the location of the adjustable cam surface relative to the pump engagement body is selectable from at least a first location and a second location; and wherein a distance between the first cam surface and the second cam surface is greater when the adjustable cam surface is at the second location than when the adjustable cam surface is at the first location.

In a fifty second aspect, the invention resides in a fluid dispenser, which optionally incorporates one or more features of any one or more of the first to fifty first aspects, wherein, when the driver is activated, the camming body moves away from the extension position and towards the retraction position in a retraction motion, and moves away from the retraction position and towards the extension position in an extension motion; wherein the camming body engages with the first cam surface at least during an engagement portion of the retraction motion; wherein the camming body engages with the second cam surface at least during an engagement portion of the extension motion; and wherein, when the adjustable cam surface is at the second location, the camming body is disengaged from both the first cam surface and the second cam surface during a disengagement portion of the retraction motion and during a disengagement portion of the extension motion.

In a fifty third aspect, the invention resides in a fluid dispenser, which optionally incorporates one or more features of any one or more of the first to fifty second aspects, wherein the camming body travels a lost link distance in a retraction direction during the disengagement portion of the retraction motion, and travels the lost link distance in an extension direction during the disengagement portion of the extension motion; wherein the lost link distance increases as the distance between the first cam surface and the second cam surface increases; wherein the camming body travels an engagement distance in the retraction direction during the engagement portion of the retraction motion, and travels the engagement distance in the extension direction during the engagement portion of the extension motion; wherein the engagement distance decreases as the distance between the first cam surface and the second cam surface increases; wherein the camming body, through engagement with the first cam surface, moves the pump engagement body the engagement distance in the retraction direction during the retraction motion, which moves the movable pump member to the retracted position; wherein the camming body, through engagement with the second cam surface, moves the pump engagement body the engagement distance in the extension direction during the extension motion, which moves the movable pump member to the extended position; wherein a stroke distance between the retracted position and the extended position decreases as the engagement distance decreases; and wherein a volume of the dose of fluid that is dispensed from the pump mechanism decreases as the stroke distance decreases.

In a fifty fourth aspect, the invention resides in a fluid dispenser, which optionally incorporates one or more features of any one or more of the first to fifty third aspects, wherein the driver comprises a drive wheel that rotates about a drive axis when the driver is activated; wherein the camming body is carried on the drive wheel and is spaced from the drive axis, so that the camming body moves in a circular path around the drive axis as the drive wheel rotates; and wherein the pump engagement body and the movable pump member are movable in the retraction direction and in the extension direction relative to the drive axis.

In a fifty fifth aspect, the invention resides in a fluid dispenser, which optionally incorporates one or more features of any one or more of the first to fifty fourth aspects, wherein, with each activation of the driver, the camming body travels an equal distance in the retraction direction and in the extension direction relative to the drive axis.

In a fifty sixth aspect, the invention resides in a fluid dispenser, which optionally incorporates one or more features of any one or more of the first to fifty fifth aspects, wherein the drive wheel completes one rotation with each activation of the driver.

In a fifty seventh aspect, the invention resides in a fluid dispenser, which optionally incorporates one or more features of any one or more of the first to fifty sixth aspects, wherein the dose adjustment mechanism comprises: a sliding body that is laterally slideable relative to the pump engagement body, the sliding body having a ramped adjustment surface with a first location selection segment, a ramped intermediate segment, and a second location selection segment, the first location selection segment being spaced in the retraction direction or in the extension direction relative to the second location selection segment, and the ramped intermediate segment connecting the first location selection segment to the second location selection segment; and a cam adjustment body that is slideable relative to the pump engagement body in the retraction direction and in the extension direction, the cam adjustment body having an engagement surface that engages with the ramped adjustment surface; wherein the cam adjustment body carries the adjustable cam surface; wherein the location of the adjustable cam surface is selected by laterally sliding the sliding body relative to the cam adjustment body to move the cam adjustment body in the retraction direction or in the extension direction through the engagement of the engagement surface with the ramped adjustment surface; wherein, when the engagement surface is engaged with the first location selection segment of the ramped adjustment surface, the adjustable cam surface is located at the first location relative to the pump engagement body; and wherein, when the engagement surface is engaged with the second location selection segment of the ramped adjustment surface, the adjustable cam surface is located at the second location relative to the pump engagement body.

In a fifty eighth aspect, the invention resides in a fluid dispenser, which optionally incorporates one or more features of any one or more of the first to fifty seventh aspects, wherein the dose adjustment mechanism further comprises:

a first holding member that carries the sliding body, allows the sliding body to slide laterally relative to the pump engagement body, and prevents the sliding body from moving in the retraction direction or in the extension direction relative to the pump engagement body; and a second holding member that carries the cam adjustment body, allows the cam adjustment body to slide relative to the pump engagement body in the retraction direction and in the extension direction, and prevents the cam adjustment body from sliding laterally relative to the pump engagement body.

In a fifty ninth aspect, the invention resides in a fluid dispenser, which optionally incorporates one or more features of any one or more of the first to fifty eighth aspects, wherein the dose adjustment mechanism comprises: a rotation body that is rotatable about a rotation axis relative to the pump engagement body, the rotation body having an outer adjustment surface with a first location selection segment, which is spaced a first distance from the rotation axis, and a second location selection segment, which is spaced a second distance from the rotation axis, the first distance being different than the second distance; and a cam adjustment body that is slideable relative to the pump engagement body in the retraction direction and in the extension direction, the cam adjustment body having an engagement surface that engages with the outer adjustment surface; wherein the cam adjustment body carries the adjustable cam surface; wherein the location of the adjustable cam surface is selected by rotating the rotation body about the rotation axis relative to the cam adjustment body to move the cam adjustment body in the retraction direction or in the extension direction through the engagement of the engagement surface with the outer adjustment surface; wherein, when the engagement surface is engaged with the first location selection segment of the outer adjustment surface, the adjustable cam surface is located at the first location relative to the pump engagement body; and wherein, when the engagement surface is engaged with the second location selection segment of the outer adjustment surface, the adjustable cam surface is located at the second location relative to the pump engagement body.

In a sixtieth aspect, the invention resides in a fluid dispenser, which optionally incorporates one or more features of any one or more of the first to fifty ninth aspects, wherein the dose adjustment mechanism further comprises: a first holding member that carries the rotation body, allows the rotation body to rotate about the rotation axis relative to the pump engagement body, and prevents the rotation axis from moving in the retraction direction or in the extension direction relative to the pump engagement body; and a second holding member that carries the cam adjustment body, allows the cam adjustment body to slide relative to the pump engagement body in the retraction direction and in the extension direction, and prevents the cam adjustment body from rotating about the rotation axis relative to the pump engagement body.

In a sixty first aspect, the invention resides in a fluid dispenser, which optionally incorporates one or more features of any one or more of the first to sixtieth aspects, wherein the rotation body has a rotation effecting surface that is spaced from the rotation axis; the dose adjustment mechanism further comprising a sliding body that is laterally slideable relative to the rotation axis, the sliding body having a contact surface that engages with the rotation effecting surface for effecting rotation of the rotation body; wherein the location of the adjustable cam surface is selected by laterally sliding the sliding body relative to the rotation axis to thereby rotate the rotation body through the engagement of the contact surface with the rotation effecting surface.

In a sixty second aspect, the invention resides in a fluid dispenser, which optionally incorporates one or more features of any one or more of the first to sixty first aspects, wherein the fluid dispenser further comprises a carrying member that carries the sliding body, allows the sliding body to slide laterally relative to the rotation axis, and prevents the sliding body from moving in the retraction direction or in the extension direction relative to the drive axis.

In a sixty third aspect, the invention resides in a fluid dispenser, which optionally incorporates one or more features of any one or more of the first to sixty second aspects, wherein the dose adjustment mechanism comprises: a selection body that is moveable relative to the pump engagement body between a first position and a second position, the selection body having a first location selection surface and a second location selection surface; and a cam adjustment body that is moveable relative to the pump engagement body and carries the adjustable cam surface, the cam adjustment body having an engagement surface that engages with the selection body; wherein, when the selection body is at the first position, the engagement surface of the cam adjustment body engages with the first location selection surface of the selection body, which locates the adjustable cam surface at the first location relative to the pump engagement body; and wherein, when the selection body is at the second position, the engagement surface of the cam adjustment body engages with the second location selection surface of the selection body, which locates the adjustable cam surface at the second location relative to the pump engagement body.

In a sixty fourth aspect, the invention resides in a fluid dispenser, which optionally incorporates one or more features of any one or more of the first to sixty third aspects, wherein the pump mechanism further comprises a reciprocal pump member, the movable pump member being movable relative to the reciprocal pump member between the retracted position and the extended position; wherein, when the movable pump member is at the retracted position, a movable pump surface of the movable pump member is a retracted distance from a reciprocal pump surface of the reciprocal pump member; wherein, when the movable pump member is at the extended position, the movable pump surface of the movable pump member is an extended distance from the reciprocal pump surface of the reciprocal pump member; wherein the extended distance is greater than the retracted distance; wherein, when the camming body is at the retraction position, the engagement of the camming body with the first cam surface positions the movable pump member at the retracted position; and wherein, when the camming body is at the extension position, the engagement of the camming body with the second cam surface positions the movable pump member at the extended position.

In a sixty fifth aspect, the invention resides in a fluid dispenser, which optionally incorporates one or more features of any one or more of the first to sixty fourth aspects, wherein the second cam surface comprises the adjustable cam surface; and the extended distance between the movable pump surface and the reciprocal pump surface is greater when the adjustable cam surface is at the first location than when the adjustable cam surface is at the second location.

In a sixty sixth aspect, the invention resides in a fluid dispenser, which optionally incorporates one or more features of any one or more of the first to sixty fifth aspects, wherein the first cam surface has a fixed location relative to the pump engagement body, so that the retracted distance between the movable pump surface and the reciprocal pump surface remains constant regardless of whether the adjustable cam surface is at the first location or the second location.

In a sixty seventh aspect, the invention resides in a fluid dispenser, which optionally incorporates one or more features of any one or more of the first to sixty sixth aspects, wherein the first cam surface and the second cam surface are substantially parallel; and the first cam surface comprises a surface of the pump engagement body.

In a sixty eighth aspect, the invention resides in a fluid dispenser, which optionally incorporates one or more features of any one or more of the first to sixty seventh aspects, wherein the dose adjustment mechanism comprises a locking mechanism that prevents the camming body from moving the adjustable cam surface relative to the pump engagement body.

In a sixty ninth aspect, the invention resides in a fluid dispenser, which optionally incorporates one or more features of any one or more of the first to sixty eighth aspects, wherein the movable pump member has a catch member, and the pump engagement body has a catch mechanism that engages with the catch member to effect movement of the movable pump member between the extended position and the retracted position; wherein the driver engagement mechanism is spaced from the catch mechanism; wherein the catch member is spaced from the camming body; and wherein the fluid is a hand cleaning fluid.

In a seventieth aspect, the invention resides in a fluid dispenser, which optionally incorporates one or more features of any one or more of the first to sixty ninth aspects, wherein the fluid dispenser comprises: a pump mechanism that dispenses a dose of fluid when a movable pump member of the pump mechanism is moved between an extended position and a retracted position; a pump engagement body that engages with the movable pump member for effecting movement of the movable pump member between the extended position and the retracted position; a driver engagement mechanism having a first cam surface and a second cam surface that are connected to the pump engagement body, at least one of the first cam surface and the second cam surface comprising an adjustable cam surface whose location relative to the pump engagement body is selectively adjustable; a driver having a camming body that moves between an extension position and a retraction position when the driver is activated, the camming body engaging with the first cam surface and the second cam surface to effect movement of the pump engagement body; and a dose adjustment mechanism for selecting the location of the adjustable cam surface relative to the pump engagement body.

In a seventy first aspect, the invention resides in a fluid dispenser, which optionally incorporates one or more features of any one or more of the first to seventieth aspects, wherein the camming body is positioned between the first cam surface and the second cam surface; wherein the location of the adjustable cam surface relative to the pump engagement body is selectable from at least a first location and a second location; and wherein a distance between the first cam surface and the second cam surface is greater when the adjustable cam surface is at the second location than when the adjustable cam surface is at the first location.

In a seventy second aspect, the invention resides in a fluid dispenser, which optionally incorporates one or more features of any one or more of the first to seventy first aspects, wherein, when the driver is activated, the camming body moves away from the extension position and towards the retraction position in a retraction motion, and moves away from the retraction position and towards the extension position in an extension motion; wherein the camming body engages with the first cam surface at least during an engagement portion of the retraction motion; wherein the camming body engages with the second cam surface at least during an engagement portion of the extension motion; and wherein, when the adjustable cam surface is at the second location, the camming body is disengaged from both the first cam surface and the second cam surface during a disengagement portion of the retraction motion and during a disengagement portion of the extension motion.

In a seventy third aspect, the invention resides in a fluid dispenser, which optionally incorporates one or more features of any one or more of the first to seventy second aspects, wherein the camming body travels a lost link distance in a retraction direction during the disengagement portion of the retraction motion, and travels the lost link distance in an extension direction during the disengagement portion of the extension motion; wherein the lost link distance increases as the distance between the first cam surface and the second cam surface increases; wherein the camming body travels an engagement distance in the retraction direction during the engagement portion of the retraction motion, and travels the engagement distance in the extension direction during the engagement portion of the extension motion; wherein the engagement distance decreases as the distance between the first cam surface and the second cam surface increases; wherein the camming body, through engagement with the first cam surface, moves the pump engagement body the engagement distance in the retraction direction during the retraction motion, which moves the movable pump member to the retracted position; wherein the camming body, through engagement with the second cam surface, moves the pump engagement body the engagement distance in the extension direction during the extension motion, which moves the movable pump member to the extended position; wherein a stroke distance between the retracted position and the extended position decreases as the engagement distance decreases; and wherein a volume of the dose of fluid that is dispensed from the pump mechanism decreases as the stroke distance decreases.

In a seventy fourth aspect, the invention resides in a fluid dispenser, which optionally incorporates one or more features of any one or more of the first to seventy third aspects, wherein the driver comprises a drive wheel that rotates about a drive axis when the driver is activated; wherein the camming body is carried on the drive wheel and is spaced from the drive axis, so that the camming body moves in a circular path around the drive axis as the drive wheel rotates; wherein the pump engagement body and the movable pump member are movable in the retraction direction and in the extension direction relative to the drive axis; and wherein with each activation of the driver, the camming body travels an equal distance in the retraction direction and in the extension direction relative to the drive axis.

In a seventy fifth aspect, the invention resides in a fluid dispenser, which optionally incorporates one or more features of any one or more of the first to seventy fourth aspects, wherein the drive wheel completes one rotation with each activation of the driver.

In a seventy sixth aspect, the invention resides in a fluid dispenser, which optionally incorporates one or more features of any one or more of the first to seventy fifth aspects, wherein the dose adjustment mechanism comprises: a sliding body that is laterally slideable relative to the pump engagement body, the sliding body having a ramped adjustment surface with a first location selection segment, a ramped intermediate segment, and a second location selection segment, the first location selection segment being spaced in the retraction direction or in the extension direction relative to the second location selection segment, and the ramped intermediate segment connecting the first location selection segment to the second location selection segment; and a cam adjustment body that is slideable relative to the pump engagement body in the retraction direction and in the extension direction, the cam adjustment body having an engagement surface that engages with the ramped adjustment surface; wherein the cam adjustment body carries the adjustable cam surface; wherein the location of the adjustable cam surface is selected by laterally sliding the sliding body relative to the cam adjustment body to move the cam adjustment body in the retraction direction or in the extension direction through the engagement of the engagement surface with the ramped adjustment surface; wherein, when the engagement surface is engaged with the first location selection segment of the ramped adjustment surface, the adjustable cam surface is located at the first location relative to the pump engagement body; wherein, when the engagement surface is engaged with the second location selection segment of the ramped adjustment surface, the adjustable cam surface is located at the second location relative to the pump engagement body; and wherein the dose adjustment mechanism further comprises: a first holding member that carries the sliding body, allows the sliding body to slide laterally relative to the pump engagement body, and prevents the sliding body from moving in the retraction direction or in the extension direction relative to the pump engagement body; and a second holding member that carries the cam adjustment body, allows the cam adjustment body to slide relative to the pump engagement body in the retraction direction and in the extension direction, and prevents the cam adjustment body from sliding laterally relative to the pump engagement body.

In a seventy seventh aspect, the invention resides in a fluid dispenser, which optionally incorporates one or more features of any one or more of the first to seventy sixth aspects, wherein the dose adjustment mechanism comprises: a rotation body that is rotatable about a rotation axis relative to the pump engagement body, the rotation body having an outer adjustment surface with a first location selection segment, which is spaced a first distance from the rotation axis, and a second location selection segment, which is spaced a second distance from the rotation axis, the first distance being different than the second distance; and a cam adjustment body that is slideable relative to the pump engagement body in the retraction direction and in the extension direction, the cam adjustment body having an engagement surface that engages with the outer adjustment surface; wherein the cam adjustment body carries the adjustable cam surface; wherein the location of the adjustable cam surface is selected by rotating the rotation body about the rotation axis relative to the cam adjustment body to move the cam adjustment body in the retraction direction or in the extension direction through the engagement of the engagement surface with the outer adjustment surface; wherein, when the engagement surface is engaged with the first location selection segment of the outer adjustment surface, the adjustable cam surface is located at the first location relative to the pump engagement body; wherein, when the engagement surface is engaged with the second location selection segment of the outer adjustment surface, the adjustable cam surface is located at the second location relative to the pump engagement body; wherein the dose adjustment mechanism further comprises: a first holding member that carries the rotation body, allows the rotation body to rotate about the rotation axis relative to the pump engagement body, and prevents the rotation axis from moving in the retraction direction or in the extension direction relative to the pump engagement body; and a second holding member that carries the cam adjustment body, allows the cam adjustment body to slide relative to the pump engagement body in the retraction direction and in the extension direction, and prevents the cam adjustment body from rotating about the rotation axis relative to the pump engagement body; wherein the rotation body has a rotation effecting surface that is spaced from the rotation axis; the dose adjustment mechanism further comprising a sliding body that is laterally slideable relative to the rotation axis, the sliding body having a contact surface that engages with the rotation effecting surface for effecting rotation of the rotation body; wherein the location of the adjustable cam surface is selected by laterally sliding the sliding body relative to the rotation axis to thereby rotate the rotation body through the engagement of the contact surface with the rotation effecting surface; and wherein the fluid dispenser further comprises a carrying member that carries the sliding body, allows the sliding body to slide laterally relative to the rotation axis, and prevents the sliding body from moving in the retraction direction or in the extension direction relative to the drive axis.

In a seventy eighth aspect, the invention resides in a fluid dispenser, which optionally incorporates one or more features of any one or more of the first to seventy seventh aspects, wherein the dose adjustment mechanism comprises: a selection body that is moveable relative to the pump engagement body between a first position and a second position, the selection body having a first location selection surface and a second location selection surface; and a cam adjustment body that is moveable relative to the pump engagement body and carries the adjustable cam surface, the cam adjustment body having an engagement surface that engages with the selection body; wherein, when the selection body is at the first position, the engagement surface of the cam adjustment body engages with the first location selection surface of the selection body, which locates the adjustable cam surface at the first location relative to the pump engagement body; and wherein, when the selection body is at the second position, the engagement surface of the cam adjustment body engages with the second location selection surface of the selection body, which locates the adjustable cam surface at the second location relative to the pump engagement body.

In a seventy ninth aspect, the invention resides in a fluid dispenser, which optionally incorporates one or more features of any one or more of the first to seventy eighth aspects, wherein the pump mechanism further comprises a reciprocal pump member, the movable pump member being movable relative to the reciprocal pump member between the retracted position and the extended position; wherein, when the movable pump member is at the retracted position, a movable pump surface of the movable pump member is a retracted distance from a reciprocal pump surface of the reciprocal pump member; wherein, when the movable pump member is at the extended position, the movable pump surface of the movable pump member is an extended distance from the reciprocal pump surface of the reciprocal pump member; wherein the extended distance is greater than the retracted distance; wherein, when the camming body is at the retraction position, the engagement of the camming body with the first cam surface positions the movable pump member at the retracted position; and wherein, when the camming body is at the extension position, the engagement of the camming body with the second cam surface positions the movable pump member at the extended position.

In an eightieth aspect, the invention resides in a fluid dispenser, which optionally incorporates one or more features of any one or more of the first to seventy ninth aspects, wherein the second cam surface comprises the adjustable cam surface; and wherein the extended distance between the movable pump surface and the reciprocal pump surface is greater when the adjustable cam surface is at the first location than when the adjustable cam surface is at the second location.

In an eighty first aspect, the invention resides in a fluid dispenser, which optionally incorporates one or more features of any one or more of the first to eightieth aspects, wherein the first cam surface has a fixed location relative to the pump engagement body, so that the retracted distance between the movable pump surface and the reciprocal pump surface remains constant regardless of whether the adjustable cam surface is at the first location or the second location.

In an eighty second aspect, the invention resides in a fluid dispenser, which optionally incorporates one or more features of any one or more of the first to eighty first aspects, wherein the first cam surface and the second cam surface are substantially parallel.

In an eighty third aspect, the invention resides in a fluid dispenser, which optionally incorporates one or more features of any one or more of the first to eighty second aspects, wherein the dose adjustment mechanism comprises a locking mechanism that prevents the camming body from moving the adjustable cam surface relative to the pump engagement body; and wherein the first cam surface comprises a surface of the pump engagement body.

In an eighty fourth aspect, the invention resides in a fluid dispenser, which optionally incorporates one or more features of any one or more of the first to eighty third aspects, wherein the movable pump member has a catch member, and the pump engagement body has a catch mechanism that engages with the catch member to effect movement of the movable pump member between the extended position and the retracted position; wherein the driver engagement mechanism is spaced from the catch mechanism; wherein the catch member is spaced from the camming body; and wherein the fluid is a hand cleaning fluid.

In an eighty fifth aspect, the present invention resides in a fluid dispenser that combines one or more of the features of one or more of the first to eighty fourth aspects with any one or more of the remaining features of any one or more of the first to eighty fourth aspects.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
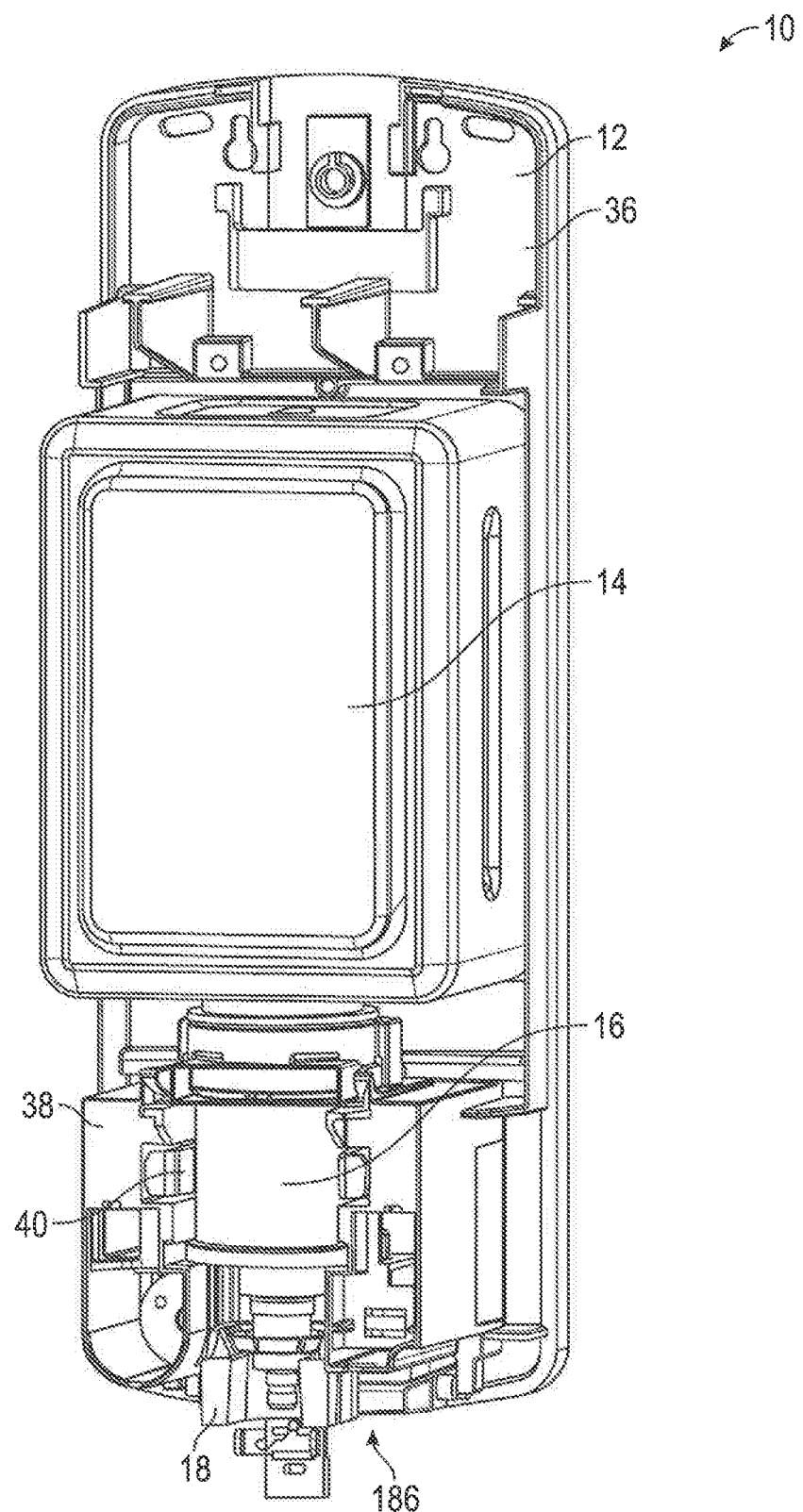
FIG. 1 is a front perspective view of a fluid dispenser in accordance with a first embodiment of the present invention.

FIG. 1 shows a fluid dispenser 10 in accordance with a first embodiment of the invention. The fluid dispenser 10 includes a housing 12, a fluid reservoir 14, a fluid pump 16, a pump actuator 18, and a driver 20.

Figure 2:
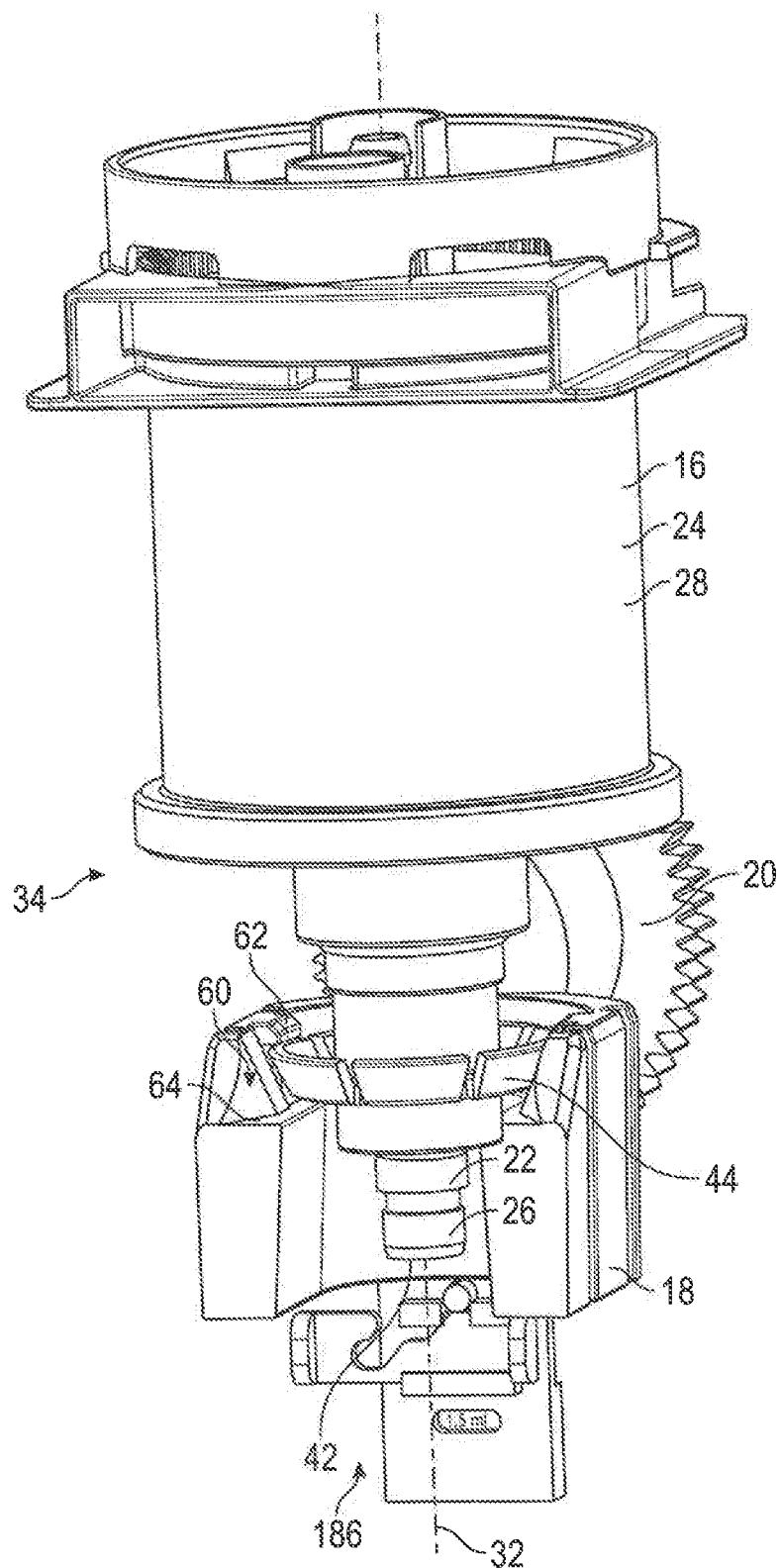
FIG. 2 is a front perspective view of a pump, a pump actuator, and a driver of the dispenser of FIG. 1, with a dose adjustment mechanism of the pump actuator at a high dose setting and the pump at an extended position.
Figure 3:
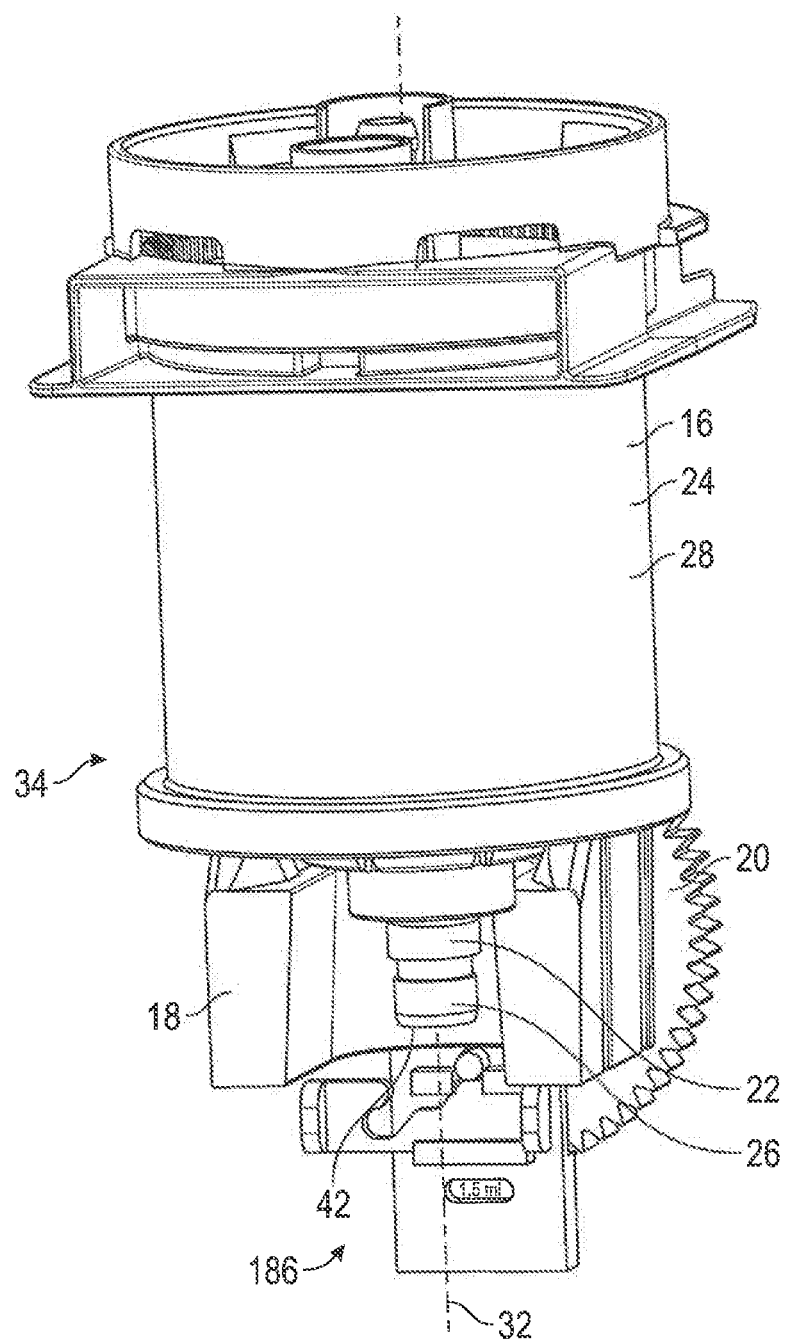
FIG. 3 is a front perspective view of the pump, the pump actuator, and the driver of FIG. 2, with the dose adjustment mechanism of the pump actuator at the high dose setting and the pump at a retracted position.

The fluid pump 16 is a piston-type pump mechanism 34 for dispensing a hand cleaning fluid, such as liquid soap, liquid hand sanitizer, liquid disinfectant, or a foamed soap, hand sanitizer, or disinfectant. The fluid pump 16 is shown in FIG. 2 as having a movable pump member 22, in the form of a piston-forming element 26, and a reciprocal pump member 24, in the form of a piston chamber-forming body 28. The piston-forming element 26 has a downwardly directed fluid outlet 42 and an umbrella-type catch member 44, as is described, for example, in U.S. Pat. No. 8,113,388 to Ophardt et al., issued Feb. 14, 2012, and in U.S. Pat. No. 8,091,739 to Ophardt et al., issued Jan. 10, 2012, both of which are incorporated herein by reference.

Figure 12:
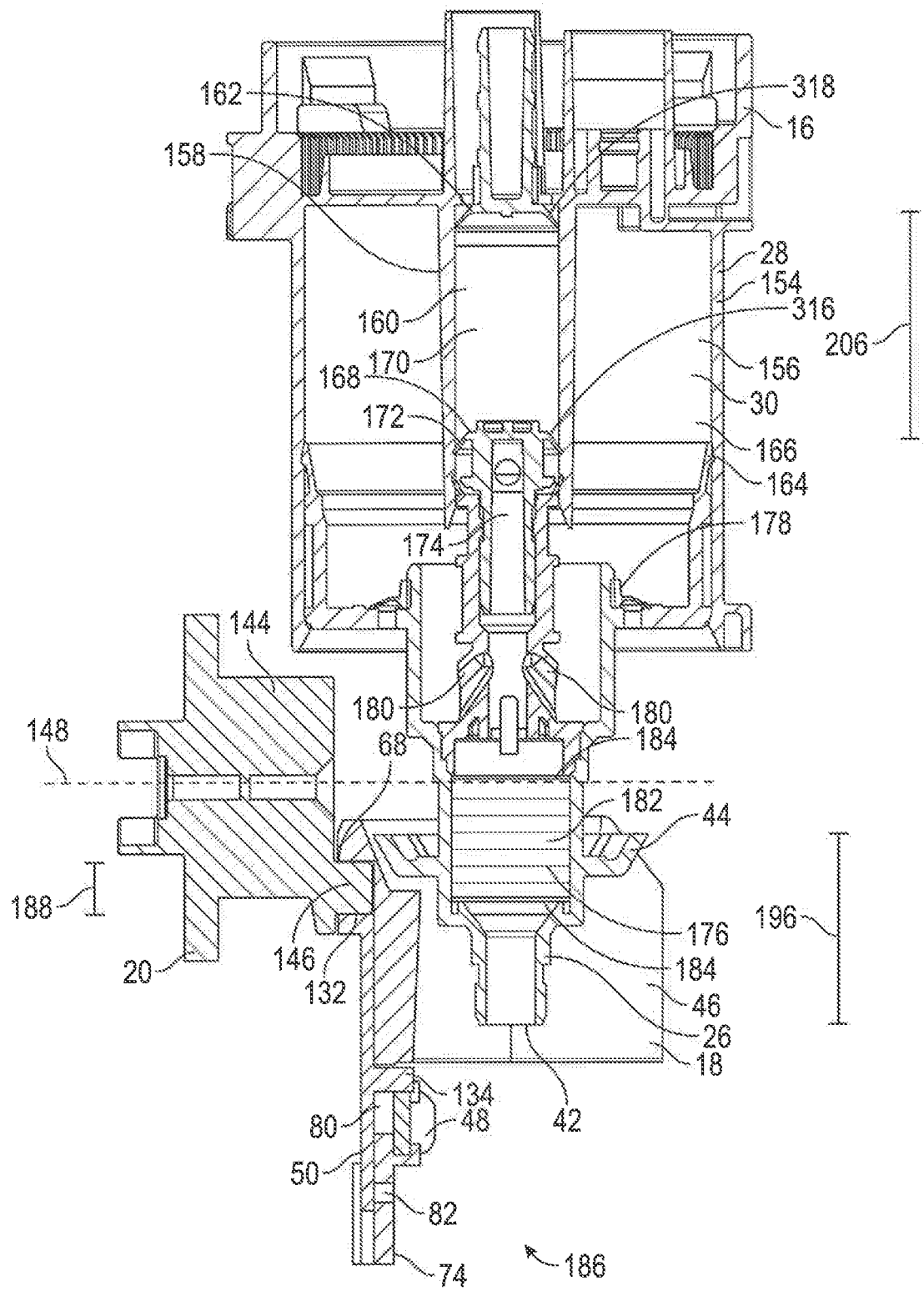
FIG. 12 is a cross-sectional view of the pump, the pump actuator, and the driver of FIG. 8, taken along line A-A' as shown in FIG. 8, with the dose adjustment mechanism of the pump actuator at the high dose setting and the pump at the extended position.

As shown in FIG. 12, the piston-forming element 26 is received within a chamber cavity 30 of the piston chamber-forming body 28 for reciprocal movement relative thereto along a pump axis 32. In the construction shown, the piston chamber-forming body 78 has a cylindrical outer wall 154 which defines an air chamber 156, and a cylindrical inner wall 158 which defines a fluid chamber 160. A one-way fluid inlet valve 162 is positioned at the top of the fluid chamber 160 for allowing fluid to pass into the fluid chamber 160 from the fluid reservoir 14, and for preventing fluid from passing from the fluid chamber 160 into the fluid reservoir 14.

The piston-forming element 26 includes an outer sealing member 164 which engages with the outer wall 154 of the piston chamber-forming body 28, and an inner sealing member 168 which engages with the inner wall 158 of the piston chamber-forming body 28. A variable volume air compartment 166 is defined between the outer sealing member 164 and the outer wall 154, and a variable volume fluid compartment 170 is defined between the inner sealing member 168 and the inner wall 158. The inner sealing member 168 has an internal passageway 174 for delivering fluid to a foam generator 176, and a sealing disc 172 that allows fluid to pass from the variable volume fluid compartment 170 into the internal passageway 174, and prevents fluid from passing from the internal passageway 174 into the variable volume fluid compartment 170.

The outer sealing member 164 has a one-way air inlet valve 178 that allows atmospheric air to enter the variable volume air compartment 166, and prevents air from exiting the variable volume air compartment 166 through the one-way air inlet valve 178. A pair of air passageways 180 extend through the base of the inner sealing member 168 for delivering air from the variable volume air compartment 166 to the internal passageway 174, to be passed through the foam generator 176 together with the fluid. The foam generator 176 may, for example, be in the form of a porous material, such as a synthetic sponge or foam plug 182, which is sandwiched between two fine wire screens 184.

The fluid pump 16 is not limited to the specific construction shown, and may have any suitable construction that dispenses fluid upon reciprocal axial movement of the piston-forming element 26 relative to the piston chamber-forming body 28, such as the constructions described in U.S. Pat. No. 7,984,825 to Ophardt et al., issued Jul. 26, 2011; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; U.S. Pat. No. 8,113,388 to Ophardt et al., issued Feb. 14, 2012; and U.S. Pat. No. 9,682,390 to Ophardt et al., issued Jun. 20, 2017, each of which is incorporated herein by reference.

The fluid reservoir 14 is a bottle for containing the fluid to be dispensed. As shown in FIG. 1, the reservoir 14 is connected to the piston chamber-forming body 28 for delivering the fluid thereto. The fluid reservoir 14 is not limited to the specific construction shown, and may have any suitable construction for delivering fluid to the pump 16, such as the constructions described in the aforementioned patents or otherwise known in the art.

As shown in FIG. 1, the housing 12 includes a back panel 36 and a pump carrying body 38. The back panel 36 is a flat, generally rectangular panel for mounting the housing 12 to a wall or other vertical support surface. The pump carrying body 38 extends forwardly from a lower portion of the back panel 36, and has a mounting mechanism 40 for releasably receiving and carrying the fluid pump 16. When the fluid pump 16 is received by the mounting mechanism 40, the mounting mechanism 40 holds the piston chamber-forming body 28 stationary relative to the housing 12. The housing 12, the back panel 36, the pump carrying body 38, and the mounting mechanism 40 are not limited to the specific construction shown, and may for example have any suitable construction known in the art.

Figure 4:
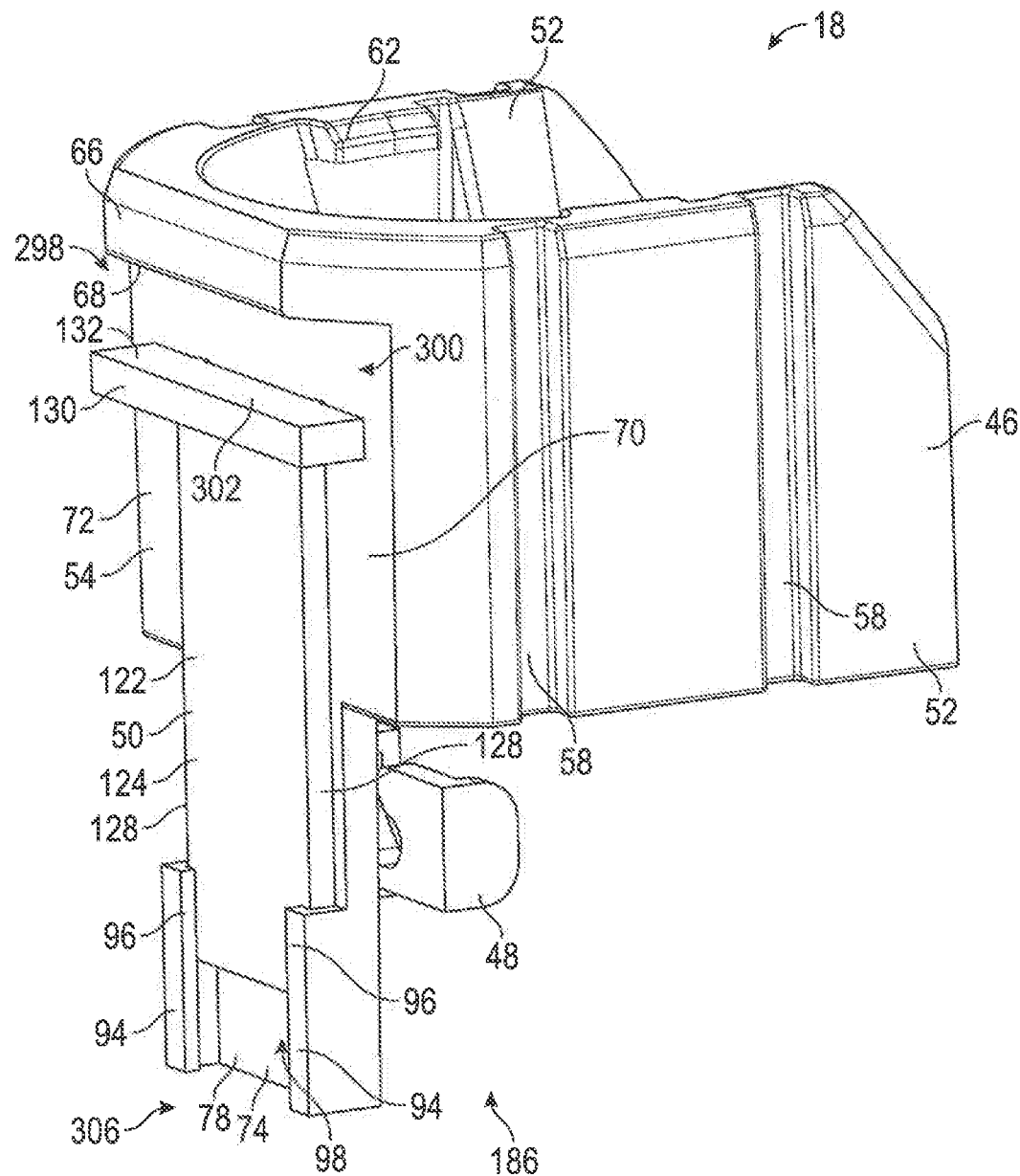
FIG. 4 is a rear perspective view of the pump actuator of FIG. 2, with the dose adjustment mechanism at the high dose setting.
Figure 5:
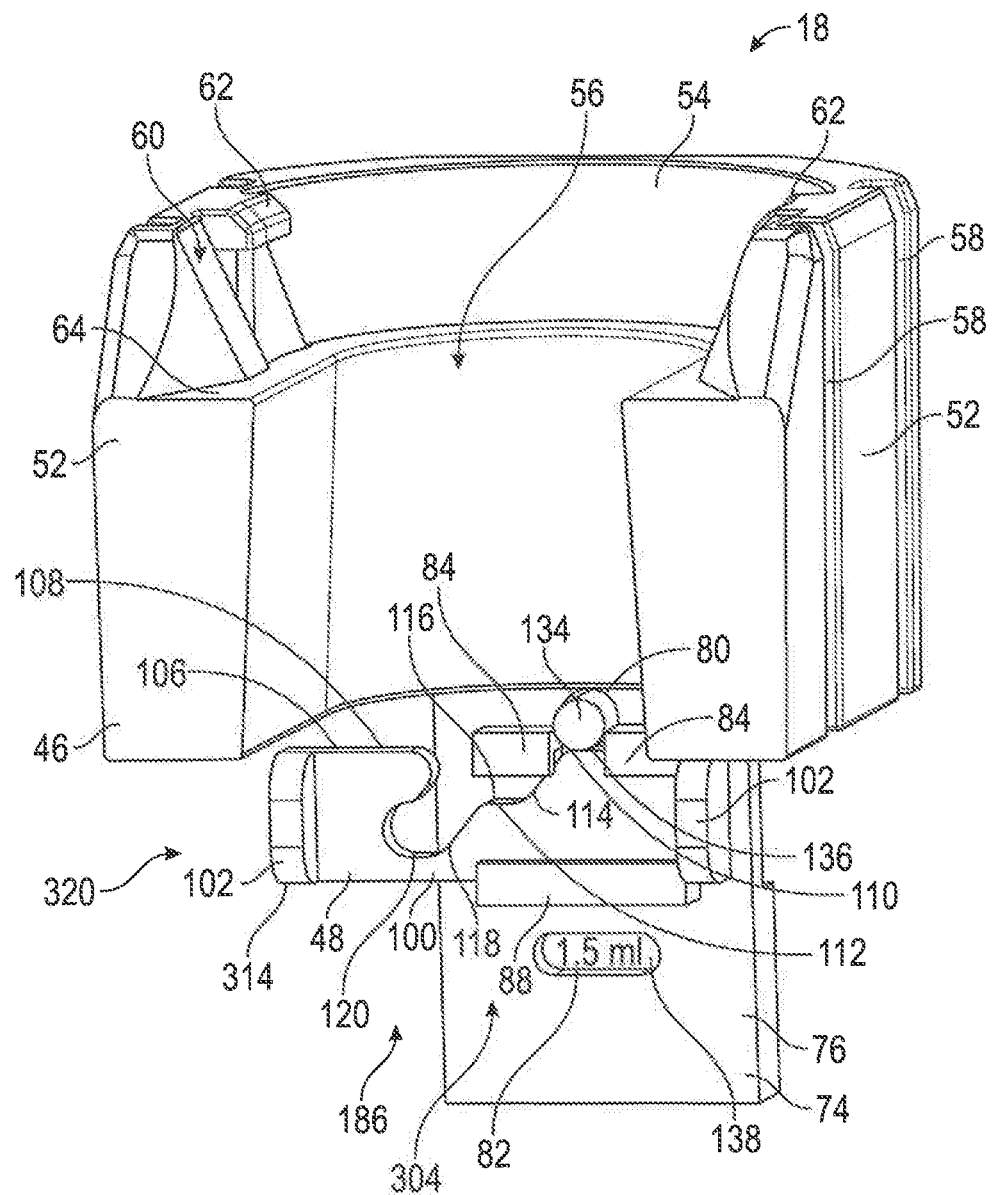
FIG. 5 is a front perspective view of the pump actuator of FIG. 2, with the dose adjustment mechanism at the high dose setting.
Figure 6:
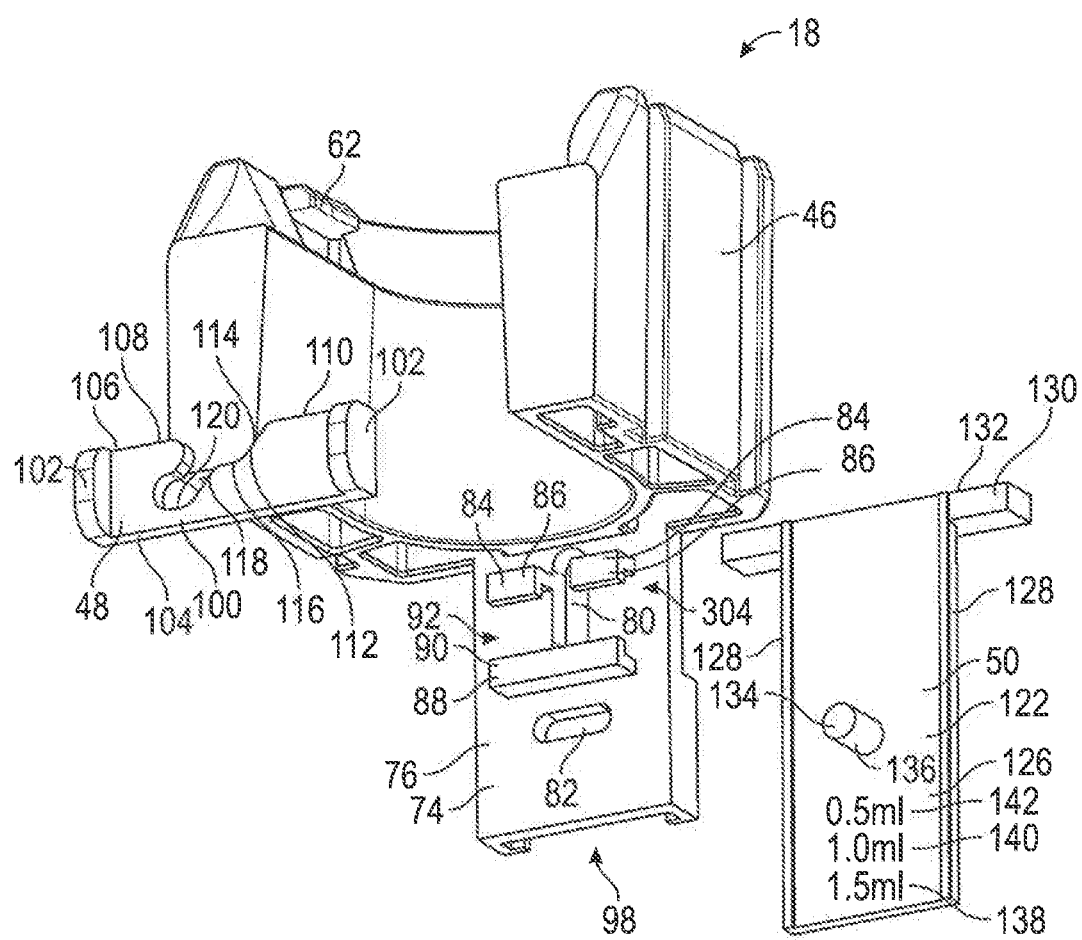
FIG. 6 is an exploded view of the pump actuator of FIG. 2.

The pump actuator 18 is shown in FIGS. 4 to 6 as having a pump engagement body 46, a sliding body 48, and a cam adjustment body 50. The pump engagement body 46 has a generally horseshoe-shaped construction, with two sidewalls 52, a rear wall 54, and a central pump receiving cavity 56 defined between the sidewalls 52 and the rear wall 54. The sidewalls 52 each have two outwardly facing vertical mounting channels 58, which mate with corresponding tracks on the pump carrying body 38, not shown, to allow the pump actuator 18 to slide vertically relative to the housing 12.

The upper portion of the central cavity 56 has a catch mechanism 60 for receiving and engaging with the catch member 44 of the piston-forming element 26. The catch mechanism 60 is formed by two catch fingers 62, each of which extends radially inwardly from the top of one of the sidewalls 52, and an upwardly facing catch surface 64 that is spaced downwardly from the catch fingers 62. As can be seen in FIG. 2, the catch mechanism 60 is configured to receive the catch member 44 between the catch fingers 62 and the catch surface 64.

The rear wall 54 of the pump engagement body 46 is shown in FIG. 4 as having a central portion 70 with a vertical rear surface 72, and an upper portion 66 that projects rearwardly from the rear surface 72, the upper portion 66 having a downwardly facing first cam surface 68. A lower extension 74 extends downwardly from the central portion 70, the lower extension 74 having a back surface 78, which is continuous with the rear surface 72 of the central portion 70, and a front surface 76. As can be seen in FIG. 6, the lower extension 74 has a vertical slot 80 and a horizontal slot 82, both of which extend through the lower extension 74 from the back surface 78 to the front surface 76. Two upper channel forming bodies 84 extend forwardly from the front surface 76 on either side of the vertical slot 80. Each of the upper channel forming bodies 84 has a downwardly extending lip 86 that is spaced forwardly from the front surface 76 of the lower extension 74. A lower channel forming body 88 extends forwardly from the front surface 76 below the vertical slot 80, and has an upwardly extending lip 90 that is spaced forwardly from the front surface 76. The upper channel forming bodies 84 and the lower channel forming body 88 define a first sliding channel 92 that extends horizontally across the front surface 76 of the lower extension 74, and partially over the vertical slot 80. Together, the upper channel forming bodies 84 and the lower channel forming body 88 function as a first holding member 304 that carries the sliding body 48 in the first sliding channel 92, allows the sliding body 48 to slide laterally relative to the pump engagement body 46, and prevents the sliding body 48 from moving vertically relative to the pump engagement body 46. The horizontal slot 82 is positioned below the lower channel forming body 88.

As can be seen in FIG. 4, two rear channel forming bodies 94 extend rearwardly from the left and right sides of the back surface 78 of the lower extension 74. Each rear channel forming body 94 has a laterally inwardly extending lip 96 that is spaced rearwardly from the back surface 78. The two rear channel forming bodies 94 define a second sliding channel 98 that extends vertically over the bottom portion of the back surface 78 of the lower extension 74. Together, the two rear channel forming bodies 94 function as a second holding member 306 that carries the cam adjustment body 50 in the second sliding channel 98, allows the cam adjustment body 50 to slide vertically relative to the pump engagement body 46, and prevents the cam adjustment body 50 from sliding laterally or rotating relative to the pump engagement body 46.

The sliding body 48 functions as a selection body 314 for selecting the location of the cam adjustment body 50, and is shown in FIG. 6 as having a laterally extended middle portion 100 with side tabs 102 projecting forwardly from each lateral end of the middle portion 100. The middle portion 100 has a horizontal lower sliding surface 104 and an upper surface 106, the upper surface 106 including a horizontal sliding surface 108 that extends laterally inwardly from the left side of the middle portion 100, and a ramped adjustment surface 112 that extends laterally inwardly from the right side of the middle portion 100.

The ramped adjustment surface 112 includes a first location selection segment 110 that extends horizontally from the right side of the middle portion 100, a first ramped intermediate segment 114 that slopes downwardly from the first location selection segment 110, a second location selection segment 116 that extends horizontally from the bottom of the first ramped intermediate segment 114, a second ramped intermediate segment 118 that slopes downwardly from the second location selection segment 116, and a third location selection segment 120 that extends horizontally from the bottom of the second ramped intermediate segment 118. The first location selection segment 110 is also referred to herein as the first location selection surface 110; the second location selection segment 116 is also referred to herein as the second location selection surface 116; and the third location selection segment 120 is also referred to herein as the third location selection surface 120.

As can be seen in FIG. 5, the middle portion 100 of the sliding body 48 is received in the first sliding channel 92 between the upper channel forming bodies 84 and the lower channel forming body 88. The sliding body 48 is laterally slideable relative to the vertical slot 80, with the downwardly extending lips 86 and the upwardly extending lip 90 preventing the sliding body 48 from falling forwardly out of the first sliding channel 92. The side tabs 102 engage with the downwardly extending lips 86 and the upwardly extending lip 90 to prevent the sliding body 48 from falling laterally out of the first sliding channel 92.

The cam adjustment body 50 is shown in FIGS. 4 and 6 as having a vertically extended rectangular portion 122 with a rear facing surface 124, a forward facing surface 126, and two lateral side surfaces 128. The top of the rectangular portion 122 carries a cam portion 130 that extends laterally outwardly from the lateral side surfaces 128, and extends rearwardly from the rear facing surface 124. The cam portion 130 has an upwardly facing second cam surface 132. Together, the first cam surface 68 and the second cam surface 132 form a driver engagement mechanism 298. A driver pin receiving cavity 300 is defined between the first cam surface 68 and the second cam surface 132, as shown in FIG. 4. The second cam surface 132 functions as an adjustable cam surface 302 that is moveable relative to the pump engagement body 46 and the first cam surface 68.

As can be seen in FIG. 6, a cam adjustment pin 134 extends forwardly from the forward facing surface 126 of the rectangular portion 122. The bottom of the cam adjustment pin 134 has an engagement surface 136 for engaging with the ramped adjustment surface 112 of the sliding body 48. A high dose marker 138, a medium dose marker 140, and a low dose marker 142 are presented on the forwardly facing surface 126 below the cam adjustment pin 134, with the high dose marker 138 positioned below the medium dose marker 140, and the medium dose marker 140 positioned below the low dose marker 142.

As shown in FIGS. 4 and 5, the forward facing surface 126 of the rectangular portion 122 engages with the rear surface 72 of the central portion 70 and with the back surface 78 of the lower extension 74, with the cam adjustment pin 134 extending forwardly through the vertical slot 80. The lower end of the rectangular portion 122 is received in the second sliding channel 98 between the two rear channel forming bodies 94, and is vertically slideable relative to the pump engagement body 46. The laterally inwardly extending lips 96 prevent the rectangular portion 122 from moving rearwardly out of the second sliding channel 98, and the rear channel forming bodies 94 prevent the rectangular portion 122 from moving laterally relative to the pump engagement body 46.

Figure 16:
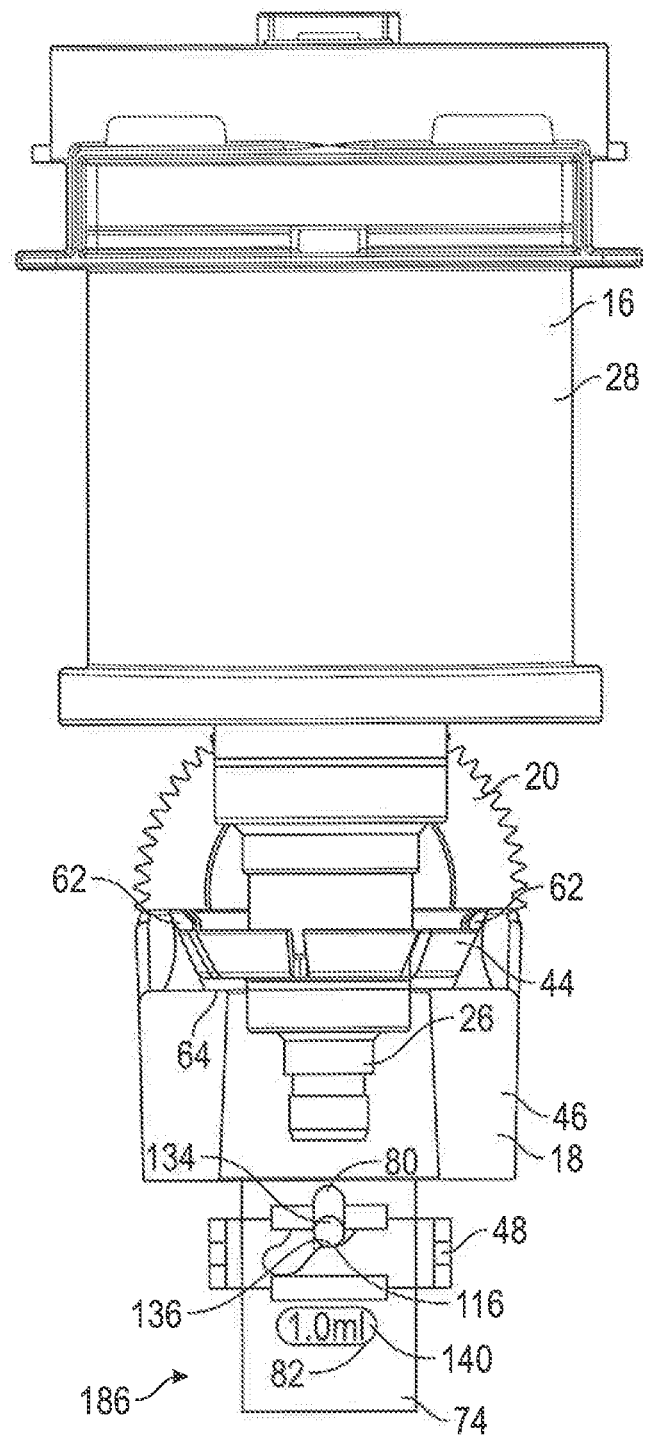
FIG. 16 is a front view of the pump, the pump actuator, and the driver of FIG. 2, with the dose adjustment mechanism of the pump actuator at a medium dose setting and the pump at the extended position.
Figure 17:
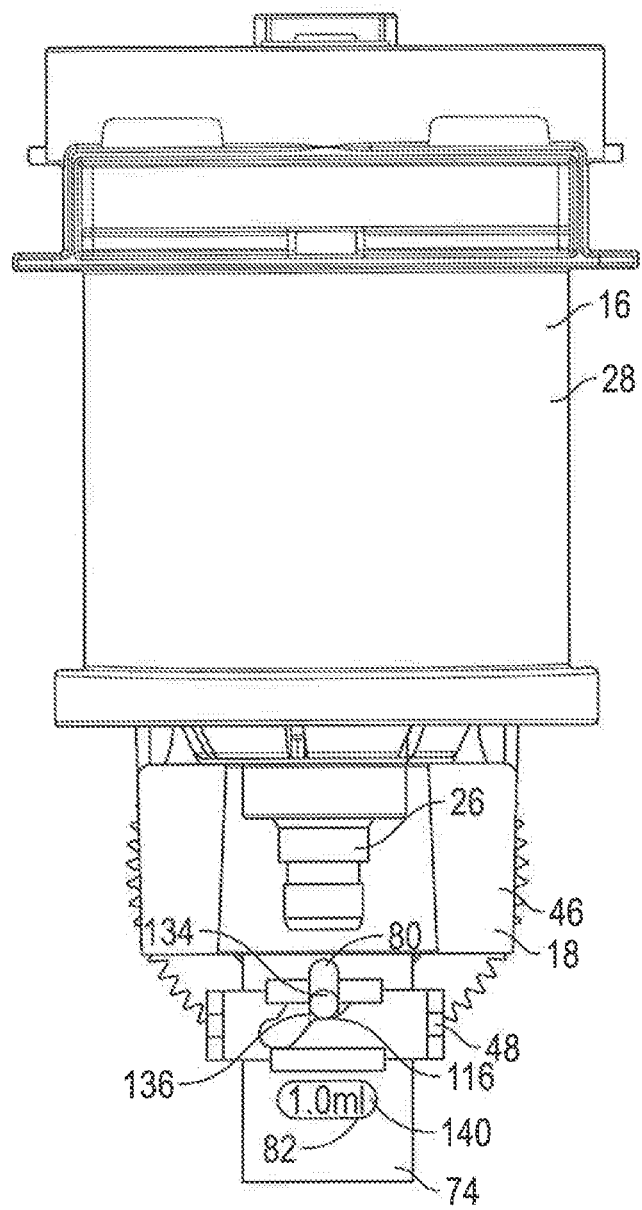
FIG. 17 is a front view of the pump, the pump actuator, and the driver of FIG. 2, with the dose adjustment mechanism of the pump actuator at the medium dose setting and the pump at the retracted position.
Figure 22:
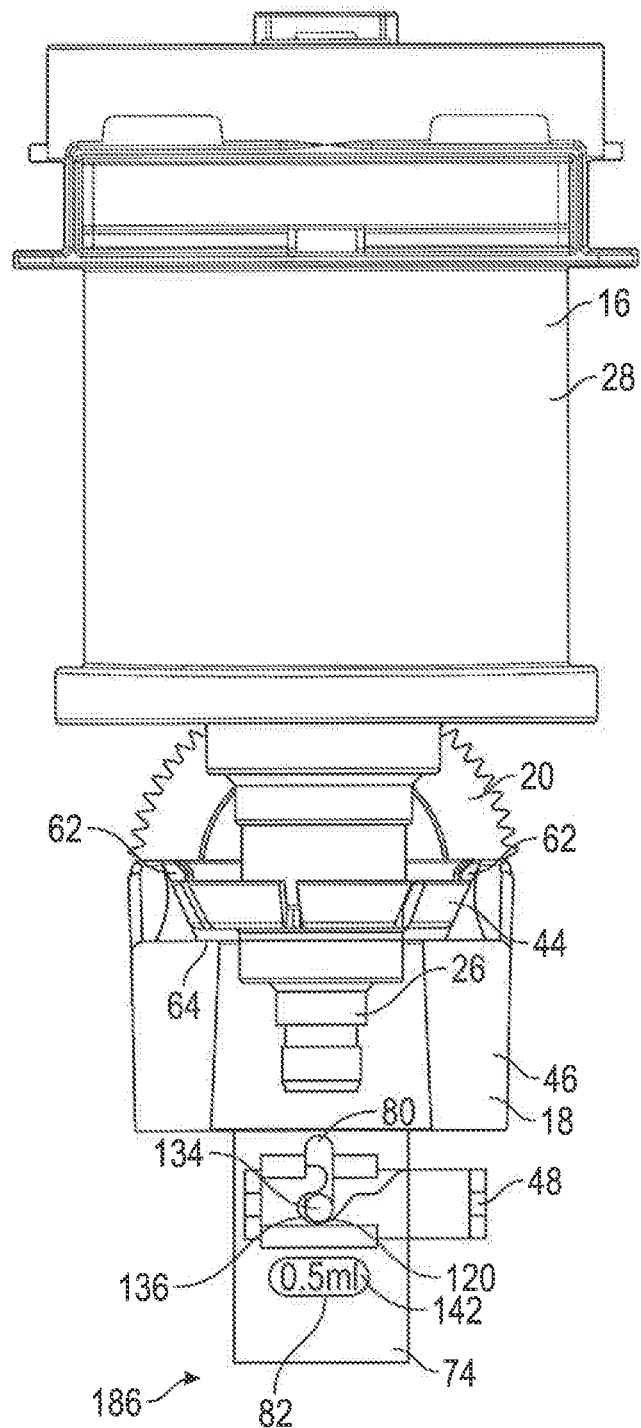
FIG. 22 is a front view of the pump, the pump actuator, and the driver of FIG. 2, with the dose adjustment mechanism of the pump actuator at a low dose setting and the pump at the extended position.
Figure 23:
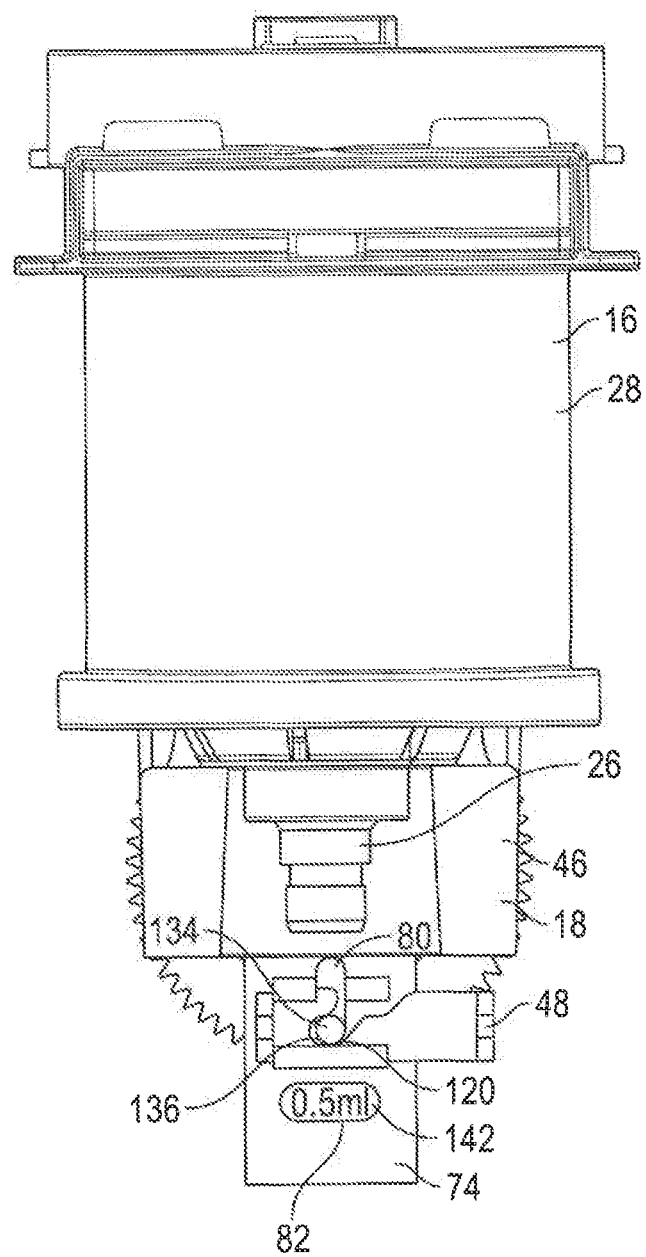
FIG. 23 is a front view of the pump, the pump actuator, and the driver of FIG. 2, with the dose adjustment mechanism of the pump actuator at the low dose setting and the pump at the retracted position.

As can be seen in FIG. 5, the engagement surface 136 of the cam adjustment pin 134 engages with whichever segment of the ramped adjustment surface 112 is aligned with the vertical slot 80, under the force of gravity pulling the cam adjustment body 50 downwards. By sliding the sliding body 48 laterally relative to the vertical slot 80, the cam adjustment body 50 can be raised or lowered relative to the pump engagement body 46, with the height of the cam adjustment body 50 being dependent on the height of the segment of the ramped adjustment surface 112 that is aligned with the vertical slot 80, and thus in engagement with the cam adjustment pin 134. As the cam adjustment body 50 is raised and lowered, the marker 138, 140, 142 that is aligned with the horizontal slot 82, and thus visible from the front of the dispenser 10, changes. When the first location selection segment 110 is aligned with the vertical slot 80, as shown in FIG. 5, the high dose marker 138 is aligned with the horizontal slot 82; when the second location selection segment 116 is aligned with the vertical slot 80, as shown in FIG. 16, the medium dose marker 140 is aligned with the horizontal slot 82; and when the third location selection segment 120 is aligned with the vertical slot 80, as shown in FIG. 22, the low dose marker 142 is aligned with the horizontal slot 82.

Figure 7:
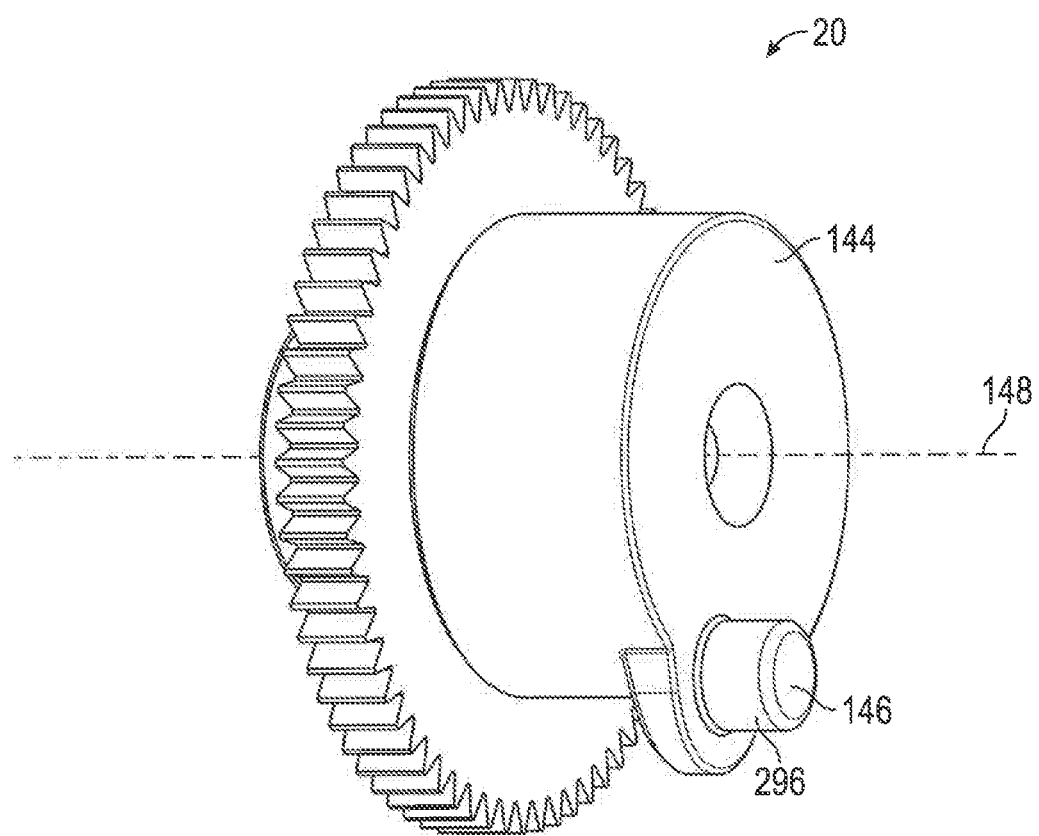
FIG. 7 is a front perspective view of the driver of FIG. 2.
Figure 8:
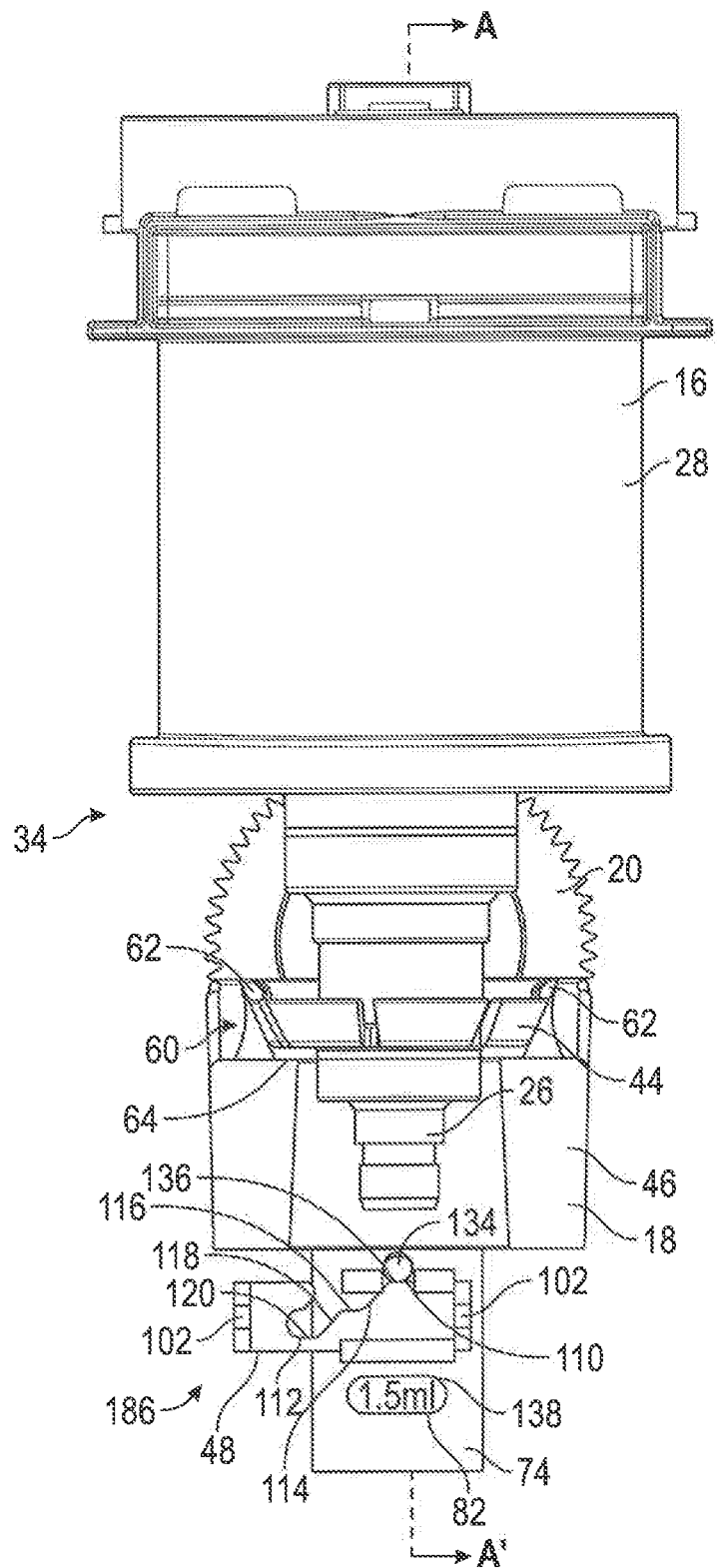
FIG. 8 is a front view of the pump, the pump actuator, and the driver of FIG. 2, with the dose adjustment mechanism of the pump actuator at the high dose setting and the pump at the extended position.
Figure 9:
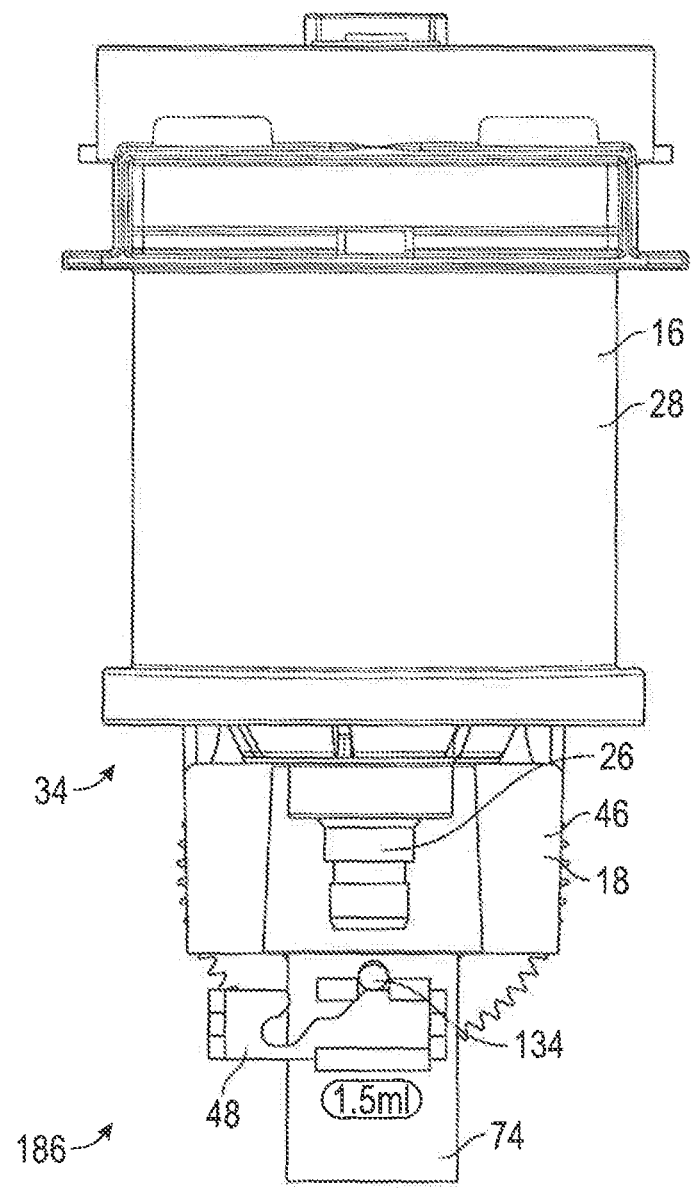
FIG. 9 is a front view of the pump, the pump actuator, and the driver of FIG. 2, with the dose adjustment mechanism of the pump actuator at the high dose setting and the pump at the retracted position.
Figure 10:
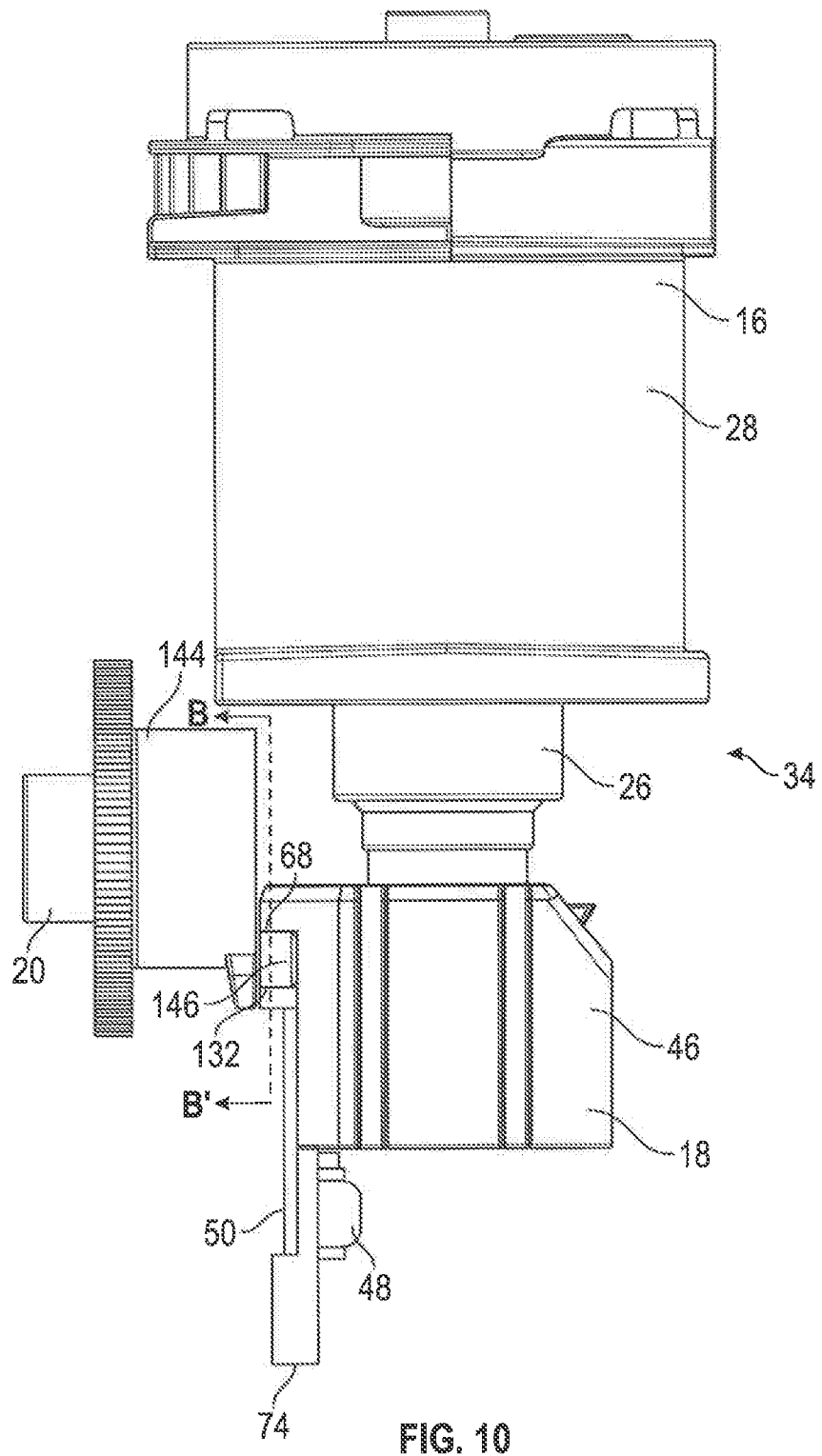
FIG. 10 is a side view of the pump, the pump actuator, and the driver of FIG. 2, with the dose adjustment mechanism of the pump actuator at the high dose setting and the pump at the extended position.

The driver 20 is shown in FIG. 7 as including a drive wheel 144 that carries an eccentrically positioned drive pin 146, the drive pin 146 extending forwardly from the face of the drive wheel 144. The drive wheel 144 is rotatable about a horizontal drive axis 148, so as to cause the drive pin 146 to travel up and down in a circular path about the drive axis 148. The drive wheel 144 is journaled to the housing 12 so as to allow the drive wheel 144 to rotate about the drive axis 148 relative to the housing 12, with the drive axis 148 remaining stationary relative to the housing 12. An electric motor, not shown, is operatively connected to the drive wheel 144 to effect rotation of the drive wheel 144 about the axis 148. As shown in FIG. 10, the drive pin 146 is positioned between the first cam surface 68 and the second cam surface 132 of the pump actuator 18, and functions as a camming body 296 for effecting movement of the pump actuator 18 through engagement with the first cam surface 68 and the second cam surface 132.

The operation of the fluid dispenser 10 in accordance with the first embodiment of the invention will now be described with reference to FIGS. 1 to 27. The dispenser 10 preferably operates touchlessly, and incorporates a hand sensor, not shown, as is known in the art for detecting the presence of a user's hand positioned below the fluid outlet 42. Upon detecting the user's hand, the sensor sends an activation signal to activate the electric motor. Alternatively, the dispenser 10 could incorporate a button or any other suitable mechanism for activating the electric motor.

Figure 11:
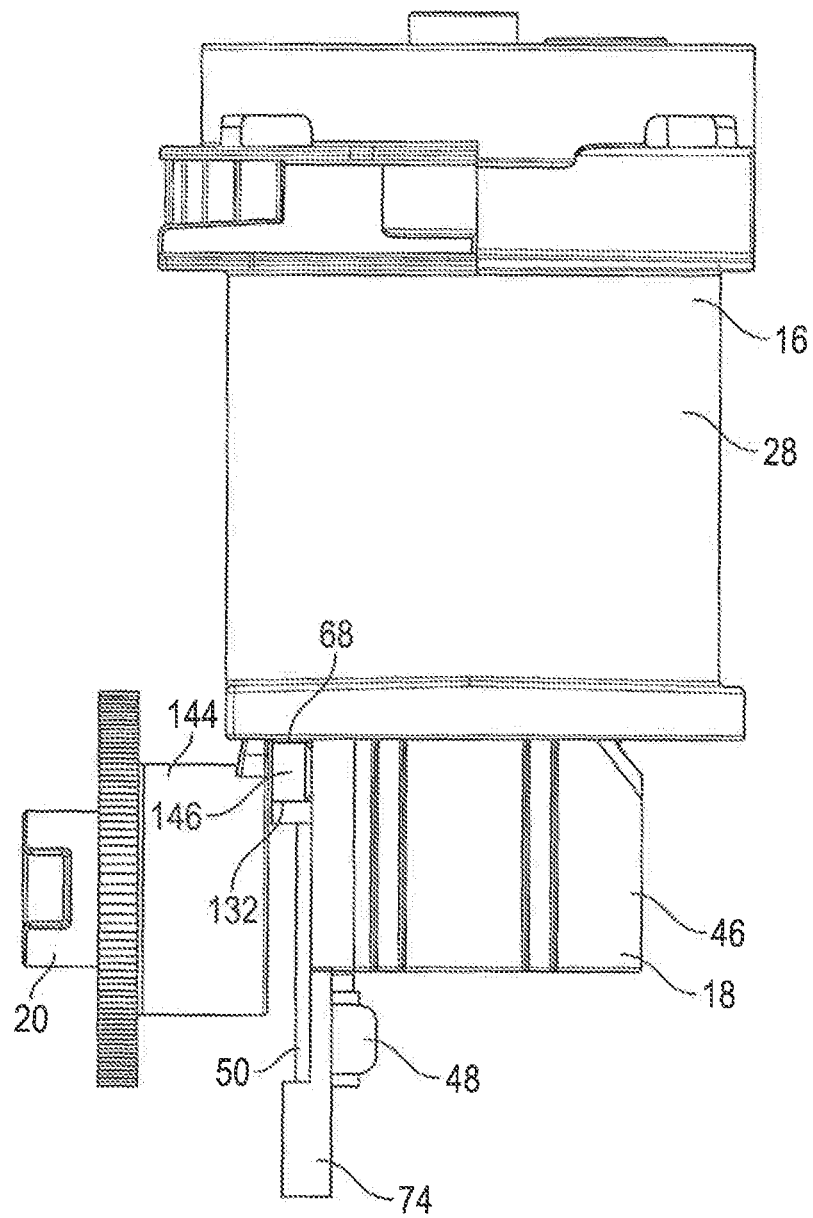
FIG. 11 is a side view of the pump, the pump actuator, and the driver of FIG. 2, with the dose adjustment mechanism of the pump actuator at the high dose setting and the pump at the retracted position.
Figure 13:
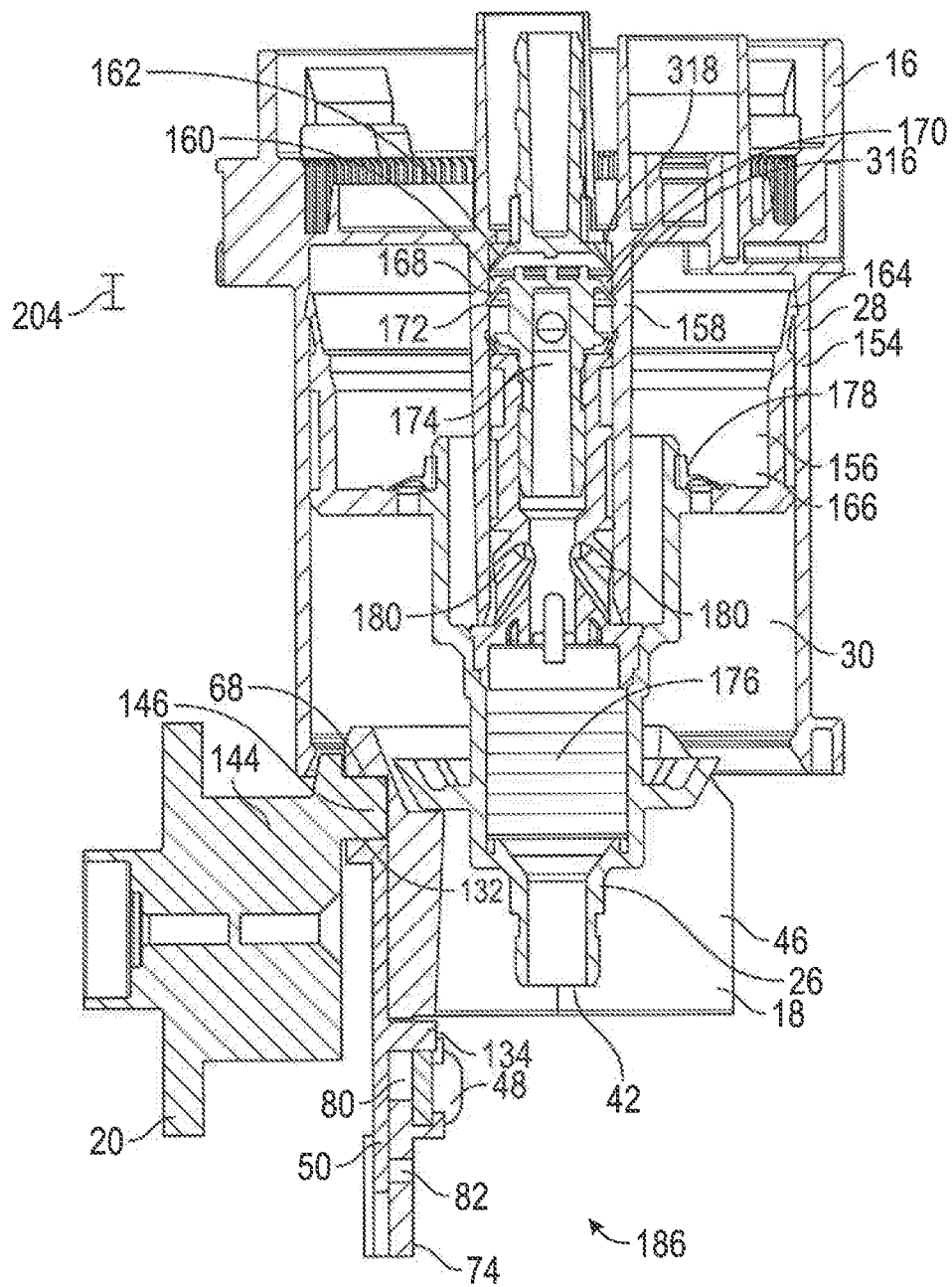
FIG. 13 is a cross-sectional view of the pump, the pump actuator, and the driver of FIG. 9, taken along line A-A' as shown in FIG. 8, with the dose adjustment mechanism of the pump actuator at the high dose setting and the pump at the retracted position.
Figure 14:
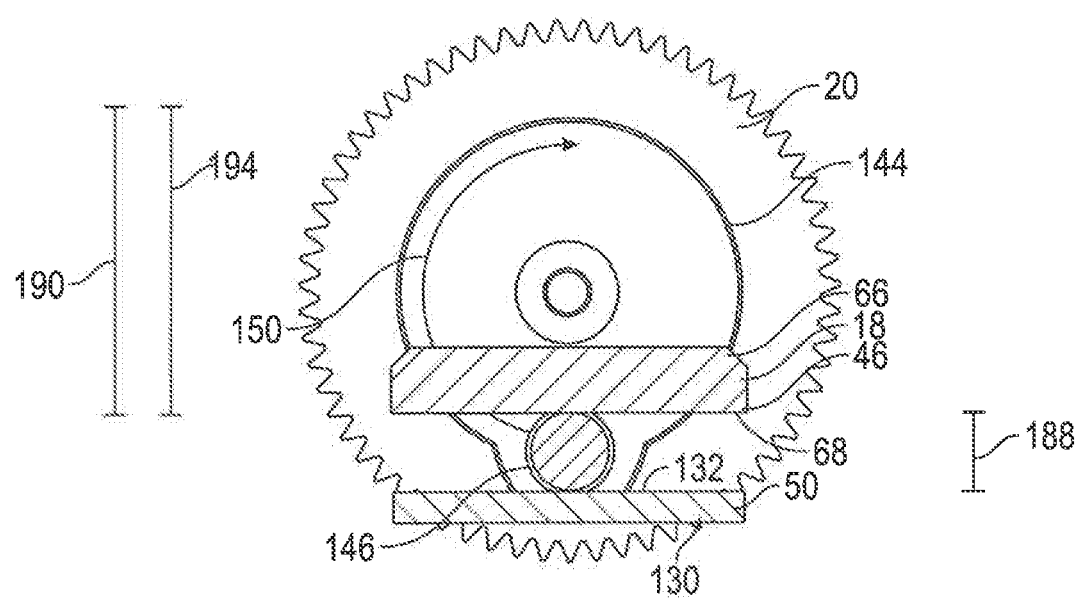
FIG. 14 is a cross-sectional view of the pump actuator and the driver of FIG. 10, taken along line B-B' as shown in FIG. 10, with the dose adjustment mechanism of the pump actuator at the high dose setting and a driver pin of the driver at an extension position.
Figure 15:
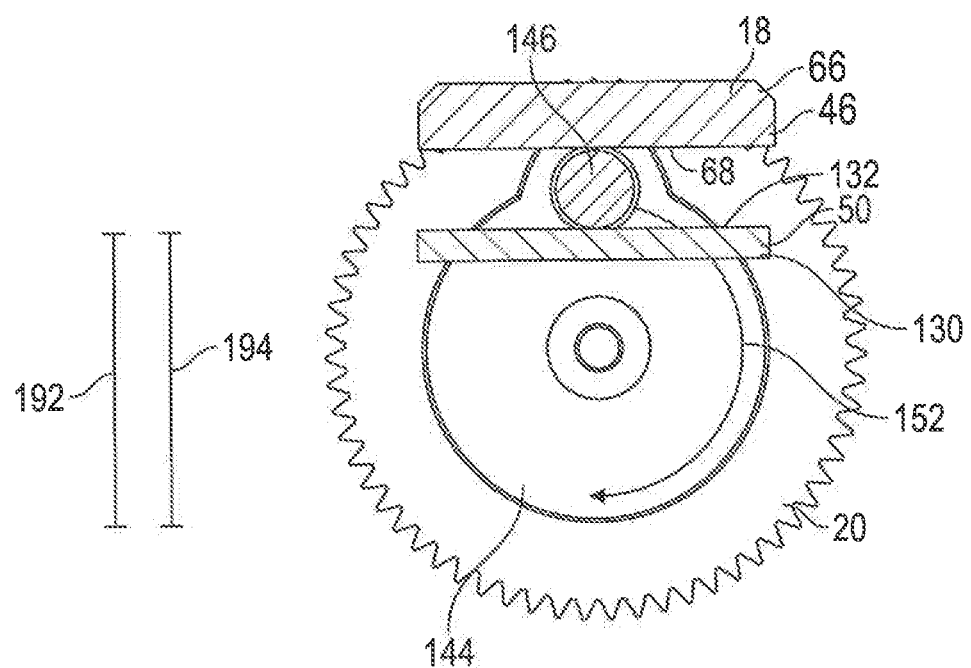
FIG. 15 is a cross-sectional view of the pump actuator and the driver of FIG. 11, taken along line B-B' as shown in FIG. 10, with the dose adjustment mechanism of the pump actuator at the high dose setting and the driver pin of the driver at a retraction position.

When activated, the motor preferably effects a complete rotation of the drive wheel 144 about the drive axis 148, so that the drive pin 146 moves from the extension position shown in FIGS. 10, 12 and 14 to the retraction position shown in FIGS. 11, 13 and 15 in a retraction motion, depicted by arrow 150 in FIG. 14, and then moves from the retraction position shown in FIGS. 11, 13 and 15 back to the extension position shown in FIGS. 10, 12 and 14 in an extension motion, depicted by arrow 152 in FIG. 15.

As the drive pin 146 travels upwards in the retraction direction from the extension position of FIG. 14 to the retraction position of FIG. 15, the drive pin 146 engages with the first cam surface 68, lifting the pump actuator 18 upwards in the retraction direction relative to the drive axis 148. As the pump actuator 18 is lifted upwards, the catch surface 64 of the pump actuator 18 engages with the catch member 44 of the piston-forming element 26, which lifts the piston-forming element 26 upwards along the pump axis 32 relative to the piston chamber-forming body 28 from the extended position shown in FIGS. 2 and 12 to the retracted position shown in FIGS. 3 and 13.

As the piston-forming element 26 slides axially inwards from the extended position shown in FIG. 12 to the retracted position shown in FIG. 13, the inner sealing member 168 slides axially inwardly into the fluid chamber 160, decreasing the volume of the variable volume fluid compartment 170, and the outer sealing member 164 slides axially inwardly into the air chamber 156, decreasing the volume of the variable volume air compartment 166. This forces the fluid contained within the variable volume fluid compartment 166 to flow past the sealing disc 172 into the internal passageway 174, and forces the air contained within the variable volume air compartment 166 to flow through the air passageways 180 into the internal passageway 174. The fluid and the air then flow together through the foam generator 176, where they are thoroughly mixed to form a foam. The foam is then discharged from the fluid outlet 42 onto the user's hand.

Once the drive pin 146 has reached the retraction position as shown in FIG. 15, it then travels back downwards in the extension direction from the retraction position of FIG. 15 to the extension position of FIG. 14. As the drive pin 146 travels downwards in the extension direction, the drive pin 146 engages with the second cam surface 132, pushing the pump actuator 18 downwards in the extension direction relative to the drive axis 148. As the pump actuator 18 is driven downwards, the catch fingers 62 of the pump actuator 18 engage with the catch member 44 of the piston-forming element 26, which pulls the piston-forming element 26 downwards along the pump axis 32 relative to the piston chamber-forming body 28 from the retracted position shown in FIG. 13 back to the extended position shown in FIG. 12.

As the piston-forming element 26 slides axially outwards from the retracted position shown in FIG. 13 to the extended position shown in FIG. 12, the inner sealing member 168 slides axially outwardly within the fluid chamber 160, increasing the volume of the variable volume fluid compartment 170, and the outer sealing member 164 slides axially outwardly within the air chamber 156, increasing the volume of the variable volume air compartment 166. The increase in the volume of the variable volume fluid compartment 170 creates a vacuum pressure within the variable volume fluid compartment 170, which draws fluid from the fluid reservoir 14, past the one-way fluid inlet valve 162, and into the variable volume fluid compartment 170. The increase in the volume of the variable volume air compartment 166 likewise creates a vacuum pressure within the variable volume air compartment 166, which draws atmospheric air past the one-way air inlet valve 178 and into the variable volume air compartment 166.

When the piston-forming element 26 returns to the extended position, the variable volume fluid compartment 170 is filled with fluid and the variable volume air compartment 166 is filled with air. The fluid pump 16 is thus ready to dispense a further allotment of foam when the dispenser 10 is activated again, for example by a subsequent user placing his or her hands under the fluid outlet 42.

The dispenser 10 allows a user or owner of the dispenser 10 to adjust the amount of fluid that is dispensed with each activation. In the exemplary embodiment shown in FIGS. 1 to 27, the pump engagement body 46, the sliding body 48, and the cam adjustment body 50 together function as a dose adjustment mechanism 186 having a high dose setting, a medium dose setting, and a low dose setting. To place the dose adjustment mechanism 186 at the high dose setting, the sliding body 48 is slid all the way to the left as shown in FIG. 5, so that the cam adjustment pin 134 engages with the first location selection segment 110 of the ramped adjustment surface 112. This positions the second cam surface 132 at a first location relative to the first cam surface 68, as shown in FIG. 10. When at the first location, the second cam surface 132 is spaced a high dose distance 188 from the first cam surface 68, as shown in FIG. 14. The high dose distance 188 is equal to the diameter of the drive pin 146, with the result that the drive pin 146 simultaneously engages with both the first cam surface 68 and the second cam surface 132 when the second cam surface 132 is at the first location.

When the electric motor is activated, the drive pin 146 travels a retraction distance 190 in the retraction direction during the retraction motion from the extension position of FIG. 14 to the retraction position of FIG. 15. Because the high dose distance 188 between the first cam surface 68 and the second cam surface 132 is equal to the diameter of the drive pin 146, the drive pin 146 engages with the first cam surface 68 during the entire retraction motion, displacing the pump actuator 18 an engagement distance 194 in the retraction direction, the engagement distance 194 being equal to the retraction distance 190. The movement of the pump actuator 18 the engagement distance 194 in the retraction direction displaces the piston-forming element 26 a stroke distance 196 in the retraction direction from the extended position of FIG. 12 to the retracted position of FIG. 13, causing an allotment of foam to be dispensed from the fluid outlet 42 as described above. The stroke distance 196 is proportional to the engagement distance 194, though the two are not necessarily identical. For example, if the distance between the catch fingers 62 and the catch surface 64 is greater than the height of the catch member 44, then the stroke distance 196 will be slightly less than the engagement distance 194.

During the extension motion, the drive pin 146 travels an extension distance 192 in the extension direction from the retraction position of FIG. 15 back to the extension position of FIG. 14. The extension distance 192 is equal to the retraction distance 190. Because the high dose distance 188 between the first cam surface 68 and the second cam surface 132 is equal to the diameter of the drive pin 146, the drive pin 146 engages with the second cam surface 132 during the entire extension motion, displacing the pump actuator 18 the engagement distance 194 in the extension direction, the engagement distance 194 being equal to the extension distance 192. The movement of the pump actuator 18 the engagement distance 194 in the extension direction displaces the piston-forming element 26 the stroke distance 196 in the extension direction from the retracted position of FIG. 13 back to the extended position of FIG. 12, causing fluid and air to be drawn into the variable volume fluid compartment 170 and the variable volume air compartment 166, respectively, as described above.

Figure 18:
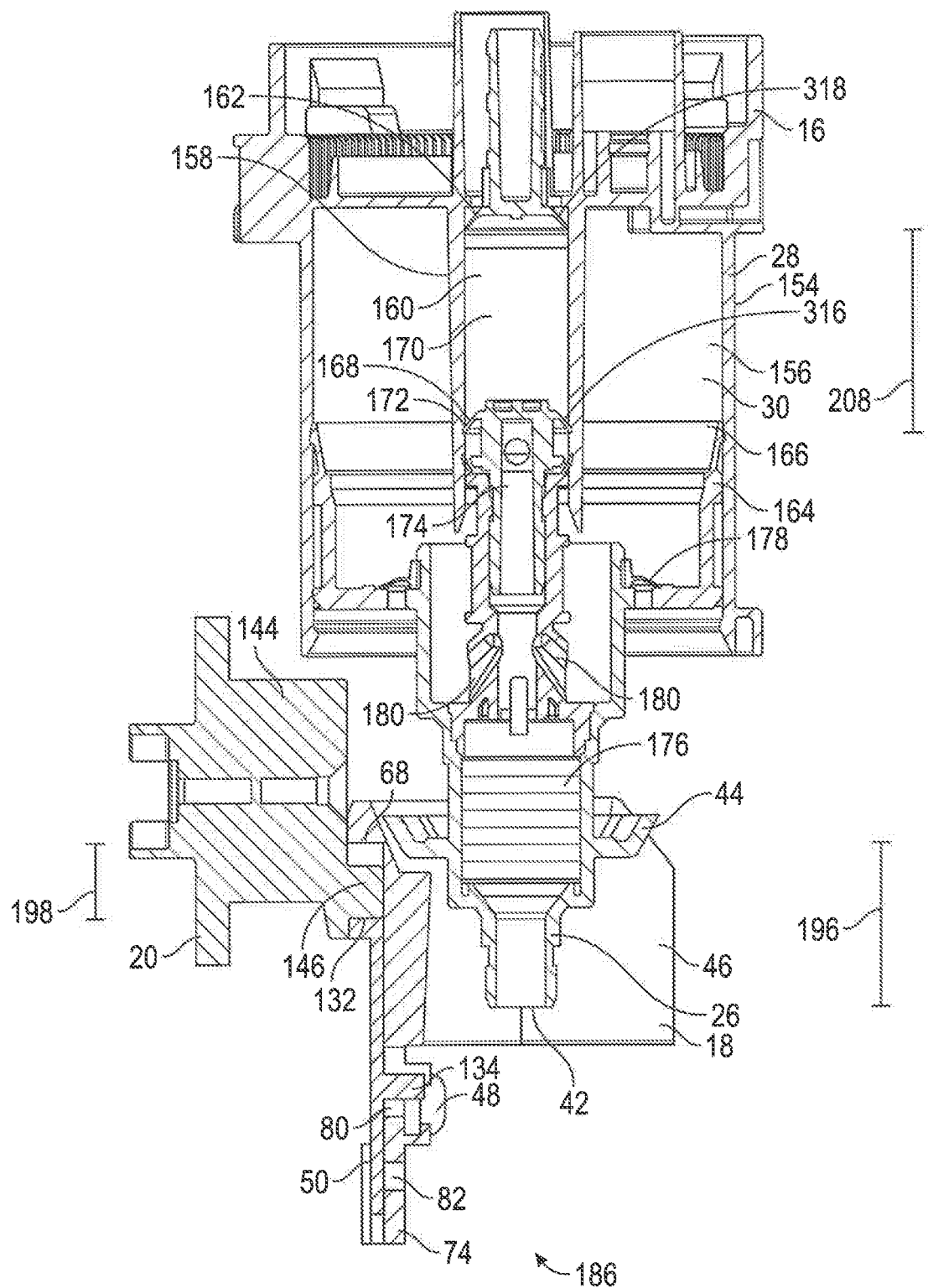
FIG. 18 is a cross-sectional view of the pump, the pump actuator, and the driver of FIG. 16, taken along line A-A' as shown in FIG. 8, with the dose adjustment mechanism of the pump actuator at the medium dose setting and the pump at the extended position.
Figure 20:
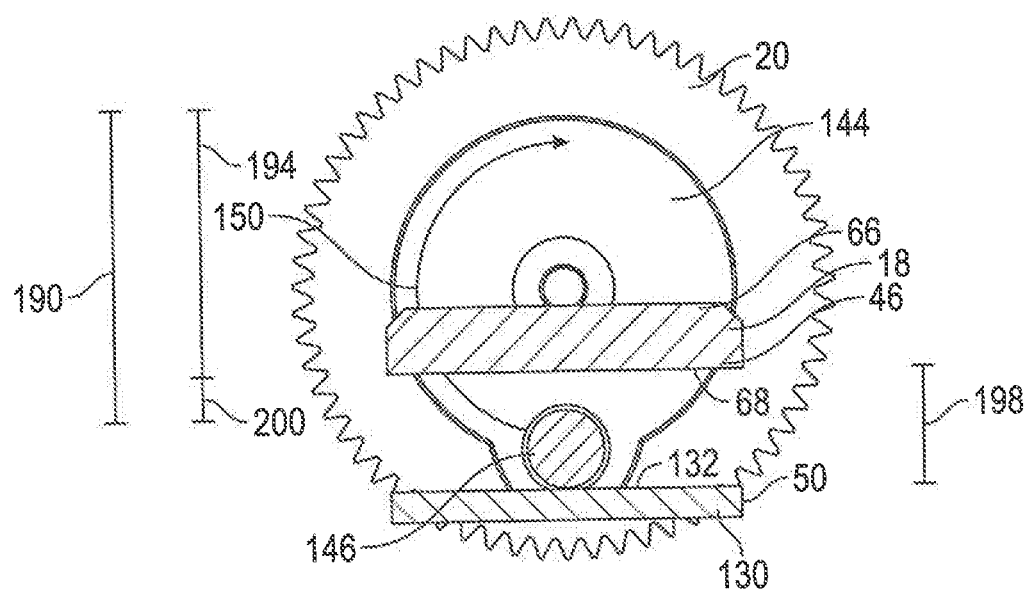
FIG. 20 is a cross-sectional view of the pump actuator and the driver of FIG. 16, taken along line B-B' as shown in FIG. 10, with the dose adjustment mechanism of the pump actuator at the medium dose setting and the driver pin of the driver at the extension position.

To place the dose adjustment mechanism 186 at the medium dose setting, the sliding body 48 is slid to the right from the high dose setting of FIG. 5, so that the cam adjustment pin 134 engages with the second location selection segment 116 of the ramped adjustment surface 112, as shown in FIG. 16. This positions the second cam surface 132 at a second location relative to the first cam surface 68, as shown in FIG. 18. When at the second location, the second cam surface 132 is spaced a medium dose distance 198 from the first cam surface 68, as shown in FIG. 20. The medium dose distance 198 is greater than the diameter of the drive pin 146, with the result that the drive pin 146 cannot simultaneously engage with both the first cam surface 68 and the second cam surface 132 when the second cam surface 132 is at the second location.

Figure 21:
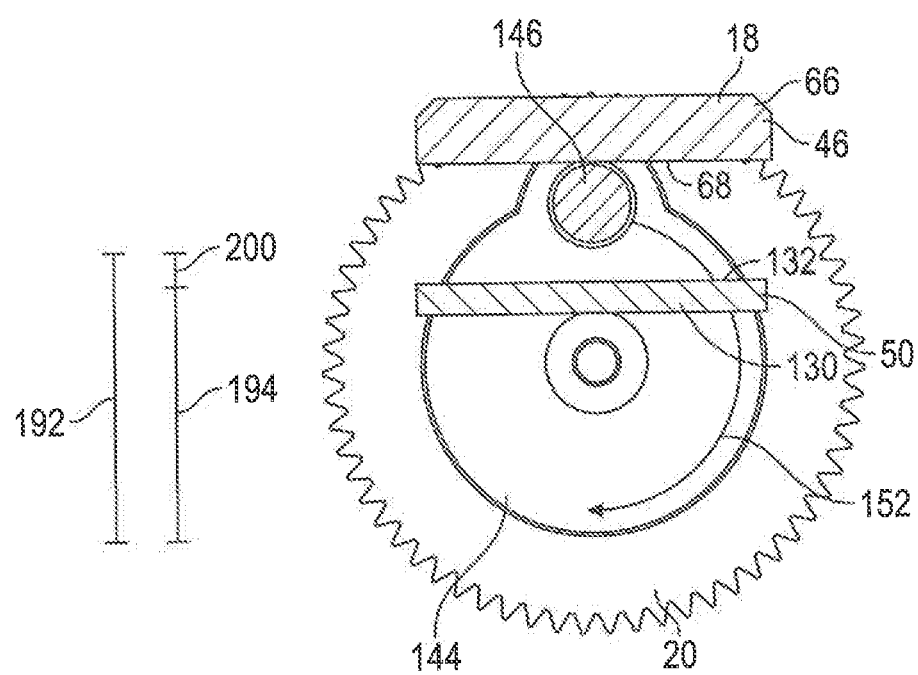
FIG. 21 is a cross-sectional view of the pump actuator and the driver of FIG. 17, taken along line B-B' as shown in FIG. 10, with the dose adjustment mechanism of the pump actuator at the medium dose setting and the driver pin of the driver at the retraction position.

When the electric motor is activated, the drive pin 146 travels the retraction distance 190 in the retraction direction during the retraction motion from the extension position of FIG. 20 to the retraction position of FIG. 21. Because the medium dose distance 198 between the first cam surface 68 and the second cam surface 132 is greater than the diameter of the drive pin 146, the drive pin 146 initially travels a lost link distance 200 during a disengagement portion of the retraction motion, in which the drive pin 146 does not engage with the first cam surface 68. After travelling the lost link distance 200 in the retraction direction, the drive pin 146 engages with the first cam surface 68 and continues travelling to the retraction position during an engagement portion of the retraction motion, displacing the pump actuator 18 the engagement distance 194 in the retraction direction. Because the drive pin 146 is disengaged from the first cam surface 68 during the disengagement portion of the retraction motion, the engagement distance 194 when the dose adjustment mechanism 186 is at the medium dose setting, as shown in FIG. 20, is less than the retraction distance 190, and is also less than the engagement distance 194 when the dose adjustment mechanism 186 is at the high dose setting, as shown in FIG. 14.

Figure 19:
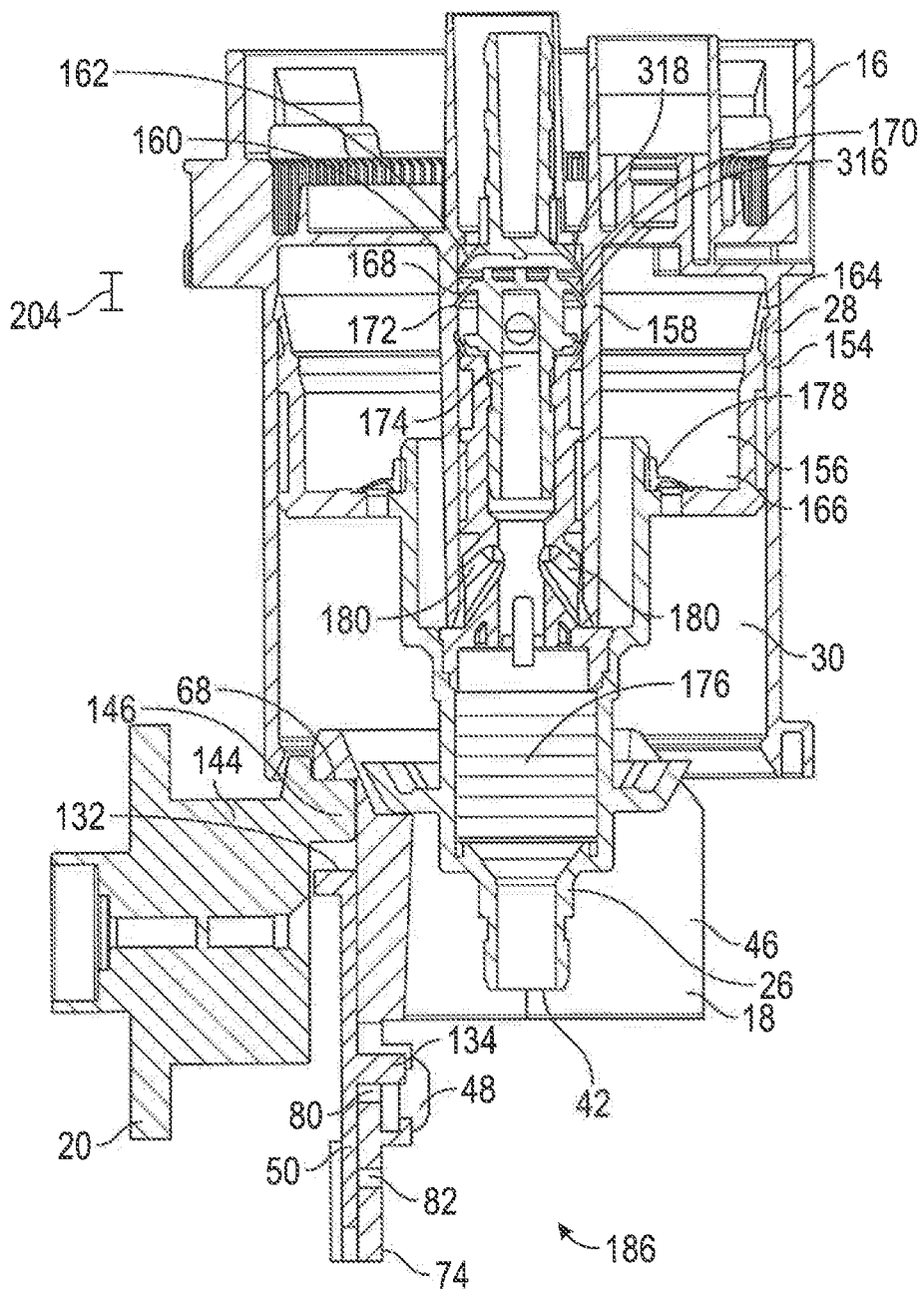
FIG. 19 is a cross-sectional view of the pump, the pump actuator, and the driver of FIG. 17, taken along line A-A' as shown in FIG. 8, with the dose adjustment mechanism of the pump actuator at the medium dose setting and the pump at the retracted position.

The movement of the pump actuator 18 the engagement distance 194 in the retraction direction displaces the piston-forming element 26 the stroke distance 196 in the retraction direction from the extended position of FIG. 18 to the retracted position of FIG. 19. Because the engagement distance 194 is smaller when the dose adjustment mechanism 186 is at the medium dose setting compared to the high dose setting, the stroke distance 196 is also proportionally smaller when at the medium dose setting, as shown in FIG. 18, compared to the high dose setting, as shown in FIG. 12. The smaller stroke distance 196 causes a smaller decrease in the volume of the variable volume fluid compartment 170 and in the volume of the variable volume air compartment 166 when the piston-forming element 26 moves from the extended position of FIG. 18 to the retracted position of FIG. 19. As a result of the smaller decrease in the volume of the variable volume fluid compartment 170 and in the volume of the variable volume air compartment 166, a smaller volume of fluid and a smaller volume of air are discharged into the internal passageway 174. This results in a smaller volume of foam being dispensed from the fluid outlet 42 when the dose adjustment mechanism is at the medium dose setting, as shown in FIG. 18, in comparison with the larger volume of foam that is dispensed when the dose adjustment mechanism 186 is at the high dose setting, as shown in FIG. 12.

During the extension motion, the drive pin 146 travels the extension distance 192 in the extension direction from the retraction position of FIG. 21 back to the extension position of FIG. 20. During an initial disengagement portion of the extension motion, the drive pin 146 travels the lost link distance 200 in the extension direction, and does not engage with the second cam surface 132. After travelling the lost link distance 200 in the extension direction, the drive pin 146 engages with the second cam surface 132 and continues travelling to the extension position in the extension direction during an engagement portion of the extension motion, displacing the pump actuator 18 the engagement distance 194 in the extension direction. The movement of the pump actuator 18 the engagement distance 194 in the extension direction displaces the piston-forming element 26 the stroke distance 196 in the extension direction from the retracted position of FIG. 19 back to the extended position of FIG. 18, causing fluid and air to be drawn into the variable volume fluid compartment 170 and the variable volume air compartment 166, respectively, as described above. Because the stroke distance 196 is smaller when the dose adjusting mechanism 186 is at the medium dosage setting compared to the high dose setting, the volume of fluid and air that are drawn into the variable volume fluid compartment 170 and the variable volume air compartment 166, respectively, during the extension motion is smaller when the dose adjusting mechanism 186 is at the medium dosage setting compared to the high dose setting.

Figure 24:
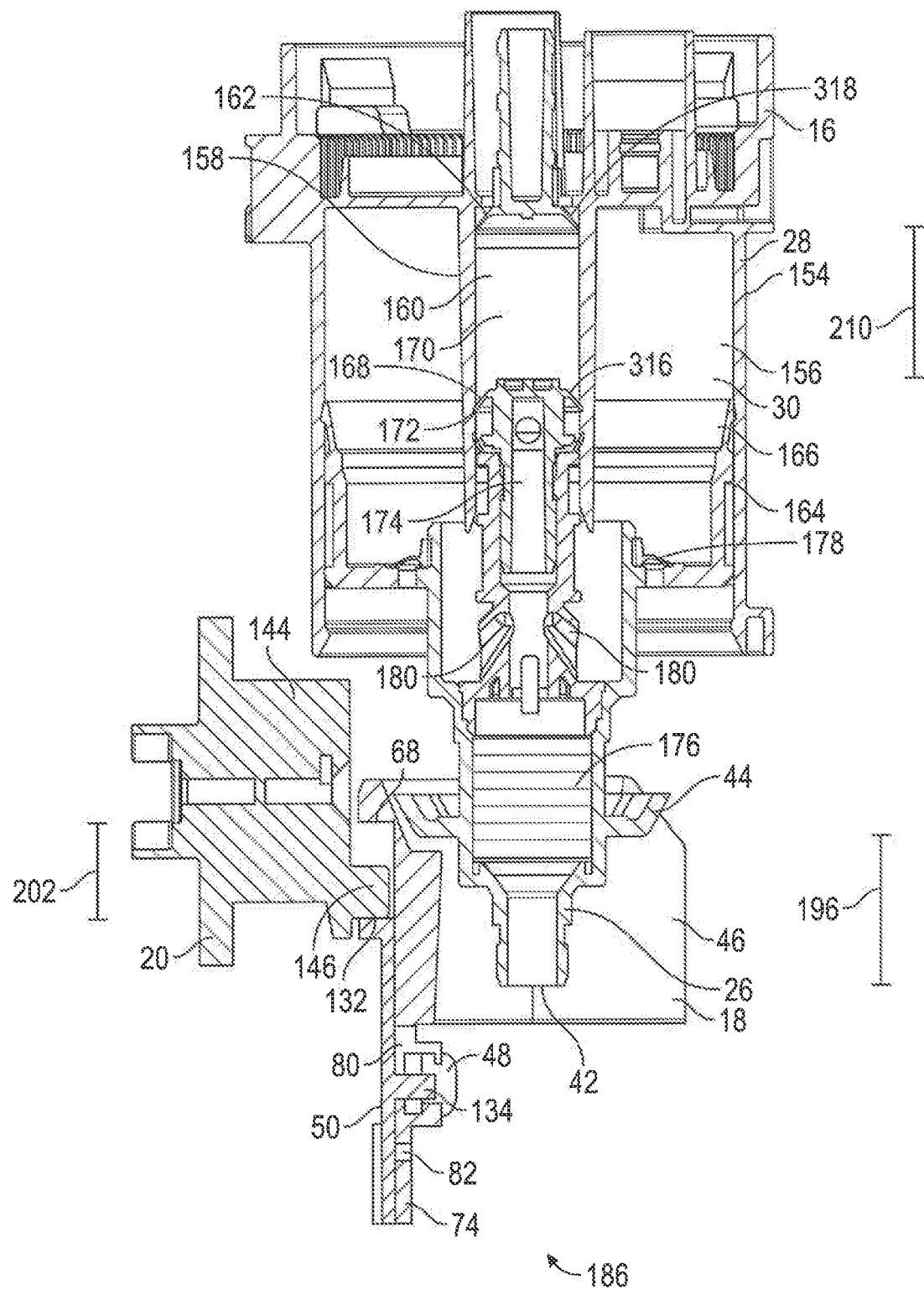
FIG. 24 is a cross-sectional view of the pump, the pump actuator, and the driver of FIG. 22, taken along line A-A' as shown in FIG. 8, with the dose adjustment mechanism of the pump actuator at the low dose setting and the pump at the extended position.
Figure 26:
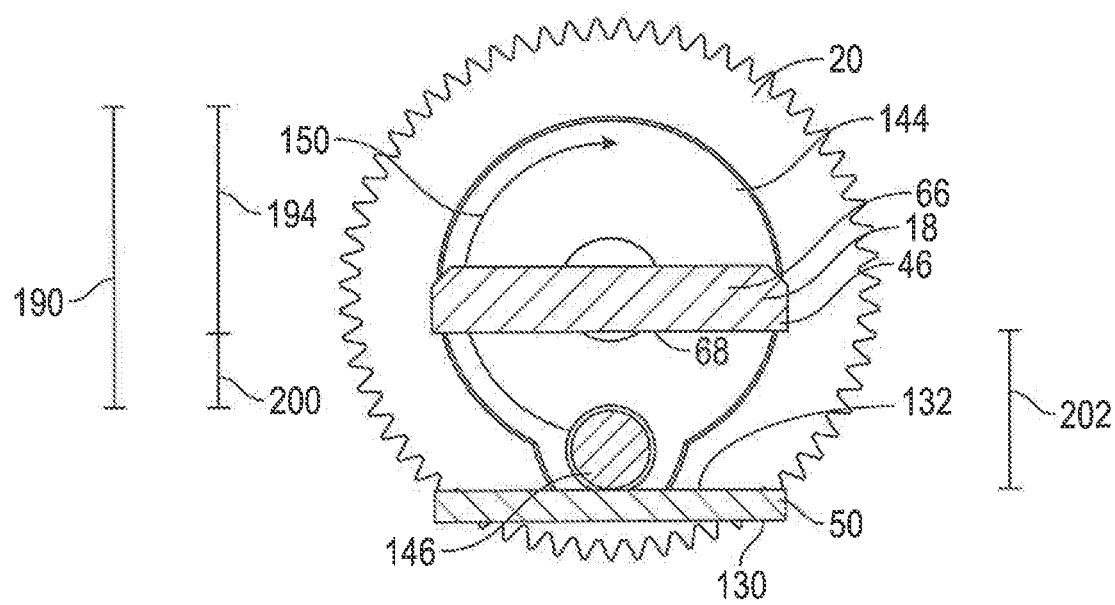
FIG. 26 is a cross-sectional view of the pump actuator and the driver of FIG. 22, taken along line B-B' as shown in FIG. 10, with the dose adjustment mechanism of the pump actuator at the low dose setting and the driver pin of the driver at the extension position.

To place the dose adjustment mechanism 186 at the low dose setting, the sliding body 48 is slid to the right from the medium dose setting of FIG. 16, so that the cam adjustment pin 134 engages with the third location selection segment 120 of the ramped adjustment surface 112, as shown in FIG. 22. This positions the second cam surface 132 at a third location relative to the first cam surface 68, as shown in FIG. 24. When at the third location, the second cam surface 132 is spaced a low dose distance 202 from the first cam surface 68, as shown in FIG. 26. The low dose distance 202, as shown in FIG. 26, is larger than the medium dose distance 198, as shown in FIG. 20.

Figure 27:
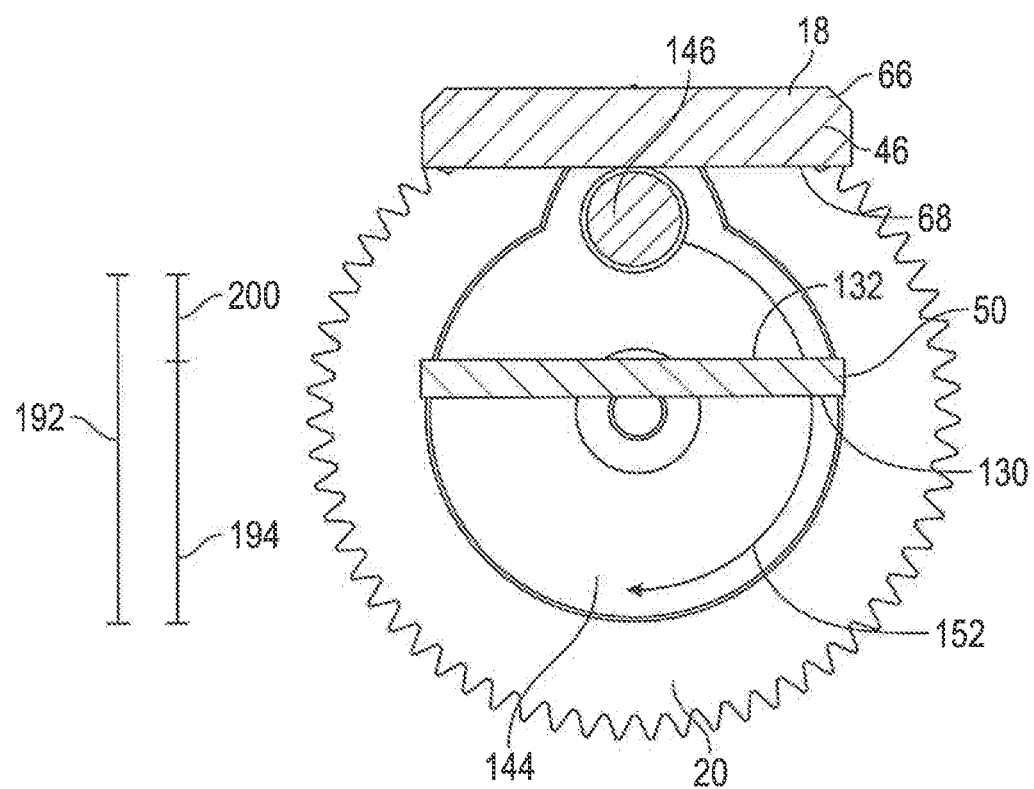
FIG. 27 is a cross-sectional view of the pump actuator and the driver of FIG. 23, taken along line B-B' as shown in FIG. 10, with the dose adjustment mechanism of the pump actuator at the low dose setting and the driver pin of the driver at the retraction position.

When the electric motor is activated, the drive pin 146 travels the retraction distance 190 in the retraction direction during the retraction motion from the extension position of FIG. 26 to the retraction position of FIG. 27. Similarly to the medium dose setting, when at the low dose setting the drive pin 146 initially travels a lost link distance 200 during a disengagement portion of the retraction motion, in which the drive pin 146 does not engage with the first cam surface 68. Because the low dose distance 202 is larger than the medium dose distance 198, the lost link distance 200 is larger when at the low dose setting than when at the medium dose setting. After travelling the lost link distance 200 in the retraction direction, the drive pin 146 engages with the first cam surface 68 and continues travelling to the retraction position during an engagement portion of the retraction motion, displacing the pump actuator 18 the engagement distance 194 in the retraction direction. Because the lost link distance 200 is greater when at the low dose setting compared to the medium dose setting, the engagement distance 194 is smaller when at the low dose setting compared to the medium dose setting.

Figure 25:
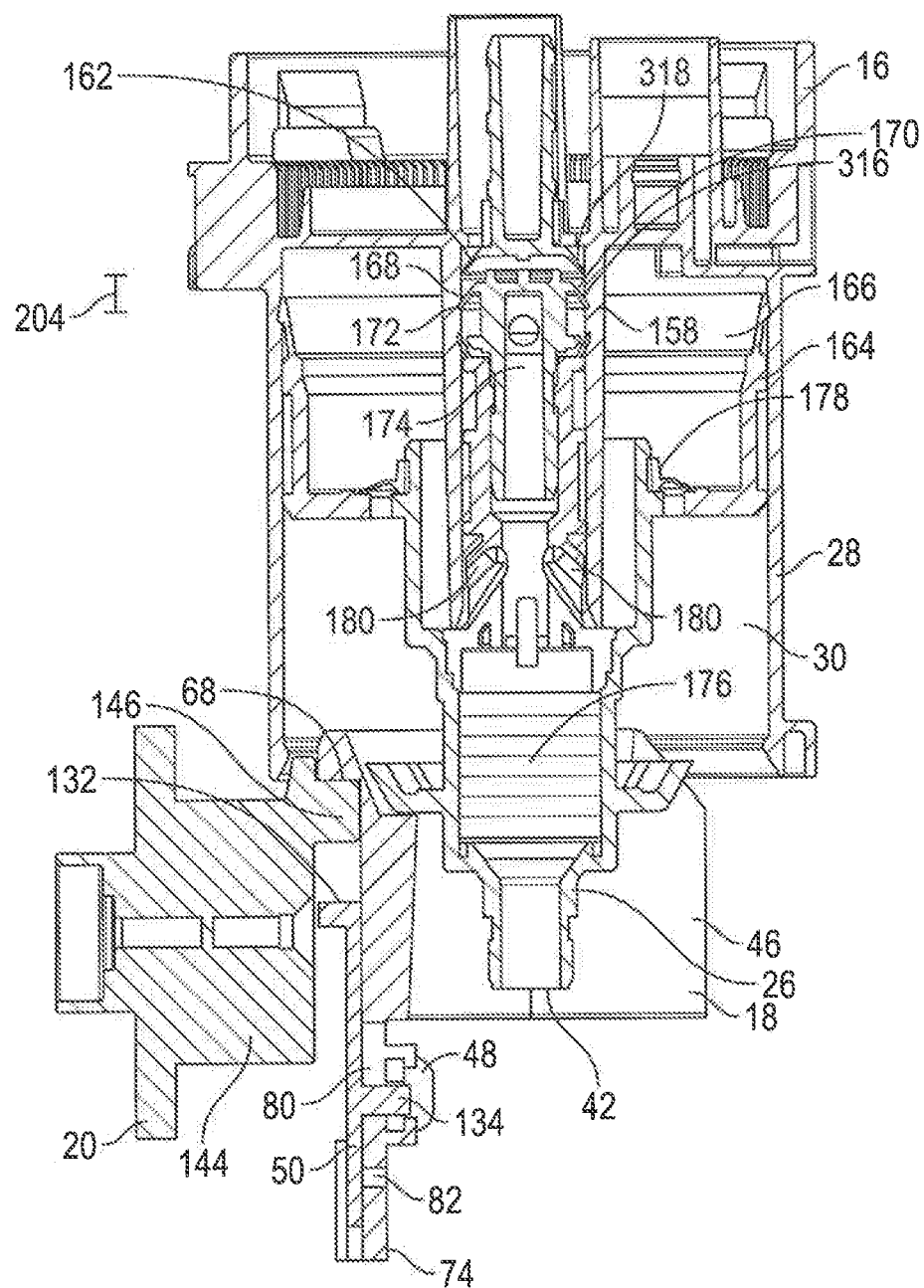
FIG. 25 is a cross-sectional view of the pump, the pump actuator, and the driver of FIG. 23, taken along line A-A' as shown in FIG. 8, with the dose adjustment mechanism of the pump actuator at the low dose setting and the pump at the retracted position.

The movement of the pump actuator 18 the engagement distance 194 in the retraction direction displaces the piston-forming element 26 the stroke distance 196 in the retraction direction from the extended position of FIG. 24 to the retracted position of FIG. 25. Because the engagement distance 194 is smaller when the dose adjustment mechanism 186 is at the low dose setting compared to the medium dose setting, the stroke distance 196 is also proportionally smaller when at the low dose setting, as shown in FIG. 24, compared to the medium dose setting, as shown in FIG. 18. The smaller stroke distance 196 causes a smaller decrease in the volume of the variable volume fluid compartment 170 and in the volume of the variable volume air compartment 166 when the piston-forming element 26 moves from the extended position of FIG. 24 to the retracted position of FIG. 25. This causes a smaller volume of foam to be dispensed from the fluid outlet 42 when the dose adjustment mechanism 186 is at the low dose setting, as shown in FIG. 24, in comparison with the larger volume of foam that is dispensed when the dose adjustment mechanism 186 is at the medium dose setting, as shown in FIG. 18.

During the extension motion, the drive pin 146 travels the extension distance 192 in the extension direction from the retraction position of FIG. 27 back to the extension position of FIG. 26. During an initial disengagement portion of the extension motion, the drive pin 146 travels the lost link distance 200 in the extension direction, and does not engage with the second cam surface 132. After travelling the lost link distance 200 in the extension direction, the drive pin 146 engages with the second cam surface 132 and continues travelling to the extension position in the extension direction during an engagement portion of the extension motion, displacing the pump actuator 18 the engagement distance 194 in the extension direction. The movement of the pump actuator 18 the engagement distance 194 in the extension direction displaces the piston-forming element 26 the stroke distance 196 in the extension direction from the retracted position of FIG. 27 back to the extended position of FIG. 26, causing fluid and air to be drawn into the variable volume fluid compartment 170 and the variable volume air compartment 166, respectively, as described above. Because the stroke distance 196 is smaller when the dose adjusting mechanism 186 is at the low dosage setting compared to the medium dose setting, the volume of fluid and air that are drawn into the variable volume fluid compartment 170 and the variable volume air compartment 166, respectively, during the extension motion is smaller when the dose adjusting mechanism 186 is at the low dosage setting compared to the medium dose setting.

The dose adjustment mechanism 186 thus allows the volume of fluid that is dispensed with each activation of the dispenser 10 to be adjusted merely by sliding the sliding body 48 relative to the vertical slot 80, and without requiring any changes to the interface between the piston-forming element 26 and the pump actuator 18. The dose adjustment mechanism 186 also allows the piston-forming element 26 to return to the same retracted position regardless of whether the dose adjustment mechanism 186 is at the high dose setting, the medium dose setting, or the low dose setting. This is because the first cam surface 68 remains stationary relative to the pump engagement body 46 of the pump actuator 18, and only the second cam surface 132 moves relative to the pump engagement body 46 when the dose setting is changed. As such, when the drive pin 146 is engaged with the first cam surface 68 at the retraction position, as shown in FIG. 13 when at the high dose setting, in FIG. 19 when at the medium dose setting, and in FIG. 25 when at the low dose setting, the piston-forming element 26 always returns to the same position relative to the piston chamber-forming body 28.

When the piston-forming element 26 is at the retracted position, a movable pump surface 316 of the sealing disc 172 is spaced a retracted distance 204 from a reciprocal pump surface 318 of the one-way fluid inlet valve 162, as shown in FIGS. 13, 19 and 25. The retracted distance 204 is preferably quite small, so that substantially all of the fluid contained within the variable volume fluid compartment 170 is expelled into the internal passageway 174 each time the piston-forming element 26 returns to the retracted position, regardless of the dose setting. This helps to avoid priming and dose consistency issues that might otherwise occur if substantially all of the fluid is not expelled from the variable volume fluid compartment 170 with each activation of the dispenser 10.

To change the volume of fluid that is dispensed from the dispenser 10, the extended position that the piston-forming element 26 adopts relative to the piston chamber-forming body 28 changes when the dose setting is changed. When at the high dose setting, the engagement of the drive pin 146 with the second cam surface 132 at the extension position places the sealing disc 172 a first extended distance 206 from the one-way fluid inlet valve 162, as shown in FIG. 12. When at the medium dose setting, the engagement of the drive pin 146 with the second cam surface 132 at the extension position places the sealing disc 172 a second extended distance 208 from the one-way fluid inlet valve 162, as shown in FIG. 18. When at the low dose setting, the engagement of the drive pin 146 with the second cam surface 132 at the extension position places the sealing disc 172 a third extended distance 210 from the one-way fluid inlet valve 162, as shown in FIG. 24. The first extended distance 206 is larger than the second extended distance 208, and the second extended distance 208 is larger than the third extended distance 210. As a result, a high dose of fluid is drawn into and subsequently expelled from the variable volume fluid compartment 170 when at the high dose setting, a smaller medium dose of fluid is drawn into and subsequently expelled from the variable volume fluid compartment 170 when at the medium dose setting, and an even smaller low dose of fluid is drawn into and subsequently expelled from the variable volume fluid compartment 170 when at the low dose setting.

The cam adjustment pin 134, the sliding body 48, and the first holding member 304 also function as a locking mechanism 320 that prevents the driver 20 from moving the second cam surface 132 relative to the pump engagement body 46 when the driver 20 is activated. In particular, because the cam adjustment pin 134 is only able to move vertically relative to the pump engagement body 46, the sliding body 48 is only able to move laterally relative to the pump engagement body 46, and the first, second, and third location selection segments 110, 116, 120 of the ramped adjustment surface 112 are horizontal, when the dose adjustment mechanism 186 is at the high dose setting of FIG. 8, the medium dose setting of FIG. 16, or the low dose setting of FIG. 22, the downwards force exerted against the second cam surface 132 by the drive pin 146 as the drive pin 146 moves towards the extension position does not slide the sliding body 48 laterally relative to the pump engagement body 46, and thus does not change the dose setting. The dose setting therefore remains locked in place until a user chooses a new dose setting by sliding the sliding body 48 to a new lateral position.

The embodiment shown in FIGS. 1 to 27 therefore provides a fluid dispenser 10 comprising: a pump mechanism 34 that dispenses a dose of fluid when a movable pump member 22 of the pump mechanism 34 is moved between an extended position and a retracted position; a pump engagement body 46 that engages with the movable pump member 22 for effecting movement of the movable pump member 22 between the extended position and the retracted position; a driver engagement mechanism 298 having a first cam surface 68 and a second cam surface 132 that are connected to the pump engagement body 46, at least one of the first cam surface 68 and the second cam surface 132 comprising an adjustable cam surface 302 whose location relative to the pump engagement body 46 is selectively adjustable; a driver 20 having a camming body 296 that moves between an extension position and a retraction position when the driver 20 is activated, the camming body 296 engaging with the first cam surface 68 and the second cam surface 132 to effect movement of the pump engagement body 46; and a dose adjustment mechanism 186 for selecting the location of the adjustable cam surface 302 relative to the pump engagement body 46.

Reference is now made to FIGS. 28 to 42, which depict a pump 16, a pump actuator 18, and a driver 20 of a fluid dispenser 10 in accordance with a second embodiment of the invention. The fluid dispenser 10 of FIGS. 28 to 42 is identical to the dispenser 10 shown in FIGS. 1 to 27, with the exception that the dose adjustment mechanism 186 is adapted to incorporate a rotation body 212 in place of the sliding body 48. Like numerals are used to denote like components.

Figure 31:
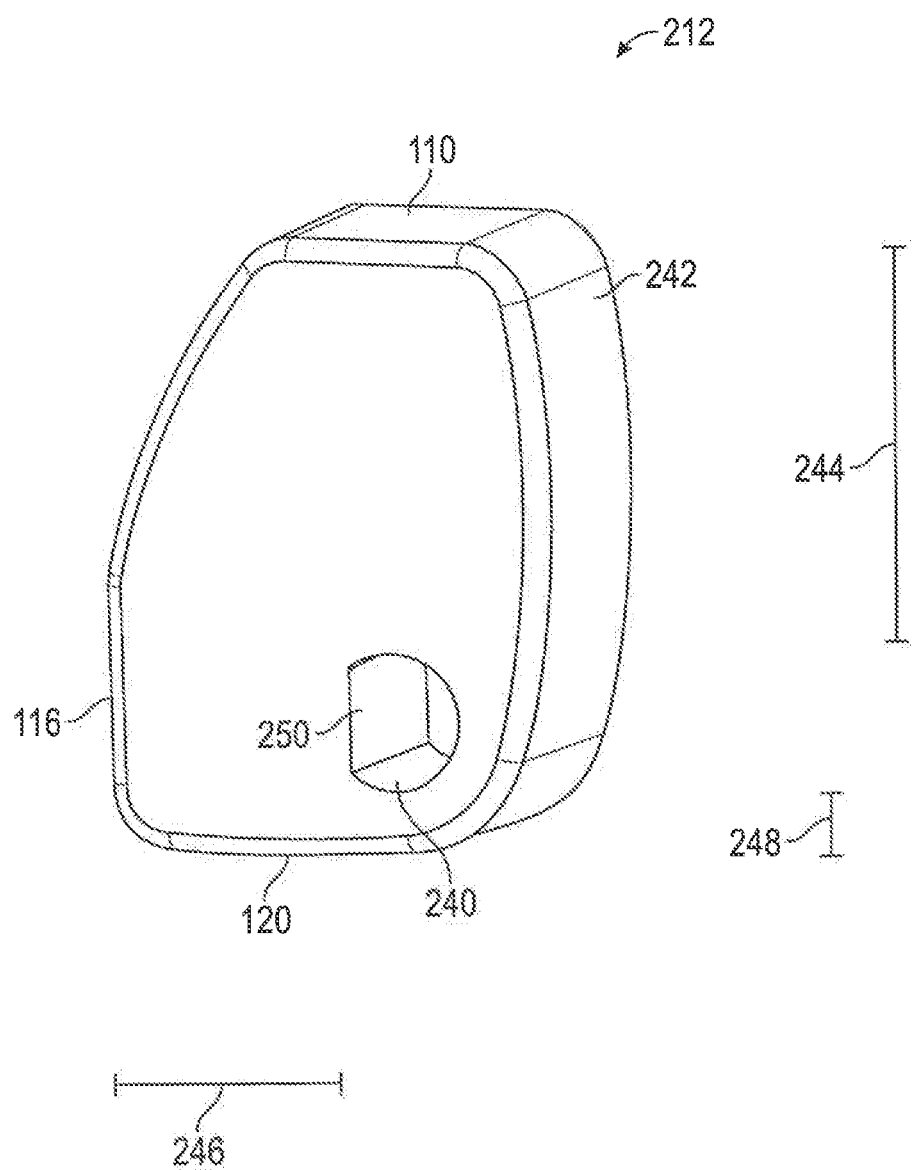
FIG. 31 is a rear perspective view of a rotation body of the dose adjustment mechanism shown in FIG. 28.
Figure 32:
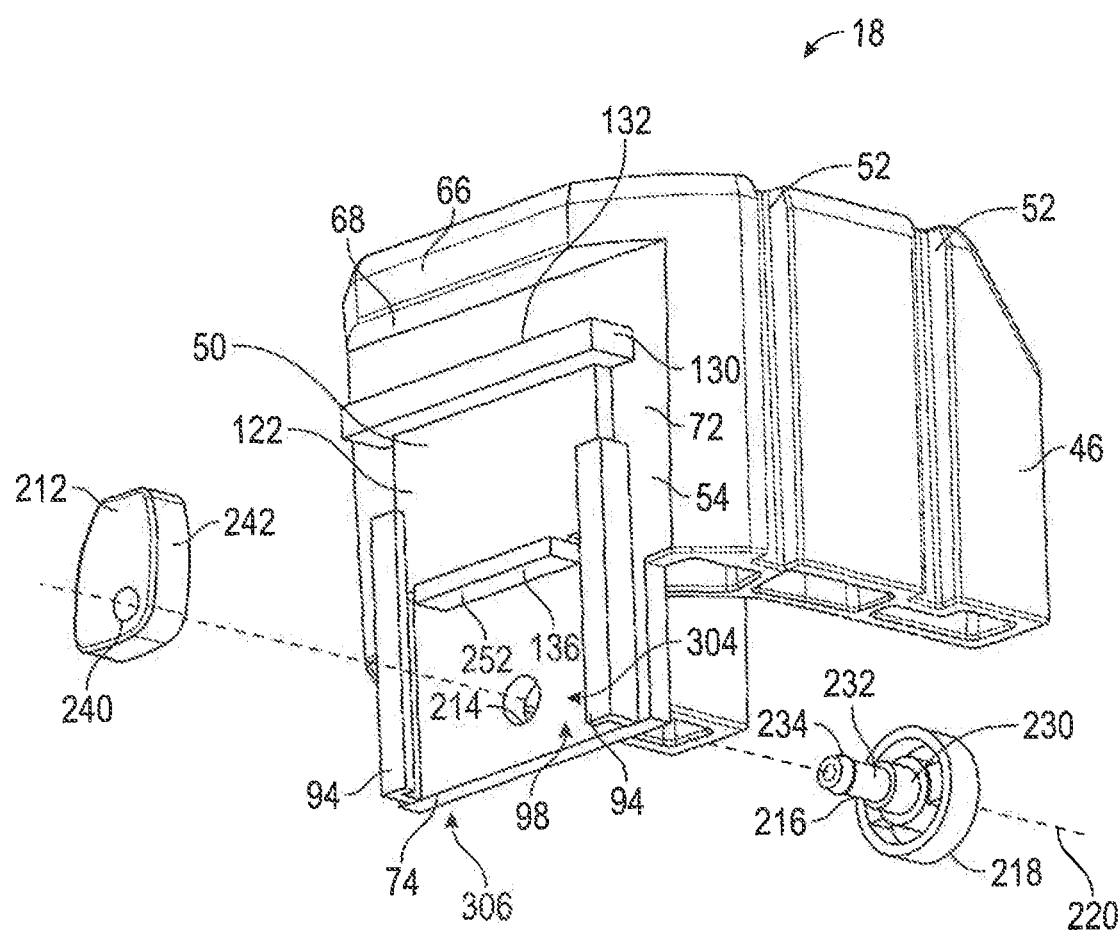
FIG. 32 is a partially exploded view of the pump actuator shown in FIG. 28.

As in the embodiment shown in FIGS. 1 to 27, in the embodiment shown in FIGS. 28 to 42 there is a lower extension 74 that extends downwardly from the rear wall 54 of the pump engagement body 46. The lower extension 74 has a circular opening 214, as shown in FIG. 32, which extends through the lower extension 74 from the front surface 76 to the back surface 78. The circular opening 214 is sized to receive a shaft 216 of a dial 218 so as to permit rotation of the dial relative to the lower extension 74 about a rotation axis 220.

Figure 30:
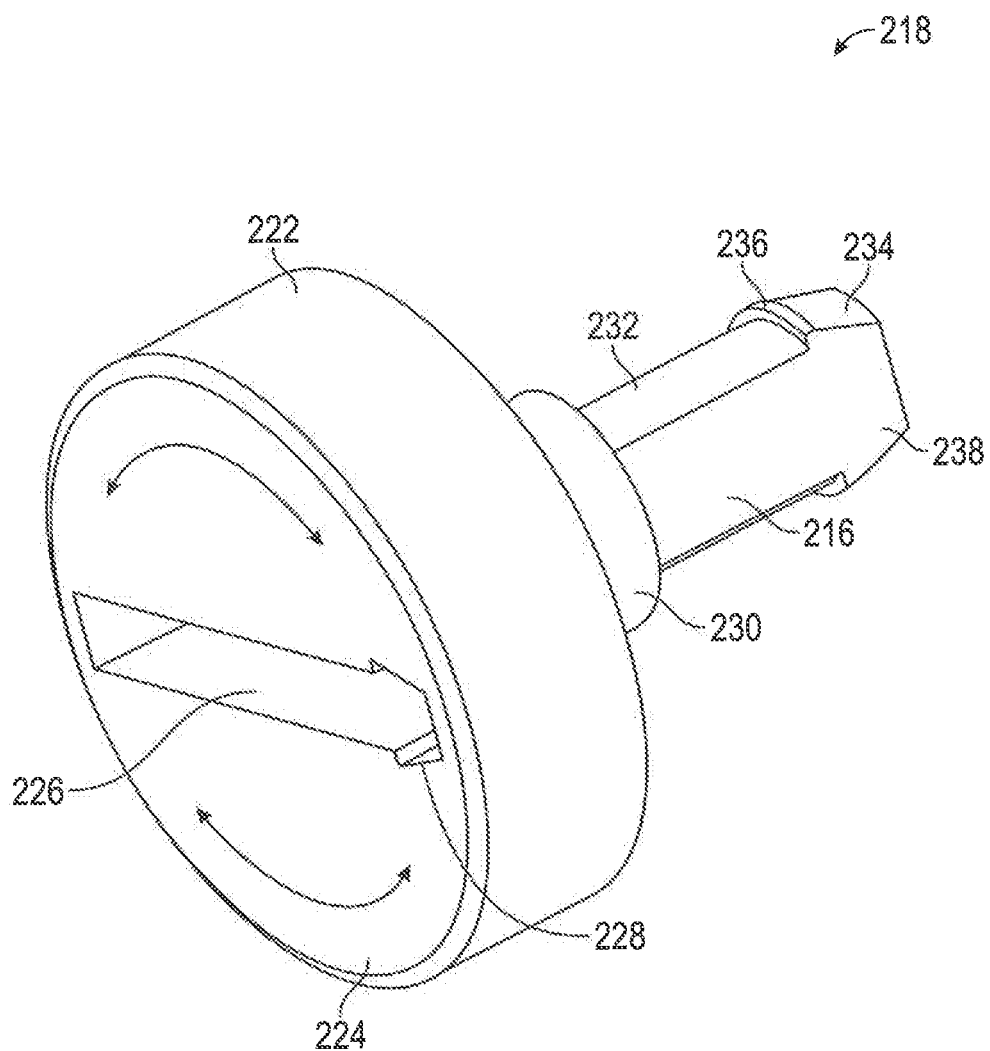
FIG. 30 is a front perspective view of a dial of the dose adjustment mechanism shown in FIG. 28.

The dial 218 is shown in FIG. 30 as having a circular dial body 222 with a front facing surface 224. An adjustment slot 226 with an arrowed end 228 extends across the front facing surface 224 of the dial body 222. The shaft 216 extends rearwardly from the dial body 222, and has a cylindrical base portion 230, a partially cylindrical engagement portion 232 that extends rearwardly from the base portion 230, and a locking portion 234 that extends rearwardly from the engagement portion 232. The locking portion 234 has a collar 236 with an increased diameter in comparison with the diameter of the engagement portion 232. Both the engagement portion 232 and the locking portion 234 have a flat side surface 238 that faces in the same direction as the arrowed end 228 of the adjustment slot 226.

The dial 218 is configured to engage with, and effect rotation of, the rotation body 212. The rotation body 212 is shown in FIG. 31 as having an eccentrically positioned shaft receiving opening 240 and an outer adjustment surface 242 that extends circumferentially about the rotation body 212. The outer adjustment surface 242 has a first location selection segment 110 that is spaced a first distance 244 from the shaft receiving opening 240, a second location selection segment 116 that is spaced a second distance 246 from the shaft receiving opening 240, and a third location selection segment 120 that is spaced a third distance 248 from the shaft receiving opening 240. The first distance 244 is greater than the second distance 246, and the second distance 246 is greater than the third distance 248.

The shaft receiving opening 240 is partially cylindrical and has a flat inside surface 250 that is generally parallel with the second location selection segment 116. When assembled, the base portion 230 of the shaft 216 extends through the circular opening 214 of the lower extension 74, and the engagement portion 232 of the shaft 216 extends through the shaft receiving opening 240 of the rotation body 212, with the flat side surface 238 of the engagement portion 232 engaged with the flat inside surface 250 of the shaft receiving opening 240. The locking portion 234 extends rearwardly from the shaft receiving opening 240, and has a larger diameter than the shaft receiving opening 240 so as to prevent the rotation body 212 from sliding rearwardly out of engagement with the shaft 216. When the dial 218 is rotated about the rotation axis 220, the engagement of the flat side surface 238 of the engagement portion 232 with the flat inside surface 250 of the shaft receiving opening 240 causes the rotation body 212 to likewise rotate about the rotation axis 220. Together, the shaft 216 and the circular opening 214 function as a first holding member 304, which carries the rotation body 212, allows the rotation body 212 to rotate about the rotation axis 220 relative to the pump engagement body 46, and prevents the rotation axis 220 from moving relative to the pump engagement body 46.

As in the embodiment shown in FIGS. 1 to 27, in the embodiment of FIGS. 28 to 42 the pump actuator 18 has a cam adjustment body 50 that is vertically slideable relative to the rear surface 72 of the pump engagement body 46, as shown in FIG. 32. In the embodiment of FIGS. 28 to 42, the cam adjustment body 50 does not have a cam adjustment pin 134, and instead has a bottom portion 252 that extends rearwardly from the bottom of the rectangular portion 122. The bottom portion 252 presents a downwardly directed engagement surface 136 for engaging with the outer adjustment surface 242 of the rotation body 212, as shown in FIG. 33.

Figure 28:
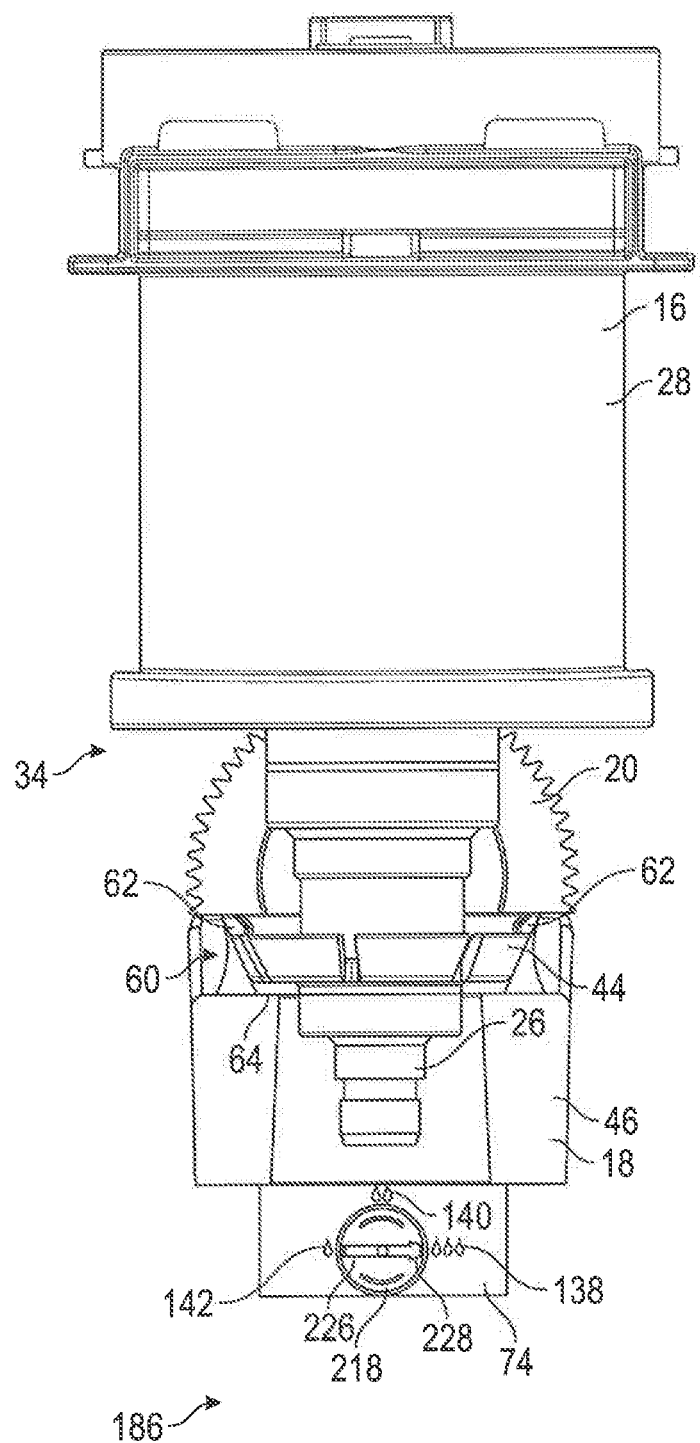
FIG. 28 is a front view of a pump, a pump actuator, and a driver of a fluid dispenser in accordance with a second embodiment of the present invention, with a dose adjustment mechanism of the pump actuator at a high dose setting and the pump at an extended position.
Figure 29:
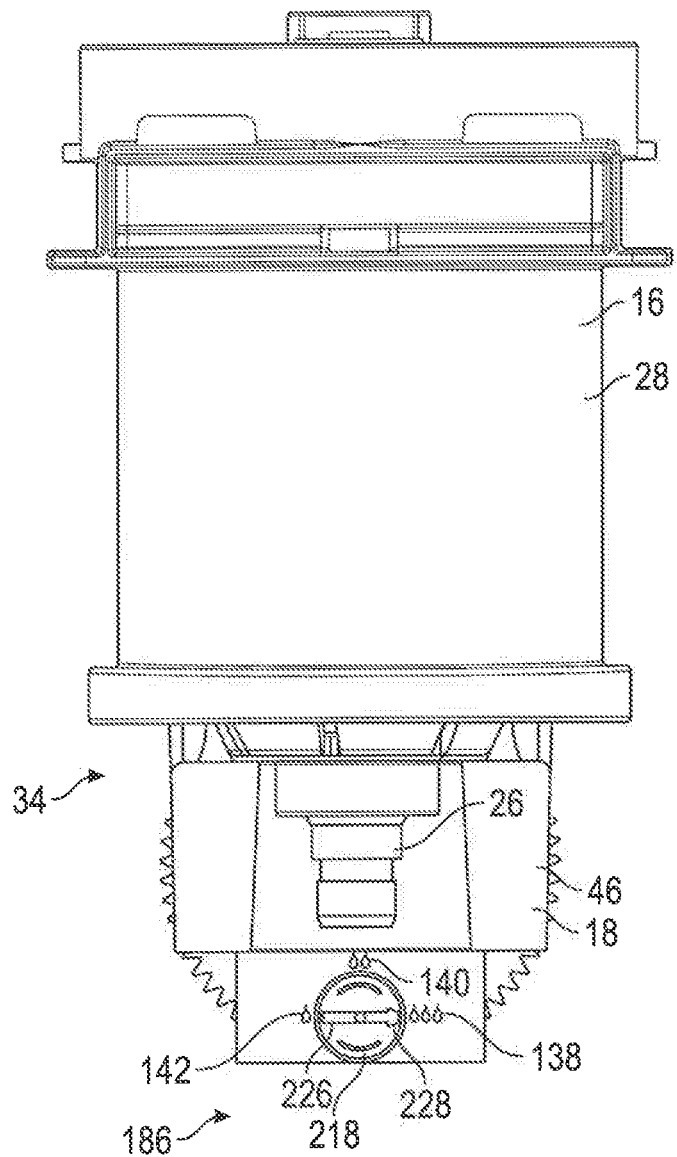
FIG. 29 is a front view of the pump, the pump actuator, and the driver of FIG. 28, with the dose adjustment mechanism of the pump actuator at the high dose setting and the pump at a retracted position.

The fluid dispenser 10 of FIGS. 28 to 42 is operated in an identical manner to the fluid dispenser 10 as shown in FIGS. 1 to 27, with the only difference being the operation of the dose adjustment mechanism 186 to select the dose setting. To place the dose adjustment mechanism 186 at the high dose setting, the dial 218 is rotated so that the arrowed end 228 of the adjustment slot 226 is directed towards the high dose marker 138 displayed on the front surface 76 of the lower extension 74, as shown in FIG. 28. The dial 218 can be manually rotated, for example, or can be rotated by placing a flat object such as the head of a screwdriver into the adjustment slot 226 and then turning the screwdriver to rotate the dial 218.

Figure 33:
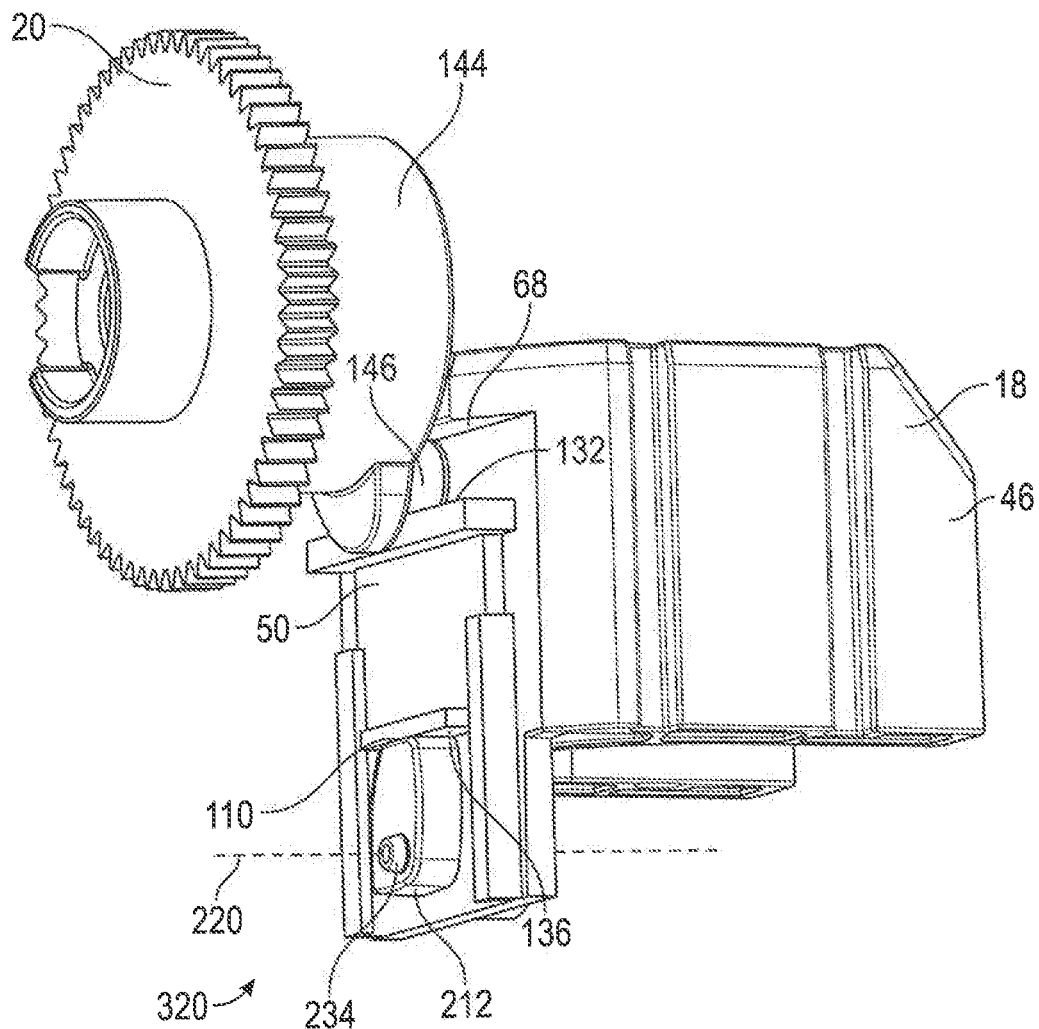
FIG. 33 is a rear perspective view of the pump actuator and the driver shown in FIG. 28, with the dose adjustment mechanism of the pump actuator at the high dose setting and a driver pin of the driver at an extension position.
Figure 34:
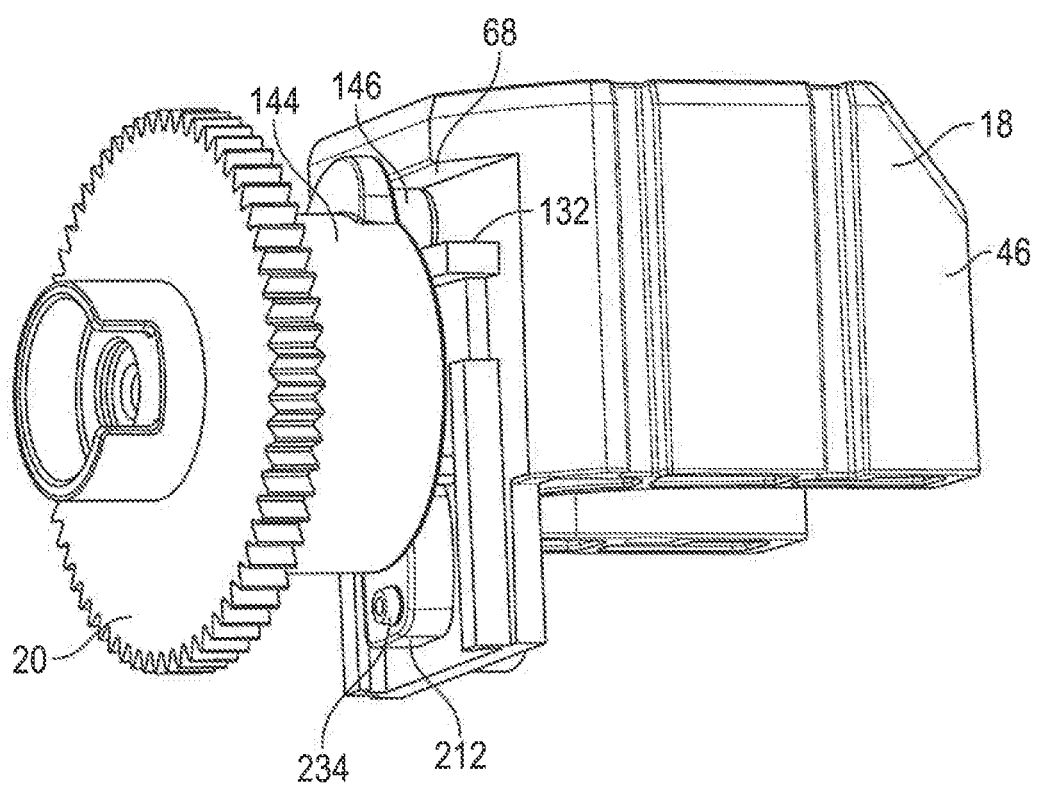
FIG. 34 is a rear perspective view of the pump actuator and the driver of FIG. 33, with the dose adjustment mechanism of the pump actuator at the high dose setting and the driver pin of the driver at a retraction position.

When the arrowed end 228 of the adjustment slot 226 is directed towards the high dose marker 138, the first location selection segment 110 of the outer adjustment surface 242 of the rotation body 212 faces upwardly and engages with the engagement surface 136 of the cam adjustment body 50, as shown in FIG. 33. The engagement of the engagement surface 136 with the first location selection segment 110 locates the second cam surface 132 at the first location relative to the first cam surface 68, as in the first embodiment of the invention shown in FIGS. 1 to 27. As in the first embodiment, when the second cam surface 132 is at the first location, the second cam surface 132 is spaced the high dose distance 188 from the first cam surface 68, as shown in FIG. 14, causing the fluid pump 16 to dispense the high dose of fluid when the electric motor is activated.

Figure 35:
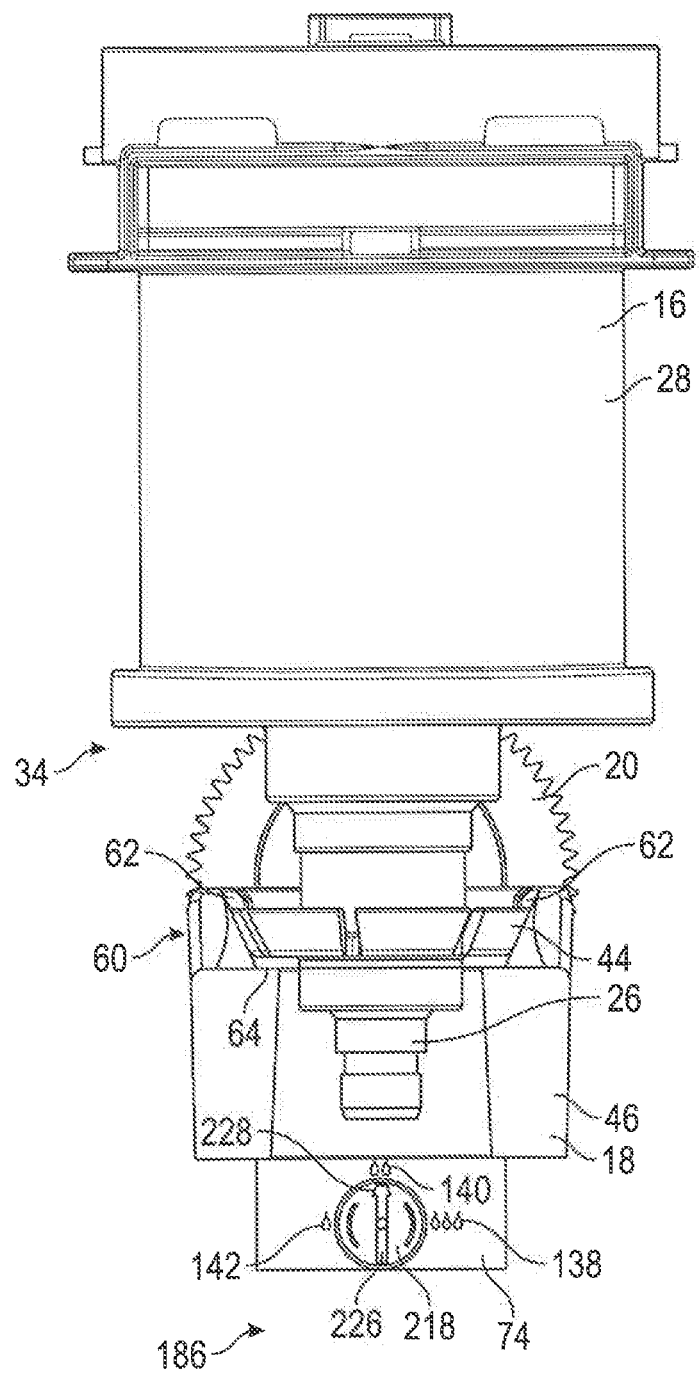
FIG. 35 is a front view of the pump, the pump actuator, and the driver of FIG. 28, with the dose adjustment mechanism of the pump actuator at a medium dose setting and the pump at the extended position.
Figure 36:
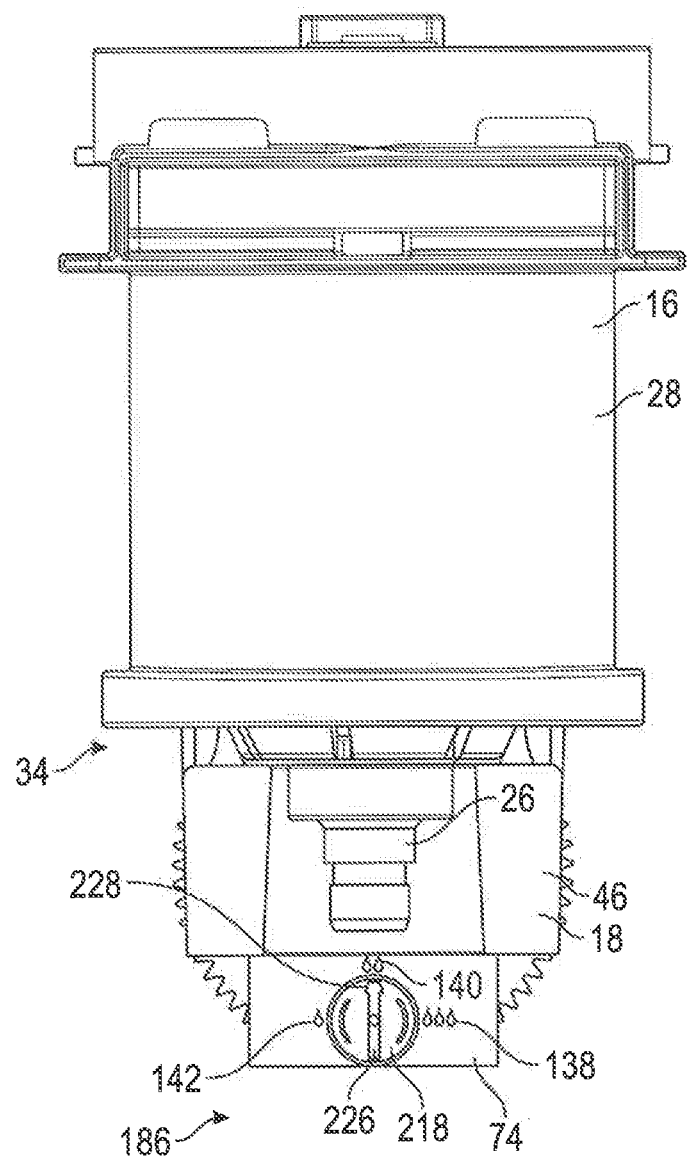
FIG. 36 is a front view of the pump, the pump actuator, and the driver of FIG. 28, with the dose adjustment mechanism of the pump actuator at the medium dose setting and the pump at the retracted position.
Figure 37:
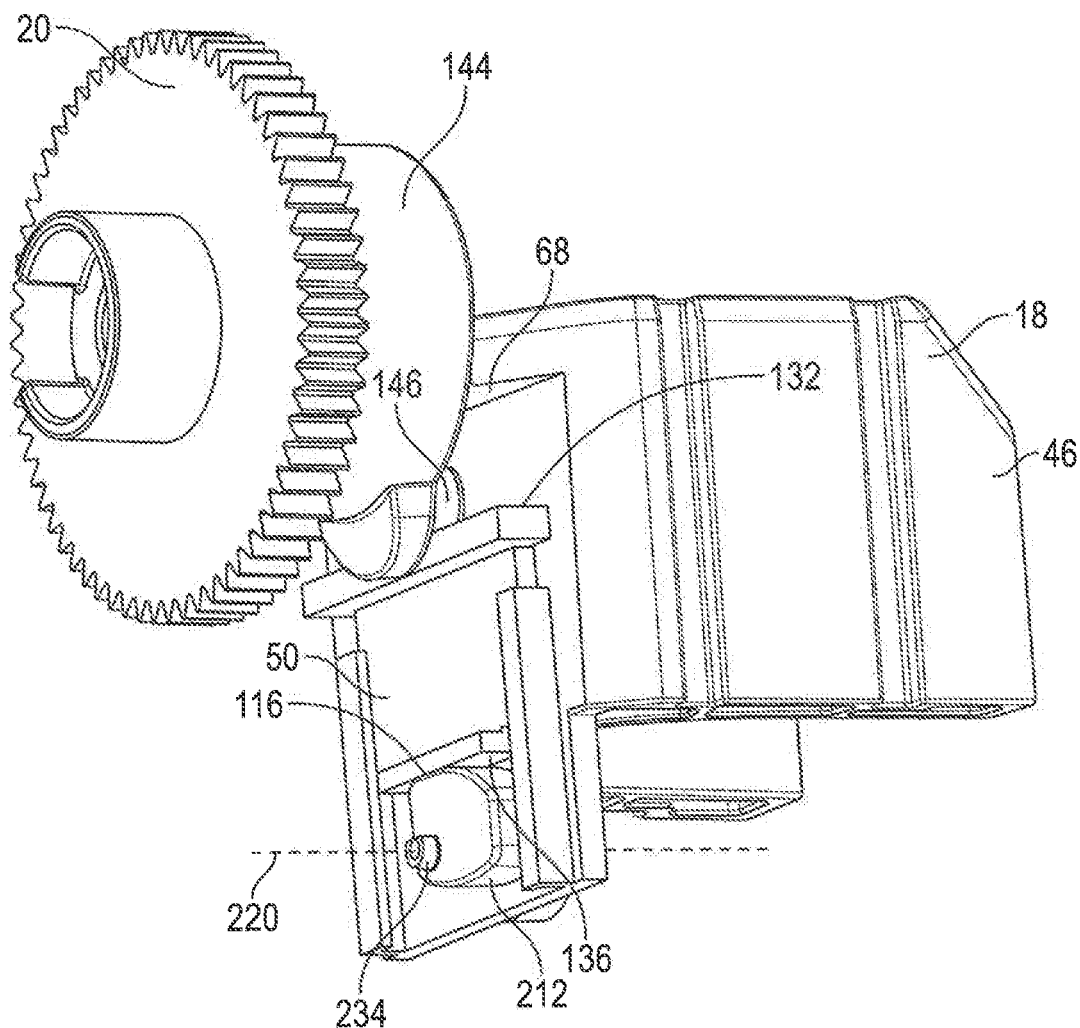
FIG. 37 is a rear perspective view of the pump actuator and the driver shown in FIG. 35, with the dose adjustment mechanism of the pump actuator at the medium dose setting and the driver pin of the driver at the extension position.
Figure 38:
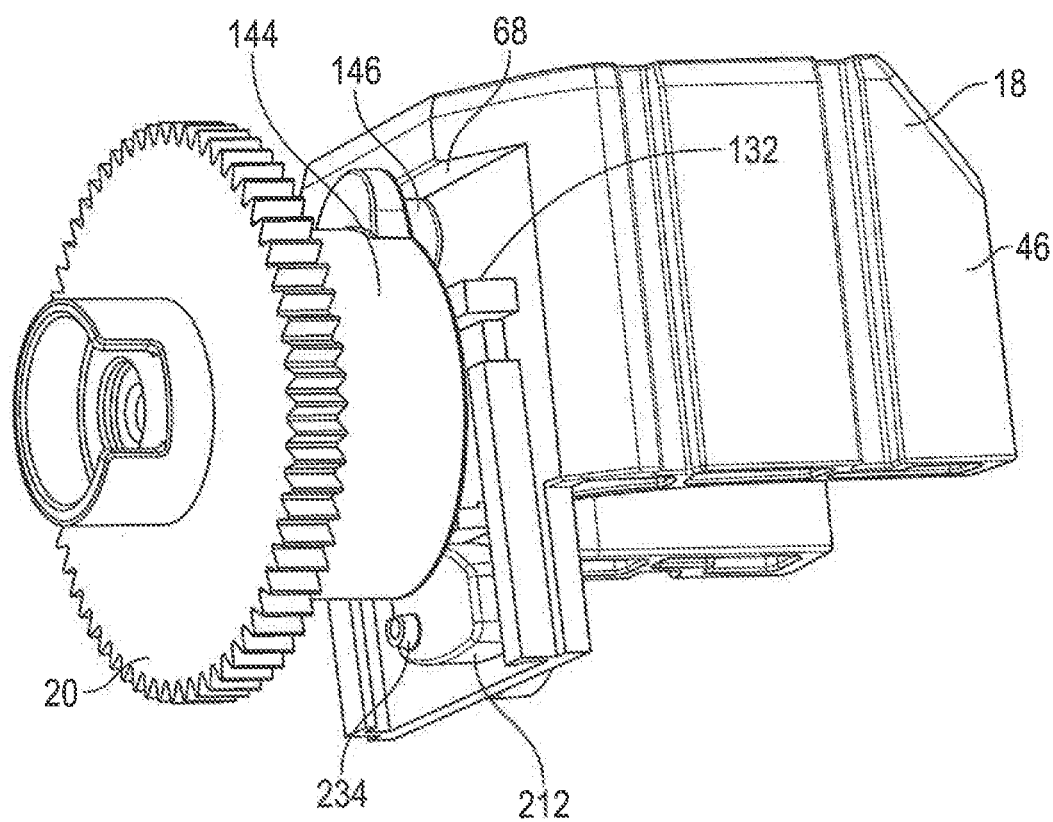
FIG. 38 is a rear perspective view of the pump actuator and the driver shown in FIG. 36, with the dose adjustment mechanism of the pump actuator at the medium dose setting and the driver pin of the driver at the retraction position.

To place the dose adjustment mechanism 186 at the medium dose setting, the dial 218 is rotated counter clockwise from the high dose setting until the arrowed end 228 of the adjustment slot 226 is directed towards the medium dose marker 140, as shown in FIG. 35. When the arrowed end 228 of the adjustment slot 226 is directed towards the medium dose marker 140, the second location selection segment 116 of the outer adjustment surface 242 of the rotation body 212 faces upwardly and engages with the engagement surface 136 of the cam adjustment body 50, as shown in FIG. 37. The engagement of the engagement surface 136 with the second location selection segment 116 locates the second cam surface 132 at the second location relative to the first cam surface 68. As in the first embodiment shown in FIGS. 1 to 27, when the second cam surface 132 is at the second location, the second cam surface 132 is spaced the medium dose distance 198 from the first cam surface 68, as shown in FIG. 20, causing the fluid pump 16 to dispense the medium dose of fluid when the electric motor is activated.

Figure 39:
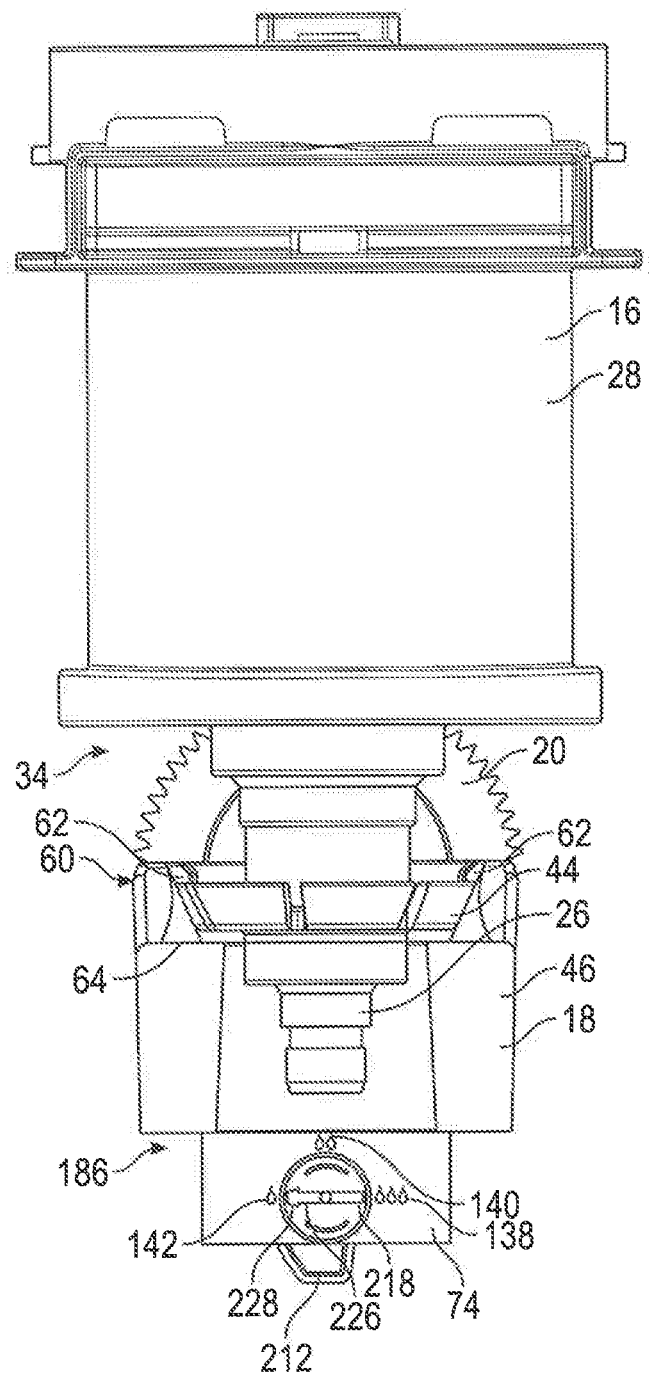
FIG. 39 is a front view of the pump, the pump actuator, and the driver of FIG. 28, with the dose adjustment mechanism of the pump actuator at a low dose setting and the pump at the extended position.
Figure 40:
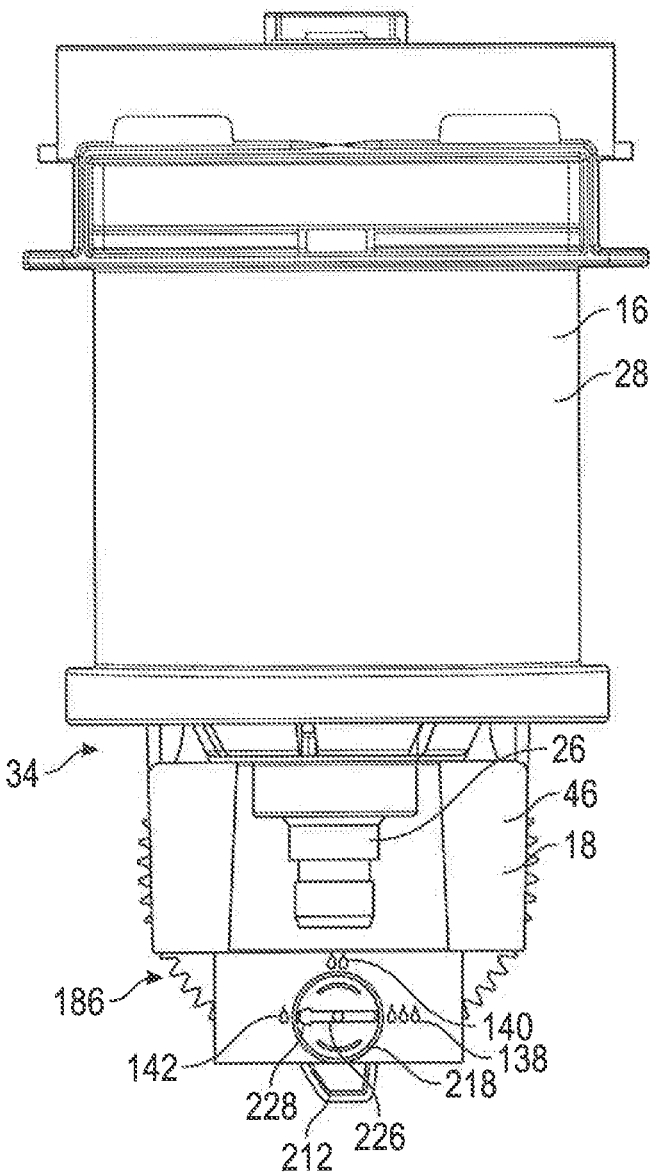
FIG. 40 is a front view of the pump, the pump actuator, and the driver of FIG. 28, with the dose adjustment mechanism of the pump actuator at the low dose setting and the pump at the retracted position.
Figure 41:
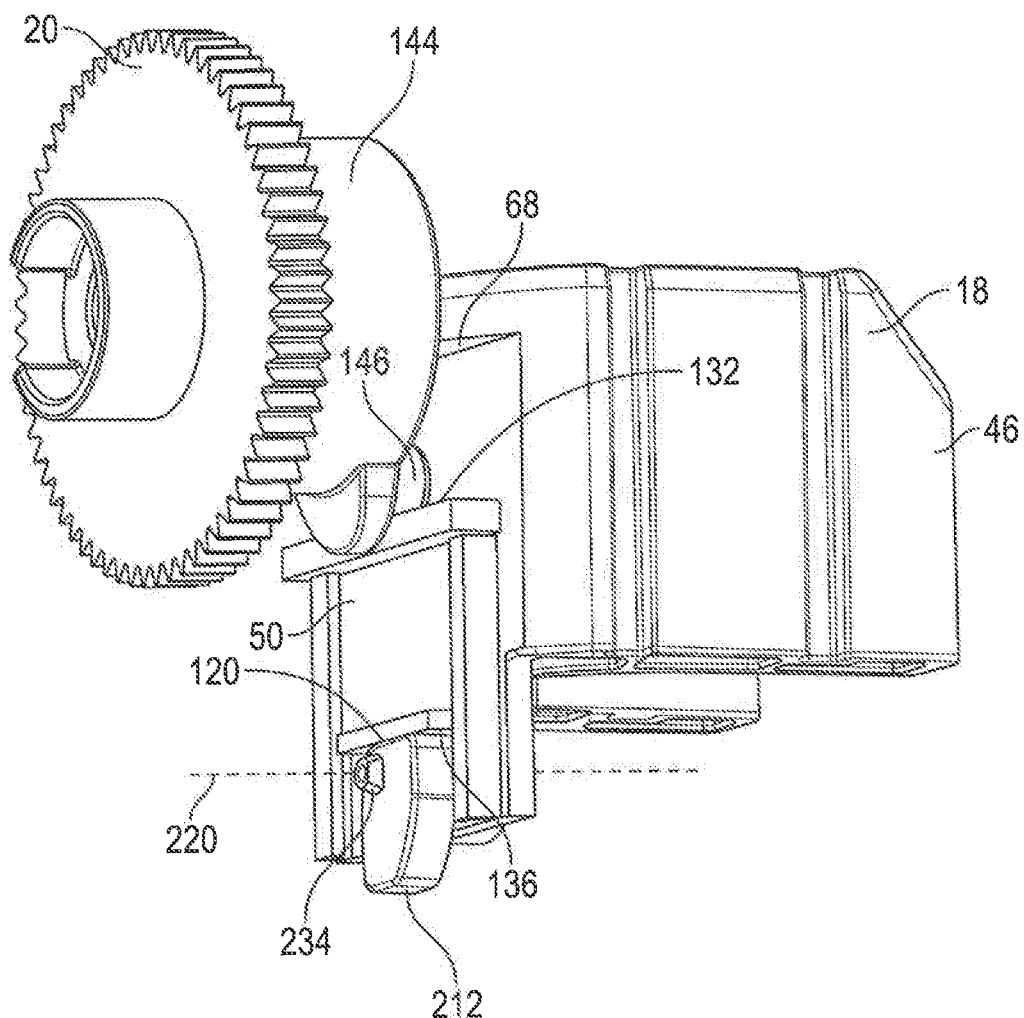
FIG. 41 is a rear perspective view of the pump actuator and the driver shown in FIG. 39, with the dose adjustment mechanism of the pump actuator at the low dose setting and the driver pin of the driver at the extension position.
Figure 42:
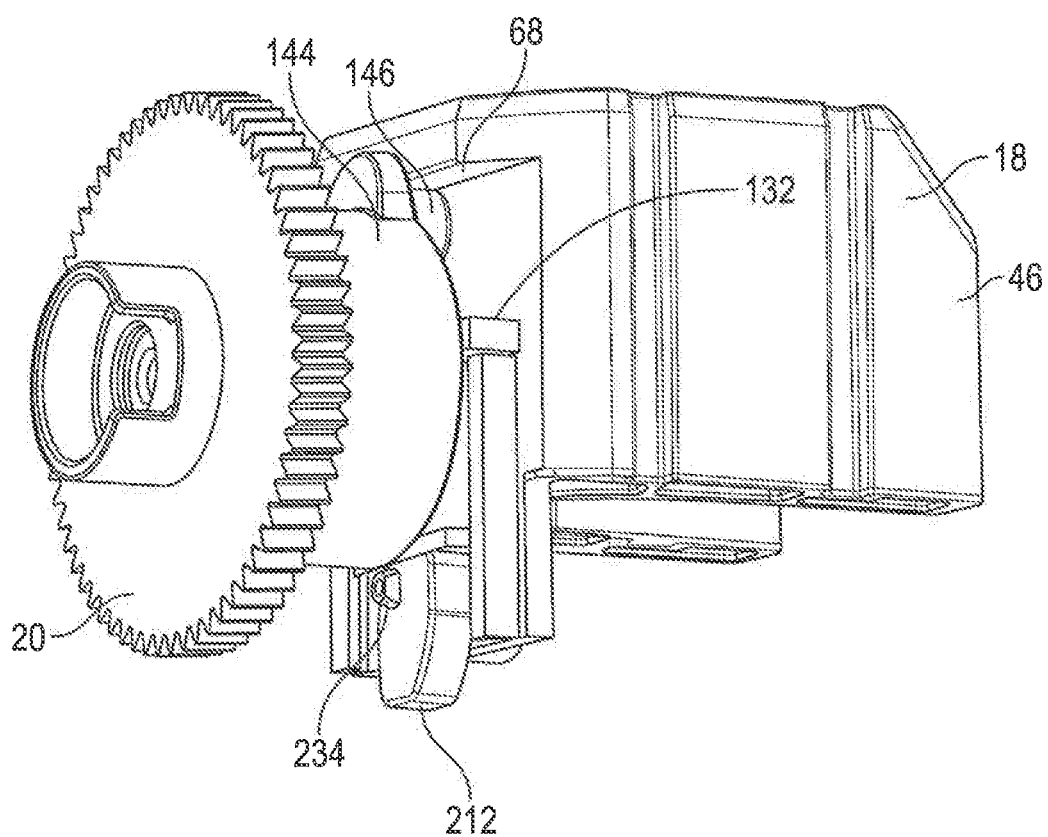
FIG. 42 is a rear perspective view of the pump actuator and the driver shown in FIG. 40, with the dose adjustment mechanism of the pump actuator at the low dose setting and the driver pin of the driver at the retraction position.

To place the dose adjustment mechanism 186 at the low dose setting, the dial 218 is rotated counter clockwise from the medium dose setting until the arrowed end 228 of the adjustment slot 226 is directed towards the low dose marker 142, as shown in FIG. 39. When the arrowed end 228 of the adjustment slot 226 is directed towards the low dose marker 142, the third location selection segment 120 of the outer adjustment surface 242 of the rotation body 212 faces upwardly and engages with the engagement surface 136 of the cam adjustment body 50, as shown in FIG. 41. The engagement of the engagement surface 136 with the third location selection segment 120 locates the second cam surface 132 at the third location relative to the first cam surface 68. As in the first embodiment shown in FIGS. 1 to 27, when the second cam surface 132 is at the third location, the second cam surface 132 is spaced the low dose distance 198 from the first cam surface 68, as shown in FIG. 26, causing the fluid pump 16 to dispense the low dose of fluid when the electric motor is activated.

In the embodiment shown in FIGS. 28 to 42, the cam adjustment body 50, the rotation body 212, and the first holding member 304 function as a locking mechanism 320 that prevents the driver 20 from moving the second cam surface 132 relative to the pump engagement body 46 when the driver 20 is activated. In particular, because the cam adjustment body 50 is only able to move vertically relative to the pump engagement body 46, the rotation body 212 is only able to rotate about the rotation axis 220 relative to the pump engagement body 46, and the first, second, and third location selection segments 110, 116, 120 of the outer adjustment surface 242 are arranged horizontally above the rotation axis 220 when the dose adjustment mechanism 186 is at the high dose setting of FIG. 33, the medium dose setting of FIG. 37, and the low dose setting of FIG. 41, respectively, the downwards force exerted against the second cam surface 132 by the drive pin 146 as the drive pin 146 moves towards the extension position does not rotate the rotation body 212 about the rotation axis 220 relative to the pump engagement body 46, and thus does not change the dose setting. The dose setting therefore remains locked in place until a user chooses a new dose setting by rotating the dial 218 to a new rotational position.

The embodiment shown in FIGS. 28 to 42 therefore provides a fluid dispenser 10 comprising: a pump mechanism 34 that dispenses a dose of fluid when a movable pump member 22 of the pump mechanism 34 is moved between an extended position and a retracted position; a pump engagement body 46 that engages with the movable pump member 22 for effecting movement of the movable pump member 22 between the extended position and the retracted position; a driver engagement mechanism 298 having a first cam surface 68 and a second cam surface 132 that are connected to the pump engagement body 46, at least one of the first cam surface 68 and the second cam surface 132 comprising an adjustable cam surface 302 whose location relative to the pump engagement body 46 is selectively adjustable; a driver 20 having a camming body 296 that moves between an extension position and a retraction position when the driver 20 is activated, the camming body 296 engaging with the first cam surface 68 and the second cam surface 132 to effect movement of the pump engagement body 46; and a dose adjustment mechanism 186 for selecting the location of the adjustable cam surface 302 relative to the pump engagement body 46.

Reference is now made to FIGS. 43 to 47, which depict a pump 16, a pump actuator 18, and a driver 20 of a fluid dispenser 10 in accordance with a third embodiment of the invention. The fluid dispenser 10 of FIGS. 43 to 47 is identical to the dispenser 10 of FIGS. 28 to 42, with the exception that the dose adjustment mechanism 186 is adapted to provide eleven dose settings instead of three. Like numerals are used to denote like components.

Figure 43:
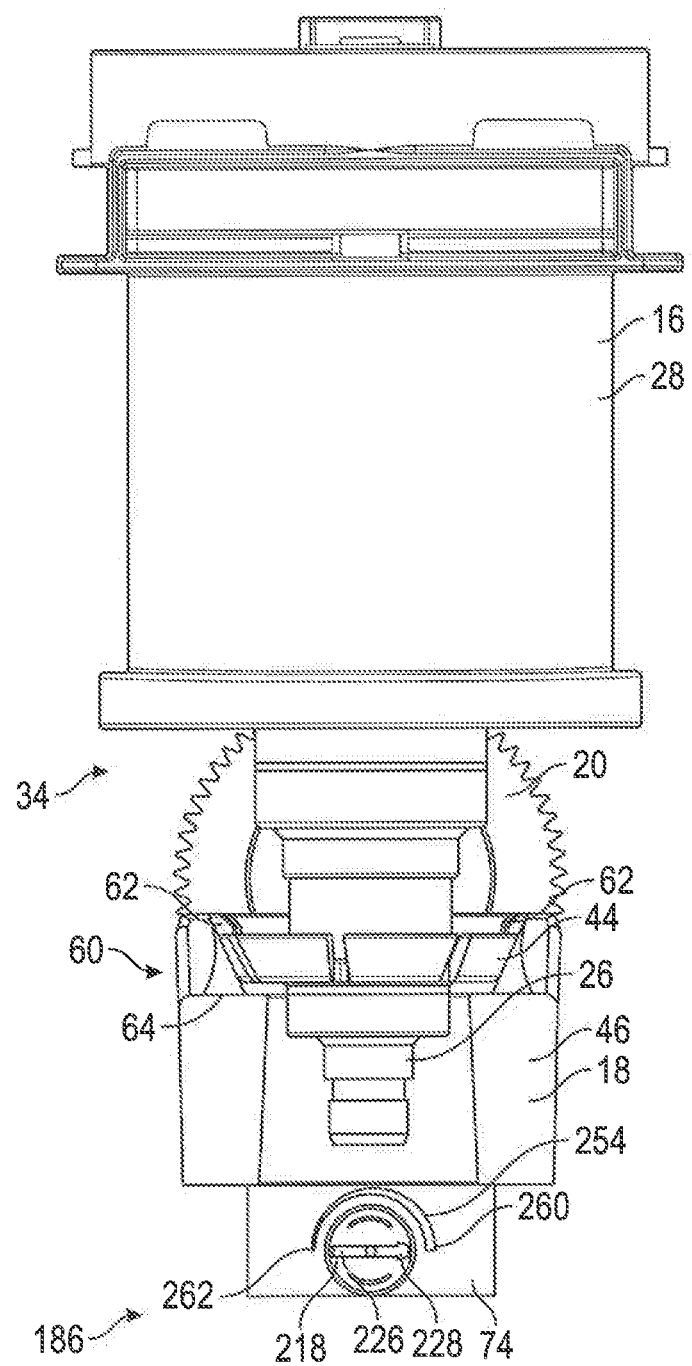
FIG. 43 is a front view of a pump, a pump actuator, and a driver of a fluid dispenser in accordance with a third embodiment of the present invention, with a dose adjustment mechanism of the pump actuator at a high dose setting and the pump at an extended position.
Figure 44:
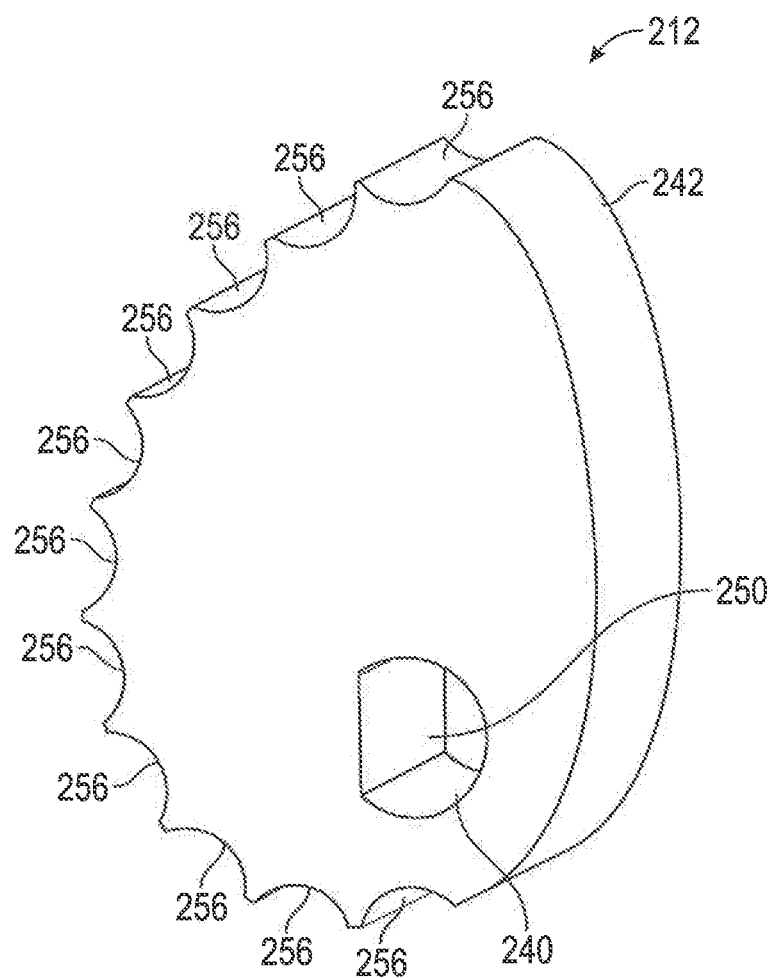
FIG. 44 is a rear perspective view of a rotation body of the dose adjustment mechanism shown in FIG. 43.

As in the embodiment shown in FIGS. 28 to 42, in the embodiment shown in FIGS. 43 to 47 the dose adjustment mechanism 186 includes a dial 218 that is rotated about a rotation axis 220 to effect rotation of a rotation body 212, the rotation body 212 having an outer adjustment surface 242 that engages with an engagement surface 136 of a cam adjustment body 50 for selecting the location of a second cam surface 132 relative to a first cam surface 68. As shown in FIG. 44, the outer adjustment surface 242 of the rotation body 212 has eleven dose selection segments 256, each of which is spaced a different distance from the shaft receiving opening 240. Each dose selection segment 256 has a concave, partially cylindrical shape.

Figure 45:
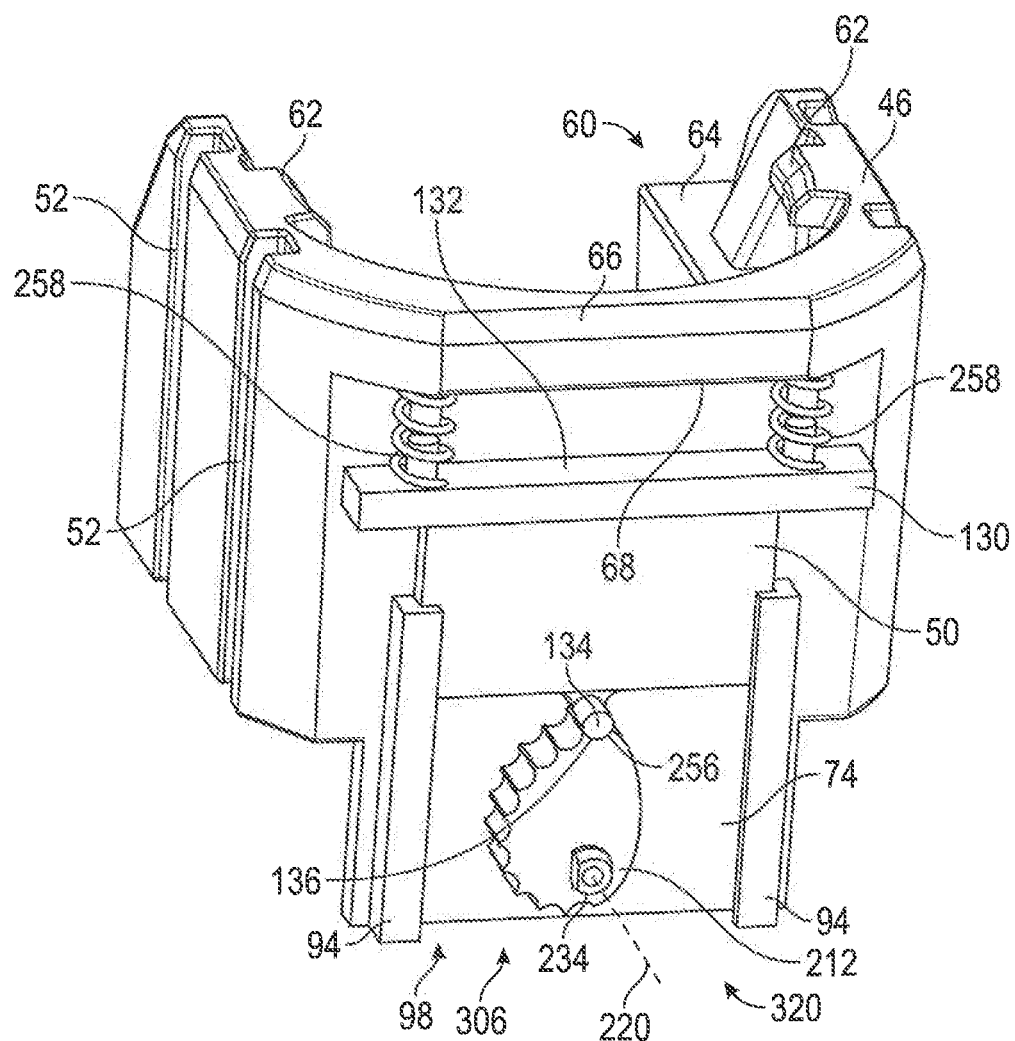
FIG. 45 is a rear perspective view of the pump actuator shown in FIG. 43, with the dose adjustment mechanism of the pump actuator at the high dose setting.

As shown in FIG. 45, a cam adjustment pin 134 extends rearwardly from the bottom of the cam adjustment body 50. The cam adjustment pin 134 has an engagement surface 136 for engaging with the outer adjustment surface 242 of the rotation body 212. Two springs 258 extend between the first cam surface 68 and the second cam surface 132 to bias the cam adjustment body 50 downwardly into engagement with the rotation body 212.

As shown in FIG. 43, the front surface 76 of the lower extension 74 displays a single dose selection marker 254 in place of the high dose marker 138, the medium dose marker 140, and the low dose marker 142. The dose selection marker 254 has a high dose end 260 and a low dose end 262.

The fluid dispenser 10 of FIGS. 43 to 47 is operated in an identical manner to the fluid dispenser 10 as shown in FIGS. 28 to 42, with the only difference being that the dose adjustment mechanism 186 has eleven different dose settings. To place the dose adjustment mechanism 186 at the highest dose setting, the dial 218 is rotated in the clockwise direction until the arrowed end 228 of the adjustment slot 226 is directed towards the high dose end 260 of the dose selection marker 254, as shown in FIG. 43. When the arrowed end 228 of the adjustment slot 226 is directed towards the high dose end 260 of the dose selection marker 254, the dose selection segment 256 that is furthest from the shaft receiving opening 240 faces upwardly and engages with the engagement surface 136 of the cam adjustment pin 134, as shown in FIG. 45. The engagement of the engagement surface 136 with the dose selection segment 256 that is furthest from the shaft receiving opening 240 locates the second cam surface 132 at the first location relative to the first cam surface 68. As in the first and second embodiments of the invention shown in FIGS. 1 to 42, when the second cam surface 132 is at the first location, the second cam surface 132 is spaced the high dose distance 188 from the first cam surface 68, as shown in FIG. 14, causing the fluid pump 16 to dispense the high dose of fluid when the electric motor is activated.

Figure 47:
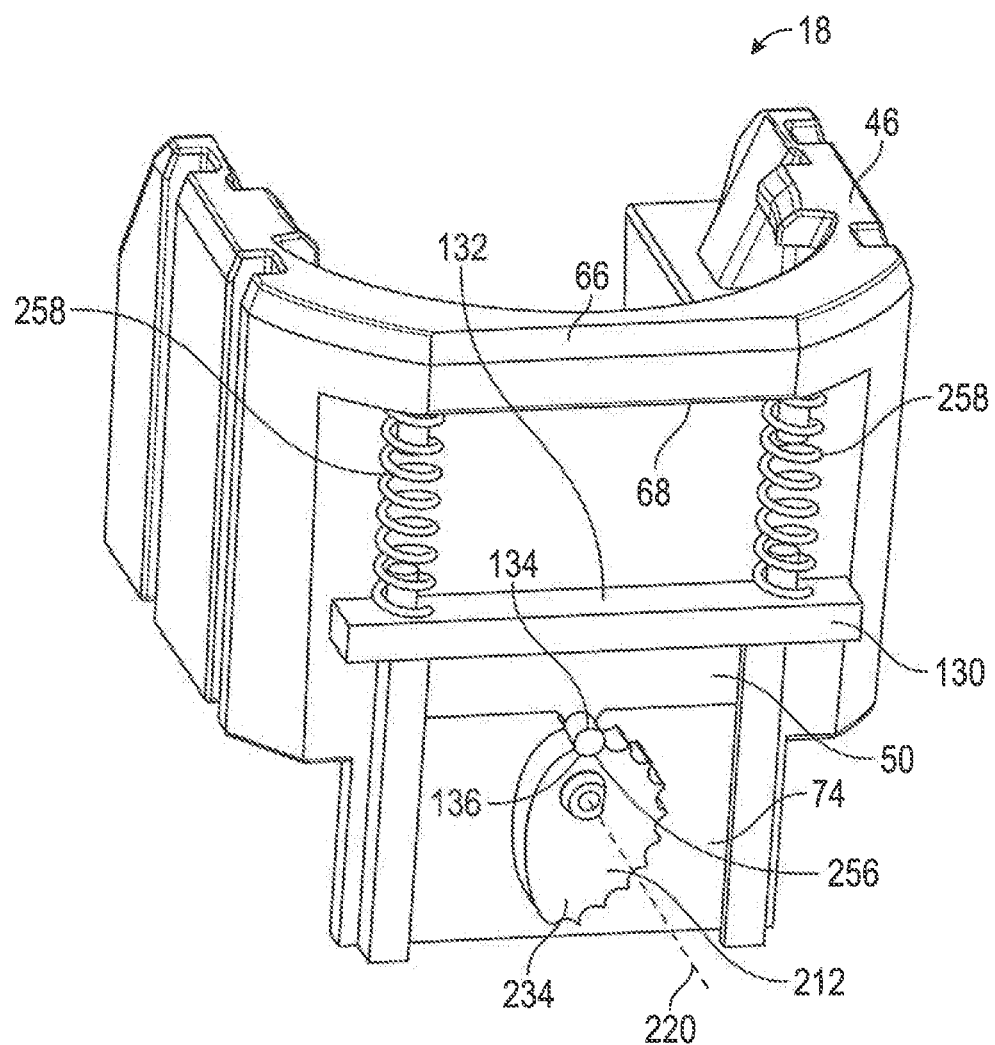
FIG. 47 is a rear perspective view of the pump actuator of FIG. 45, with the dose adjustment mechanism of the pump actuator at a low dose setting.

To place the dose adjustment mechanism 186 at the lowest dose setting, the dial 218 is rotated in the counter clockwise direction until the arrowed end 228 of the adjustment slot 226 is directed towards the low dose end 262 of the dose selection marker 254. When the arrowed end 228 of the adjustment slot 226 is directed towards the low dose end 262 of the dose selection marker 254, the dose selection segment 256 that is closest to the shaft receiving opening 240 faces upwardly and engages with the engagement surface 136 of the cam adjustment pin 134, as shown in FIG. 47. The engagement of the engagement surface 136 with the dose selection segment 256 that is closest to the shaft receiving opening 240 locates the second cam surface 132 at the third location relative to the first cam surface 68. As in the first and second embodiments of the invention shown in FIGS. 1 to 42, when the second cam surface 132 is at the third location, the second cam surface 132 is spaced the low dose distance 202 from the first cam surface 68, as shown in FIG. 26, causing the fluid pump 16 to dispense the low dose of fluid when the electric motor is activated.

Figure 46:
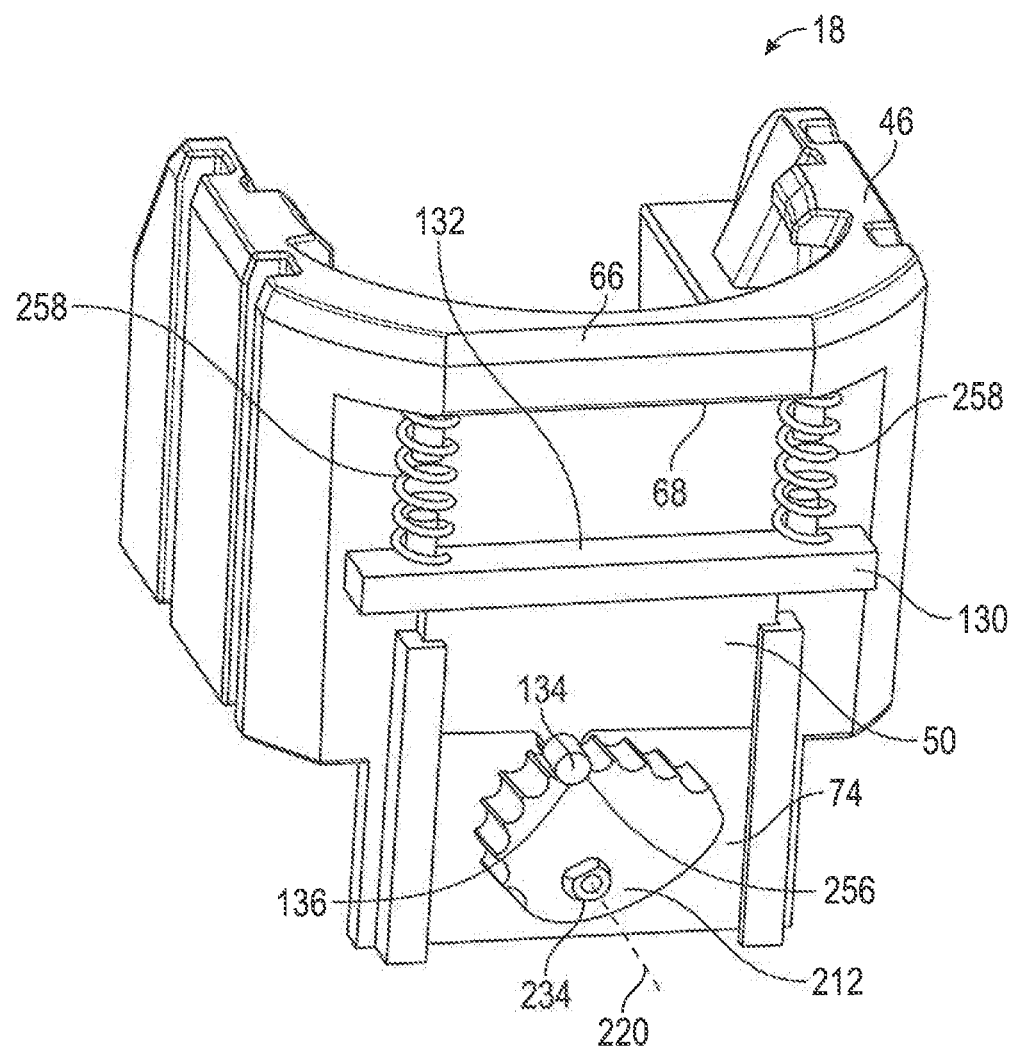
FIG. 46 is a rear perspective view of the pump actuator of FIG. 45, with the dose adjustment mechanism of the pump actuator at a medium dose setting.

To place the dose adjustment mechanism 186 at one of the other nine dose settings, the dial 218 is rotated so that the arrowed end 228 of the adjustment slot 226 is directed towards the dose selection marker 254 somewhere between the high dose end 260 and the low dose end 262. This directs one of the intermediate dose selection segments 256, which is neither the furthest nor the closest to the shaft receiving opening 240, upwardly and into engagement with the engagement surface 136 of the cam adjustment pin 134, as shown in FIG. 46. The engagement of the engagement surface 136 with one of the intermediate dose selection segments 256 locates the second cam surface 132 at a location that is between the first location, as shown in FIG. 45, and the third location, as shown in FIG. 47. This causes the fluid pump 16 to dispense an intermediate dose of fluid, which is less than the high dose of fluid and more than the low dose of fluid, when the electric motor is activated. The closer the arrowed end 228 of the adjustment slot 226 is to the high dose end 260 of the dose selection marker 254, the smaller the distance between the second cam surface 132 and the first cam surface 68, and the larger the dose of fluid that is dispensed. The closer the arrowed end 228 of the adjustment slot 226 is to the low dose end 262 of the dose selection marker 254, the larger the distance between the second cam surface 132 and the first cam surface 68, and the smaller the dose of fluid that is dispensed.

In the embodiment shown in FIGS. 43 to 47, the cam adjustment pin 134, the rotation body 212, and the first holding member 304 function as a locking mechanism 320 that prevents the driver 20 from moving the second cam surface 132 relative to the pump engagement body 46 when the driver 20 is activated. In particular, because the cam adjustment pin 134 is only able to move vertically relative to the pump engagement body 46 and is positioned directly above the rotation axis 220, the rotation body 212 is only able to rotate about the rotation axis 220 relative to the pump engagement body 46, and the dose selection segment 256 that engages with the cam adjustment pin 134 has a concave shape and is arranged directly above the rotation axis 220, as shown for example in FIGS. 45, 46 and 47, the downwards force exerted against the second cam surface 132 by the drive pin 146 as the drive pin 146 moves towards the extension position does not rotate the rotation body 212 about the rotation axis 220 relative to the pump engagement body 46, and thus does not change the dose setting. The dose setting therefore remains locked in place until a user chooses a new dose setting by rotating the dial 218 to a new rotational position.

The embodiment shown in FIGS. 43 to 47 therefore provides a fluid dispenser 10 comprising: a pump mechanism 34 that dispenses a dose of fluid when a movable pump member 22 of the pump mechanism 34 is moved between an extended position and a retracted position; a pump engagement body 46 that engages with the movable pump member 22 for effecting movement of the movable pump member 22 between the extended position and the retracted position; a driver engagement mechanism 298 having a first cam surface 68 and a second cam surface 132 that are connected to the pump engagement body 46, at least one of the first cam surface 68 and the second cam surface 132 comprising an adjustable cam surface 302 whose location relative to the pump engagement body 46 is selectively adjustable; a driver 20 having a camming body 296 that moves between an extension position and a retraction position when the driver 20 is activated, the camming body 296 engaging with the first cam surface 68 and the second cam surface 132 to effect movement of the pump engagement body 46; and a dose adjustment mechanism 186 for selecting the location of the adjustable cam surface 302 relative to the pump engagement body 46.

Reference is now made to FIGS. 48 to 56, which depict a pump 16, a pump carrying body 38, a pump actuator 18, and a driver 20 of a fluid dispenser 10 in accordance with a fourth embodiment of the invention. The fluid dispenser 10 of FIGS. 48 to 56 is identical to the dispenser 10 of FIGS. 28 to 42, with the exception that the dose adjustment mechanism 186 is adapted to use both a sliding body 48 and a rotation body 212 to adjust the dose setting. Like numerals are used to denote like components.

As in the embodiment shown in FIGS. 28 to 42, in the embodiment shown in FIGS. 48 to 56 the dose adjustment mechanism 186 includes a rotation body 212 that is rotated about a rotation axis 220, the rotation body 212 having an outer adjustment surface 242 that engages with an engagement surface 136 of a cam adjustment body 50 for selecting the location of a second cam surface 132 relative to a first cam surface 68. In the embodiment shown in FIGS. 48 to 56, a sliding body 48 is used to effect rotation of the rotation body 212, instead of a dial 218.

Figure 50:
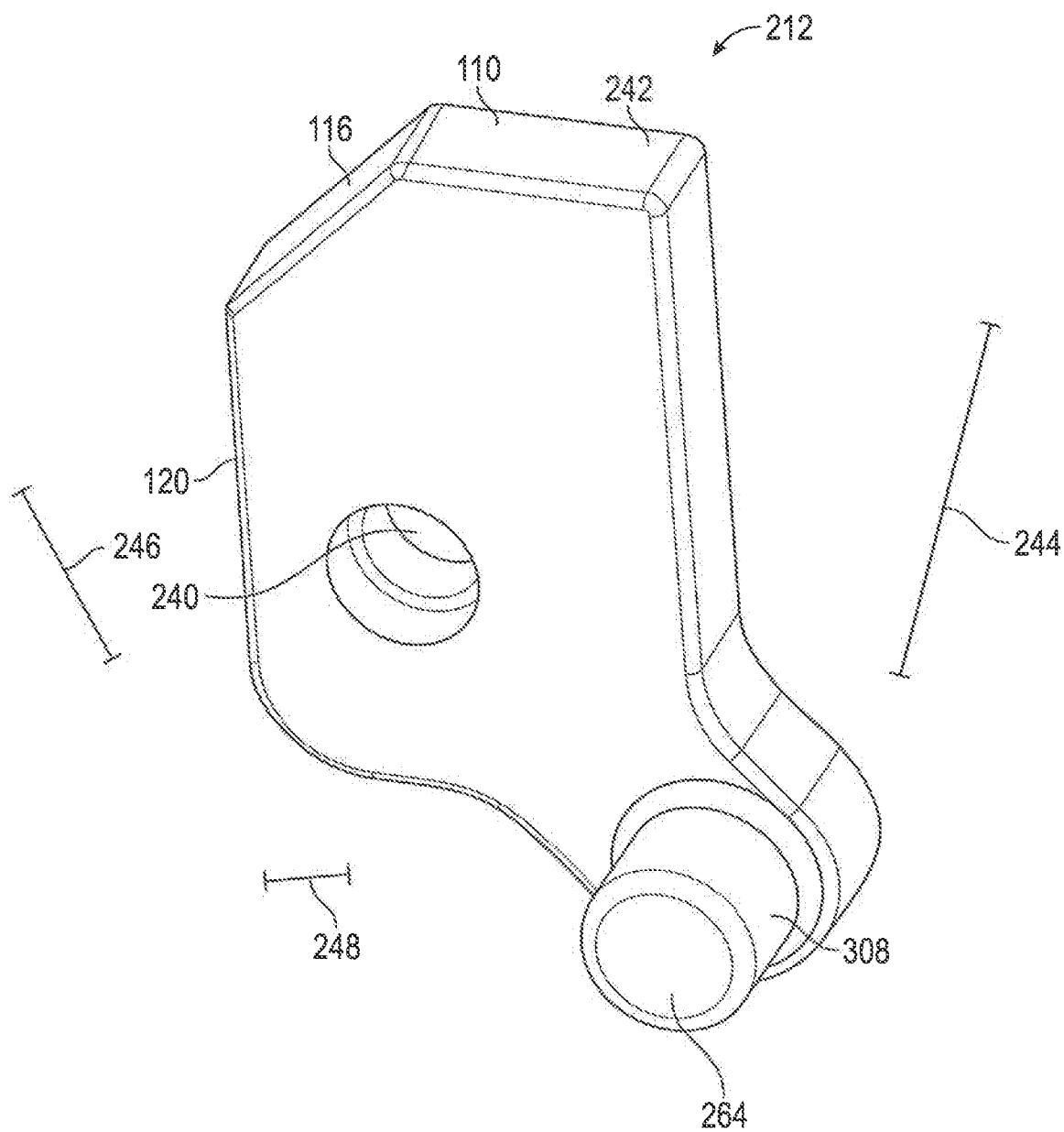
FIG. 50 is a rear perspective view of a rotation body of the dose adjustment mechanism shown in FIG. 48.

The rotation body 212 is shown in FIG. 50 as having a first location selection segment 110 that is spaced a first distance 244 from the shaft receiving opening 240, a second location selection segment 116 that is spaced a second distance 246 from the shaft receiving opening 240, and a third location selection segment 120 that is spaced a third distance 248 from the shaft receiving opening 240. The first distance 244 is greater than the second distance 246, and the second distance 246 is greater than the third distance 248. The rotation body 212 also includes a rearwardly extending rotation pin 264 that is spaced from the shaft receiving opening 240. The rotation pin 264 has a circumferential outer surface that functions as a rotation effecting surface 308.

Figure 49:
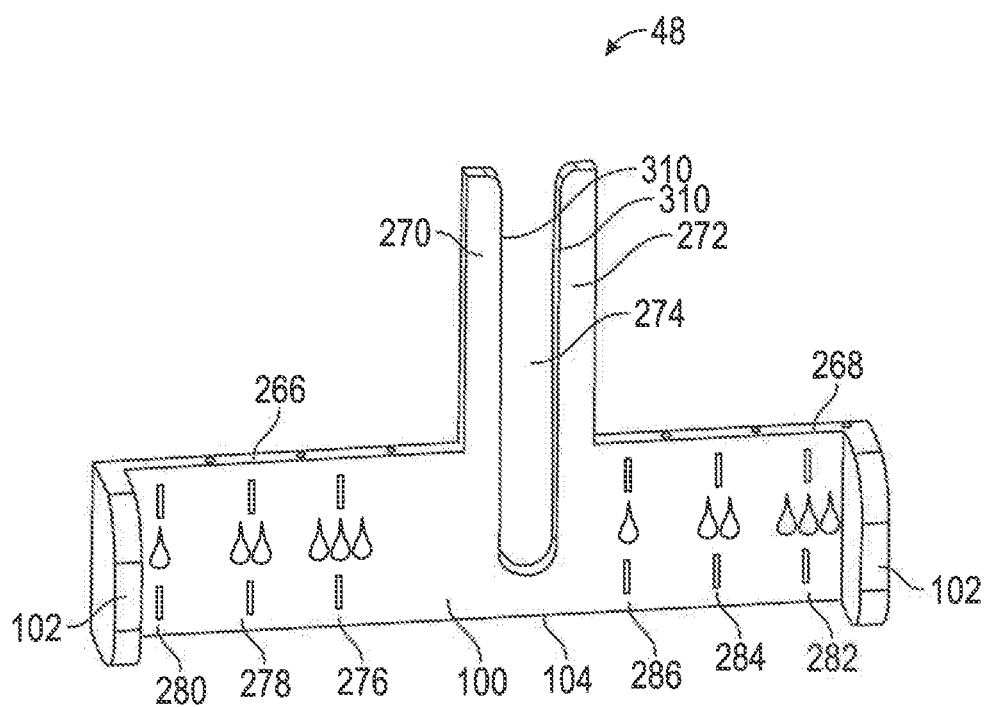
FIG. 49 is a front perspective view of a sliding body of the dose adjustment mechanism shown in FIG. 48.

The sliding body 48 is shown in FIG. 49 as having a laterally extended middle portion 100 with side tabs 102 projecting forwardly from each lateral end of the middle portion 100. The middle portion 100 has a horizontal lower sliding surface 104 that extends from the left side of the middle portion 100 to the right side of the middle portion 100, a first horizontal upper sliding surface 266 that extends from the left side of the middle portion 100 to a first vertical prong 270, the first vertical prong 270 extending upwardly from the first horizontal upper sliding surface 266, and a second horizontal upper sliding surface 268 that extends from the right side of the middle portion 100 to a second vertical prong 272, the second vertical prong 272 extending upwardly from the second horizontal upper sliding surface 268. The first prong 270 and the second prong 272 each have an inner contact surface 310, with a vertical engagement slot 274 being defined between the inner contact surface 310 of the first prong 270 and the inner contact surface 310 of the second prong 272. A first high dose marker 276, a first medium dose marker 278, and a first low dose marker 280 are displayed on the middle portion 100 below the first horizontal upper sliding surface 266, and a second high dose marker 282, a second medium dose marker 284, and a second low dose marker 286 are displayed on the middle portion 100 below the second horizontal upper sliding surface 268.

Figure 48:
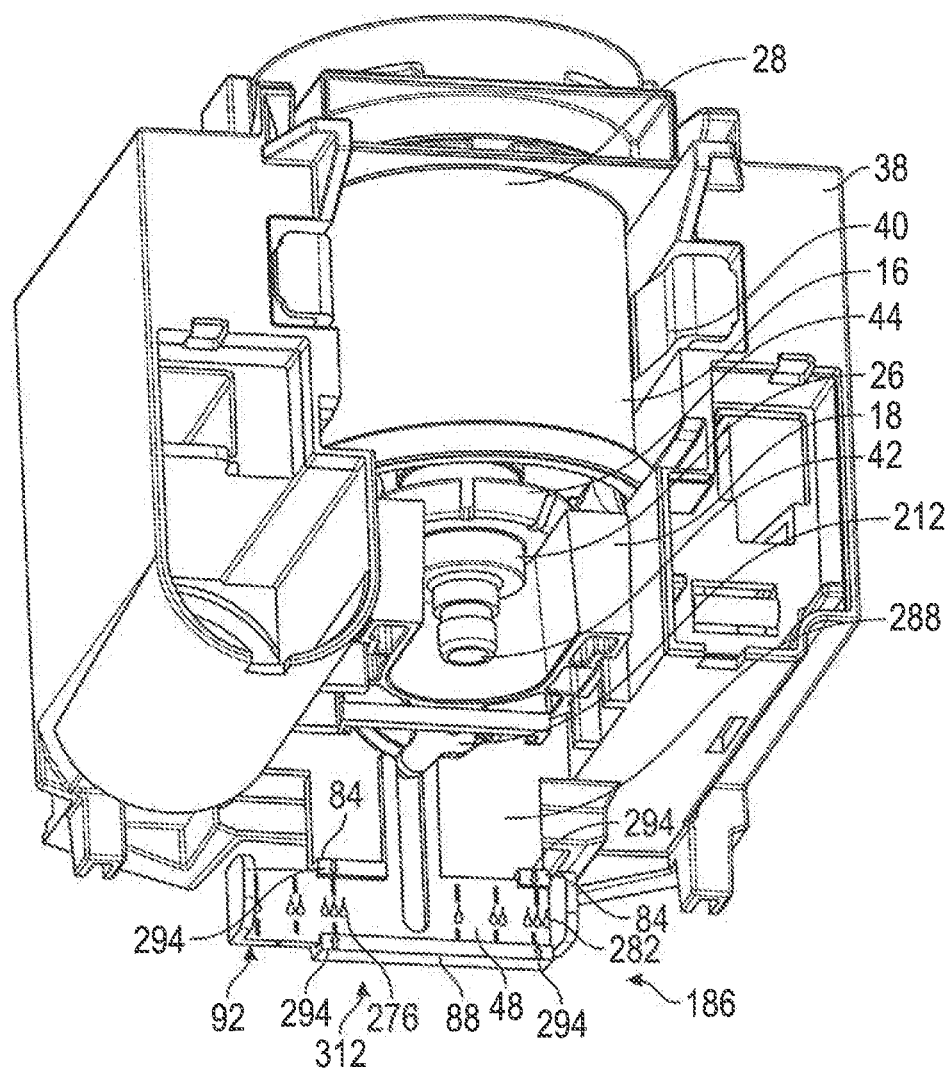
FIG. 48 is a front perspective view of a pump, a pump carrying body, a pump actuator, and a driver of a fluid dispenser in accordance with a fourth embodiment of the present invention, with a dose adjustment mechanism of the pump actuator at a high dose setting.

As shown in FIG. 48, the pump carrying body 38 of the housing 12 has a downwardly extending wall 288 that carries two upper channel forming bodies 84 and a lower channel forming body 88. The upper channel forming bodies 84 and the lower channel forming body 88 define a horizontal first sliding channel 92, similarly to the embodiment shown in FIGS. 1 to 27. Together, the upper channel forming bodies 84 and the lower channel forming body 88 function as a carrying member 312 that carries the sliding body 48 in the first sliding channel 92, allows the sliding body 48 to slide laterally relative to the housing 12 and the rotation axis 220, and prevents the sliding body 48 from moving vertically relative to the housing 12 and the drive axis 148. The upper channel forming bodies 84 each display an indicator arrow 294, and the lower channel forming body 88 has two indicator arrows 294, each of which is aligned with one of the indicator arrows 294 on the upper channel forming bodies 84. The middle portion 100 of the sliding body 48 is received in the first sliding channel 92 for sliding laterally relative to the housing 12.

Figure 51:
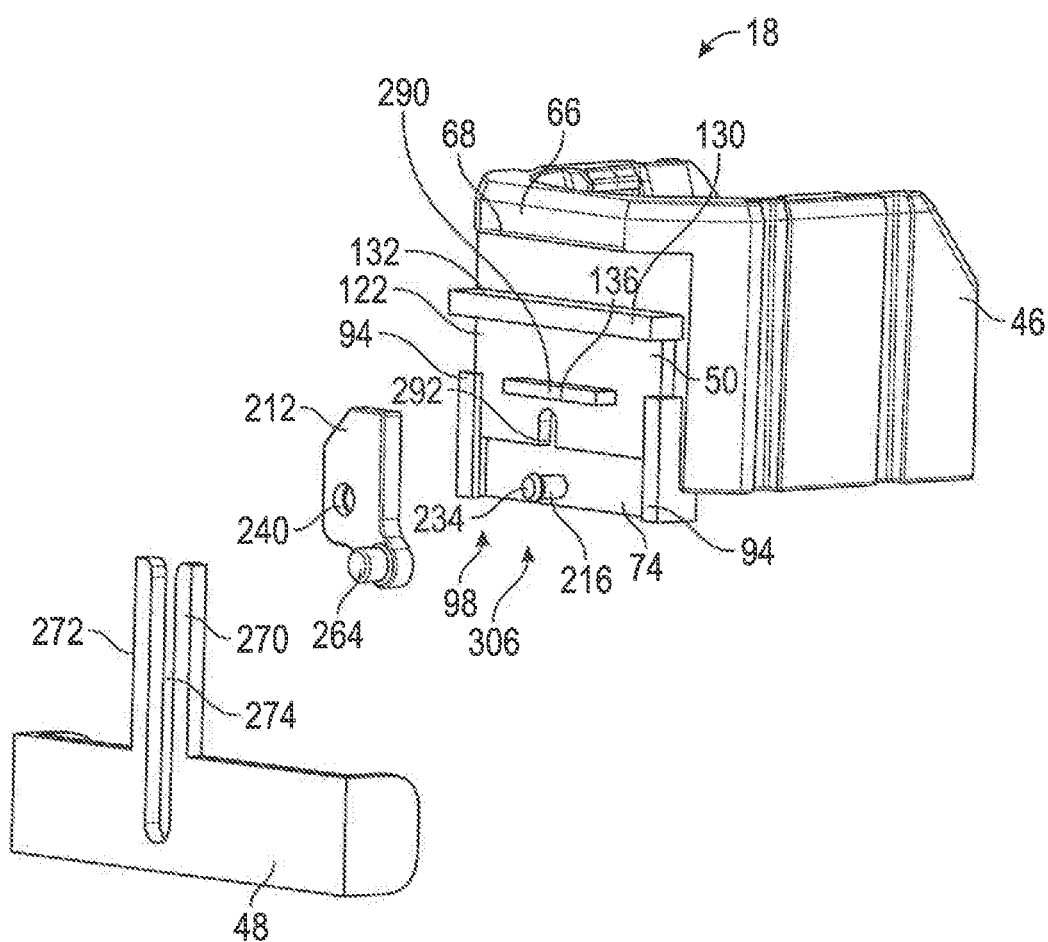
FIG. 51 is a partially exploded view of the pump actuator shown in FIG. 48.

As shown in FIG. 51, the lower extension 74 of the pump engagement body 46 is shorter in the embodiment of FIGS. 48 to 56 compared to the embodiments of FIGS. 1 to 47. A shaft 216 extends rearwardly from the back surface 78 of the lower extension 74 along a rotation axis 220. The shaft 216 extends through the shaft receiving opening 240 of the rotation body 212, allowing the rotation body 212 to rotate about the rotation axis 212 relative to the pump engagement body 46.

As shown in FIG. 51, the cam adjustment body 50 has a center portion 290 that extends rearwardly from the rectangular portion 122. The center portion 290 presents a horizontal, downwardly facing engagement surface 136 for engaging with the outer adjustment surface 242 of the rotation body 212. A downwardly open slotway 292 extends upwardly from the bottom end of the cam adjustment body 50, the slotway 292 being sized to receive the shaft 216 when the cam adjustment body 50 slides downwardly relative to the pump engagement body 46.

Figure 52:
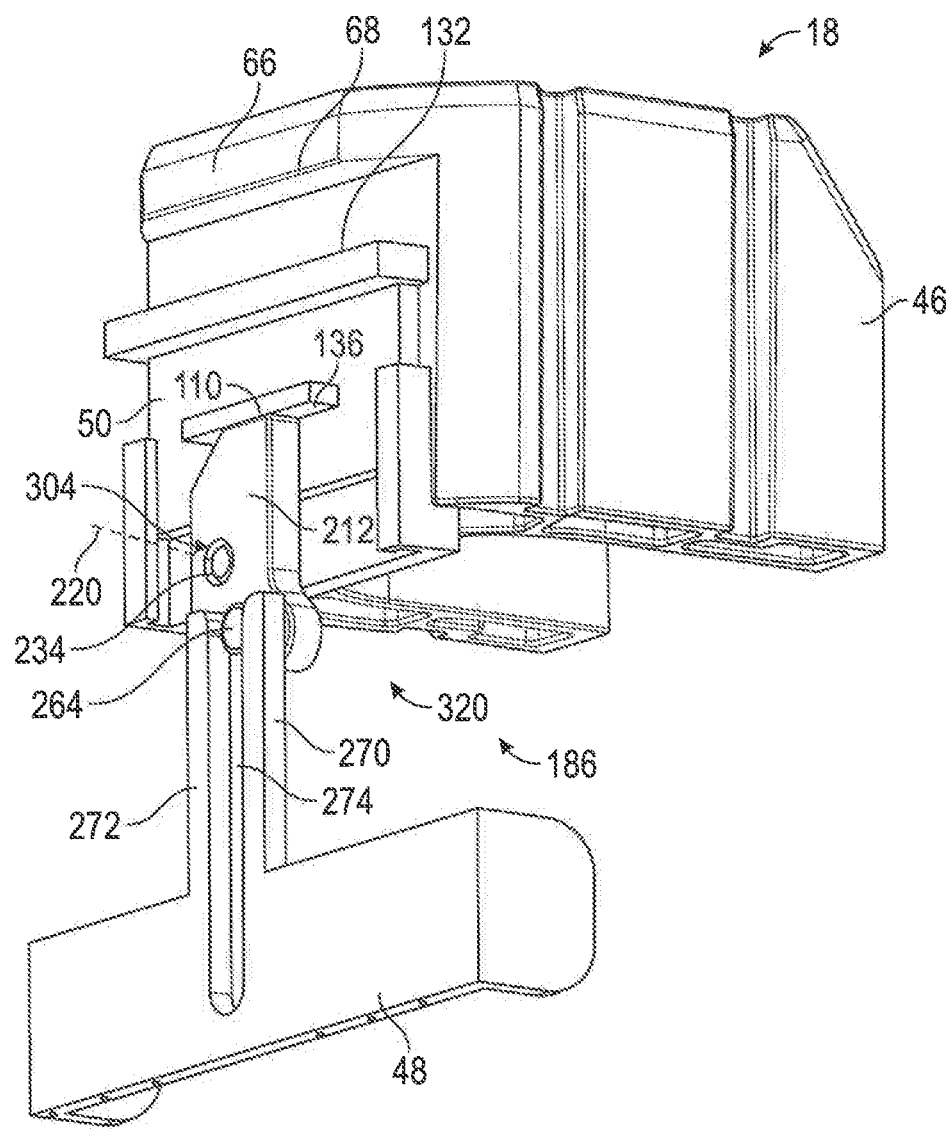
FIG. 52 is a rear perspective view of the pump actuator shown in FIG. 48, with the dose adjustment mechanism of the pump actuator at the high dose setting.

As shown in FIG. 52, the rotation pin 264 is received in the engagement slot 274 between the first prong 270 and the second prong 272 of the sliding body 48. By sliding the sliding body 48 laterally relative to the rotation axis 220, the rotation body 212 can be rotated about the rotation axis 220 through the engagement of the rotation pin 264 with the first prong 270 or the second prong 272.

The fluid dispenser 10 of FIGS. 48 to 56 is operated in an identical manner to the fluid dispenser of FIGS. 28 to 42, with the only difference being that the sliding body 48 is used to effect rotation of the rotation body 212 and select the dose setting. To place the dose adjustment mechanism 186 at the high dose setting, the sliding body 48 is slid all the way to the left within the first sliding channel 92, so that the indicator arrows 294 are aligned with the first and second high dose markers 276, 282, as shown in FIG. 48. This rotates the rotation body 212, via the engagement of the rotation pin 264 with the second prong 272, so that the first location selection segment 110 faces upwardly and engages with the engagement surface 136 of the cam adjustment body 50, as shown in FIG. 52. The engagement of the engagement surface 136 with the first location selection segment 110 locates the second cam surface 132 at the first location relative to the first cam surface 68. As in the first and second embodiments shown in FIGS. 1 to 42, when the second cam surface 132 is at the first location, the second cam surface 132 is spaced the high dose distance 188 from the first cam surface 68, as shown in FIG. 14, causing the fluid pump 16 to dispense the high dose of fluid when the electric motor is activated.

Figure 53:
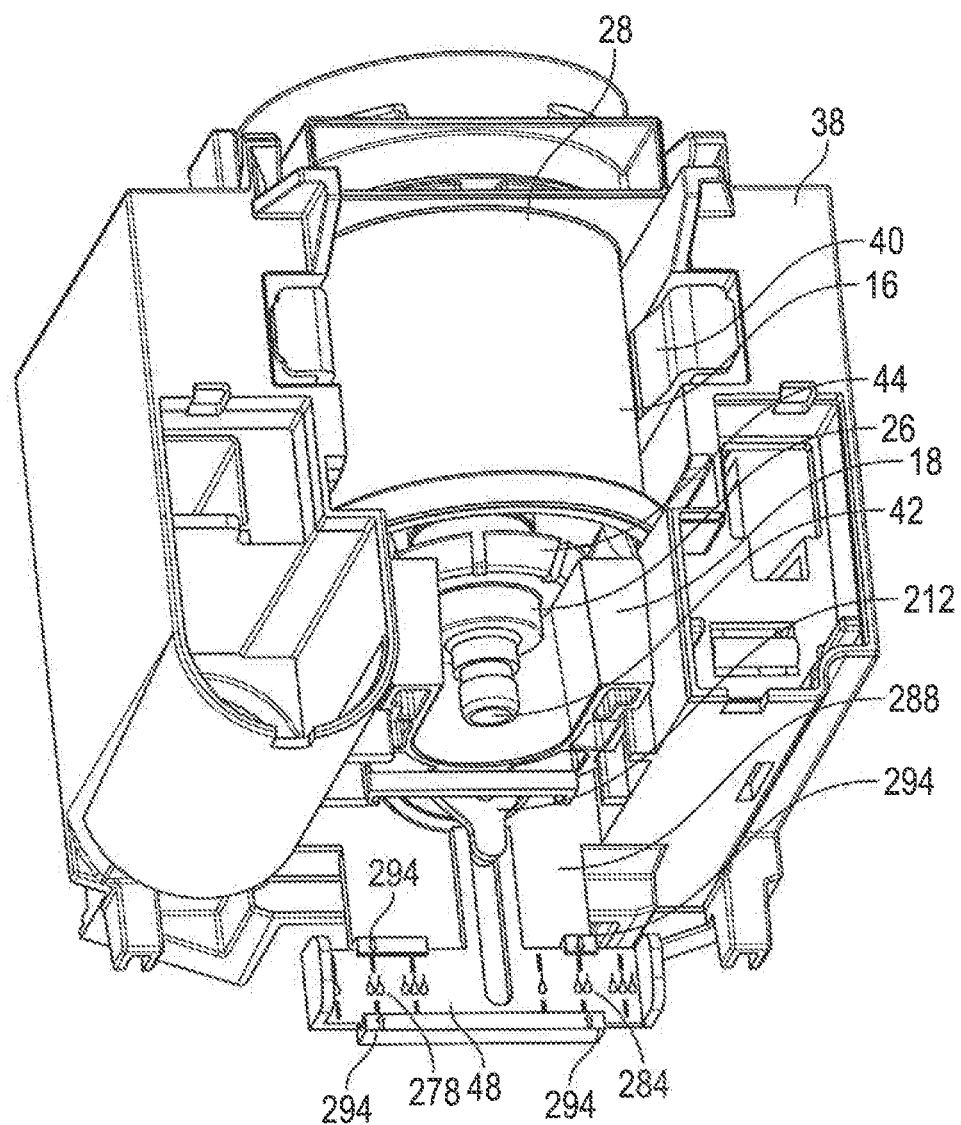
FIG. 53 is a front perspective view of the pump, the pump carrying body, the pump actuator, and the driver of FIG. 48, with the dose adjustment mechanism of the pump actuator at a medium dose setting.
Figure 54:
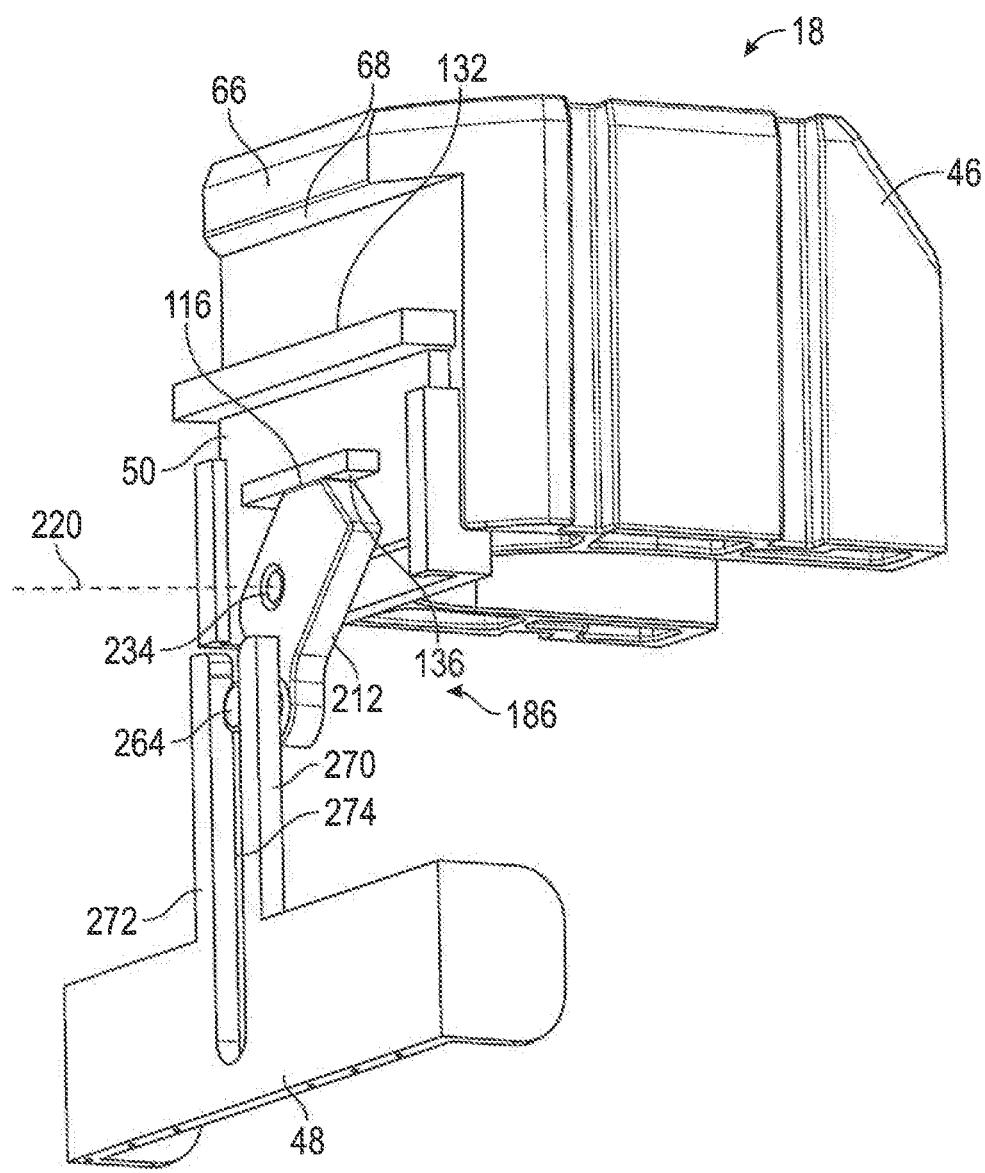
FIG. 54 is a rear perspective view of the pump actuator shown in FIG. 53, with the dose adjustment mechanism of the pump actuator at the medium dose setting.

To place the dose adjustment mechanism 186 at the medium dose setting, the sliding body 48 is slid to the right from the high dose setting of FIG. 48, so that the indicator arrows 294 are aligned with the first and second medium dose markers 278, 284, as shown in FIG. 53. This rotates the rotation body 212, via the engagement of the rotation pin 264 with the first prong 270, so that the second location selection segment 116 faces upwardly and engages with the engagement surface 136 of the cam adjustment body 50, as shown in FIG. 54. The engagement of the engagement surface 136 with the second location selection segment 116 locates the second cam surface 132 at the second location relative to the first cam surface 68. As in the first and second embodiments shown in FIGS. 1 to 42, when the second cam surface 132 is at the second location, the second cam surface 132 is spaced the medium dose distance 198 from the first cam surface 68, as shown in FIG. 20, causing the fluid pump 16 to dispense the medium dose of fluid when the electric motor is activated.

Figure 55:
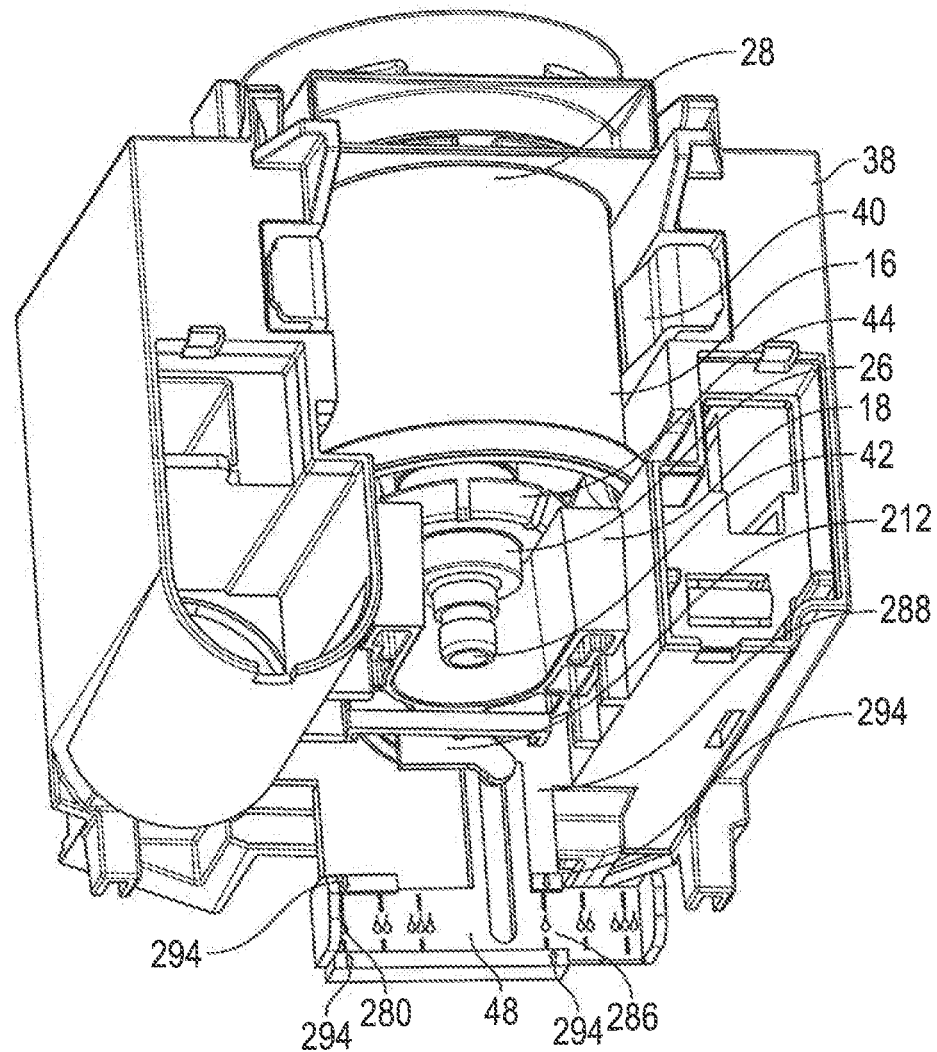
FIG. 55 is a front perspective view of the pump, the pump carrying body, the pump actuator, and the driver of FIG. 48, with the dose adjustment mechanism of the pump actuator at a low dose setting.
Figure 56:
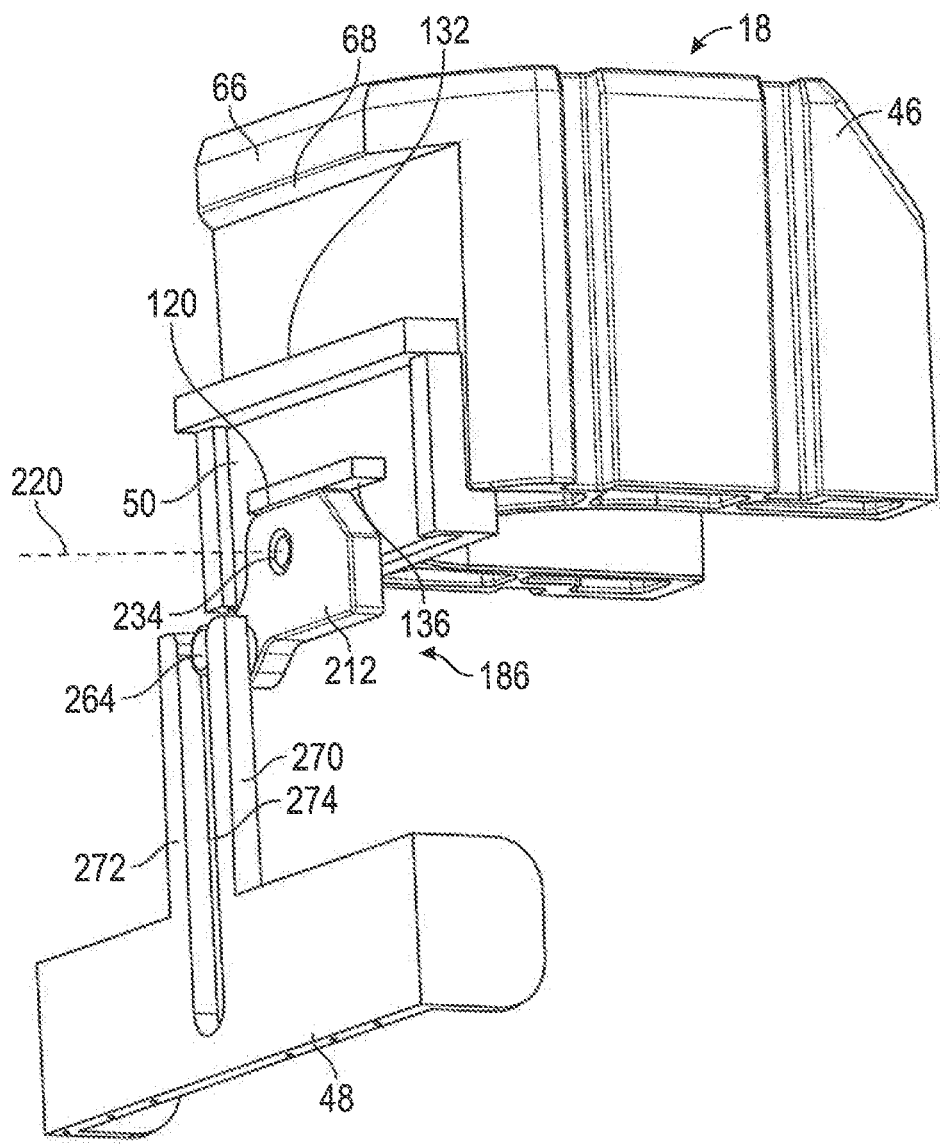
FIG. 56 is a rear perspective view of the pump actuator shown in FIG. 55, with the dose adjustment mechanism of the pump actuator at the low dose setting.
Figure 57:
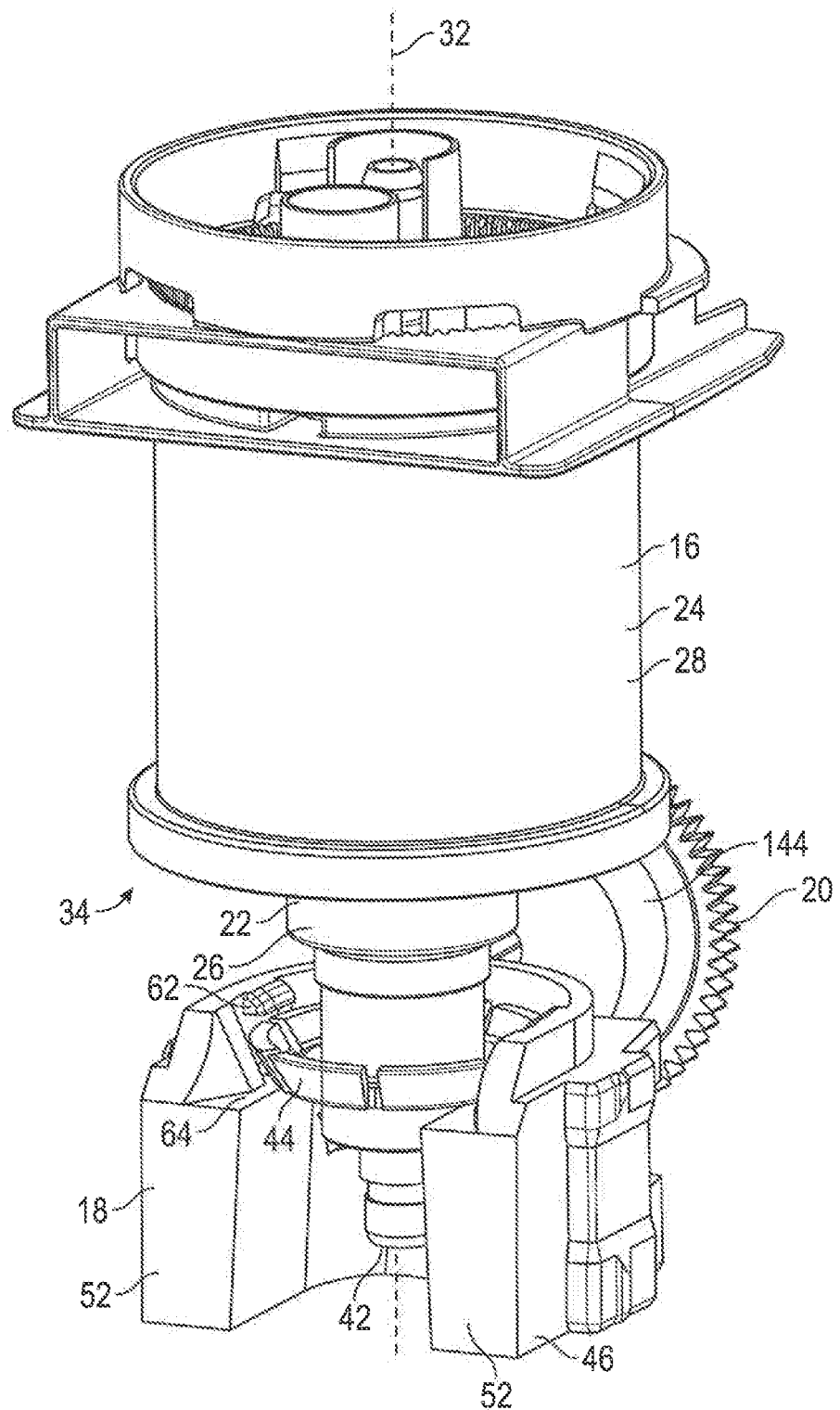
FIG. 57 is a front perspective view of a pump, a pump actuator, and a driver of a fluid dispenser in accordance with a fifth embodiment of the present invention.

To place the dose adjustment mechanism 186 at the low dose setting, the sliding body 48 is slid all the way to the right so that the indicator arrows 294 are aligned with the first and second low dose markers 280, 286, as shown in FIG. 55. This rotates the rotation body 212, via the engagement of the rotation pin 264 with the first prong 270, so that the third location selection segment 120 faces upwardly and engages with the engagement surface 136 of the cam adjustment body 50, as shown in FIG. 56. The engagement of the engagement surface 136 with the third location selection segment 120 locates the second cam surface 132 at the third location relative to the first cam surface 68. As in the first and second embodiments shown in FIGS. 1 to 42, when the second cam surface 132 is at the third location, the second cam surface 132 is spaced the low dose distance 202 from the first cam surface 68, as shown in FIG. 26, causing the fluid pump 16 to dispense the low dose of fluid when the electric motor is activated.

In the embodiment of FIGS. 48 to 56, the first sliding channel 92 that receives the sliding body 48 is formed by the housing 12 rather than the pump engagement body 46. As such, the sliding body 48 does not move in the retraction direction or the extension direction together with the pump actuator 18 when the electric motor is activated. To accommodate for vertical movement of the pump actuator 18 relative to the sliding body 48, the engagement slot 274 is vertically elongated to allow the rotation pin 264 to slide vertically within the engagement slot 274 when the pump actuator 18 moves in the retraction and extension directions.

In the embodiment of FIGS. 48 to 56, the cam adjustment body 50, the rotation body 212, and the first holding member 304 function as a locking mechanism 320 that prevents the driver 20 from moving the second cam surface 132 relative to the pump engagement body 46 when the driver 20 is activated. In particular, because the cam adjustment body 50 is only able to move vertically relative to the pump engagement body 46, the rotation body 212 is only able to rotate about the rotation axis 220 relative to the pump engagement body 46, and the first, second, and third location selection segments 110, 116, 120 of the outer adjustment surface 242 are arranged horizontally above the rotation axis 220 when the dose adjustment mechanism 186 is at the high dose setting of FIG. 52, the medium dose setting of FIG. 54, and the low dose setting of FIG. 56, respectively, the downwards force exerted against the second cam surface 132 by the drive pin 146 as the drive pin 146 moves towards the extension position does not rotate the rotation body 212 about the rotation axis 220 relative to the pump engagement body 46, and thus does not change the dose setting. The dose setting therefore remains locked in place until a user chooses a new dose setting by sliding the sliding body 48 to a new lateral position.

The embodiment shown in FIGS. 48 to 56 therefore provides a fluid dispenser 10 comprising: a pump mechanism 34 that dispenses a dose of fluid when a movable pump member 22 of the pump mechanism 34 is moved between an extended position and a retracted position; a pump engagement body 46 that engages with the movable pump member 22 for effecting movement of the movable pump member 22 between the extended position and the retracted position; a driver engagement mechanism 298 having a first cam surface 68 and a second cam surface 132 that are connected to the pump engagement body 46, at least one of the first cam surface 68 and the second cam surface 132 comprising an adjustable cam surface 302 whose location relative to the pump engagement body 46 is selectively adjustable; a driver 20 having a camming body 296 that moves between an extension position and a retraction position when the driver 20 is activated, the camming body 296 engaging with the first cam surface 68 and the second cam surface 132 to effect movement of the pump engagement body 46; and a dose adjustment mechanism 186 for selecting the location of the adjustable cam surface 302 relative to the pump engagement body 46.

Reference is now made to FIGS. 57 to 84, which depict a pump 16, a pump actuator 18, and a driver 20 of a fluid dispenser 10 in accordance with a fifth embodiment of the invention. The fluid dispenser 10 of FIGS. 57 to 84 is identical to the dispenser 10 shown in FIGS. 1 to 27, with the exception that the pump actuator 18 has a simplified and more compact dose adjustment mechanism 186, and the driver 20 has a narrower drive pin 146 for engaging with the dose adjustment mechanism 186. Like numerals are used to denote like components.

Figure 59:
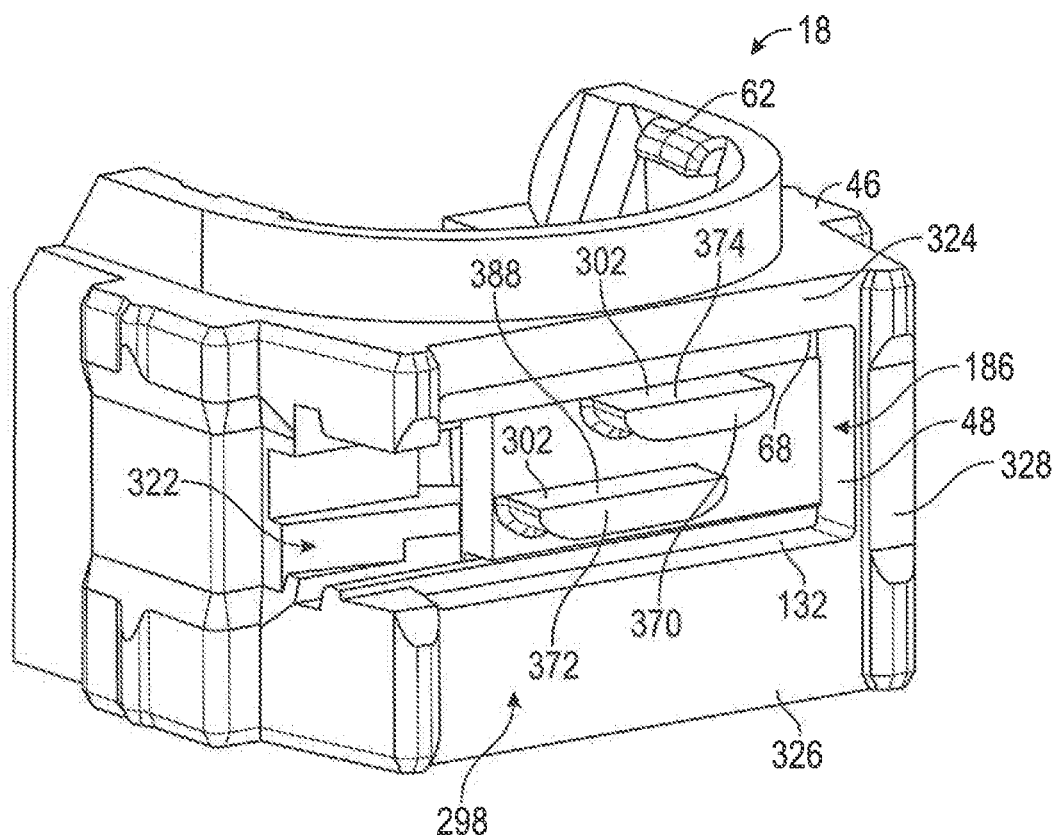
FIG. 59 is a rear perspective view of the pump actuator of FIG. 58, with the dose adjustment mechanism at the low dose setting.
Figure 60:
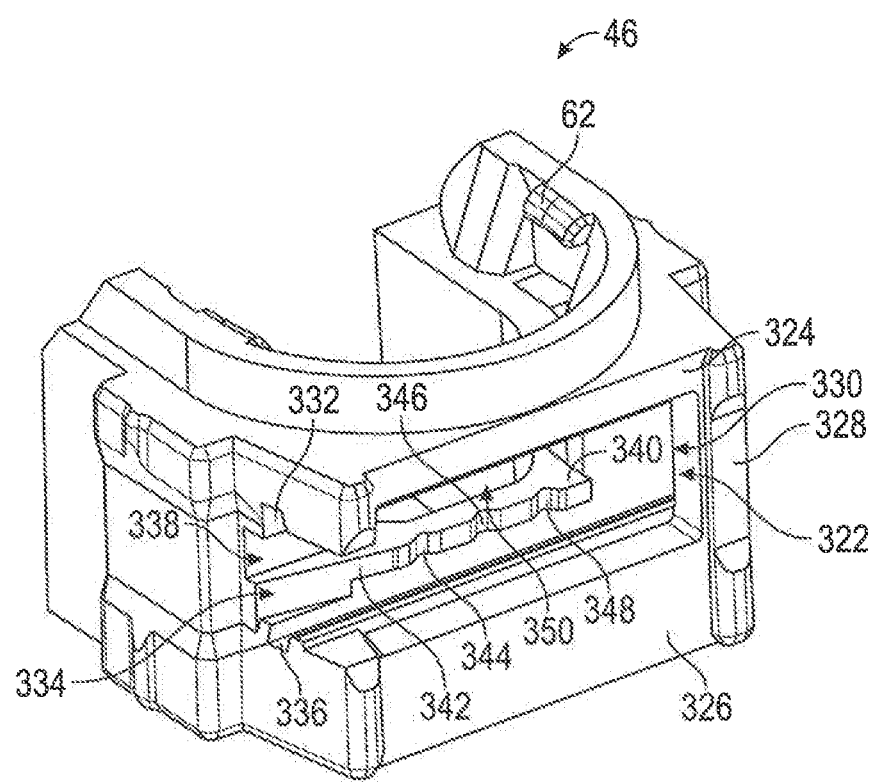
FIG. 60 is a rear perspective view of a pump engagement body of the pump actuator of FIG. 59, shown with a sliding body of the pump actuator omitted.

As can be seen in FIG. 59, the pump actuator 18 has a pump engagement body 46 and a sliding body 48 that is slidably received in a rear holding member 322 of the pump engagement body 46. The rear holding member 322 has an upper wall 324, a lower wall 326, and a closed left end wall 328, which together define a rearwardly open slotway cavity 330, as shown in FIG. 60. The upper wall 324 has a downwardly open groove 332 that extends laterally from an open right end 334 of the slotway cavity 330 to the closed left end wall 328, and the lower wall 326 has an upwardly open groove 336 that likewise extends laterally from the open right end 224 of the slotway cavity 330 to the closed left end wall 328. Together, the downwardly open groove 332 and the upwardly open groove 336 form a dose adjustment slot 338 that slidably receives the sliding body 48. The upper wall 324 has a downwardly facing first cam surface 68 that extends forwardly from the dose adjustment slot 338, and the lower wall 326 has an upwardly facing second cam surface 132 that extends forwardly from the dose adjustment slot 338.

Figure 58:
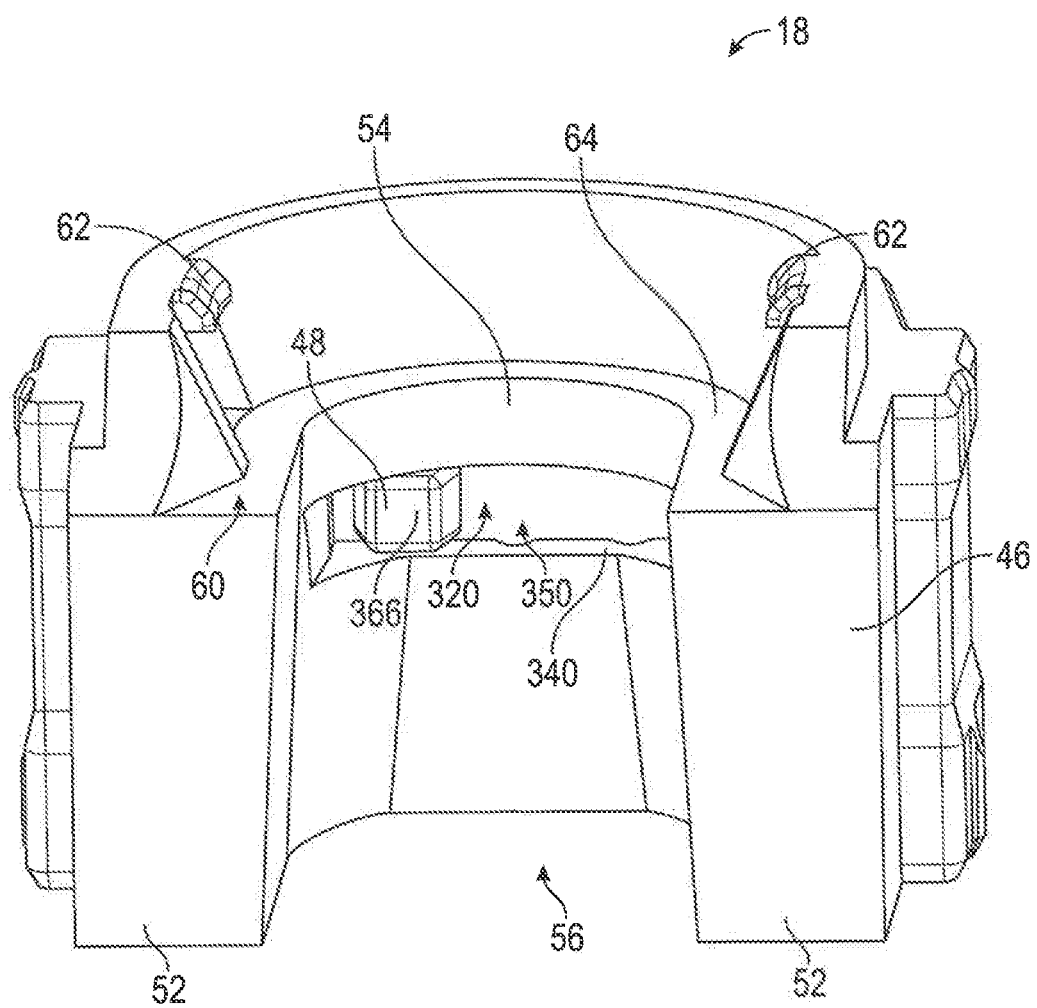
FIG. 58 is a front perspective view of the pump actuator shown in FIG. 57, with a dose adjustment mechanism of the pump actuator at a low dose setting.

As shown in FIG. 60, the pump engagement body 46 has a dose selection flange 340 that extends rearwardly into the slotway cavity 330. The dose selection flange 340 has a rearwardly facing surface 342 with three laterally spaced indentations 344, 346, 348. As best shown in FIG. 58, the pump engagement body 46 also has a dose selection slot 350 located above the dose selection flange 340 that extends through the rear wall 54 of the pump engagement body 46 and opens forwardly into the central cavity 56 of the pump engagement body 46.

Figure 61:
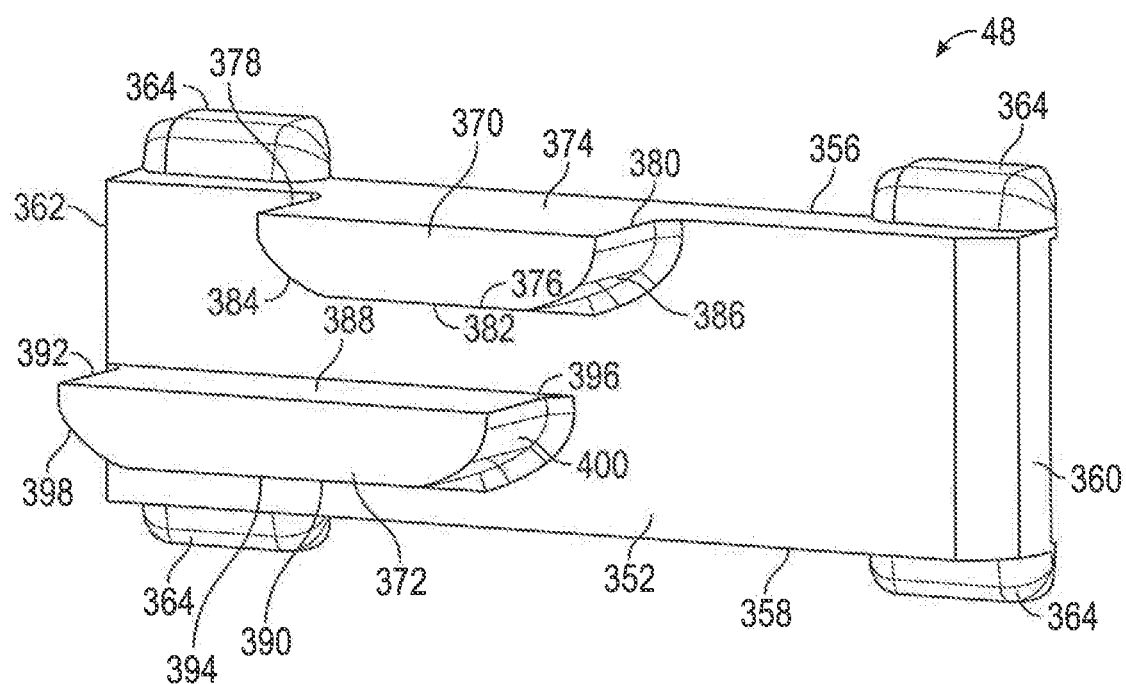
FIG. 61 is a rear perspective view of the sliding body of the pump actuator of FIG. 59.
Figure 62:
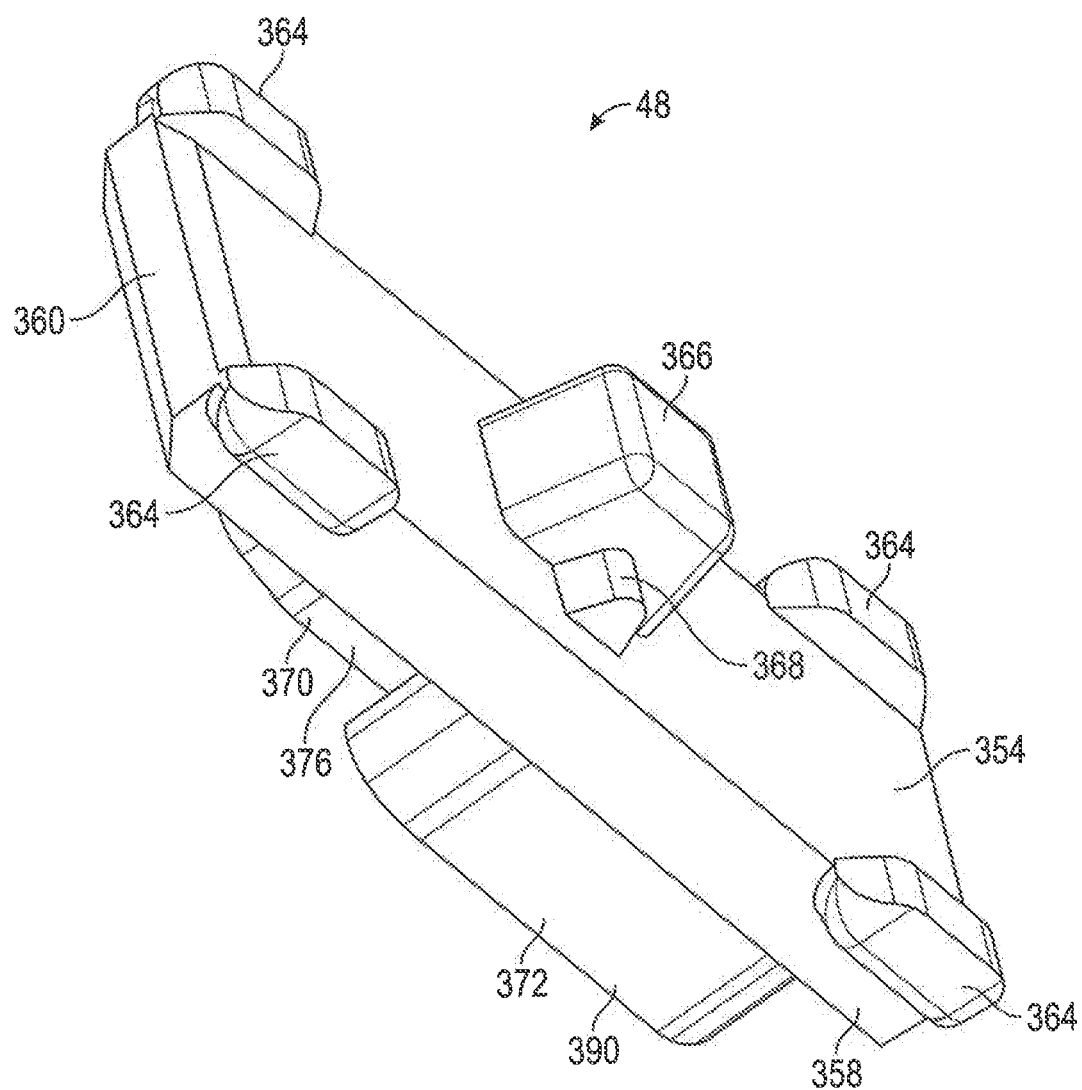
FIG. 62 is a bottom and front perspective view of the sliding body of FIG. 61.

The sliding body 48 is shown in FIGS. 61 and 62 as having a generally rectangular shape with an outwardly facing surface 352, an inwardly facing surface 354, an upwardly facing surface 356, a downwardly facing surface 358, a left facing surface 360, and a right facing surface 362. Two sliding fingers 364 extend upwardly and forwardly from the upwardly facing surface 356 at the top left and right corners of the sliding body 48, and two sliding fingers 364 extend downwardly and forwardly from the downwardly facing surface 358 at the bottom left and right corners of the sliding body 48. The sliding fingers 364 are configured to be received in sliding engagement with the dose adjustment slot 338 of the pump engagement body 46, with the two top sliding fingers 364 being received in the downwardly open groove 332 and the two bottom sliding fingers 364 being received in the upwardly open groove 336.

A dose selection body 366 extends forwardly from the inwardly facing surface 354. As shown in FIG. 58, when the sliding fingers 364 are received in the dose adjustment slot 338, the dose selection body 366 extends through the dose selection slot 350 towards the central cavity 56. A dose locking body 368, which is smaller than the dose selection body 366, extends forwardly from the inwardly facing surface 354 immediately below the dose selection body 366, as shown in FIG. 62. The dose locking body 368 is configured to lockingly engage with the indentations 344, 346, 348 in the rearwardly facing surface 342 of the dose selection flange 340 when the dose locking body 368 is aligned with one of the indentations 344, 346, 348.

As shown in FIG. 61, the sliding body 366 has a first adjustable cam member 370 that extends rearwardly from the outwardly facing surface 352 and a second adjustable cam member 372 that likewise extends rearwardly from the outwardly facing surface 352. The first adjustable cam member 370 has an upwardly facing first adjustable cam surface 374 and a first rounded lower surface 376. The first adjustable cam surface 374 is substantially planar and lies in the same horizontal plane as the upwardly facing surface 356. The first rounded lower surface 376 extends downwardly from a right edge 378 of the first adjustable cam surface 374 to a lower planar portion 382 of the first rounded lower surface 376, and then upwardly from the lower planar portion 382 of the first rounded lower surface 376 to a left edge 380 of the first adjustable cam surface 374. A right corner portion 384 of the first rounded lower surface 376 connects the lower planar portion 382 to the right edge 378 of the first adjustable cam surface 374, and a left corner portion 386 of the first rounded lower surface 376 connects the lower planar portion 382 to the left edge 380 of the first adjustable cam surface 374.

The second adjustable cam member 372 is spaced downwardly and to the right from the first adjustable cam member 370, and has a longer lateral length than the first adjustable cam member 370. The second adjustable cam member 372 has an upwardly facing second adjustable cam surface 388 and a second rounded lower surface 390. The second adjustable cam surface 388 is substantially planar and lies in a horizontal plane that is parallel to the first adjustable cam surface 374. The second rounded lower surface 390 extends downwardly from a right edge 392 of the second adjustable cam surface 388 to a lower planar portion 394 of the second rounded lower surface 390, and then upwardly from the lower planar portion 394 of the second rounded lower surface 390 to a left edge 396 of the second adjustable cam surface 388. A right corner portion 398 of the second rounded lower surface 390 connects the lower planar portion 394 to the right edge 392 of the second adjustable cam surface 388, and a left corner portion 400 of the second rounded lower surface 390 connects the lower planar portion 394 to the left edge 396 of the second adjustable cam surface 388. As can be seen in FIG. 61, the left edge 396 of the second adjustable cam surface 388 is positioned below the lower planar portion 382 of the first adjustable cam member 370.

Figure 71:
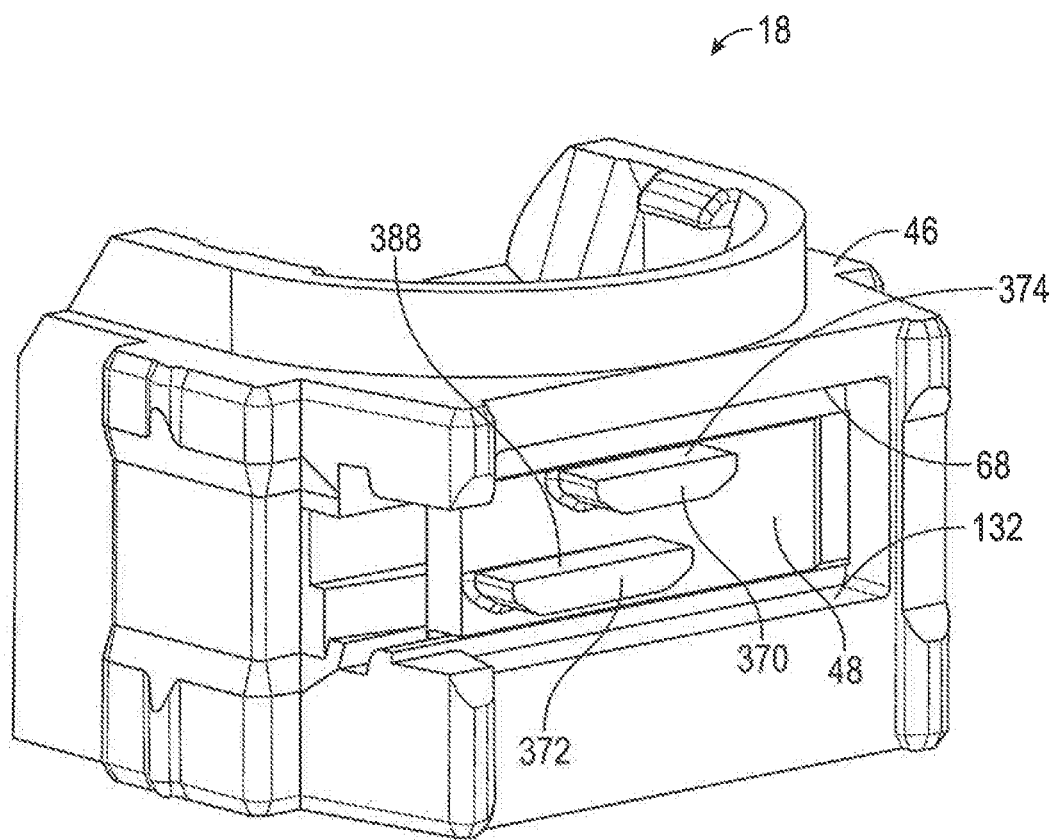
FIG. 71 is a rear perspective view of the pump actuator of FIG. 58, with the dose adjustment mechanism at the medium dose setting.
Figure 79:
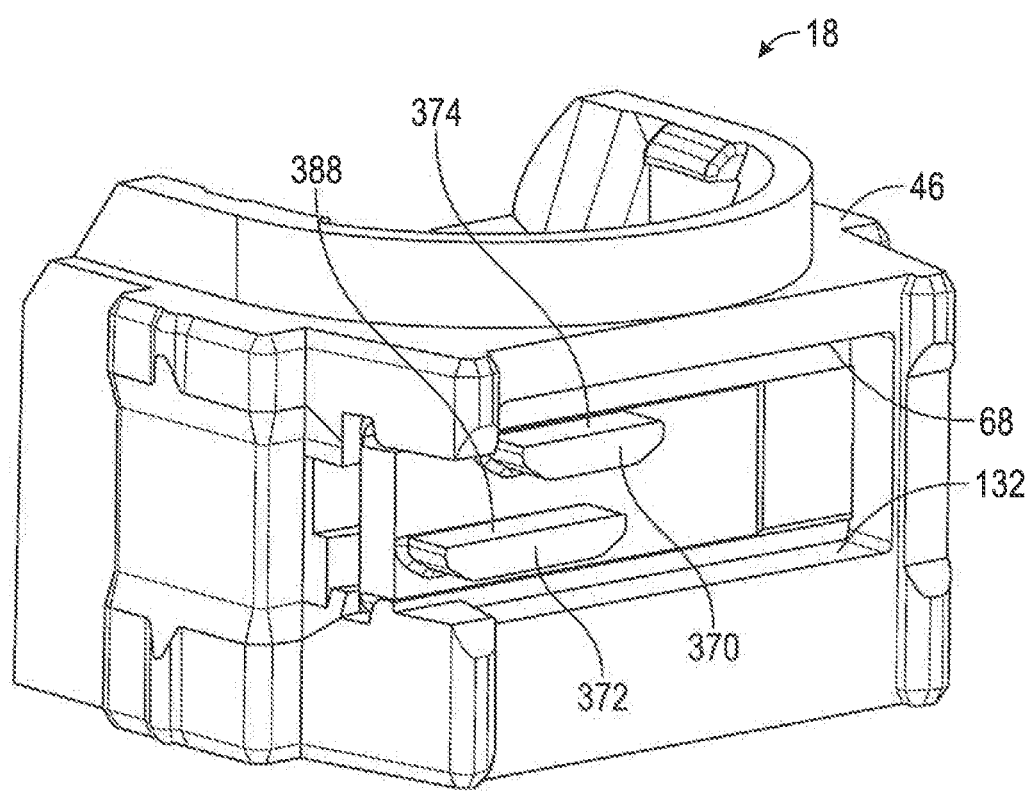
FIG. 79 is a rear perspective view of the pump actuator of FIG. 58, with the dose adjustment mechanism at the high dose setting.

When received in the dose adjustment slot 338, the sliding body 48 is laterally slidable relative to the pump engagement body 46 between the low dose position shown in FIG. 59, the medium dose position shown in FIG. 71, and the high dose position shown in FIG. 79. When the sliding body 48 is at the high dose position shown in FIG. 79, the dose locking body 368 engages with the first indentation 344 in the dose selection flange 340. When the sliding body 48 is at the medium dose position shown in FIG. 71, the dose locking body 368 engages with the second indentation 346 in the dose selection flange 340. When the sliding body 48 is at the low dose position shown in FIG. 59, the dose locking body 368 engages with the third indentation 348 in the dose selection flange 340. The engagement of the dose locking body 368 with the indentations 344, 346, 348 provides resistance against lateral movement of the sliding body 48 relative to the pump engagement body 46. This resistance preferably helps to prevent the sliding body 48 from being unintentionally moved away from the selected position. The sliding body 48 can be moved between the high dose, medium dose, and low dose positions by applying a sufficient lateral force to the sliding body 48 to overcome the resistance provided by the engagement of the dose locking body 368 with the indentations 344, 346, 348, for example by manipulating the dose selection body 366 with a user's fingers. The sliding body 48 can also optionally be removed from the dose adjustment slot 338 by sliding the sliding body 48 laterally out of the open right end 334 of the slotway cavity 330.

Figure 63:
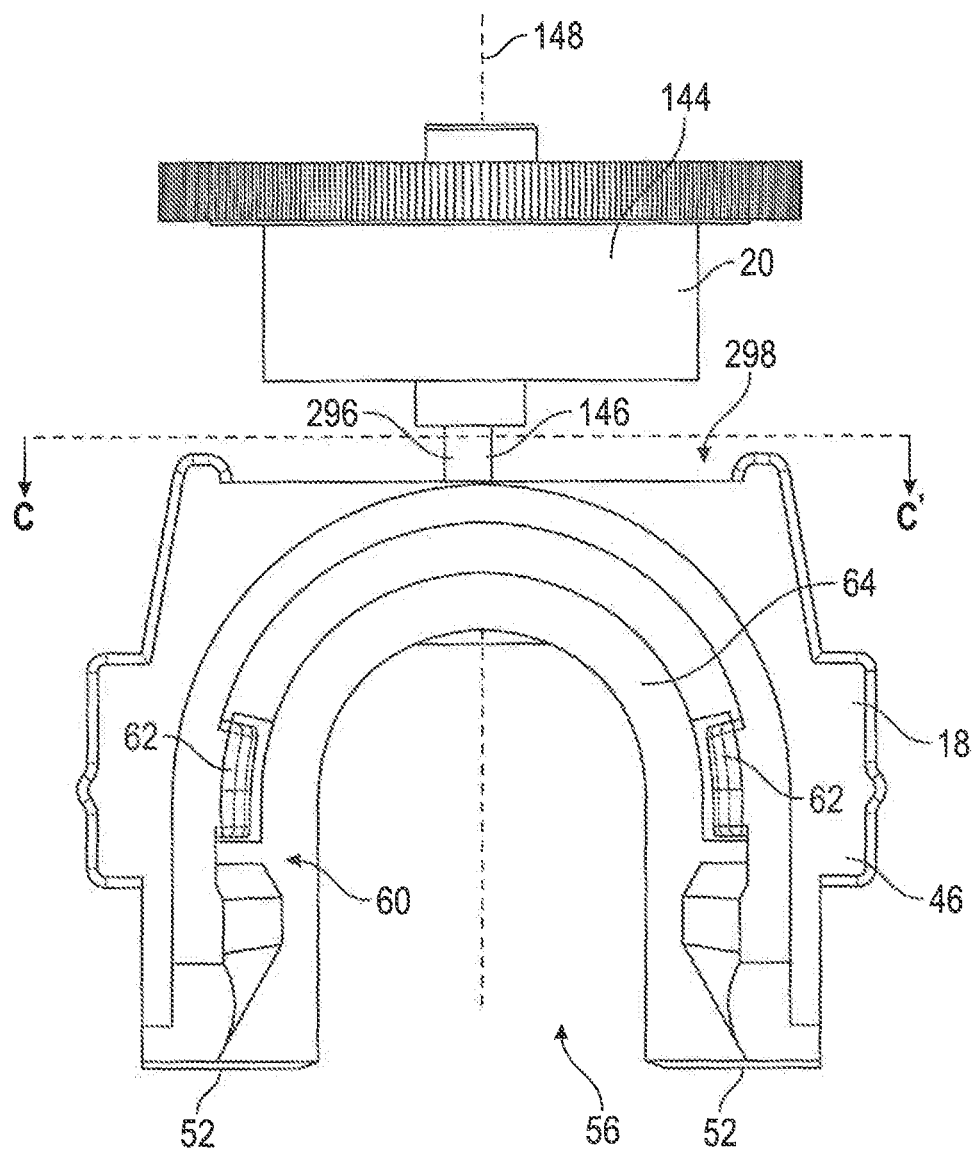
FIG. 63 is a top view of the pump actuator and the driver shown in FIG. 57.
Figure 64:
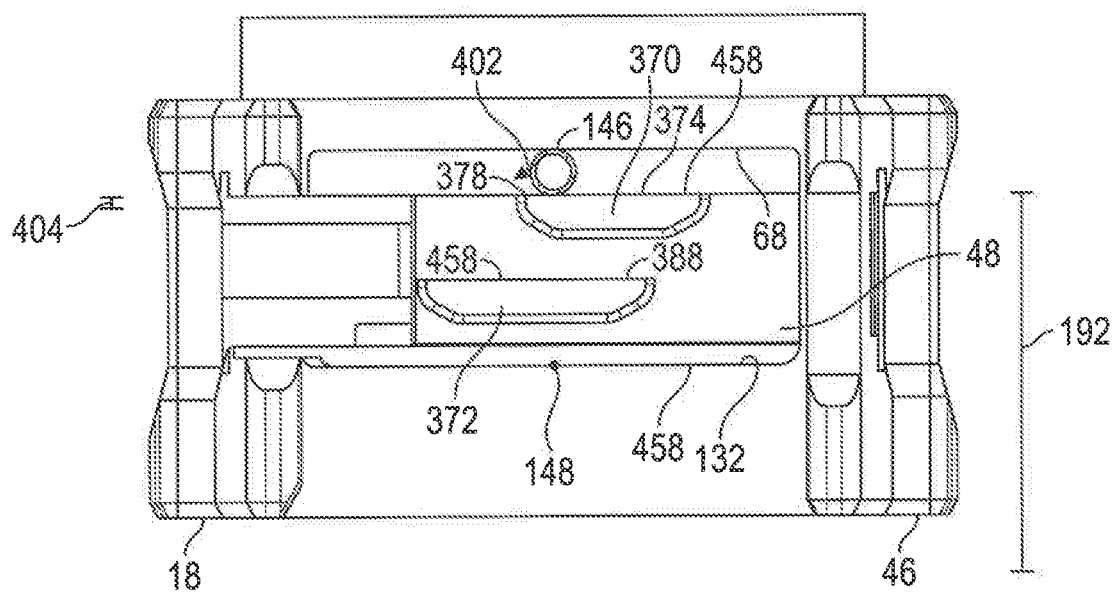
FIG. 64 is a forward looking cross-sectional view of the pump actuator and the driver of FIG. 63 taken along line C-C' in FIG. 63, showing a drive pin of the driver at a retraction position and the dose adjustment mechanism at the low dose setting.

As can be seen in FIG. 63, the drive pin 146 of the driver 20 extends from the drive wheel 144 into the slotway cavity 330. As in the embodiment shown in FIGS. 1 to 27, the drive wheel 144 is rotatable about a horizontal drive axis 148, so as to cause the drive pin 146 to travel up and down in a circular path about the drive axis 148. As shown in FIG. 64, the drive pin 146 is positioned between the first cam surface 68 and the second cam surface 132 of the pump actuator 18, and functions as a camming body 296 for effecting movement of the pump actuator 18 through engagement with two or more of the first cam surface 68, the second cam surface 132, the first adjustable cam surface 374, the first rounded lower surface 376, the second adjustable cam surface 388, and the second rounded lower surface 390, depending on whether the sliding body 48 is at the high dose position, the medium dose position, or the low dose position.

The movement of the drive pin 146 relative to the drive axis 148, and the resulting movement of the pump actuator 18 relative to the drive axis 148, when the sliding body 48 is at the low dose position and the driver 20 is activated, is shown in FIGS. 64 to 69. In FIG. 64, the drive pin 146 is located vertically above the drive axis 148 in the retraction position, and is positioned between the first cam surface 68 and the first adjustable cam surface 374. When the driver 20 is activated the drive pin 146 initially moves in a counter clockwise arc from the retraction position shown in FIG. 64 to the extension position shown in FIG. 67 in a low dose extension motion.

During a first phase of the low dose extension motion, as represented by the arrow 402 in FIG. 64, the drive pin 146 engages with the first adjustable cam surface 374, which drives the pump actuator 18 a first low dose extension engagement distance 404 in the extension direction relative to the drive axis 148. The first phase of the low dose extension motion ends when the drive pin 146 reaches the right edge 378 of the first adjustable cam surface 374, as shown in FIG. 65.

Figure 65:
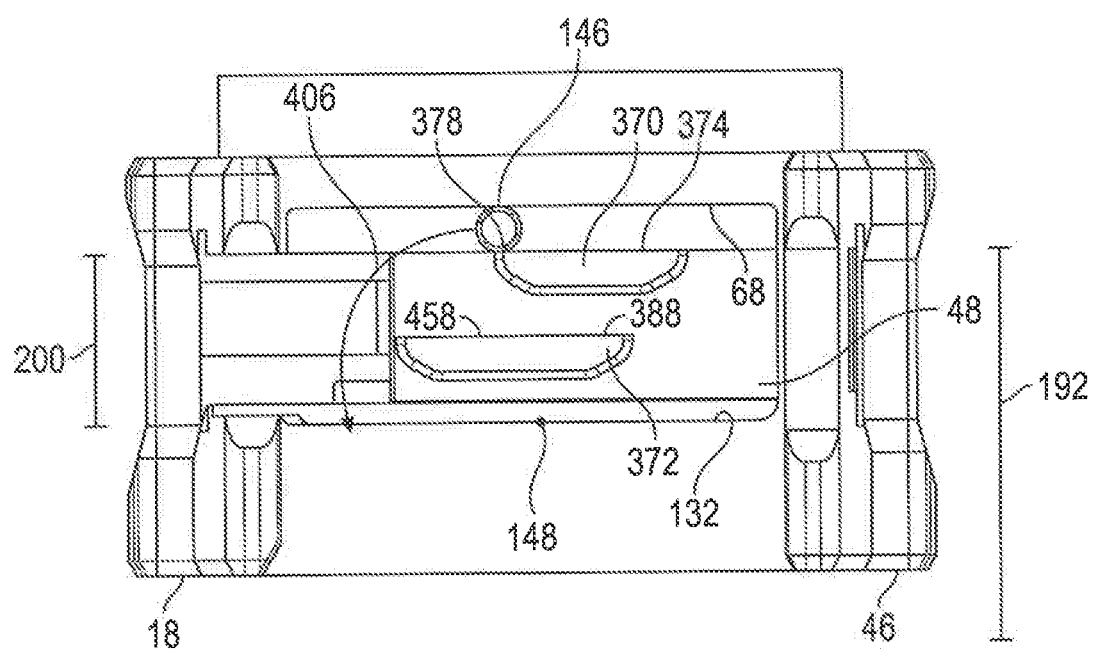
FIG. 65 is a cross-sectional view of the pump actuator and the driver the same as in FIG. 64, but showing the drive pin at the end of a first phase of a low dose extension motion.

During a second phase of the low dose extension motion, the drive pin 146 disengages from the first adjustable cam surface 374 and travels along the path shown by the arrow 406 in FIG. 65, moving to the right of the first adjustable cam surface 374 and past the first adjustable cam surface 374 in the extension direction towards the second cam surface 132. The pump actuator 18 does not move relative to the drive axis 148 during the second phase of the low dose extension motion, because the drive pin 146 is disengaged from the pump actuator 18. The second phase of the low dose extension motion ends when the drive pin 146 contacts the second cam surface 132, as shown in FIG. 66.

Figure 66:
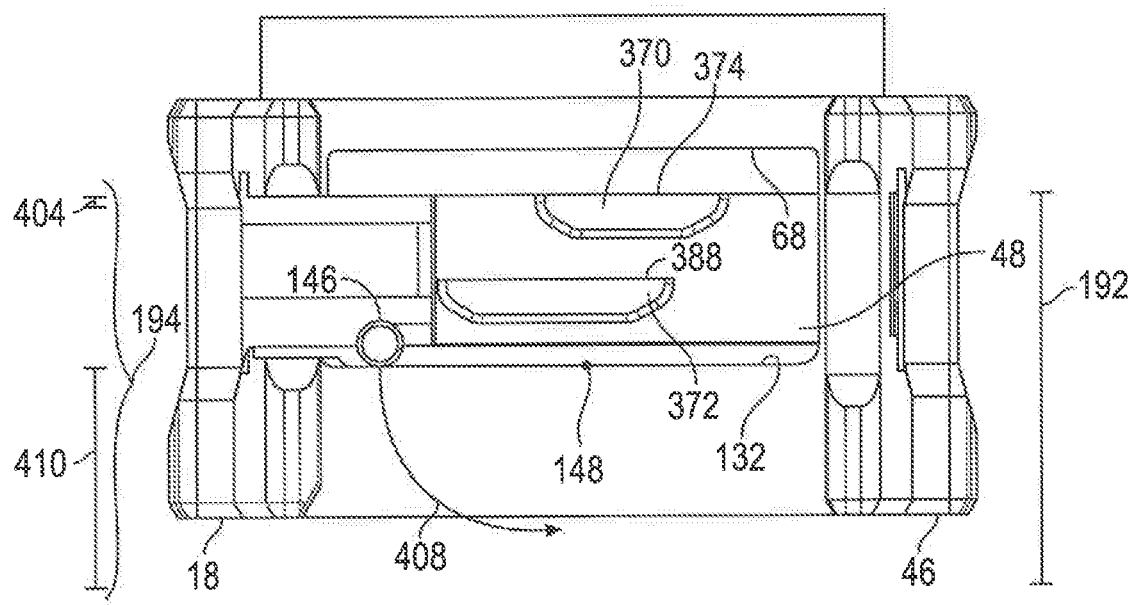
FIG. 66 is a cross-sectional view of the pump actuator and the driver the same as in FIG. 64, but showing the drive pin at the end of a second phase of the low dose extension motion.

During a third phase of the low dose extension motion, the drive pin 146 engages with the second cam surface 132 and travels to the extension position along the path shown by the arrow 408 in FIG. 66. The engagement of the drive pin 146 with the second cam surface 132 drives the pump actuator 18 a second low dose extension engagement distance 410 in the extension direction relative to the drive axis 148. The third phase of the low dose extension motion ends when the drive pin 146 reaches the extension position shown in FIG. 67.

Figure 67:
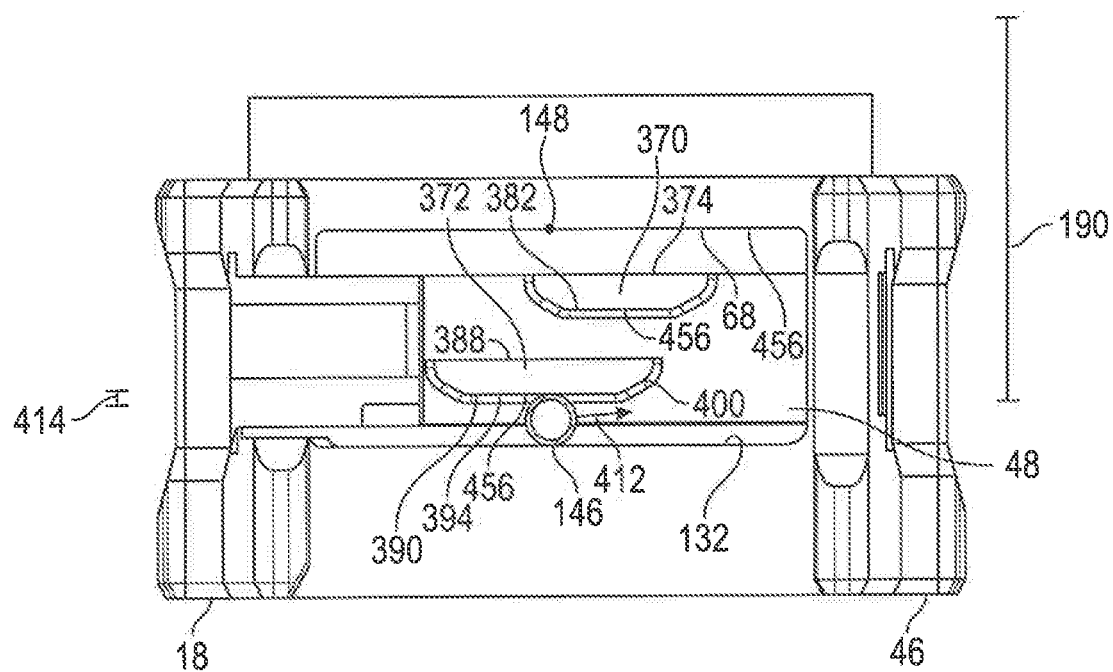
FIG. 67 is a cross-sectional view of the pump actuator and the driver the same as in FIG. 64, but showing the drive pin at an extension position.

The drive pin 146 then moves in a counter clockwise arc upwardly from the extension position of FIG. 67 back to the retraction position of FIG. 64 in a low dose retraction motion. During a first phase of the low dose retraction motion, as represented by the arrow 412 in FIG. 67, the drive pin 146 engages with the lower planar portion 394 of the second rounded lower surface 390 of the second adjustable cam member 372, which drives the pump actuator 18 a first low dose retraction engagement distance 414 in the retraction direction relative to the drive axis 148. The first phase of the low dose retraction motion ends when the drive pin 146 reaches the left corner portion 400 of the second rounded lower surface 390, as shown in FIG. 68.

Figure 68:
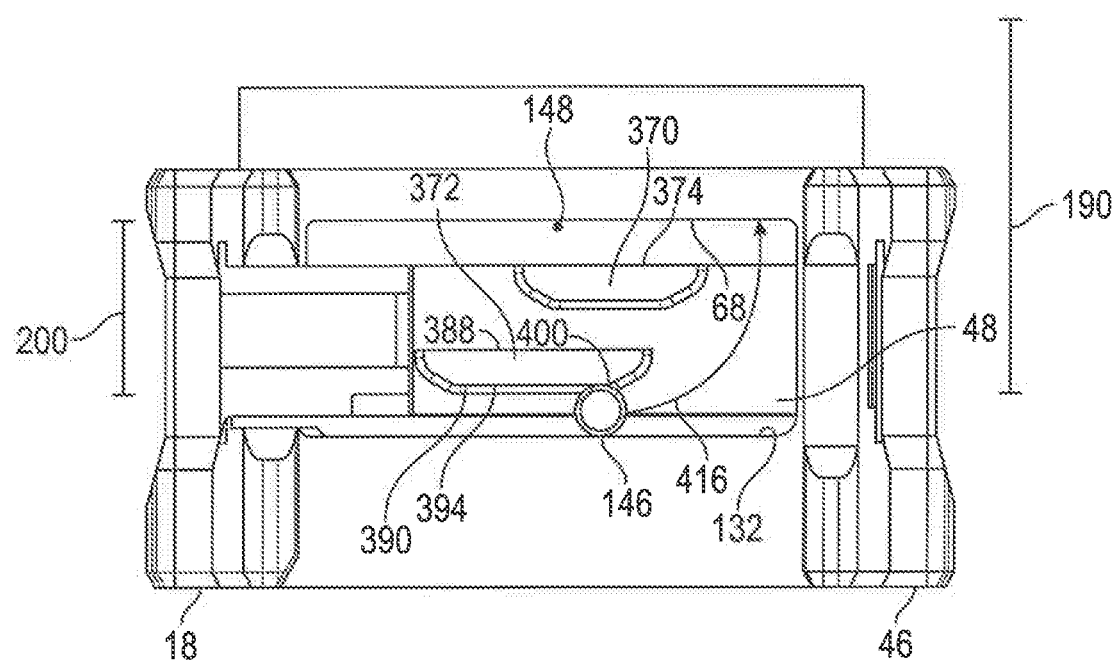
FIG. 68 is a cross-sectional view of the pump actuator and the driver the same as in FIG. 64, but showing the drive pin at the end of a first phase of a low dose retraction motion.

During a second phase of the low dose retraction motion, the drive pin 146 disengages from the second rounded lower surface 390 and travels towards the first cam surface 68 along the path shown by the arrow 416 in FIG. 68, moving past the first adjustable cam surface 374 in the retraction direction and to the left of the first adjustable cam surface 374. The pump actuator 18 does not move relative to the drive axis 148 during the second phase of the low dose retraction motion, because the drive pin 146 is disengaged from the pump actuator 18. The second phase of the low dose retraction motion ends when the drive pin 146 contacts the first cam surface 68, as shown in FIG. 69.

Figure 69:
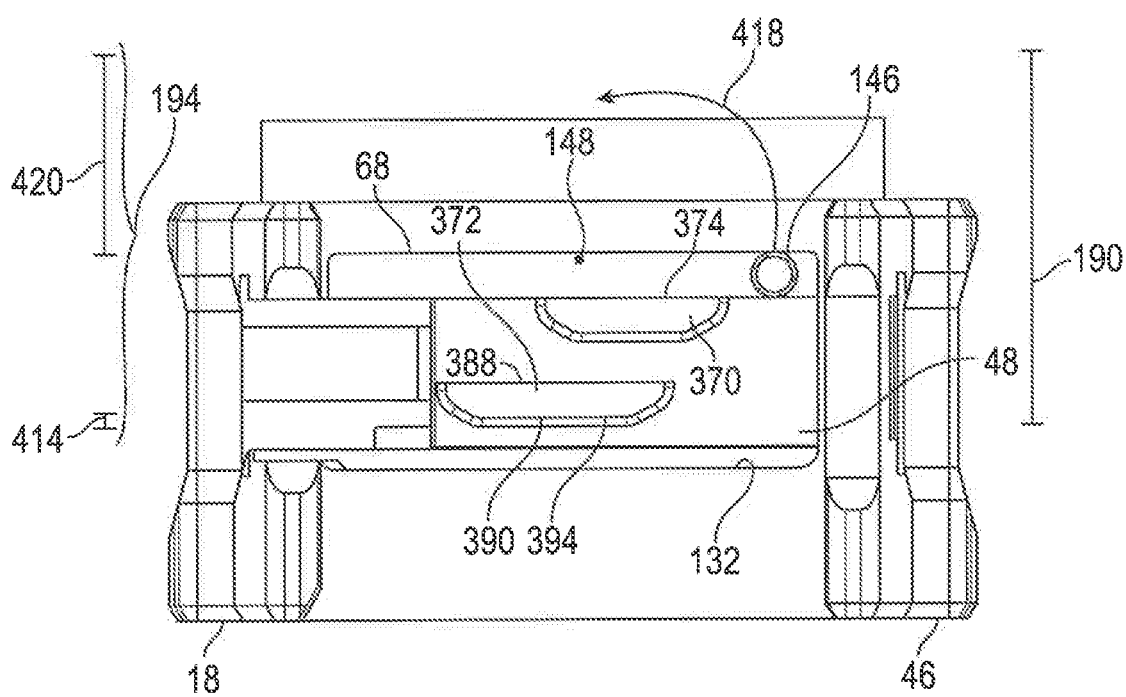
FIG. 69 is a cross-sectional view of the pump actuator and the driver the same as in FIG. 64, but showing the drive pin at the end of a second phase of the low dose retraction motion.
Figure 70:
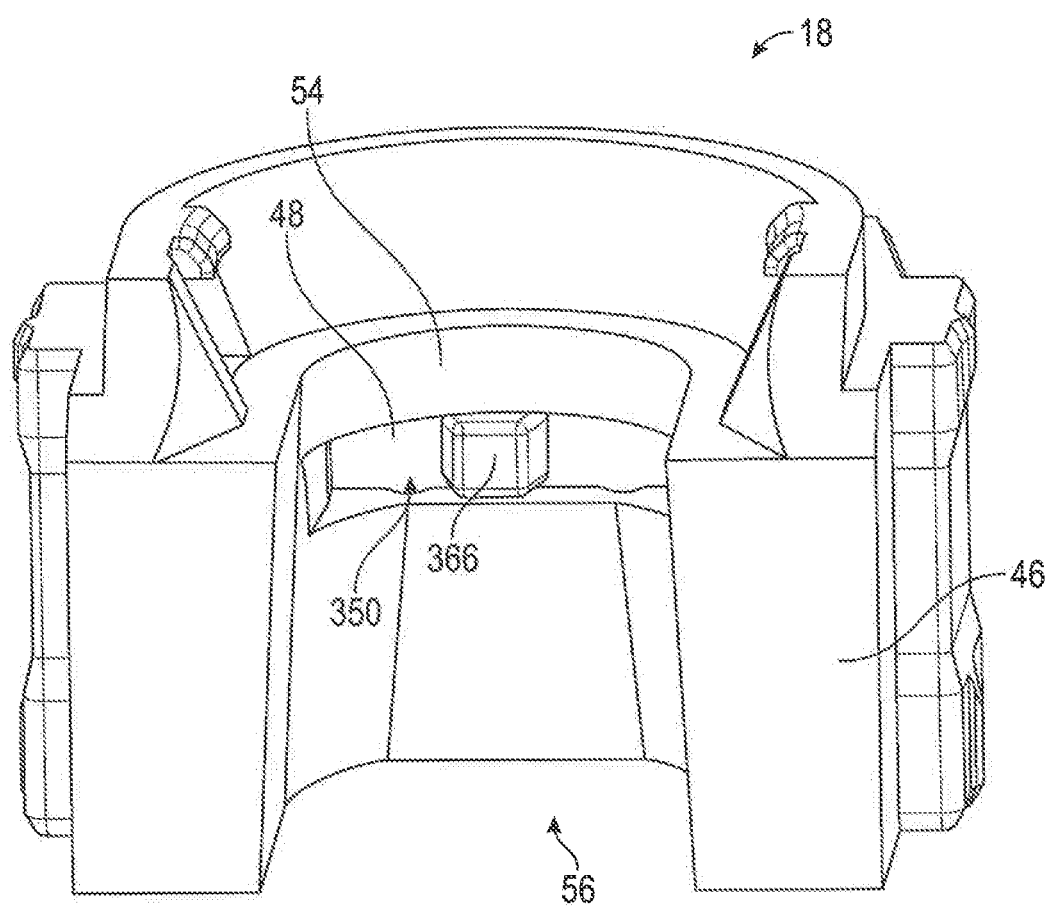
FIG. 70 is a front perspective view of the pump actuator of FIG. 58, with the dose adjustment mechanism of the pump actuator at a medium dose setting.

During a third phase of the low dose retraction motion, the drive pin 146 engages with the first cam surface 68 and travels back to the retraction position along the path shown by the arrow 418 in FIG. 69. The engagement of the drive pin 146 with the first cam surface 68 drives the pump actuator 18 a second low dose retraction engagement distance 420 in the retraction direction relative to the drive axis 148. The third phase of the low dose retraction motion ends when the drive pin 146 reaches the retraction position shown in FIG. 64.

As in the embodiment shown in FIGS. 1 to 27, in the embodiment shown in FIGS. 57 to 84 the vertical movement of the pump actuator 18 relative to the drive axis 148 when the driver 20 is activated displaces the piston-forming element 26 relative to the piston-chamber forming body 28, which causes the fluid pump 16 to dispense a dose of the fluid. As in the previous embodiments, the volume of fluid that is dispensed with each activation depends on the engagement distance 194 that the pump actuator 18 travels in the retraction direction and in the extension direction.

When the sliding body 48 is at the low dose position as shown in FIGS. 64 to 69, the engagement distance 194 in the extension direction is the sum of the first low dose extension engagement distance 404 travelled during the first phase 402 of the low dose extension motion and the second low dose extension engagement distance 410 travelled during the third phase 408 of the low dose extension motion. The engagement distance 194 in the retraction direction is the same as the engagement distance 194 in the extension direction, and is the sum of the first low dose retraction engagement distance 414 travelled during the first phase 412 of the low dose retraction motion and the second low dose retraction engagement distance 420 travelled during the third phase 418 of the low dose retraction motion. The lost link distance 200 is the vertical distance travelled by the drive pin 146 when the drive pin 146 is disengaged from the pump actuator 18 during the second phase 406 of the low dose extension motion and the second phase 416 of the low dose retraction motion.

When the sliding body 48 is at the low dose position shown in FIGS. 64 to 69, the engagement distance 194 is relatively small and the lost link distance 200 is relatively large. As a result, when the driver 20 is activated the piston-forming element 26 travels a relatively small stroke distance 196 as shown in FIG. 24, which causes the fluid pump 16 to dispense a relatively small dose of the fluid.

To increase the volume of fluid that is dispensed with each activation of the driver 20, the sliding body 48 can be moved to the medium dose position shown in FIGS. 70 to 77. The movement of the drive pin 146 relative to the drive axis 148, and the resulting movement of the pump actuator 18 relative to the drive axis 148, when the sliding body 48 is at the medium dose position and the driver 20 is activated, is shown in FIGS. 72 to 77.

Figure 72:
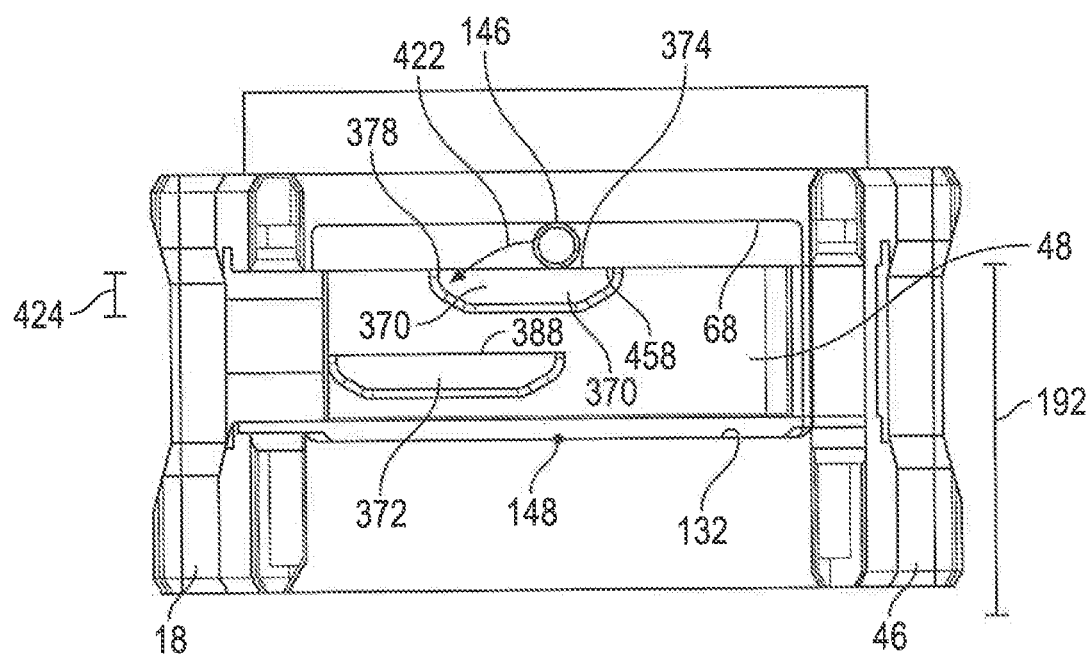
FIG. 72 is a cross-sectional view of the pump actuator and the driver the same as in FIG. 64, but with the drive pin at the retraction position and the dose adjustment mechanism at the medium dose setting.

In FIG. 72, the drive pin 146 is located vertically above the drive axis 148 in the retraction position, and is positioned between the first cam surface 68 and the first adjustable cam surface 374. When the driver 20 is activated the drive pin 146 initially moves in a counter clockwise arc from the retraction position shown in FIG. 72 to the extension position shown in FIG. 75 in a medium dose extension motion.

During a first phase of the medium dose extension motion, as represented by the arrow 422 in FIG. 72, the drive pin 146 engages with the first adjustable cam surface 374, which drives the pump actuator 18 a first medium dose extension engagement distance 424 in the extension direction relative to the drive axis 148. The first phase of the medium dose extension motion ends when the drive pin 146 reaches the right edge 378 of the first adjustable cam surface 374, as shown in FIG. 73.

Figure 73:
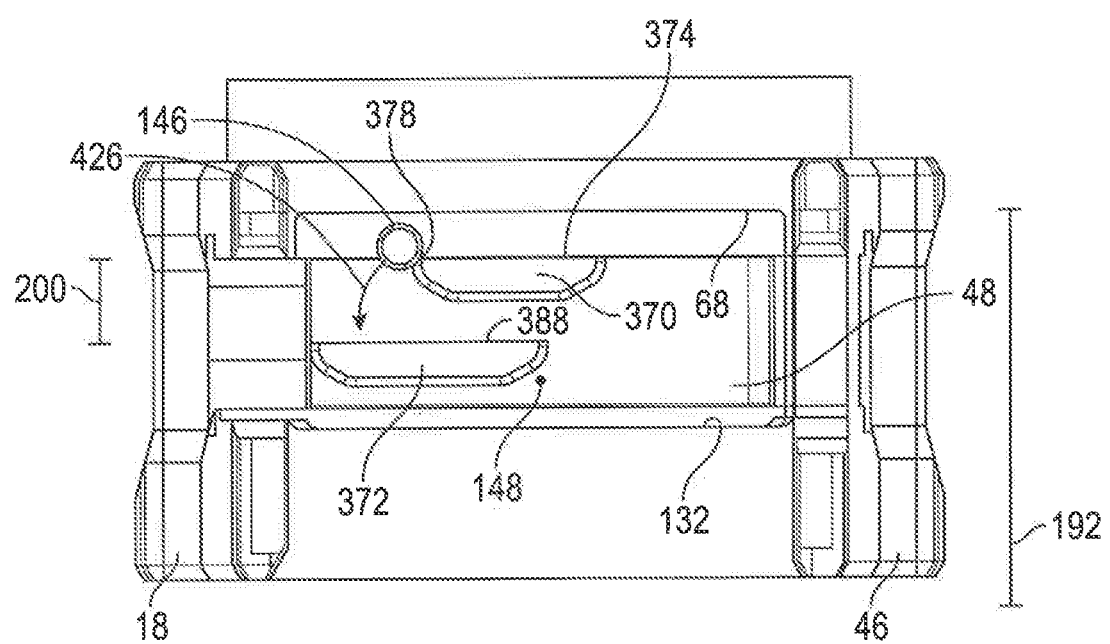
FIG. 73 is a cross-sectional view of the pump actuator and the driver the same as in FIG. 72, but showing the drive pin at the end of a first phase of a medium dose extension motion.

During a second phase of the medium extension motion, the drive pin 146 disengages from the first adjustable cam surface 374 and travels towards the second adjustable cam surface 388 along the path shown by the arrow 426 in FIG. 73. The pump actuator 18 does not move relative to the drive axis 148 during the second phase of the medium dose extension motion, because the drive pin 146 is disengaged from the pump actuator 18. The second phase of the medium dose extension motion ends when the drive pin 146 contacts the second adjustable cam surface 388, as shown in FIG. 74.

Figure 74:
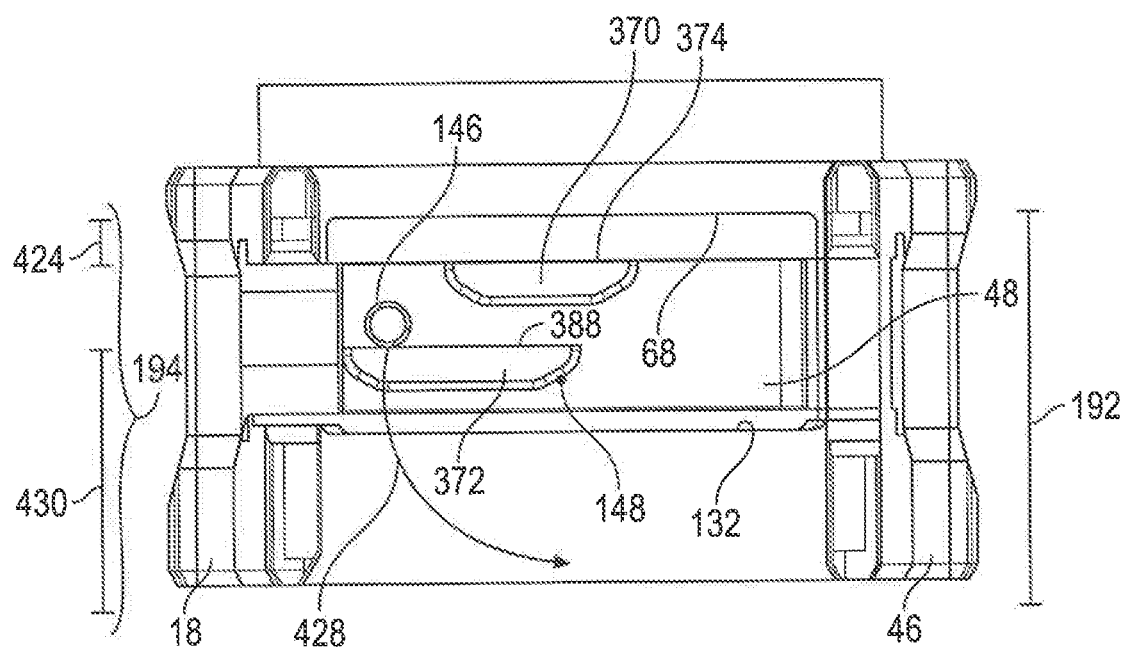
FIG. 74 is a cross-sectional view of the pump actuator and the driver the same as in FIG. 72, but showing the drive pin at the end of a second phase of the medium dose extension motion.

During a third phase of the medium dose extension motion, the drive pin 146 engages with the second adjustable cam surface 388 and travels to the extension position along the path shown by the arrow 428 in FIG. 74. The engagement of the drive pin 146 with the second adjustable cam surface 388 drives the pump actuator 18 a second medium dose extension engagement distance 430 in the extension direction relative to the drive axis 148. The third phase of the medium dose extension motion ends when the drive pin 146 reaches the extension position shown in FIG. 75.

Figure 75:
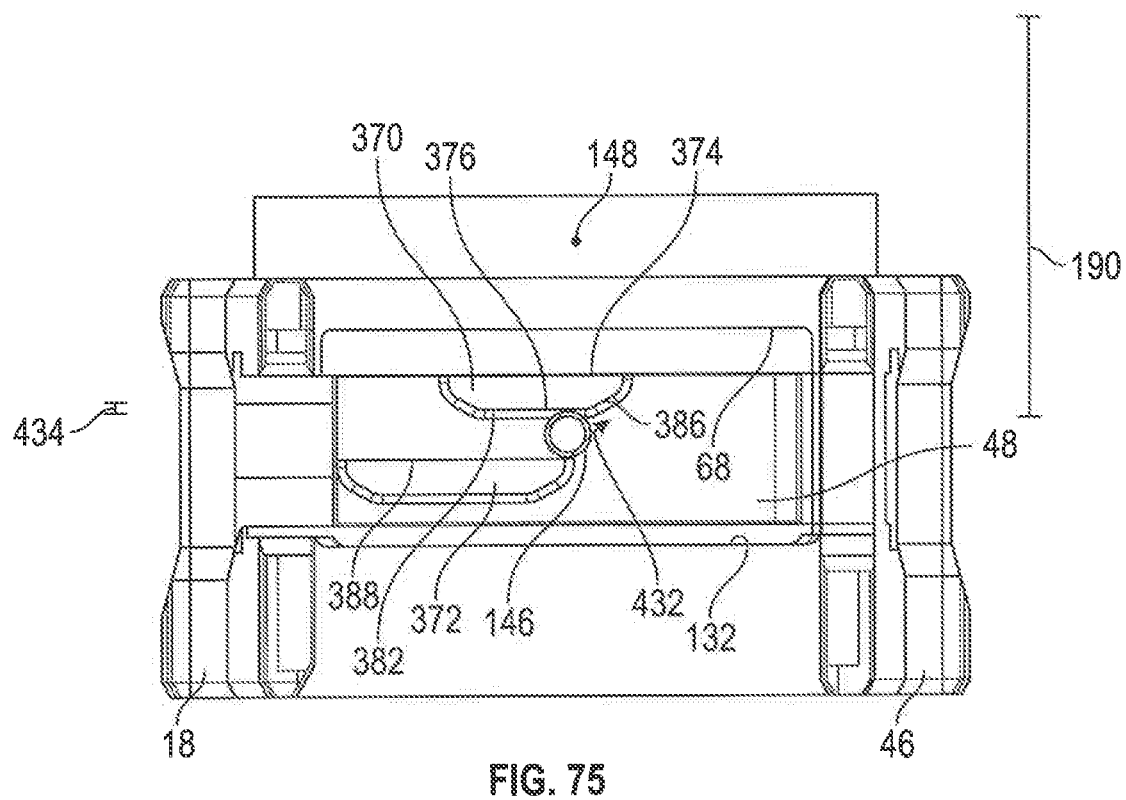
FIG. 75 is a cross-sectional view of the pump actuator and the driver the same as in FIG. 72, but showing the drive pin at the extension position.

The drive pin 146 then moves in a counter clockwise arc upwardly from the extension position of FIG. 75 back to the retraction position of FIG. 72 in a medium dose retraction motion. During a first phase of the medium dose retraction motion, as represented by the arrow 432 in FIG. 75, the drive pin 146 engages with the lower planar portion 382 of the first rounded lower surface 376 of the first adjustable cam member 370, which drives the pump actuator 18 a first medium dose retraction engagement distance 434 in the retraction direction relative to the drive axis 148. The first phase of the medium dose retraction motion ends when the drive pin 146 reaches the left corner portion 386 of the first rounded lower surface 376, as shown in FIG. 76.

Figure 76:
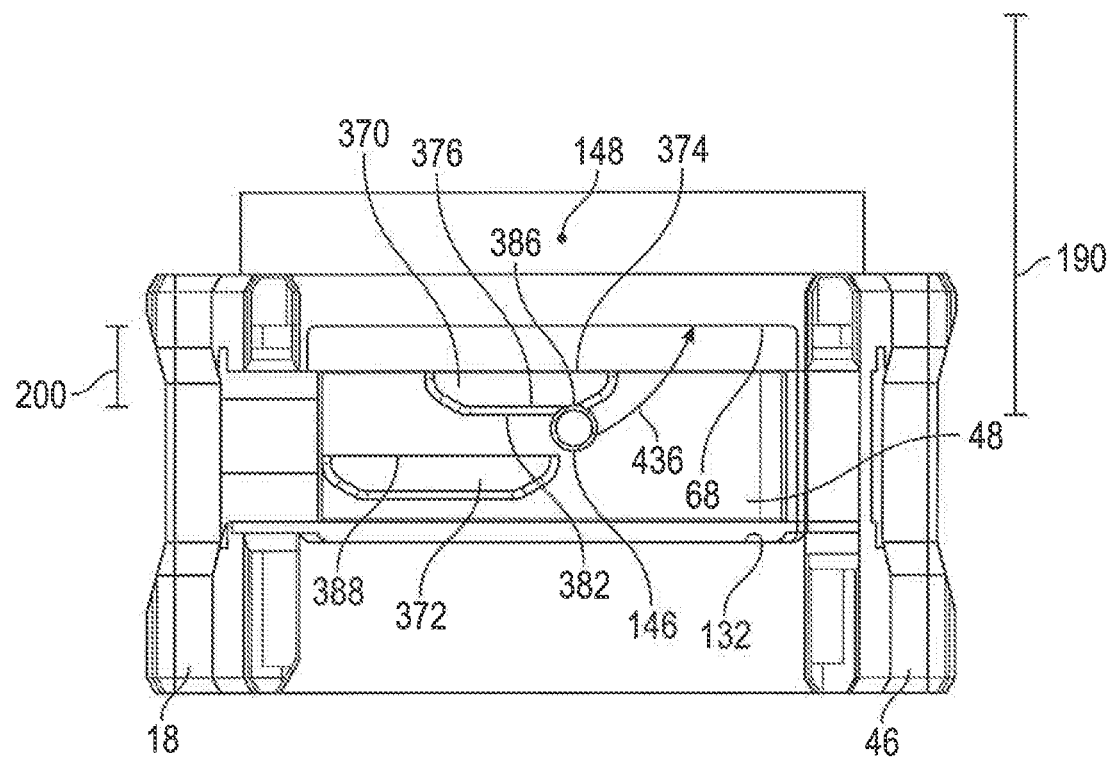
FIG. 76 is a cross-sectional view of the pump actuator and the driver the same as in FIG. 72, but showing the drive pin at the end of a first phase of a medium dose retraction motion.

During a second phase of the medium dose retraction motion, the drive pin 146 disengages from the first rounded lower surface 376 and travels towards the first cam surface 68 along the path shown by the arrow 436 in FIG. 76. The pump actuator 18 does not move relative to the drive axis 148 during the second phase of the medium dose retraction motion, because the drive pin 146 is disengaged from the pump actuator 18. The second phase of the medium dose retraction motion ends when the drive pin 146 contacts the first cam surface 68, as shown in FIG. 77.

Figure 77:
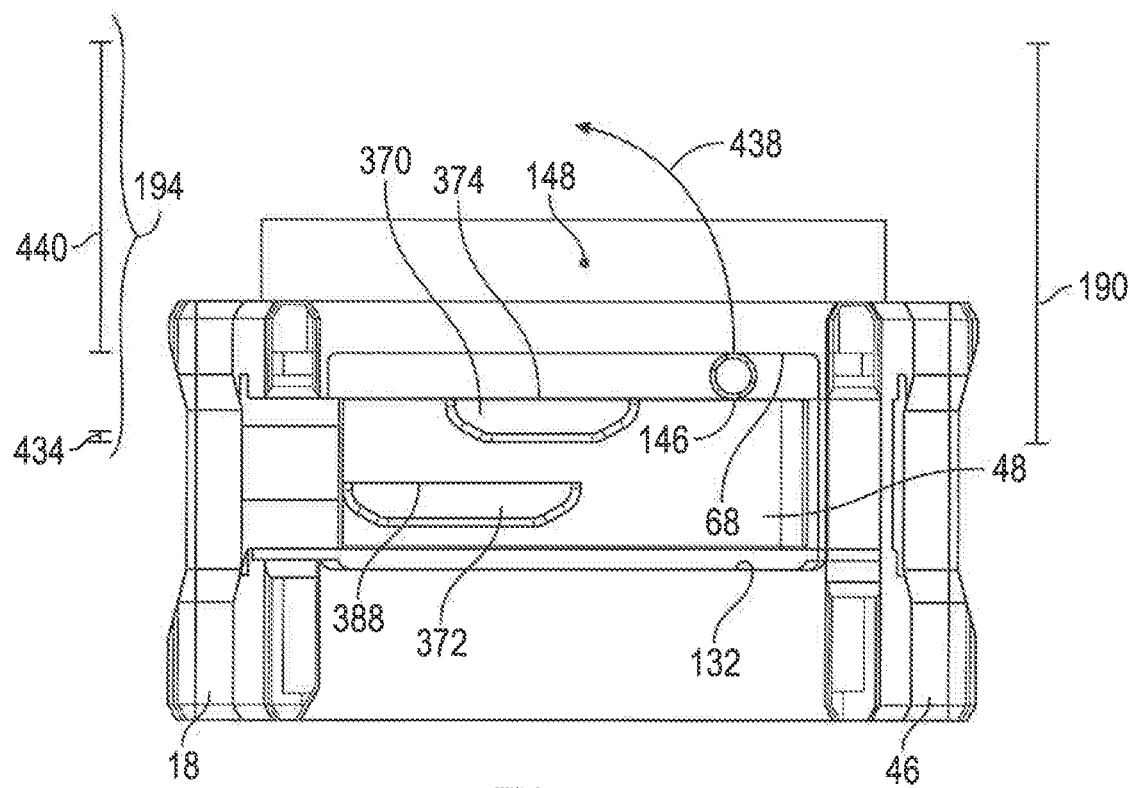
FIG. 77 is a cross-sectional view of the pump actuator and the driver the same as in FIG. 72, but showing the drive pin at the end of a second phase of the medium dose retraction motion.
Figure 78:
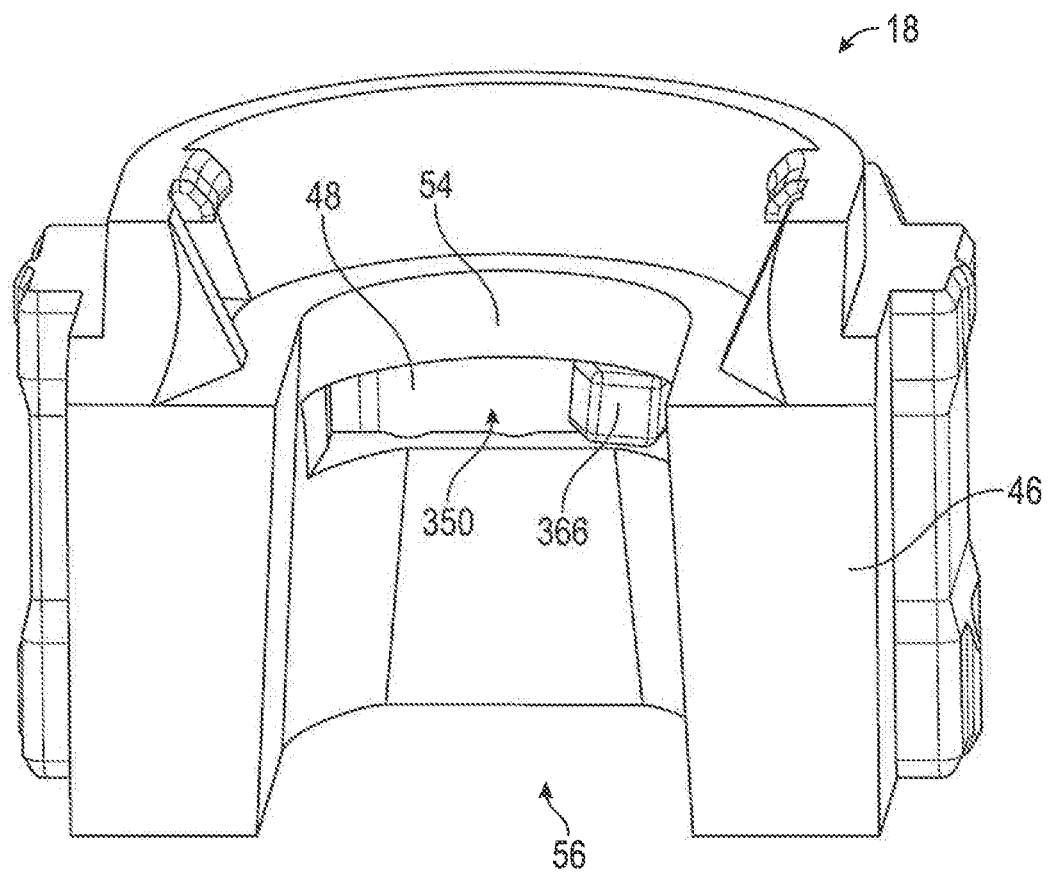
FIG. 78 is a front perspective view of the pump actuator of FIG. 58, with the dose adjustment mechanism of the pump actuator at a high dose setting.

During a third phase of the medium dose retraction motion, the drive pin 146 engages with the first cam surface 68 and travels back to the retraction position along the path shown by the arrow 438 in FIG. 77. The engagement of the drive pin 146 with the first cam surface 68 drives the pump actuator 18 a second medium dose retraction engagement distance 440 in the retraction direction relative to the drive axis 148. The third phase of the medium dose retraction motion ends when the drive pin 146 reaches the retraction position shown in FIG. 72.

When the sliding body 48 is at the medium dose position as shown in FIGS. 72 to 77, the engagement distance 194 in the extension direction is the sum of the first medium dose extension engagement distance 424 travelled during the first phase 422 of the medium dose extension motion and the second medium dose extension engagement distance 430 travelled during the third phase 428 of the medium dose extension motion. The engagement distance 194 in the retraction direction is the same as the engagement distance 194 in the extension direction, and is the sum of the first medium dose retraction engagement distance 434 travelled during the first phase 432 of the medium dose retraction motion and the second medium dose retraction engagement distance 440 travelled during the third phase 438 of the medium dose retraction motion. The lost link distance 200 is the vertical distance travelled by the drive pin 146 when the drive pin 146 is disengaged from the pump actuator 18 during the second phase 426 of the medium dose extension motion and the second phase 436 of the medium dose retraction motion.

When the sliding body 48 is at the medium dose position shown in FIGS. 72 to 77, the engagement distance 194 is larger and the lost link distance 200 is smaller in comparison to when the sliding body 48 is at the low dose position shown in FIGS. 64 to 69. As a result, the piston-forming element 26 travels a medium stroke distance 196 as shown in FIG. 18, which causes the fluid pump 16 to dispense a medium dose of the fluid.

To further increase the volume of fluid that is dispensed with each activation of the driver 20, the sliding body 48 can be moved to the high dose position shown in FIGS. 78 to 84. The movement of the drive pin 146 relative to the drive axis 148, and the resulting movement of the pump actuator 18 relative to the drive axis 148, when the sliding body 48 is at the high dose position and the driver 20 is activated, is shown in FIGS. 80 to 84.

Figure 80:
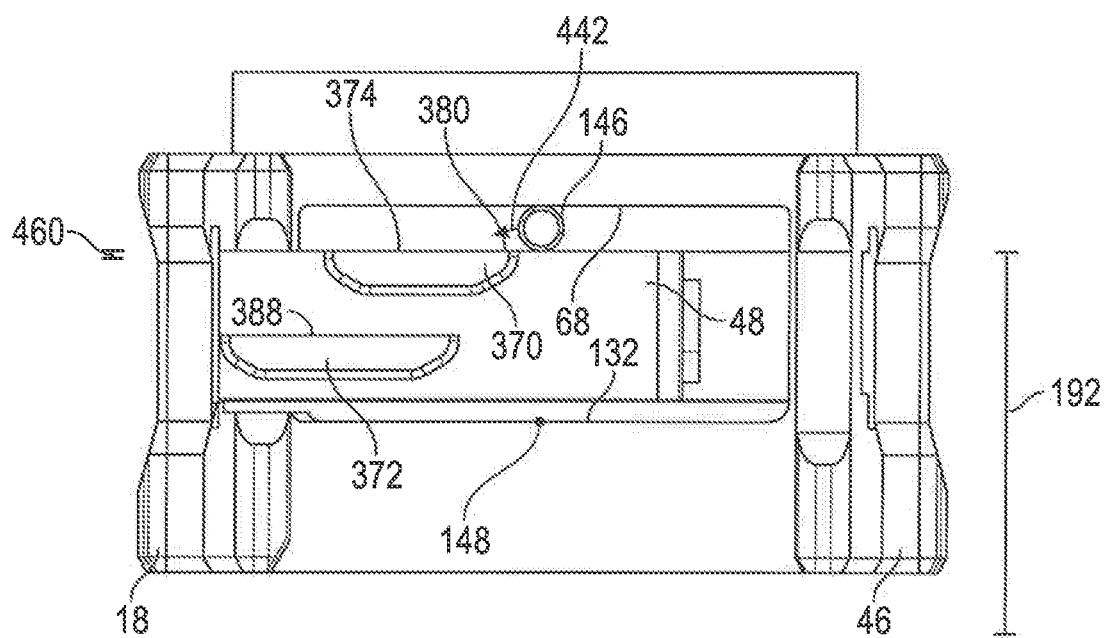
FIG. 80 is a cross-sectional view of the pump actuator and the driver the same as in FIG. 64, but with the drive pin at the retraction position and the dose adjustment mechanism at the high dose setting.

In FIG. 80, the drive pin 146 is located vertically above the drive axis 148 in the retraction position, and is positioned below the first cam surface 68 and above and to the left of the first adjustable cam surface 374. When the driver 20 is activated the drive pin 146 initially moves in a counter clockwise arc from the retraction position shown in FIG. 80 to the extension position shown in FIG. 83 in a high dose extension motion.

Figure 81:
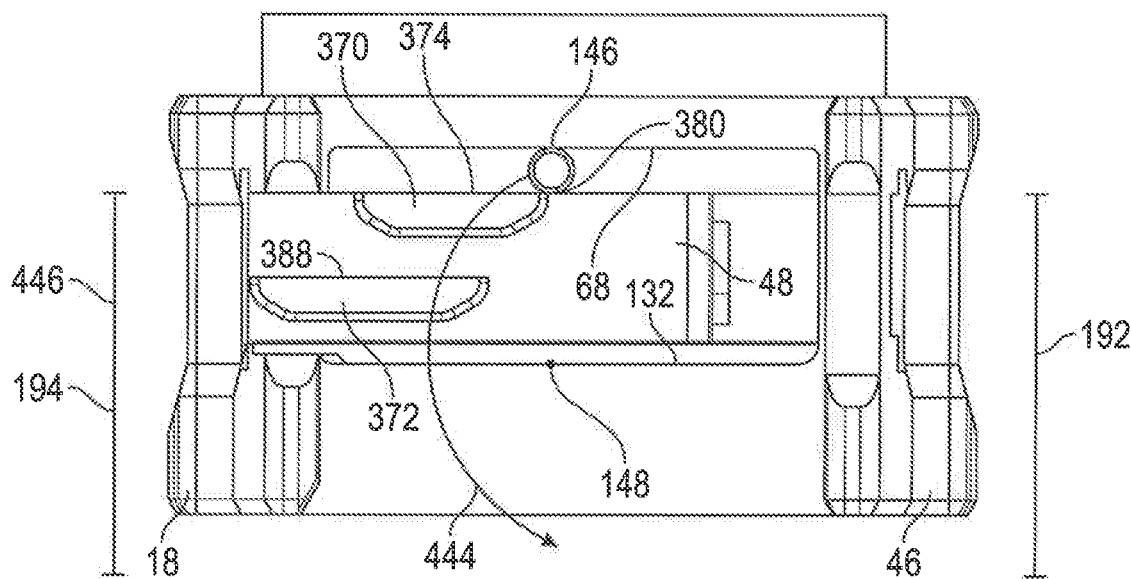
FIG. 81 is a cross-sectional view of the pump actuator and the driver the same as in FIG. 80, but showing the drive pin at the end of a first phase of a high dose extension motion.

During a first phase of the high dose extension motion, as represented by the arrow 442 in FIG. 80, the drive pin 146 is disengaged from the pump actuator 18 and so the pump actuator 18 does not move relative to the drive axis 148. The first phase of the high dose extension motion ends when the drive pin 146 contacts the left edge 380 of the first adjustable cam surface 374, as shown in FIG. 81. During the first phase of the high dose extension motion, the drive pin 146 travels a first high dose extension lost link distance 460 in the extension direction.

During a second phase of the high dose extension motion, the drive pin 146 engages with the first adjustable cam surface 374 and travels along the path shown by the arrow 444 in FIG. 81. The engagement of the drive pin 146 with the first adjustable cam surface 374 drives the pump actuator 18 a first high dose extension engagement distance 446 in the extension direction relative to the drive axis 148. The second phase of the high dose extension motion ends when the drive pin 146 returns to the left edge 380 of the first adjustable cam surface 374, as shown in FIG. 82.

Figure 82:
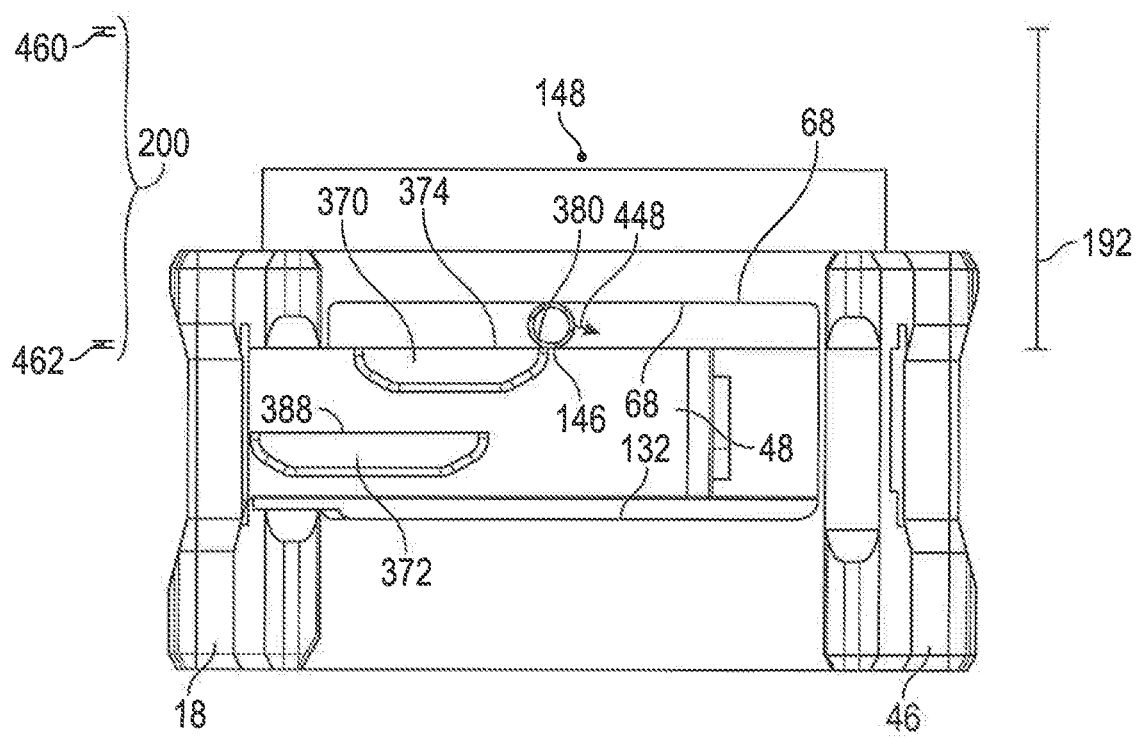
FIG. 82 is a cross-sectional view of the pump actuator and the driver the same as in FIG. 80, but showing the drive pin at the end of a second phase of the high dose extension motion.

During a third phase of the high dose extension motion, the drive pin 146 disengages from the first adjustable cam surface 374 and travels to the extension position along the path shown by the arrow 448 in FIG. 82. The pump actuator 18 does not move relative to the drive axis 148 during the third phase of the high dose retraction motion, because the drive pin 146 is disengaged from the pump actuator 18. The third phase of the high dose extension motion ends when the drive pin 146 reaches the extension position shown in FIG. 83. During the third phase of the high dose extension motion, the drive pin 146 travels a second high dose extension lost link distance 462 in the extension direction.

Figure 83:
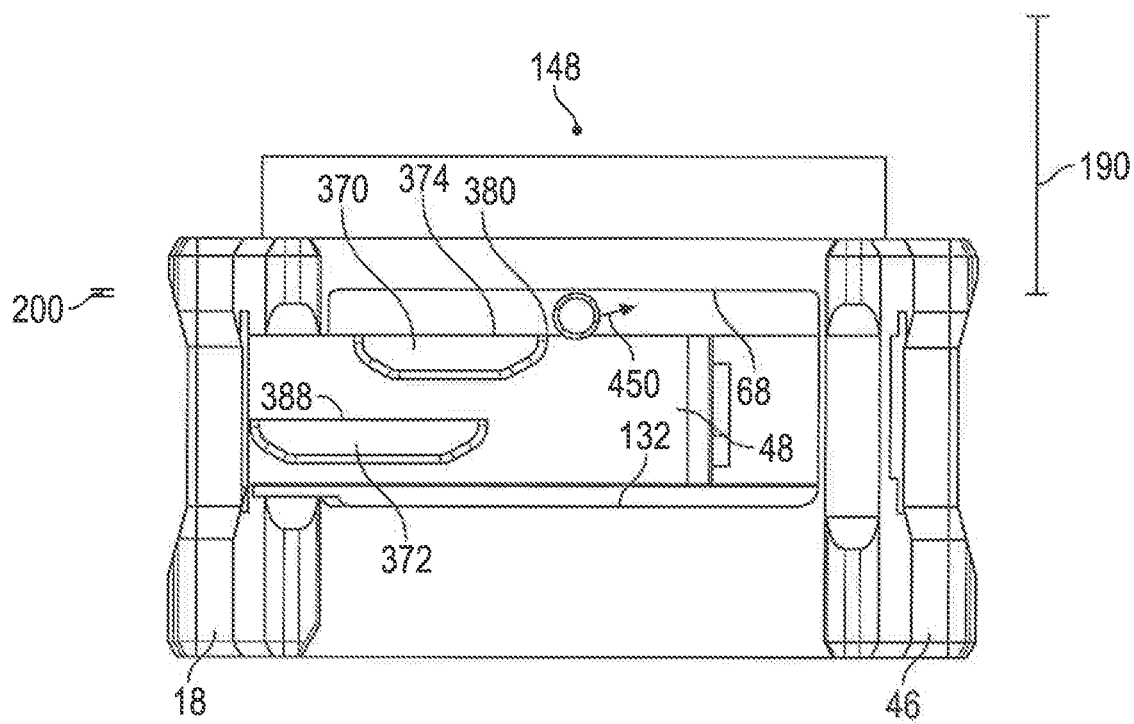
FIG. 83 is a cross-sectional view of the pump actuator and the driver the same as in FIG. 80, but showing the drive pin at the extension position.

The drive pin 146 then moves in a counter clockwise arc upwardly from the extension position of FIG. 83 back to the retraction position of FIG. 80 in a high dose retraction motion. During a first phase of the high dose retraction motion, as represented by the arrow 450 in FIG. 83, the drive pin 146 is disengaged from the pump actuator 18 and so the pump actuator 18 does not move relative to the drive axis 148. The first phase of the high dose retraction motion ends when the drive pin 146 contacts the first cam surface 68, as shown in FIG. 84.

Figure 84:
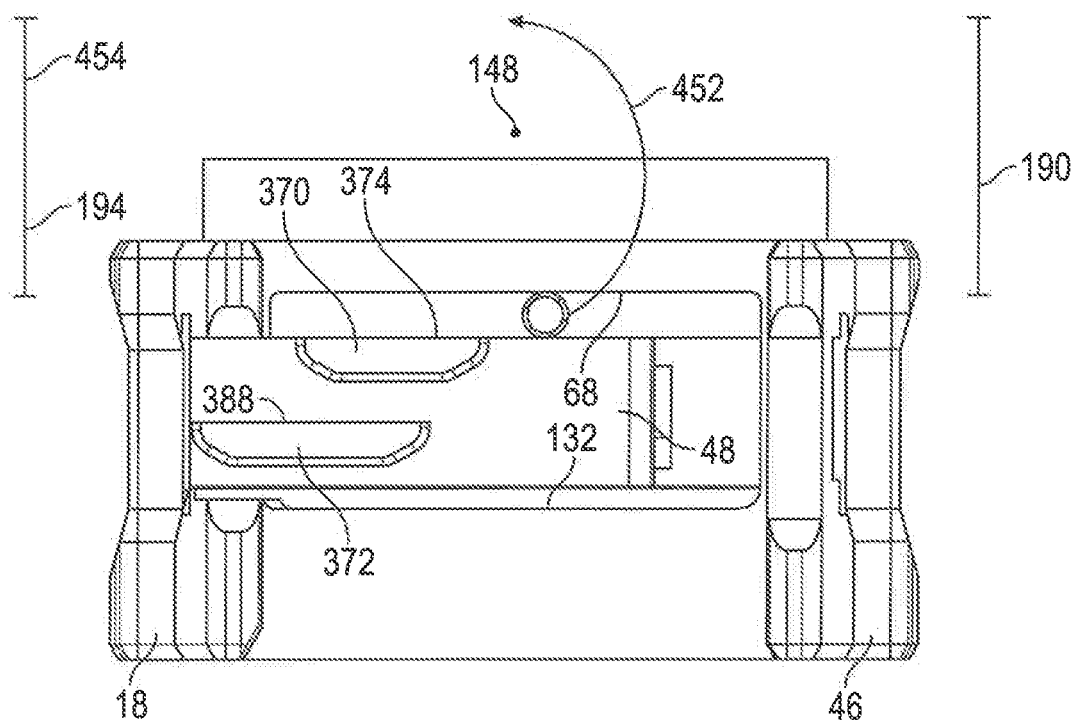
FIG. 84 is a cross-sectional view of the pump actuator and the driver the same as in FIG. 80, but showing the drive pin at the end of a first phase of a high dose retraction motion.

During a second phase of the high dose retraction motion, the drive pin 146 engages with the first cam surface 68 and travels along the path shown by the arrow 452 in FIG. 84. The engagement of the drive pin 146 with the first cam surface 68 drives the pump actuator 18 a first high dose retraction engagement distance 454 in the retraction direction relative to the drive axis 148. The second phase of the high dose retraction motion ends when the drive pin 146 returns to the retraction position as shown in FIG. 80.

When the sliding body 48 is at the high dose position as shown in FIGS. 80 to 84, the engagement distance 194 in the extension direction is the first extension engagement distance 446 travelled during the second phase 444 of the high dose extension motion, and the engagement distance 194 in the retraction direction is the first retraction engagement distance 454 travelled during the second phase 452 of the high dose retraction motion, the first extension engagement distance 446 being equal to the first retraction engagement distance 454. The lost link distance 200 in the extension direction is the sum of the first high dose extension lost link distance 460 travelled by the drive pin 146 when the drive pin 146 is disengaged from the pump actuator 18 during the first phase 442 of the high dose extension motion and the second high dose lost link distance 462 travelled by the drive pin 146 when the drive pin 146 is disengaged from the pump actuator 18 during the third phase 448 of the high dose extension motion. The lost link distance 200 in the retraction direction is the same as the lost link distance 200 in the extension direction, and is the vertical distance travelled by the drive pin 146 when the drive pin 146 is disengaged from the pump actuator 18 during the first phase 450 of the high dose retraction motion.

When the sliding body 48 is at the high dose position shown in FIGS. 80 to 84, the engagement distance 194 is larger and the lost link distance 200 is smaller in comparison to when the sliding body 48 is at the medium dose position shown in FIGS. 72 to 77. As a result, the piston-forming element 26 travels a large stroke distance 196 as shown in FIG. 12, which causes the fluid pump 16 to dispense a high dose of the fluid.

The embodiment shown in FIGS. 57 to 84 has many of the same advantages as the embodiments shown in FIGS. 1 to 56. For example, the dose adjustment mechanism 186 allows the volume of fluid that is dispensed with each activation of the dispenser 10 to be adjusted merely by selecting the position of the sliding body 48, and without requiring any changes to the interface between the piston-forming element 26 and the pump actuator 18. Furthermore, the dose adjustment mechanism 186 allows the piston-forming element 26 to return to the same retracted position regardless of whether the dose adjustment mechanism 186 is at the high dose setting, the medium dose setting, or the low dose setting. This is because the drive pin 146 always engages with the first cam surface 68 when at the retraction position, and the first cam surface 68 remains stationary relative to the pump engagement body 46 of the pump actuator 18, regardless of whether the sliding body 48 is at the high dose position, the medium dose position, or the low dose position.

The dose adjustment mechanism 186 also preferably has a compact and simplified construction that takes advantage of the lateral movement of the drive pin 146 as it travels in its circular activation path, with movement in the left lateral direction and the right lateral direction as well as in the retraction direction and the extension direction. For example, the dose adjustment mechanism 186 is preferably made compact by placing the first adjustable cam member 370 and the second adjustable cam member 372 radially within the circular activation path of the drive pin 146 when the sliding body 48 is at the low dose position, so that the lateral movement of the drive pin 146 causes it to largely bypass the first adjustable cam member 370 and the second adjustable cam member 372 when the driver 20 is activated. This preferably saves space as compared to an alternative construction in which the first adjustable cam member 370 and the second adjustable cam member 372 are placed radially outside the circular activation path of the drive pin 146 when at the low dose position. The dose adjustment mechanism 186 also preferably has a simplified construction with the pump actuator 18 having only two parts, the pump engagement body 46 and the sliding body 48.

As can be seen in FIGS. 64 to 69, 72 to 77, and 80 to 84, the lateral position of the sliding body 48 relative to the pump engagement body 46 determines which surfaces of the driver engagement mechanism 298 the drive pin 146 contacts as it travels in its circular activation path. The surfaces of the driver engagement mechanism 298 that the drive pin 146 contacts as it travels in the retraction direction during one or more of the low dose retraction motion, the medium dose retraction motion, and the high dose retraction motion are collectively referred to herein as the retraction surfaces 456, and the surfaces of the driver engagement mechanism 298 that the drive pin 146 contacts as it travels in the extension direction during one or more of the low dose extension motion, the medium dose extension motion, and the high dose extension motion are collectively referred to herein as the extension surfaces 458.

As can be seen in FIGS. 64 to 69, the lateral positions of the first adjustable cam member 370 and the second adjustable cam member 372 when the sliding body 48 is at the low dose position cause the drive pin 146 to largely bypass the first adjustable cam member 370 and the second adjustable cam member 372 as it travels in its circular activation path and engages with the first cam surface 68 and the second cam surface 132. As a result, there is a relatively large lost link distance 200 and a correspondingly small dose of fluid dispensed. As can be seen in FIGS. 72 to 77, the lateral positions of the first adjustable cam member 370 and the second adjustable cam member 372 when the sliding body 48 is at the medium dose position cause the drive pin 146 to largely bypass the first adjustable cam member 370 and engage with the second adjustable cam member 372 as it travels in its circular activation path, without engaging with the second cam surface 132. As a result, there is a comparatively smaller lost link distance 200 and a medium dose of fluid is dispensed. As can be seen in FIGS. 80 to 84, the lateral positions of the first adjustable cam member 370 and the second adjustable cam member 372 when the sliding body 48 is at the high dose position cause the drive pin 146 to engage extensively with the first adjustable cam member 370 as it travels in its circular activation path, without engaging with either the second adjustable cam surface 388 or the second cam surface 132. As a result, the lost link distance 200 is even smaller and a high dose of fluid is dispensed.

The dose locking body 368 and the indentations 344, 346, 348 act as a locking mechanism 320 that prevents that driver 20 from moving the sliding body 48 relative to the pump engagement body 46 when the driver 20 is activated. In particular, the engagement of the dose locking body 368 with the indentations 344, 346, 348 provides resistance against lateral movement of the sliding body 48 relative to the pump engagement body 46. The degree of resistance is preferably selected so that any lateral forces encountered when the drive pin 146 engages with the sliding body 48 as the drive pin 146 travels in its circular activation path are not sufficient to overcome the resistance.

The embodiments shown in FIGS. 1 to 84 therefore provide a fluid dispenser 10 comprising: a pump mechanism 34 that dispenses a dose of fluid when a movable pump member 22 of the pump mechanism 34 is moved between an extended position and a retracted position; a pump engagement body 46 that engages with the movable pump member 22 for effecting movement of the movable pump member 22 between the extended position and the retracted position; a driver engagement mechanism 298 having one or more retraction surfaces 456 and one or more extension surfaces 458 that are connected to the pump engagement body 46, at least one of the one or more retraction surfaces 456 and the one or more extension surfaces 458 comprising an adjustable cam surface 302 whose location relative to the pump engagement body 46 is selectively adjustable; a driver 20 having a camming body 296 that moves between an extension position and a retraction position when the driver 20 is activated, the camming body 296 engaging with at least one of the one or more retraction surfaces 456 and at least one of the one or more extension surfaces 458 to effect movement of the pump engagement body 46; and a dose adjustment mechanism 186 for selecting the location of the adjustable cam surface 302 relative to the pump engagement body 46.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the specific constructions of the fluid dispenser 10 that have been described and illustrated. Rather, any suitable construction that provides an adjustable cam surface 302 whose location relative to the pump engagement body 46 is selectively adjustable could be used. The invention includes, for example, fluid dispensers 10 in which the first cam surface 68 is adjustable relative to the pump engagement body 46 and the second cam surface 132 is stationary relative to the pump engagement body 46, in which the second cam surface 132 is adjustable relative to the pump engagement body 46 and the first cam surface 68 is stationary relative to the pump engagement body 46, and in which both the first cam surface 68 and the second cam surface 132 are adjustable relative to the pump engagement body 46.

Although the preferred embodiments have been described with reference to a particular upwards and downwards orientation, it is to be appreciated that the invention is not limited to this orientation. Rather, the invention could be adapted for any desired orientation, including, for example, embodiments that draw the fluid upwardly from the fluid reservoir 14.

Although the preferred embodiments have been described as incorporating a drive wheel 144 with a drive pin 146, the invention is not limited to drivers 20 that incorporate these features. The driver 20 could have any suitable construction that provides a moveable camming body 296 that engages with the driver engagement mechanism 298 to effect movement of the pump actuator 18.

Although the preferred embodiments have been described as being electronically operated, the fluid dispenser 10 could also be manually operated. For example, the driver 20 could be connected to an activation mechanism, such as a lever, that is manually operable to effect movement of the camming body 296 between the retraction and extension positions.

Although the fluid dispenser 10 preferably dispenses hand cleaning fluid, such as hand soap or hand sanitizer, the dispenser 10 could be adapted to dispense other fluids as well, such as condiments, tooth paste, shaving foam, or hand lotion. Although the preferred embodiments have been described as dispensing foam, the invention is in no way limited to dispensers 10 that dispense foam. Rather, the dispenser 10 could be adapted to dispense any type of fluid, and need not incorporate an air compartment 166 or a foam generator 176. The term "fluid" as used herein includes any flowable substance, including liquids, foams, emulsions, and dispersions.

The fluid dispenser 10 could be adapted to dispense any desired volume of fluid at each dosage setting, and could have fewer dosage settings or more dosage settings than those shown in the preferred embodiments.

Although some of the preferred embodiments have described the drive pin 146 as returning to the extension position after each activation, this is not necessary. For example, the drive pin 146 could alternatively return to the retraction position after each activation. The drive pin 146 could also return to an intermediate position that is between the retraction position and the extension position after each activation. The retraction motion and/or the extension motion could also be split into more than one part, for example with a first part of the retraction motion occurring as the drive pin 146 moves from an intermediate position to the retraction position, and a second part of the retraction motion occurring as the drive pin 146 moves from the extension position back to the intermediate position. The fluid pump 16 could also be adapted to dispense fluid during the extension motion instead of the retraction motion. Furthermore, the drive wheel 144 need not complete a full rotation with each activation. For example, the drive wheel 144 could be configured to rotate in a clockwise direction to move the drive pin 146 from the extension position to the retraction position, and then rotate in a counter clockwise direction to move the drive pin 146 from the retraction position back to the extension position. Also, the retraction position and the extension position of the drive pin 146 could be different from those shown in the Figures, and for example could be located less than 180 degrees from each other.

The terms "high dosage", "medium dosage", and "low dosage" as used herein are not limited to any particular range of dosages, but rather refer solely to the relative volumes of fluid that are dispensed at each dosage setting. Any dosage setting that dispenses a greater volume of fluid than another dosage setting may be referred to as a "high dosage setting", and any dosage setting that dispenses a smaller volume of fluid than another dosage setting may be referred to as a "low dosage setting", regardless of whether the absolute volume of fluid that is dispensed might be considered large or small in a given context.

Although the first and second cam surfaces 68, 132 are shown in the preferred embodiments as being horizontal, flat, and parallel, this is not strictly necessary. The invention could also incorporate cam surfaces 68, 132 that have vertical or slanted orientations, have curved or irregular shapes, and/or are not parallel with each other. The shape and/or orientation of the cam surfaces 68, 132 may be selected, for example, to affect the relative speed that the piston-forming element 26 moves relative to the piston chamber-forming body 28 at different parts of the retraction motion and/or the extension motion.

Although the embodiment shown in FIGS. 57 to 84 includes a first adjustable cam surface 374 and a second adjustable cam surface 388, the driver engagement mechanism 298 could alternatively have just one adjustable cam surface 302 or more than two. The first cam surface 68 and the second cam surface 132 also do not need to have a fixed location relative to the pump engagement body 46, and could for example be carried by the sliding body 48 so as to be laterally slidable relative to the pump engagement body 46. The size and location of the first adjustable cam surface 374 and the second adjustable cam surface 388 could also be different from that shown in the drawings. For example, the first adjustable cam surface 374 could have a size and location that are selected so that, when the sliding body 48 is at the high dose setting, the camming body 296 remains in continuous contact with both the first cam surface 68 and the first adjustable cam surface 374, so that the lost link distance 200 is zero. The first adjustable cam surface 374 could also have a size and location that are selected so that, when the sliding body 48 is at the medium and low dose settings, the camming body 296 does not contact the first adjustable cam surface 374 at all. The drive pin 146 could also be configured to travel in a non-circular path when the driver 20 is activated, such as in an oval or figure eight pattern.

Although this disclosure has described and illustrated certain preferred embodiments of the invention, it is to be understood that the invention is not restricted to these particular embodiments. Rather, the invention includes all embodiments which are functional, mechanical, or electrical equivalents of the specific embodiments and features that have been described and illustrated herein.

The invention claimed is:

1. A fluid dispenser comprising:
 a pump mechanism that dispenses a dose of fluid when a movable pump member of the pump mechanism is moved between an extended position and a retracted position;
 a pump engagement body that engages with the movable pump member for effecting movement of the movable pump member between the extended position and the retracted position;
 a driver engagement mechanism having one or more retraction surfaces and one or more extension surfaces that are connected to the pump engagement body, at least one of the one or more retraction surfaces and the one or more extension surfaces comprising an adjustable cam surface whose location relative to the pump engagement body is selectively adjustable;
 a driver having a camming body that moves between an extension position and a retraction position when the driver is activated, the camming body engaging with at least one of the one or more retraction surfaces and at least one of the one or more extension surfaces to effect movement of the pump engagement body; and
 a dose adjustment mechanism for selecting the location of the adjustable cam surface relative to the pump engagement body;

wherein the driver engagement mechanism has a first cam surface and a second cam surface that are connected to the pump engagement body;

wherein the location of the adjustable cam surface is selectable from at least a first location and a second location;

wherein, when the adjustable cam surface is at the first location and the driver is activated the camming body engages with at least the first cam surface and the second cam surface to effect movement of the pump engagement body;

wherein, when the adjustable cam surface is at the second location and the driver is activated, the camming body engages with at least the first cam surface and the adjustable cam surface to effect movement of the pump engagement body, without engaging with the second cam surface;

wherein, when the driver is activated, the camming body moves away from the extension position and towards the retraction position in a retraction motion, and moves away from the retraction position and towards the extension position in an extension motion wherein the camming body engages with the at least one of the one or more retraction surfaces at least during an engagement portion of the retraction motion;

wherein the camming body engages with the at least one of the one or more extension surfaces at least during an engagement portion of the extension motion;

wherein the one or more retraction surfaces comprise the first cam surface;

wherein the one or more extension surfaces comprise the adjustable cam surface and the second cam surface;

wherein, when the adjustable cam surface is at the first location, the camming body engages with the first cam surface during at least part of the engagement portion of the retraction motion;

wherein, when the adjustable cam surface is at the first location, the camming body engages with the second cam surface during at least part of the engagement portion of the extension motion;

wherein, when the adjustable cam surface is at the second location, the camming body engages with the first cam surface during at least part of the engagement portion of the retraction motion;

wherein, when the adjustable cam surface is at the second location, the camming body engages with the adjustable cam surface during at least part of the engagement portion of the extension motion; and wherein, when the adjustable cam surface is at the first location, the camming body is disengaged from the one or more retraction surfaces and the one or more extension surfaces during a disengagement portion of the retraction motion and during a disengagement portion of the extension motion.

2. A fluid dispenser comprising:

a pump mechanism that dispenses a dose of fluid when a movable pump member of the pump mechanism is moved between an extended position and a retracted position;

a pump engagement body that engages with the movable pump member for effecting movement of the movable pump member between the extended position and the retracted position;

a driver engagement mechanism having one or more retraction surfaces and one or more extension surfaces that are connected to the pump engagement body, at least one of the one or more retraction surfaces and the one or more extension surfaces comprising an adjustable cam surface whose location relative to the pump engagement body is selectively adjustable;

a driver having a camming body that moves between an extension position and a retraction position when the driver is activated, the catching body engaging with at least one the one or more retraction surfaces and at least one of the one or more extension surfaces to effect movement of the pump engagement body; and a dose adjustment mechanism for selecting the location of the adjustable cam surface relative to the pump engagement body;

wherein the driver engagement mechanism has a first cam surface and a second cam surface that are connected to the pump engagement body;

wherein the location of the adjustable cam surface is selectable from at least a first location and a second location;

wherein, when the adjustable cam surface is at the first location and the driver is activated, the camming body engages with at least the first cam surface and the second cam surface to effect movement of the pump engagement body;

wherein, when the adjustable cam surface is at the second location and the driver is activated, the camming body engages with at least the first cam surface and the adjustable cam surface to effect movement of the pump engagement body, without engaging with the second cam surface;

wherein the camming body is positioned between the first cam surface and the second cam surface;

wherein, when the adjustable cam surface is at the second location, the adjustable cam surface is positioned between the first cam surface and the second cam surface; and wherein, when the adjustable cam surface is at the second location, a distance between the first cam surface and the second cam surface is greater than a distance between the first cam surface and the adjustable cam surface.

3. The fluid dispenser according to claim 1, wherein the camming body travels a lost link distance in a retraction direction during the disengagement portion of the retraction motion, and travels the lost link distance in an extension direction during the disengagement portion of the extension motion;

wherein the lost link distance is greater when the adjustable cam surface is at the first location than when the adjustable cam surface is at the second location;

wherein the camming body travels an engagement distance in the retraction direction during the engagement portion of the retraction motion, and travels the engagement distance in the extension direction during the engagement portion of the extension motion;

wherein the engagement distance is greater when the adjustable cam surface is at the second location than when the adjustable cam surface is at the first location;

wherein the camming body, through engagement with the at least one of the one or more retraction surfaces, moves the pump engagement body the engagement distance in the retraction direction during the retraction motion, which moves the movable pump member to the retracted position;

wherein the camming body, through engagement with the at least one of the one or more extension surfaces, moves the pump engagement body the engagement distance in the extension direction during the extension motion, which moves the movable pump member to the extended position;

wherein a stroke distance between the retracted position and the extended position decreases as the engagement distance decreases; and wherein a volume of the dose of fluid that is dispensed from the pump mechanism decreases as the stroke distance decreases.

4. The fluid dispenser according to claim 3, wherein the driver comprises a drive wheel that rotates about a drive axis when the driver is activated;

wherein the camming body is carried on the drive wheel and is spaced from the drive axis, so that the camming body moves in a circular path around the drive axis as the drive wheel rotates;

wherein the pump engagement body and the movable pump member are movable in the retraction direction and in the extension direction relative to the drive axis;

wherein with each activation of the driver, the camming body travels an equal distance in the retraction direction and in the extension direction relative to the drive axis; and wherein the drive wheel completes one rotation with each activation of the driver.

5. The fluid dispenser according to claim 3, wherein, when the driver is activated, the caroming body travels in a first lateral direction and an opposite second lateral direction in addition to travelling in the retraction direction and the extension direction, the first lateral direction and the second lateral direction being perpendicular to the retraction direction and perpendicular to the extension direction;

wherein, when the adjustable cam surface is at the first location and the driver is activated;

the camming body travels past the adjustable cam surface in the extension direction during the extension motion, and travels past the adjustable cam surface in the retraction direction during the retraction motion;

the camming body is located in the first lateral direction relative to the adjustable cam surface when the camming body passes the adjustable cam surface in the extension direction during the extension motion; and the camming body is located in the second lateral direction relative to the adjustable cam surface when the camming body passes the adjustable cam surface in the retraction direction during the retraction motion.

6. The fluid dispenser according to claim 3, wherein the dose adjustment mechanism comprises a sliding body that carries the adjustable cam surface;

wherein the sliding body is laterally slideable relative to the pump engagement body for selecting the location of the adjustable cam surface relative to the pump engagement body; and wherein the pump engagement body comprises a holding member that carries the sliding body, allows the sliding body to slide laterally relative to the pump engagement body, and prevents the sliding body from moving in the retraction direction or in the extension direction relative to the pump engagement body.

7. The fluid dispenser according to claim 1, wherein the pump mechanism further comprises a reciprocal pump member, the movable pump member being movable relative to the reciprocal pump member between the retracted position and the extended position;

wherein, when the movable pump member is at the retracted position, a movable pump surface of the movable pump member is a retracted distance from a reciprocal pump surface of the reciprocal pump member;

wherein, when the movable pump member is at, the extended position, the movable pump surface of the movable pump member is an extended distance from the reciprocal pump surface of the reciprocal pump member;

wherein the extended distance is greater than the retracted distance;

wherein the engagement of the camming body with the at least one of the one or more retraction surfaces during the retraction motion moves the movable pump member to the retracted position;

wherein the engagement of the camming body with the at least one of the one or more extension surfaces during the extension motion moves the movable pump member to the extended position;

wherein the extended distance between the movable pump surface and the reciprocal pump surface is greater then the adjustable cam surface is at the second location than when the adjustable cam surface is at the first location;

wherein the camming body engages with the first cam surface when the camming body is at the retraction position, regardless of whether the adjustable cam surface is at the first location or the second location; and wherein the first cam surface has a fixed location relative to the pump engagement body, so that the retracted distance between the movable pump surface and the reciprocal pump surface remains constant regardless of whether the adjustable cam surface is at the first location or the second location.

8. The fluid dispenser according to claim 6, wherein the adjustable cam surface is a first adjustable cam surface;

wherein the location of the first adjustable cam surface is selectable from at least the first location, the second location, and a third location;

wherein the sliding body carries a second adjustable cam surface that is spaced from the first adjustable cam surface;

wherein, when the first adjustable cam surface is at the third location and the driver is activated, the camming body engages with at least the first cam surface and the second adjustable cam surface to effect movement of the pump engagement body;

wherein, when the first adjustable cam surface is at the third location, the second adjustable cam surface is positioned between the first cam surface and the second cam surface;

wherein the one or more extension surfaces further comprise the second adjustable cam surface;

wherein, when the first adjustable cam surface is at the third location, the camming body engages with the first cam surface during at least part of the engagement portion of the retraction motion;

wherein, when the first adjustable cam surface is at the third location, the camming body engages with the second adjustable cam surface during at least part of the engagement portion of the extension motion;

wherein the lost link distance is greater when the first adjustable cam surface is at the second location than when the first adjustable cam surface is at the third location; and wherein the first cam surface, the second cam surface, the first adjustable cam surface, and the second adjustable cam surface are substantially parallel.

9. The fluid dispenser according to claim 1, wherein the dose adjustment mechanism comprises a locking mechanism that prevents the camming body from moving the adjustable cam surface relative to the pump engagement body.

10. The fluid dispenser according to claim 1, wherein the movable pump member has a catch member, and the pump engagement body has a catch mechanism that engages with the catch member to effect movement of the movable pump member between the extended position and the retracted position;
   wherein the driver engagement mechanism is spaced from the catch mechanism; and
   wherein the catch member is spaced from the camming body.

11. A fluid dispenser comprising:
   a pump mechanism that dispenses a dose of fluid when a movable pump member of the pump mechanism is moved between an extended position and a retracted position;
   a pump engagement body that engages with the movable pump member for effecting movement of the movable pump member between the extended position and the retracted position;
   a driver engagement mechanism having one or more retraction surfaces and one or more extension surfaces that are connected to the pump engagement body, at least one of the one or more retraction surfaces and the one or more extension surfaces comprising an adjustable cam surface whose location relative to the pump engagement body is selectively adjustable;
   a driver having a camming body that moves between an extension position and a retraction position when the driver is activated, the camming body engaging with at least one of the one or more retraction surfaces and at least one of the one or more extension surfaces to effect movement of the pump engagement body;
   a dose adjustment mechanism for selecting the location of the adjustable cam surface relative to the pump engagement body;
wherein the dose adjustment mechanism comprises a sliding body that carries the adjustable cam surface; and
   wherein the sliding body is laterally slideable relative to the pump engagement body for selecting the location of the adjustable cam surface relative to the pump engagement body.

12. The fluid dispenser according to claim 1, wherein the first cam surface, the second cam surface, and the adjustable cam surface are substantially parallel.

13. The fluid dispenser according to claim 1, wherein the first cam surface and the second cam surface each comprise a respective surface of the pump engagement body.

14. The fluid dispenser according to claim 1,
   wherein the first cam surface has a fixed location relative to the pump engagement body; and
   wherein the camming body engages with the first cam surface when the calm ling body is at the retraction position.

15. The fluid dispenser according to claim 1, wherein the first cam surface has a fixed location relative to the pump engagement body; and
   wherein the camming body engages with the first cam surface when the camming body is at the retraction position, regardless of whether the adjustable cam surface is at the first location or the second location.

16. A fluid dispenser comprising:
   a pump mechanism that dispenses a dose of fluid when a movable pump member of the pump mechanism is moved between an extended position and a retracted position;
   a pump engagement body that engages with the movable pump member for effecting movement of the movable pump member between the extended position and the retracted position;
   a driver engagement mechanism having one or more retraction surfaces and one or more extension surfaces that are connected to the pump engagement body, at least one of the one or more retraction surfaces and the one or more extension surfaces comprising an adjustable cam surface whose location relative to the pump engagement body is selectively adjustable;
   a driver having a camming body that moves between an extension position and a retraction position when the driver is activated, the camming body engaging with at least one of the one or more retraction surfaces and at least one of the one or more extension surfaces to effect movement of the pump engagement body; and
   a dose adjustment mechanism for selecting the location of the adjustable cam surface relative to the pump engagement body;
wherein, when the driver is activated, the camming body moves in a retraction direction towards the retraction position during a retraction motion, and moves in an extension direction towards the extension position during an extension motion;
   wherein, when the driver is activated, the camming body also travels in a first lateral direction and an opposite second lateral direction, the first lateral direction and the second lateral direction being perpendicular to the retraction direction and perpendicular to the extension direction;
   wherein, when the adjustable cam surface is at a first location and the driver is activated;
   the camming body travels past the adjustable cam surface in the extension direction during the extension motion, and travels past the adjustable cam surface in the retraction direction during the retraction motion;
   the camming body is located in the first lateral direction relative to the adjustable cam surface when the camming body passes the adjustable cam surface in the extension direction during the extension motion; and
   the camming body is located in the second lateral direction relative to the adjustable cam surface when the camming body passes the adjustable cam surface in the retraction direction during the retraction motion.

17. The fluid dispenser according to claim 2, wherein, when the driver is activated, the camming body moves away from the extension position and towards the retraction position in a retraction motion, and moves away from the retraction position and towards the extension position in an extension motion;
   wherein the caroming body engages with the at least one of the one or more retraction surfaces at least during an engagement portion of the retraction motion;
   wherein the camming body engages with the at least one of the one or more extension surfaces at least during an engagement portion of the extension motion;
   wherein the one or more retraction surfaces comprise the first cam surface;
   wherein the one or more extension surfaces comprise the adjustable cam surface and the second cam surface;

wherein, when the adjustable cam surface is at the first location, the camming body engages with the first cam surface during at least part of the engagement portion of the retraction motion;

wherein, when the adjustable cam surface is at the first location, the camming body engages with the second cam surface during at least part of the engagement portion of the extension motion;

wherein, when the adjustable cam surface is at the second location, the camming body engages with the first cam surface during at least part of the engagement portion of the retraction motion;

wherein, when the adjustable cam surface is at the second location, the camming body engages with the adjustable cam surface during at least part of the engagement portion of the extension motion;

wherein, when the adjustable cam surface is at the first location, the camming body is disengaged from the one or more retraction surfaces and the one or more extension surfaces during a disengagement portion of the retraction motion and during a disengagement portion of the extension motion;

wherein the camming body travels a lost link distance in a retraction direction during the disengagement portion of the retraction motion, and travels the lost link distance in an extension direction during the disengagement portion of the extension motion;

wherein the lost link distance is greater when the adjustable cam surface is at the first location than when the adjustable cam surface is at the second location;

wherein the camming body travels an engagement distance in the retraction direction during the engagement portion of the retraction motion, and travels the engagement distance in the extension direction during the engagement portion of the extension motion;

wherein the engagement distance is greater when the adjustable cam surface is at the second location than when the adjustable cam surface is at the first location;

wherein the camming body, through engagement with the at least one of the one or more retraction surfaces, moves the pump engagement body the engagement distance in the retraction direction during the retraction motion, which moves the movable pump member to the retracted position;

wherein the camming body, through engagement with the at least one of the one or more extension surfaces, moves the pump engagement body the engagement distance in the extension direction during the extension motion, which moves the movable pump member to the extended position;

wherein a stroke distance between the retracted position and the extended position decreases as the engagement distance decreases;

wherein a volume of the dose of fluid that is dispensed from the pump mechanism decreases as the stroke distance decreases;

wherein the driver comprises a drive wheel that rotates about a drive axis when the driver is activated;

wherein the camming body is carried on the drive wheel and is spaced from the drive axis, so that the camming body moves in a circular path around the drive axis as the drive wheel rotates;

wherein the pump engagement body and the movable pump member are movable in the retraction direction and in the extension direction relative to the drive axis;

wherein with each activation of the driver, the camming body travels an equal distance in the retraction direction and in the extension direction relative to the drive axis;

wherein the drive wheel completes one rotation with each activation of the driver;

wherein, when the driver is activated, the camming body travels in a first lateral direction and an opposite second lateral direction in addition to travelling in the retraction direction and the extension direction, the first lateral direction and the second lateral direction being perpendicular to the retraction direction and perpendicular to the extension direction; and wherein; when the adjustable cam surface is at the first location and the driver is activated;

the camming body travels past the adjustable cam surface in the extension direction during the extension motion, and travels past the adjustable cam surface in the retraction direction during the retraction motion;

the camming body is located in the first lateral direction relative to the adjustable cam surface when the camming body passes the adjustable cam surface in the extension direction during the extension motion; and the camming body is located in the second lateral direction relative to the adjustable cam surface when the camming body passes the adjustable cam surface in the retraction direction during the retraction motion.

18. The fluid dispenser according to claim 17, wherein the dose adjustment mechanism comprises a sliding body that carries the adjustable cam surface;

wherein the sliding body is laterally slideable relative to the pump engagement body for selecting the location of the adjustable cam surface relative to the pump engagement body;

wherein the pump engagement body comprises a holding member that carries the sliding body, allows the sliding body to slide laterally relative to the pump engagement body, and prevents the sliding body from moving in the retraction direction or in the extension direction relative to the pump engagement body;

wherein the pump mechanism further comprises a reciprocal pump member, the movable pump member being movable relative to the reciprocal pump member between the retracted position and the extended position;

wherein, when the movable pump member is at the retracted position, a movable pump surface of the movable pump member is a retracted distance from a reciprocal pump surface of the reciprocal pump member;

wherein, when the movable pump member is at the extended position, the movable pump surface of the movable pump member is an extended distance from the reciprocal pump surface of the reciprocal pump member;

wherein the extended distance is greater than the retracted distance;

wherein the engagement of the camming body with the at least one of the one or more retraction surfaces during the retraction motion moves the movable pump member to the retracted position;

wherein the engagement of the camming, body with the at least one of the one or more extension surfaces during the extension motion moves the movable pump member to the extended position;

wherein the extended distance between the movable pump surface and the reciprocal pump surface is greater when the adjustable cam surface is at the second location than when the adjustable cam surface is at the first location;

wherein the camming body engages with the first cam surface when the camming body is at the retraction position, regardless of whether the adjustable cam surface is at the first location or the second location;

wherein the first cam surface has a fixed location relative to the pump engagement body, so that the retracted distance between the movable pump surface and the reciprocal pump surface remains constant regardless of whether the adjustable cam surface is at the first location or the second location;

wherein the adjustable cam surface is a first adjustable cam surface;

wherein the location of the first adjustable cam surface is selectable from at least the first location, the second location, and a third location;

wherein the sliding body carries a second adjustable cam surface that is spaced from the first adjustable cam surface;

wherein, when the first adjustable cam surface is at the third location and the driver is activated, the camming body engages with at least the first cam surface and the second adjustable cam surface to effect movement of the pump engagement body;

wherein, when the first adjustable cam surface is at the third location, the second adjustable cam surface is positioned between the first cam surface and the second cam surface;

wherein the one or more extension surfaces further comprise the second adjustable cam surface;

wherein, when the first adjustable cam surface is at the third location, the camming body engages with the first cam surface during at least part of the engagement portion of the retraction motion;

wherein, when the first adjustable cam surface is at the third location, the camming body engages with the second adjustable cam surface during at least part of the engagement portion of the extension motion;

wherein the lost link distance is greater when the first adjustable cam surface is at the second location than when the first adjustable cam surface is at, the third location;

wherein the first cam surface, the second cam surface, the first adjustable cam surface, and the second adjustable cam surface are substantially parallel;

wherein the dose adjustment mechanism comprises a locking mechanism that prevents the camming body from moving the adjustable cam surface relative to the pump engagement body;

wherein the movable pump member has a catch member, and the pump engagement body has a catch mechanism that engages with the catch member to effect movement of the movable pump member between the extended position and the retracted position;

wherein the driver engagement mechanism is spaced from the catch mechanism;

wherein the catch member is spaced from the camming body;

wherein the first cam surface and the second cam surface each comprise a respective surface of the pump engagement body; and wherein the fluid is a hand cleaning fluid.

* * * * *